US012754935B2

(12) United States Patent
Melbouci et al.

(10) Patent No.: US 12,754,935 B2
(45) Date of Patent: Oct. 6, 2026

(54) TECHNIQUES FOR ASSIGNING LABELS TO DATASET FIELDS

(71) Applicant: Ab Initio Technology LLC, Lexington, MA (US)

(72) Inventors: Sandrick Melbouci, Myersville, MD (US); Andrew Schon, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/999,645

(22) Filed: Dec. 23, 2024

(65) Prior Publication Data

US 2025/0217388 A1 Jul. 3, 2025

Related U.S. Application Data

(60) Provisional application No. 63/682,655, filed on Aug. 13, 2024, provisional application No. 63/615,443, filed on Dec. 28, 2023.

(51) Int. Cl.
*G06N 20/00* (2019.01)
*G06F 16/28* (2019.01)

(52) U.S. Cl.
CPC .................................. *G06F 16/285* (2019.01)

(58) Field of Classification Search
CPC ...... G06F 40/186; G06F 40/30; G06F 16/221; G06F 40/18; G06F 40/177; G06F 16/287; G06F 16/116; G06F 11/302; G06F 40/40; G06F 16/23; G06F 18/22; G06F 40/169; G06F 16/16; G06F 16/211; G06F 16/215; G06F 16/217; G06F 16/2365; G06F 16/2379; G06F 16/2455; G06F 16/2457; G06F 16/25; G06F 16/285; G06F 16/906; G06F 40/211; G06Q 10/103; G06Q 10/101; H04L 51/10; H04L 51/04; H04L 51/08;
(Continued)

(56) References Cited

U.S. PATENT DOCUMENTS

| | | | |
|---|---|---|---|
| 7,587,636 | B2 | 9/2009 | Tillmann et al. |
| 7,756,873 | B2 | 7/2010 | Gould et al. |

(Continued)

FOREIGN PATENT DOCUMENTS

| | | | |
|---|---|---|---|
| CN | 109191030 | A | 1/2019 |
| CN | 110442568 | A | 11/2019 |
| EP | 3 745 276 | A1 | 12/2020 |
| JP | 2022-535792 | A | 8/2022 |

OTHER PUBLICATIONS

Canadian Office Action for Canadian Application No. 3142252 mailed Jan. 30, 2024. 8 pages.

(Continued)

*Primary Examiner* — Shyue Jiunn Hwa
(74) *Attorney, Agent, or Firm* — Wolf, Greenfield & Sacks, P.C.

(57) ABSTRACT

Techniques for processing a dataset comprising data stored in fields to identify field labels. The field labels describe data stored in the dataset fields. The techniques determine whether any field labels in a field label glossary match a field. If none of the field labels in the field label glossary match the field, the techniques generate a new field label using the name of the field. The generated field label may be assigned to the field.

20 Claims, 41 Drawing Sheets

(58) Field of Classification Search
CPC ........ G06N 20/00; G06N 3/042; G06N 3/044; G06N 3/045; G06N 3/08; G06N 5/01; G06N 5/022; G06N 5/025
See application file for complete search history.

(56) References Cited

U.S. PATENT DOCUMENTS

| | | | |
|---|---|---|---|
| 7,849,075 | B2 | 12/2010 | Gould et al. |
| 8,082,243 | B2 | 12/2011 | Gorelik et al. |
| 8,379,939 | B1 | 2/2013 | Bourdev et al. |
| 8,583,747 | B2 | 11/2013 | Buchheit et al. |
| 8,732,213 | B2 | 5/2014 | Sowell et al. |
| 8,868,580 | B2 | 10/2014 | Gould et al. |
| 9,792,351 | B2 | 10/2017 | Hernandez-Sherrington et al. |
| 10,198,460 | B2 | 2/2019 | Gorelik |
| 10,409,802 | B2 | 9/2019 | Spitz et al. |
| 10,459,954 | B1 | 10/2019 | Walters et al. |
| 10,489,360 | B2 | 11/2019 | Procops et al. |
| 10,552,443 | B1 | 2/2020 | Wu et al. |
| 10,565,177 | B2 | 2/2020 | Gausman |
| 11,704,494 | B2 | 7/2023 | Butler et al. |
| 11,886,399 | B2 | 1/2024 | Joyce et al. |
| 12,141,107 | B2 | 11/2024 | Joyce et al. |
| 12,265,538 | B2 * | 4/2025 | Garib .................... G06N 5/022 |
| 12,456,016 | B2 | 10/2025 | Butler et al. |
| 2007/0027674 | A1 | 2/2007 | Parson et al. |
| 2008/0027860 | A1 | 1/2008 | Mullen et al. |
| 2008/0201172 | A1 | 8/2008 | McNamar |
| 2009/0123419 | A1 | 5/2009 | Sherman et al. |
| 2011/0066602 | A1 | 3/2011 | Studer et al. |
| 2012/0030160 | A1 | 2/2012 | Ratnam et al. |
| 2012/0254333 | A1 | 10/2012 | Chandramouli et al. |
| 2013/0031044 | A1 | 1/2013 | Miranda et al. |
| 2013/0073594 | A1 | 3/2013 | Jugulum et al. |
| 2013/0166515 | A1 | 6/2013 | Kung et al. |
| 2014/0095296 | A1 | 4/2014 | Angell et al. |
| 2014/0108357 | A1 | 4/2014 | Procops et al. |
| 2014/0280062 | A1 | 9/2014 | Augustin et al. |
| 2015/0032609 | A1 | 1/2015 | Abuelsaad et al. |
| 2015/0095296 | A1 | 4/2015 | Nandwani et al. |
| 2015/0169715 | A1 | 6/2015 | Kanellos et al. |
| 2016/0042225 | A1 | 2/2016 | Barak |
| 2016/0055427 | A1 | 2/2016 | Adjaoute |
| 2016/0364325 | A1 | 12/2016 | Ouzzani et al. |
| 2017/0060894 | A1 | 3/2017 | Gorelik |
| 2017/0068891 | A1 | 3/2017 | Shironoshita |
| 2017/0139975 | A1 | 5/2017 | Chow et al. |
| 2017/0193838 | A1 | 7/2017 | Buchenau et al. |
| 2017/0235848 | A1 | 8/2017 | Van Dusen et al. |
| 2018/0060404 | A1 | 3/2018 | Sun et al. |
| 2018/0107694 | A1 | 4/2018 | Dupey et al. |
| 2019/0215331 | A1 | 7/2019 | Anakata et al. |
| 2019/0220508 | A1 | 7/2019 | Hu |
| 2019/0384745 | A1 * | 12/2019 | Gorelik ................. G06F 16/217 |
| 2020/0012626 | A1 | 1/2020 | Walters et al. |
| 2020/0012666 | A1 | 1/2020 | Walters et al. |
| 2020/0110736 | A1 | 4/2020 | Bauman |
| 2020/0301950 | A1 | 9/2020 | Lorrain-Hale et al. |
| 2020/0380212 | A1 | 12/2020 | Butler et al. |
| 2021/0192394 | A1 | 6/2021 | McKay et al. |
| 2021/0263900 | A1 | 8/2021 | Joyce et al. |
| 2022/0000245 | A1 | 1/2022 | Kim et al. |
| 2022/0245175 | A1 | 8/2022 | Hawco et al. |
| 2023/0409835 | A1 | 12/2023 | Butler et al. |
| 2024/0095219 | A1 | 3/2024 | Joyce et al. |
| 2024/0126734 | A1 | 4/2024 | Joyce et al. |
| 2024/0126735 | A1 | 4/2024 | Joyce et al. |
| 2024/0152495 | A1 | 5/2024 | Joyce et al. |
| 2025/0013629 | A1 * | 1/2025 | Raz ....................... G06F 16/906 |

OTHER PUBLICATIONS

Communication pursuant to Article 94(3) EPC for European Application No. 20177617.6 mailed Aug. 5, 2022.
Extended European Search Report for European Application No. 20177617.6 mailed Sep. 7, 2020.
Summons to attend oral proceedings for European Application No. 20177617.6 mailed Oct. 31, 2023.
International Search Report and Written Opinion mailed Mar. 3, 2025 in connection with International Application No. PCT/US2024/061691.
International Preliminary Report on Patentability for International Application No. PCT/US2020/035226 mailed Dec. 9, 2021.
International Preliminary Report on Patentability for International Application No. PCT/US2021/019572 mailed Sep. 9, 2022.
International Search Report and Written Opinion for International Application No. PCT/US2020/035226 mailed Aug. 19, 2020.
International Search Report and Written Opinion for International Application No. PCT/US2021/019572 mailed Jul. 22, 2021.
International Search Report and Written Opinion for International Application No. PCT/US2023/074617 mailed Jan. 3, 2024.
Invitation to Pay Additional Fees for International Application No. PCT/US2021/019572 mailed Jun. 1, 2021.
Japanese Office Action for Japanese Application No. 2022-550704 mailed May 23, 2024.
[No Author Listed], Informatica Advanced Masking Solution. Informatica. 2018. 3 pages. https://www.informatica.com/content/dam/informatica-com/en/collateral/solution-brief/advanced-masking-solution_solution-brief_3580en.pdf (Last accessed Nov. 4, 2023).
[No Author Listed], Rule-based system. Wikipedia. Oct. 2023. 2 pages. https://en.wikipedia.org/wiki/Rule-based_system (Last accessed Nov. 4, 2023).
[No Author Listed], Talend [Online] Get started with data profiling through automatic semantic discovery, Part II—Talend 6 Features. Nov. 10, 2015. 1 page. https://web.archive.org/web/20210721010236/https:/www.youtube.com/watch?v=EltwXhaPASM.
[No Author Listed], talend.com [Online] Semantic Discovery. Retrieved Dec. 10, 2019, retrieved from URL <https://help.talend.com/reader/nAXiZWojOH-2-YApZisRFw/uLT6CFkPAjCbZ30Tf9juFw> 8 pages.
[No Author Listed], Using AI and Machine Learning to Power Data Fingerprinting. Waterline Data. 2017. 6 pages. https://www.hitachivantara.com/en-us/pdfd/white-paper/using-ai-ml-to-power-data-fingerprinting-whitepaper.pdf (Last accessed Nov. 4, 2023).
Chen et al., Generating schema labels through dataset content analysis. Companion Proceedings of the The Web Conference 2018. Apr. 23, 2018: 1515-22.
Haldeman, Compare IBM data masking solutions: InfoSphere Optim and DataStage. IBM Corporation, Nov. 15, 2012. 4 pages.
Hassanzadeh, Semantic concept discovery over event databases. IBM. Jul. 17, 2018. 4 pages. https://phys.org/news/2018-07-semantic-concept-discovery-event-databases.html (Last accessed May 14, 2024).
Naumann, Data profiling revisited. ACM SIGMOD Record. Feb. 28, 2014;42(4):40-9.
Pham et al., Semantic labeling: a domain-independent approach. The Semantic Web-ISWC 2016: 15th International Semantic Web Conference, Kobe, Japan, Oct. 17-21, 2016:446-62.
Rouse, Semantic Data Model. Techopedia. Jun. 30, 2020. 11 pages. https://www.techopedia.com/definition/30489/semantic-data-model (Last accessed May 14, 2024).
Sorrentino et al., Schema label normalization for improving schema matching. Data & Knowledge Engineering. Oct. 2010;69(12):1254-73.
Japanese Office Action dated Aug. 15, 2025 in connection with Japanese Application No. 2025-515701.
Japanese Office Action dated Nov. 21, 2025 in connection with Japanese Application No. 2025-515701.
Japanese Decision to Grant a Patent dated Dec. 15, 2025 in connection with Japanese Application No. 2025-515701.
Australian Notice of Acceptance dated Nov. 26, 2025 in connection with Japanese Application No. 2023347913.

* cited by examiner

| String | Target |
|---|---|
| Credit | Card |
| Card | Number |
| Credit Card | Number |

Sequence Position Model 158B $$f(x) = \begin{cases} 0 & if\ x \leq Th \\ ax & if\ x > th \end{cases}$$

P(x, BizTerm) $=\sum_{1}^{N} \int_{L}^{H} ax$

Where:
N: Number of words in Bizterm
L: Lower Score (Th)
H: Higher Score: (Th + 0.9)

1159

| Target Word | Synonyms | Sequences Including Target Word | Collocated Words | Relative Positions | Losses |
|---|---|---|---|---|---|
| | | Seq. 11 | Word 11 | Pos. 11 | Loss 11 |
| | Syn. 11 | Seq. 12 | Word 12 | Pos. 12 | Loss 12 |
| Target Word 1 | Syn. 12 | Seq. 13 | Word 13 | Pos. 13 | Loss 13 |
| | | Seq. 21 | Word 21 | Pos. 21 | Loss 21 |
| | Syn. 21 | Seq. 22 | Word 22 | Pos. 22 | Loss 22 |
| Target Word 2 | Syn. 22 | Seq. 23 | Word 23 | Pos. 23 | Loss 23 |
| | Syn. 31 | Seq. 31 | Word 31 | Pos. 31 | Loss 31 |
| Target Word 3 | Syn. 32 | Seq. 32 | Word 32 | Pos. 32 | Loss 32 |

FIG. 13

1404

| Target Word | Synonyms | Sequences Including Target Word | Collocated Words | Relative Positions | Losses |
|---|---|---|---|---|---|
| | | Client Code | Code | -1 | 0 |
| | Customer | Client Number | Number | -1.5 | 0.18 |
| Client | Patron | Client Telephone Number | Telephone | -1 | 0 |
| | | | Client | 1.5 | 0.18 |
| | | Client Number | Telephone | 1 | 0 |
| | Code | Client Telephone Number | Credit | 2 | 0.3 |
| Number | Numeral | Credit Card Number | Card | 1 | 0 |
| | Cell | Telephone Number | Number | -1 | 0 |
| Telephone | Phone | Client Telephone Number | Client | 1 | 0 |

FIG. 14B

TECHNIQUES FOR ASSIGNING LABELS TO DATASET FIELDS

RELATED APPLICATIONS

This application priority to and the benefit of U.S. Provisional Patent Application No. 63/615,443, filed on Dec. 28, 2023, entitled "TECHNIQUES FOR ASSIGNING LABELS TO DATASET FIELDS." This application also claims priority to and the benefit of U.S. Provisional Patent Application No. 63/682,655, filed on Aug. 13, 2024, entitled "TECHNIQUES FOR ASSIGNING LABELS TO DATASET FIELDS." The contents of these applications are incorporated by reference in their entirety.

FIELD

Aspects of the present disclosure relate to techniques for automatically assigning labels to dataset fields by analyzing the names of the dataset fields using natural language processing (NLP) and, optionally, by analyzing sample data from the dataset fields. The techniques determine labels for the dataset fields that provide a natural language description of data stored in the dataset fields.

BACKGROUND

Modern data processing systems manage vast amounts of data (e.g., millions, billions, or trillions of data records). An institution (e.g., a multinational bank, a global technology company, an e-commerce company, etc.) may have vast amounts (e.g., hundreds or thousands of terabytes) of data that is used for its operations. For example, the data may include transaction records, documents, tables, files, and/or other types of data. A data processing system may store data in thousands or millions of different datasets. Each of the datasets may include multiple fields in which data is stored. For example, a dataset may be a table having multiple columns (or rows), where each column (or row) represents a dataset field storing one or multiple field values.

SUMMARY

Some embodiments provide a method for processing a dataset comprising data stored in fields to determine field labels for a set of the dataset's fields. The method comprises using at least one computer hardware processor to perform: for each particular field in one or more fields in the set of the dataset's fields: determining whether any field label in a field label glossary matches the particular field; when it is determined that a field label in the field label glossary matches the particular field, associating the particular field with the field label; and when it is determined that no field label in the field label glossary matches the particular field: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

Some embodiments provide a system for processing a dataset comprising data stored in fields to determine field labels for a set of the dataset's fields. The system comprises: at least one computer hardware processor; and at least one non-transitory computer-readable storage medium storing instructions that, when executed by the at least one computer hardware processor, cause the at least one processor to perform: for each particular field in one or more fields in the set of the dataset's fields: determining whether any field label in a field label glossary matches the particular field; when it is determined that a field label in the field label glossary matches the particular field, associating the particular field with the field label; and when it is determined that no field label in the field label glossary matches the particular field: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

Some embodiments provide a non-transitory computer-readable storage medium storing instructions that, when executed by at least one computer hardware processor, cause the at least one computer hardware processor to perform a method for processing a dataset comprising data stored in fields to determine field labels for a set of the dataset's fields. The method comprises: for each particular field in one or more fields in the set of the dataset's fields: determining whether any field label in a field label glossary matches the particular field; when it is determined that a field label in the field label glossary matches the particular field, associating the particular field with the field label; and when it is determined that no field label in the field label glossary matches the particular field: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

Some embodiments provide a method for processing a dataset comprising data stored in fields to determine field labels for a set of the dataset's field. The method comprises using at least one computer hardware processor to perform: for each particular field in one or more fields in the set of the dataset's fields: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

Some embodiments provide a system for processing a dataset comprising data stored in fields to determine field labels for a set of the dataset's fields. The system comprises: at least one computer hardware processor; and at least one non-transitory computer-readable storage medium storing instructions that, when executed by the at least one computer hardware processor, cause the at least one processor to perform: for each particular field in one or more fields in the set of the dataset's fields: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

Some embodiments provide a non-transitory computer-readable storage medium storing instructions that, when executed by at least one computer hardware processor, cause the at least one computer hardware processor to perform a method for processing a dataset comprising data stored in fields to determine field labels for a set of the dataset's fields. The method comprises: for each particular field in one or more fields in the set of the dataset's fields: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

Some embodiments provide a method for processing a dataset comprising data stored in field to identify, from a field label glossary, a field label for each field in a set of one or more of the dataset fields of the dataset, the field labels describing data stored in the set of fields. The method comprises using at least one computer hardware processor to perform: for each particular field in the set of fields, determining, using a name of the particular field and natural language processing (NLP), a first set of candidate field labels for the particular field and field name analysis scores for the first set of candidate field labels; determining, using a subset of data from the particular field and tests associated with respective field labels in the field label glossary, a second set of candidate field labels and field data analysis scores for the second set of candidate field labels; determining merged candidate field labels and corresponding scores using the first set of candidate field labels and the field name analysis scores, and the second set of candidate field labels and the field data analysis scores; and assigning one of the merged candidate field labels to the particular field using the corresponding scores.

Some embodiments provide a system for processing a dataset comprising data stored in fields to identify, from a field glossary, a field label for each field in a set of one or more of the dataset fields of the dataset. The system comprises: at least one computer hardware processor; and at least one non-transitory computer-readable medium storing instructions that, when executed by the at least one computer hardware processor, cause the at least one computer hardware processor to perform: for each particular field in the set of fields, determining, using a name of the particular field and natural language processing (NLP), a first set of candidate field labels for the particular field and field name analysis scores for the first set of candidate field labels; determining, using a subset of data stored in the particular field and tests associated with respective field labels in the field label glossary, a second set of candidate field labels and field data analysis scores for the second set of candidate field labels; determining merged candidate field labels and corresponding scores using the first set of candidate field labels and the field name analysis scores, and the second set of candidate field labels and the field data analysis scores; and assigning one of the merged candidate field labels to the particular field using the corresponding scores.

Some embodiments provide a non-transitory computer-readable storage medium storing instructions that, when executed by at least one computer hardware processor, cause the at least one computer hardware processor to perform a method for processing a dataset comprising data stored in fields to identify, from a field label glossary, a field label for each field in a set of one or more of the dataset fields of the dataset, the field labels describing data stored in the set of fields. The method comprises: for each particular field in the set of fields, determining, using a name of the particular field and natural language processing (NLP), a first set of candidate field labels for the particular field and field name analysis scores for the first set of candidate field labels; determining, using a subset of data stored in the particular field and tests associated with respective field labels in the field label glossary, a second set of candidate field labels and field data analysis scores for the second set of candidate field labels; determining merged candidate field labels and corresponding scores using the first set of candidate field labels and the field name analysis scores, and the second set of candidate field labels and the field data analysis scores; and assigning one of the merged candidate field labels to the particular field using the corresponding scores.

Some embodiments provide a method for processing a dataset comprising data stored in fields to identify, from a field label glossary, a field label for each field in a set of one or more of the dataset fields of the dataset, the field labels describing data stored in the set of fields. The method comprises using at least one computer hardware processor to perform: for each particular field in the set of fields, determining, using a name of the particular field and natural language processing (NLP), candidate field labels for the particular field and field name analysis scores for the candidate field labels, the determining comprising: identifying a set of abbreviations in the name of the particular field; identifying, for each particular abbreviation in the set of abbreviations, a set of candidate words indicated by the particular abbreviation thereby obtaining sets of candidate words; generating, using the sets of candidate words identified for the abbreviations and an n-gram model indicating a plurality of word collections that appear within field labels of the field label glossary, at least one word sequence describing data stored in the particular field; and determining, using the at least one word sequence and the field label glossary, the candidate field labels for the particular field and the field name analysis scores for the candidate field labels; and assigning one of the candidate field labels to the particular field using the field name analysis scores determined for the candidate field labels.

Some embodiments provide a system for processing a dataset comprising data stored in fields to identify, from a field label glossary, a field label for each field in a set of one or more of the dataset fields of the dataset, the field labels describing data stored in the set of fields. The system comprises: at least one computer hardware processor; and at least one non-transitory computer-readable medium storing instructions that, when executed by the at least one computer hardware processor, cause the at least one computer hardware processor to perform: for each particular field in the set of fields, determining, using a name of the particular field and natural language processing (NLP), candidate field labels for the particular field and field name analysis scores for the candidate field labels, the determining comprising: identifying a set of abbreviations in the name of the particular field; identifying, for each particular abbreviation in the set of abbreviations, a set of candidate words indicated by the particular abbreviation thereby obtaining sets of candidate words; generating, using the sets of candidate words identified for the abbreviations and an n-gram model indicating a plurality of word collections that appear within field labels of a field label glossary, at least one word sequence describing data stored in the particular field; and determining, using the at least one word sequence and the field label glossary, the candidate field labels for the particular field and the field name analysis scores for the candidate field labels; and assigning one of the candidate field labels to the particular field using the field name analysis scores determined for the candidate field labels.

Some embodiments provide a non-transitory computer-readable storage medium storing instructions that, when executed by at least one computer hardware processor, cause the at least one computer hardware processor to perform a method for processing a dataset comprising data stored in fields to identify, from a field label glossary, a field label for each field in a set of one or more of the dataset fields of the dataset, the field labels describing data stored in the set of fields. The method comprises: for each particular field in the set of fields, determining, using a name of the particular field and natural language processing (NLP), candidate field labels for the particular field and field name analysis scores for the candidate field labels, the determining comprising: identifying a set of abbreviations in the name of the particular field; identifying, for each particular abbreviation in the set of abbreviations, a set of candidate words indicated by the particular abbreviation thereby obtaining sets of candidate words; generating, using the sets of candidate words identified for the abbreviations and an n-gram model indicating a plurality of word collections that appear within field labels of a field label glossary, at least one word sequence describing data stored in the particular field; and determining, using the at least one word sequence and the field label glossary, the candidate field labels for the particular field and the field name analysis scores for the candidate field labels; and assigning one of the candidate field labels to the particular field using the field name analysis scores determined for the candidate field labels.

Some embodiments provide a method for processing a dataset comprising data stored in fields to identify, from a field label glossary, a field label for each field in a set of one or more of the dataset fields of the dataset, the field labels describing data stored in the set of fields. The method comprises using at least one computer hardware processor to perform: for each particular field in the set of fields, determining, using a name of the particular field and natural language processing (NLP), candidate field labels for the particular field and field name analysis scores for the candidate field labels, the determining comprising: identifying a set of abbreviations in the name of the particular field; determining, for each particular abbreviation in the set of abbreviations, a set of candidate words indicated by the particular abbreviation and corresponding set of similarity scores thereby obtaining sets of candidate words and corresponding sets of similarity scores, the identifying comprising: determining a measure of similarity between the particular abbreviation and each of a plurality of words in a glossary to obtain a plurality of similarity scores for the plurality of words, the measure of similarity between an abbreviation and a word being based on characters in the abbreviation, characters in the word, order of the characters in the abbreviation, and order of the characters in the word; and selecting, using the plurality of similarity scores, the set of candidate words from the plurality of words in the glossary to obtain the set of candidate words for the particular abbreviation and the corresponding set of similarity scores; determining, using the sets of candidate words and the corresponding sets of similarity scores, the candidate field labels for the particular label and the field name analysis scores for the candidate field labels; and assigning one of the candidate field labels to the particular field using the field name analysis scores determined for the candidate field labels.

Some embodiments provide a system for processing a dataset comprising data stored in fields to identify, from a field label glossary, a field label for each field in a set of one or more of the dataset fields of the dataset, the field labels describing data stored in the set of fields. The system comprises: at least one computer hardware processor; and at least one non-transitory computer-readable medium storing instructions that, when executed by the at least one computer hardware processor, cause the at least one computer hardware processor to perform: for each particular field in the set of fields, determining, using a name of the particular field and natural language processing (NLP), candidate field labels for the particular field and field name analysis scores for the candidate field labels, the determining comprising: identifying a set of abbreviations in the name of the particular field; determining, for each particular abbreviation in the set of abbreviations, a set of candidate words indicated by the particular abbreviation and corresponding set of similarity scores thereby obtaining sets of candidate words and corresponding sets of similarity scores, the identifying comprising: determining a measure of similarity between the particular abbreviation and each of a plurality of words in a glossary to obtain a plurality of similarity scores for the plurality of words, the measure of similarity between an abbreviation and a word being based on characters in the abbreviation, characters in the word, order of the characters in the abbreviation, and order of the characters in the word; and selecting, using the plurality of similarity scores, the set of candidate words from the plurality of words in the glossary to obtain the set of candidate words for the particular abbreviation and the corresponding set of similarity scores; determining, using the sets of candidate words and the corresponding sets of similarity scores, the candidate field labels for the particular label and the field name analysis scores for the candidate field labels; and assigning one of the candidate field labels to the particular field using the field name analysis scores determined for the candidate field labels.

Some embodiments provide a non-transitory computer-readable storage medium storing instructions that, when executed by at least one computer hardware processor, cause the at least one computer hardware processor to perform a method for processing a dataset comprising data stored in fields to identify, from a field label glossary, a field label for each field in a set of one or more of the dataset fields of the dataset, the field labels describing data stored in the set of fields. The method comprises: for each particular field in the set of fields, determining, using a name of the particular field and natural language processing (NLP), candidate field labels for the particular field and field name analysis scores for the candidate field labels, the determining comprising: identifying a set of abbreviations in the name of the particular field; determining, for each particular abbreviation in the set of abbreviations, a set of candidate words indicated by the particular abbreviation and corresponding set of similarity scores thereby obtaining sets of candidate words and corresponding sets of similarity scores, the identifying comprising: determining a measure of similarity between the particular abbreviation and each of a plurality of words in a glossary to obtain a plurality of similarity scores for the plurality of words, the measure of similarity between an abbreviation and a word being based on characters in the abbreviation, characters in the word, order of the characters in the abbreviation, and order of the characters in the word; and selecting, using the plurality of similarity scores, the set of candidate words from the plurality of words in the glossary to obtain the set of candidate words for the particular abbreviation and the corresponding set of similarity scores; determining, using the sets of candidate words and the corresponding sets of similarity scores, the candidate field labels for the particular label and the field name analysis scores for the candidate field labels; and assigning one of the candidate field labels to the particular field using the field name analysis scores determined for the candidate field labels.

Some embodiments provide a method for processing a dataset comprising data stored in fields to determine field labels for a set of the dataset's fields. The method comprises using at least one computer hardware processor to perform: for each particular field in the set of the dataset's fields: determining, using a name of the particular field and a subset of data from the particular field, whether any field label from a field label glossary matches the particular field, the determining comprising: identifying a set of abbreviations in the name of the particular field; identifying, for each particular abbreviation in the set of abbreviations, a set of candidate words indicated by the particular abbreviation and a corresponding set of scores thereby obtaining a plurality of sets of candidate words and a corresponding plurality of sets of scores; determining, using the plurality of sets of words and the corresponding plurality of sets of scores, whether any field label from the field label glossary matches the particular field; when it is determined that one or more field labels from the field label glossary match the particular field, assigning a field label of the one or more field labels to the particular field; when it is determined that no field label from the field label glossary matches the particular field: generating, using the plurality of sets of candidate words and the corresponding plurality of sets of scores, a word sequence describing data stored in the particular field; generating, using the word sequence describing data stored in the particular field, a new field label that is not in the field label glossary; and assigning the new field label to the particular field.

Some embodiments provide a system for processing a dataset comprising data stored in fields to determine field labels for a set of the dataset's fields. The system comprises: at least one computer hardware processor; and at least one non-transitory computer-readable storage medium storing instructions. The instructions, when executed by the at least one processor, cause the at least one processor to perform: for each particular field in the set of the dataset's fields: determining, using a name of the particular field and a subset of data from the particular field, whether any field label from a field label glossary matches the particular field, the determining comprising: identifying a set of abbreviations in the name of the particular field; identifying, for each particular abbreviation in the set of abbreviations, a set of candidate words indicated by the particular abbreviation and a corresponding set of scores thereby obtaining a plurality of sets of candidate words and a corresponding plurality of sets of scores; determining, using the plurality of sets of words and the corresponding plurality of sets of scores, whether any field label from the field label glossary matches the particular field; when it is determined that one or more field labels from the field label glossary match the particular field, assigning a field label of the one or more field labels to the particular field; when it is determined that no field label from the field label glossary matches the particular field: generating, using the plurality of sets of candidate words and the corresponding plurality of sets of scores, a word sequence describing data stored in the particular field; generating, using the word sequence describing data stored in the particular field, a new field label that is not in the field label glossary; and assigning the new field label to the particular field.

Some embodiments provide a non-transitory computer-readable storage medium storing instructions that, when executed by at least one computer hardware processor, cause the at least one computer hardware processor to perform a method for processing a dataset comprising data stored in fields to determine field labels for a set of the dataset's fields. The method comprises: for each particular field in the set of the dataset's fields: determining, using a name of the particular field and a subset of data from the particular field, whether any field label from a field label glossary matches the particular field, the determining comprising: identifying a set of abbreviations in the name of the particular field; identifying, for each particular abbreviation in the set of abbreviations, a set of candidate words indicated by the particular abbreviation and a corresponding set of scores thereby obtaining a plurality of sets of candidate words and a corresponding plurality of sets of scores; determining, using the plurality of sets of words and the corresponding plurality of sets of scores, whether any field label from the field label glossary matches the particular field; when it is determined that one or more field labels from the field label glossary match the particular field, assigning a field label of the one or more field labels to the particular field; when it is determined that no field label from the field label glossary matches the particular field: generating, using the plurality of sets of candidate words and the corresponding plurality of sets of scores, a word sequence describing data stored in the particular field; generating, using the word sequence describing data stored in the particular field, a new field label that is not in the field label glossary; and assigning the new field label to the particular field.

Some embodiments provide a method for processing a dataset comprising data stored in fields to determine field labels for a set of the dataset's fields. The method comprises using at least one computer hardware processor to perform: for each particular field in the set of the dataset's fields: determining whether any field label from a field label glossary matches the particular field; when it is determined that one or more field labels from the field label glossary match the particular field, assigning a field label of the one or more field labels to the particular field; when it is determined that no field label from the field label glossary matches the particular field: accessing, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field, the generating comprising: accessing a language model indicating a plurality of word collections that appear in a set of text and, for each of the word collections, a relative position of each word in the word collection; generating, using the plurality of sets of candidate words, a plurality of candidate word collections for the particular field; determining, using the language model and the plurality of sets of scores corresponding to the plurality of sets of candidate words, a score for each of the plurality of candidate word collections; selecting a word collection from the plurality of candidate word collections; and generating the word sequence using the word collection selected from the plurality of candidate word collections; and generating, using the word sequence, a new field label that is not in the field label glossary; and assigning the new field label to the particular field.

Some embodiments provide a system for processing a dataset comprising data stored in fields to determine field labels for a set of the dataset's fields. The system comprises: at least one computer hardware processor; and at least one non-transitory computer-readable storage medium storing instructions. The instructions, when executed by the at least one computer hardware processor, cause the at least one computer hardware processor to perform: for each particular field in the set of the dataset's fields: determining whether any field label from a field label glossary matches the particular field; when it is determined that one or more field labels from the field label glossary match the particular field, assigning a field label of the one or more field labels to the particular field; when it is determined that no field label from the field label glossary matches the particular field: accessing, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field, the generating comprising: accessing a language model indicating a plurality of word collections that appear in a set of text and, for each of the word collections, a relative position of each word in the word collection; generating, using the plurality of sets of candidate words, a plurality of candidate word collections for the particular field; determining, using the language model and the plurality of sets of scores corresponding to the plurality of sets of candidate words, a score for each of the plurality of candidate word collections; selecting a word collection from the plurality of candidate word collections; and generating the word sequence using the word collection selected from the plurality of candidate word collections; and generating, using the word sequence, a new field label that is not in the field label glossary; and assigning the new field label to the particular field.

Some embodiments provide a non-transitory computer-readable storage medium storing instructions that, when executed by at least one computer hardware processor, cause the at least one computer hardware processor to perform a method for processing a dataset comprising data stored in fields to determine field labels for a set of the dataset's fields. The method comprises: for each particular field in the set of the dataset's fields: determining whether any field label from a field label glossary matches the particular field; when it is determined that one or more field labels from the field label glossary match the particular field, assigning a field label of the one or more field labels to the particular field; when it is determined that no field label from the field label glossary matches the particular field: accessing, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field, the generating comprising: accessing a language model indicating a plurality of word collections that appear in a set of text and, for each of the word collections, a relative position of each word in the word collection; generating, using the plurality of sets of candidate words, a plurality of candidate word collections for the particular field; determining, using the language model and the plurality of sets of scores corresponding to the plurality of sets of candidate words, a score for each of the plurality of candidate word collections; selecting a word collection from the plurality of candidate word collections; and generating the word sequence using the word collection selected from the plurality of candidate word collections; and generating, using the word sequence, a new field label that is not in the field label glossary; and assigning the new field label to the particular field The foregoing summary is non-limiting.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 13 depicts a portion of a language model used in generation of a new field label, according to some embodiments of the technology described herein.

FIG. 14B shows an example depiction of a language model, according to some embodiments of the technology described herein.

DETAILED DESCRIPTION

Overview

Figure 1A:
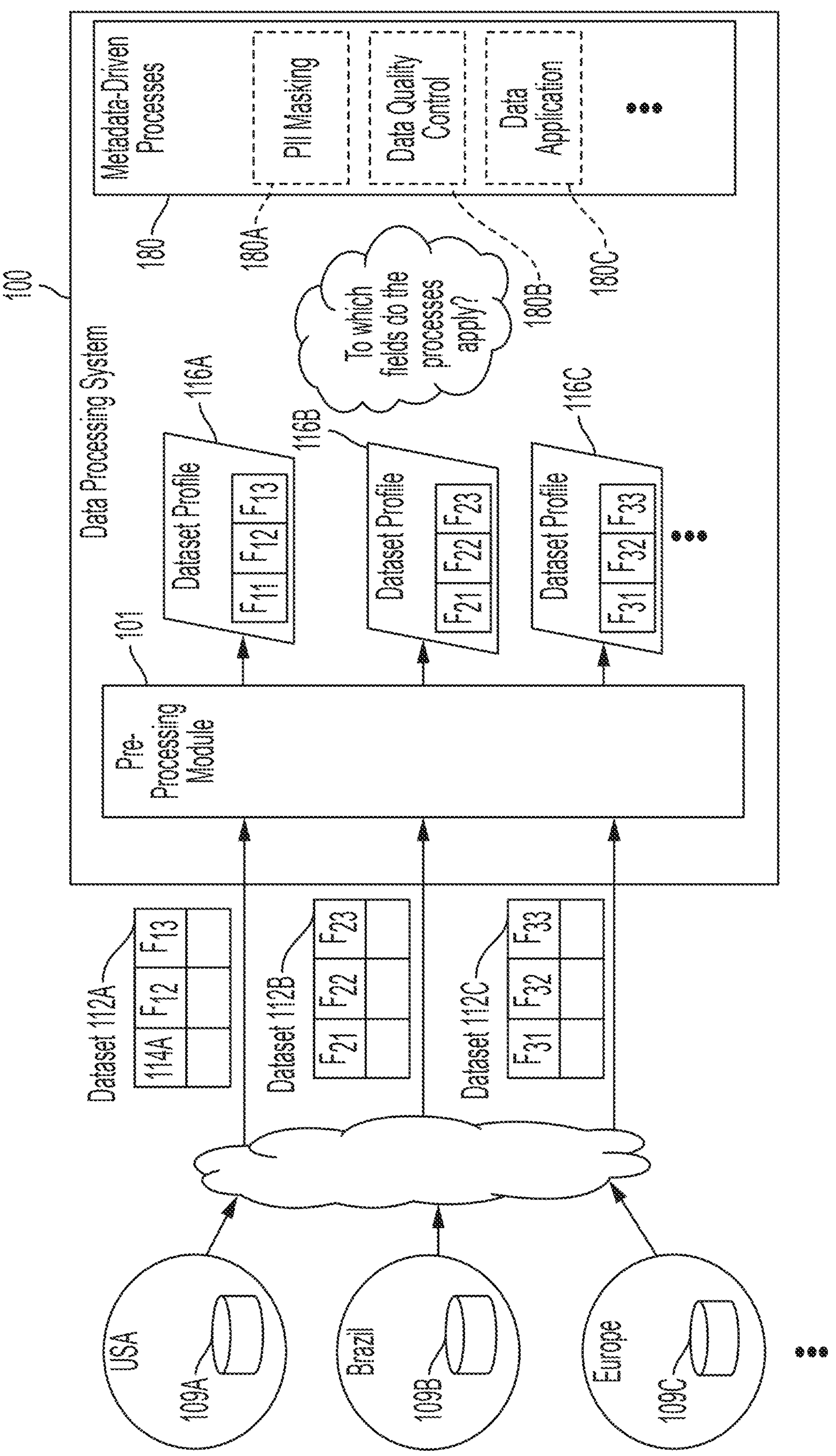
FIG. 1A shows an example data processing system that processes datasets obtained from various data sources and/or dataset profiles of such datasets, according to some embodiments of the technology described herein.

The inventors have developed techniques for automatically processing a dataset to assign field labels to respective fields in the dataset. A field label assigned to a dataset field represents metadata about the field. In turn, metadata about the field may be used to identify further processing to be performed on data stored in the field. In this way, field labels provide a way for a data processing system to use metadata to automatically identify processing to be performed on one or more fields of a dataset and to trigger performance of such processing. Processing on a dataset field or fields that is identified and/or triggered based on metadata associated with the field(s) may be termed "metadata-driven" processing or logic. This disclosure describes a variety of ways in which field labels may be assigned to dataset fields. One way is that an existing label (e.g., a label in an existing set of field labels) may be assigned to a given field. Another way is that a new field label is generated and assigned to a given dataset field instead of an existing label being assigned.

For example, in some cases, a data processing system may match a dataset field to one of an existing set of field labels (which may be referred to as a "field label glossary"). In some embodiments, the system may identify, from the field label glossary, candidate field label(s) for a field and corresponding score(s) by: (1) analyzing the name of the field using natural language processing (NLP); (2) analyzing at least some of the data stored in the field; and (3) merging the results of the field name analysis and the field data analysis to identify the candidate field label(s) and corresponding scores. In turn, the field label may be selected from among the candidate field label(s), for example, based on the scores. In other embodiments, the system may identify, from the field label glossary, candidate field label(s) and corresponding score(s) for a field by analyzing the name of the field using NLP without analyzing any of the data stored in the field. In yet other embodiments, the system may identify, from the field label glossary, candidate field label(s) and corresponding score(s) for a field by analyzing the data stored in the field without analyzing the name of the field. The system may select one of the identified candidate field label(s) as the label assigned to the field.

As another example, in some cases, a data processing system may generate a new field label for a dataset field instead of assigning an existing field label to that field. This may occur in a variety of situations, for example, when none of the existing field labels in a field label glossary provide a sufficiently good match to the field or when no field label glossary exists in the first place. In such situations, the data processing system may generate a new field label for assignment to the field by: (1) generating, using the field's name, a word sequence describing data stored in the field; and (2) generating the new field label from the word sequence. The system can then assign the newly generated field label to the field.

A field label indicates metadata about dataset field(s) to which the field label is assigned. A field label may include a text string that describes data stored in the field (e.g., "telephone number", "email address", "first name", "last name", etc.). In some embodiments, a field label may have one or more attributes which take on value(s) indicating information about a dataset field to which the field label is assigned. Attributes may include, for example, a user responsible for the data (e.g., a steward), whether the data is PII, a format of the data, data standard(s) applicable to the data, a definition of the data, a set of possible values that a field value may take on, relationship(s) with other field label(s), and/or other attributes. Accordingly, a field label's text string and attribute value(s) are examples of metadata than can be used to identify, invoke, and perform metadata-drive processing on the dataset field.

Example Uses of Field Labels

A data processing system may manage data for an organization such as a multinational corporation (e.g., a logistics company, a financial institution, a utility company, an automotive company, an e-commerce company, etc.) and/or any other organization or entity. The organization may have vast amounts of data (e.g., hundreds or thousands of terabytes of data) managed by the data processing system. The data may include thousands or millions of datasets, which may store data in multiple records that include data values. For example, a dataset may store multiple records in a table. Each record may have multiple fields each storing one or more respective values. The table may store multiple records in its rows such that field values of a record are stored in different columns (or vice versa such the table stores multiple records in columns and field values of a record are stored in different rows). However, it should be appreciated, that a dataset is not limited to storing multiple records using a tabular structure and may store the multiple records in any other suitable way (e.g., using attribute-value pairs, mark-up language such as XML, JSON, using an object-oriented approach, etc.), as aspects of the technology described herein are not limited in this respect. A data processing system may manage thousands, millions, or more of such datasets.

Datasets processed by a data processing system may be very large (e.g., with hundreds of fields) and may be obtained from many different data sources, some of which may be legacy systems. As a result, data in fields of different datasets may have different formats, naming conventions, languages, and/or may change over time relative to data from other data sources. A data processing system needs an efficient way to recognize data in a field such that the system can apply the appropriate processing to data from the field. For example, the data processing system may be configured to execute several software application programs that perform operations using data from fields of datasets. Execution of the software application programs and their logic may be dictated at least in part by the type of information is stored in the fields. For example, execution of certain software application programs may need to be triggered based on recognizing information stored in a field (e.g., execution of an anonymizing software application program may be triggered based on recognizing that data stored in a given field is personally identifiable information (PII) or a data reformatting software application may be triggered based on recognizing that data stored in a field is a phone number). As another example, a software application program may need to be reconfigured based on recognizing information stored in a field (e.g., to prevent the software application program from failing to execute or from malfunctioning). As another example, a software application program may have functionality that is triggered based on recognizing that data from one field is related to data stored in another field. Field labels provide an efficient way for a data processing system (and software application programs thereof) to recognize data in fields of datasets obtained from different sources.

When a dataset field is assigned a field label, the data processing system may use metadata about the dataset field indicated by the field label for various applications. For example, the data processing system may use the metadata to identify relationships between the dataset field and other dataset fields. As another example, the data processing system may use metadata about a dataset field to automatically generate lineage information about the dataset field that indicates how the dataset field was obtained, how the dataset field may change over time, and/or how the dataset field may be used by one or more processes over time. Lineage information for a dataset field may include upstream lineage information indicating how the dataset field was obtained (e.g., by identifying data source(s) and/or data processing operation(s) that have been applied to the dataset field). Lineage information for a dataset field may additionally or alternatively indicate downstream lineage information indicating one or more other dataset fields and/or processes that depend on and/or use the dataset field. As another example, a field label may be associated with a data standard. The data processing system may apply the data standard associated with a field label to all fields to which the field label is assigned. The data standard may indicate data quality requirements that must be met by dataset fields to which the data standard is applied in order to comply with the data standard. When a dataset field fails to meet the data quality requirements, the dataset field may, for example, be updated or flagged for further review. Accordingly, field label assignments may be used by the data processing system to ensure consistent data quality across all the data managed by the data processing system.

Metadata about a dataset field indicated by a field label assigned to the dataset field may further be used by software application(s) in processing data from the dataset field. For example, a software application may need to recognize that data stored in a dataset field includes personally identifiable information (PII) (e.g., social security numbers, bank account numbers, government ID numbers, and/or other PII) to trigger functionality that is appropriate for such PII data (e.g., anonymizing data stored in the dataset field, restricting access to such data, de-identifying such data, masking such data, etc.). As another example, a software application may need to recognize a category and/or format of data (e.g., a phone number social security number, name, address, and/or other categories of data) stored in a dataset field to determine how to format the data and/or how the data should be formatted (e.g., to meet a data standard). Field labels may further be used to control the functioning of a computer along a path leading to the desired data processing (e.g., PII masking in data) and/or data processing in a computationally efficient manner. Controlling the computer along the path may involve identifying processing (e.g., anonymizing data from a field, restricting access to such data, de-identifying data, and/or other processing) to be performed and triggering the processing.

Recognizing data from fields of datasets becomes particularly important when the data includes PII which may need to be masked for hundreds, thousands, or even millions of data records (e.g., of financial transactions) every day. A human would be unable to manually perform annotation or masking of PII of these records. Because the names of fields in a dataset may not be descriptive of the information stored in the fields, it may not be apparent to a human user that data records include PII. Also, the location of fields within a dataset may change over time making it impossible for a human to follow the fields containing PII. Even if a human could discern that PII is present within a particular field, the determination would require permitting access to unmasked data records by that person. Such access to the records to evaluate the records for PII would compromise data security and data privacy.

Aspects of this disclosure enable reliable and computationally efficient identification of PII and its masking. In particular, rapid and computationally efficient labeling of fields to discover the meaning of the data and process the data by masking PII is enabled. Field labels indicate the meaning of data in fields of data sets. For example, field labels may specify whether a detected date in a field represents a date of birth, a date of expiration of a driver's license, or some other particular kind of date. If the type of date is PII, the system can automatically trigger masking functionality that masks the data. An example further illustrates the power of this functionality, as follows: datasets with a date of birth field are received by a data processing system. This date of birth field has a meaningless alphanumeric field name of "rwr8342." Such alphanumeric field names often exist in raw data. Aspects of this disclosure enable an automatic association by a processing system of the field name of "rwr8342" with a semantic meaning of "date of birth." Moreover, the field name may change from "rwr8342" to "sfs3432", and the system may start to receive data with this new field name. Even though the new field "sfs3432" is a date of birth field, conventional systems would not be able to determine this, much less at scale. As such, data in the "sfs3432" field goes unmasked. However, a system using aspects of this disclosure can easily and efficiently recognize a semantic meaning of date of birth for the "sfs3432" field and assign a field label indicating that semantic meaning. Once the "sfs3432" field has been associated with the field, a data processing system may automatically apply masking rules that are applicable to date of birth fields.

Improved field label accuracy leads to overall improved performance of a data processing system and applications that utilize the field labels. This is particularly the case for metadata-driven processing described herein with reference to FIGS. 1A-IC. For example, more accurate field labels lead to improved security of data by triggering data protection functionality (e.g., masking of PII) in a software application. The improved field label accuracy leads to improved control of the computer along its path to the desired data protection functionality and/or desired protected data (e.g. masked PII). Additionally, by more accurately indicating via a field label that data from a field needs to be protected (e.g. data including PII), the data can be protected (e.g., masked) accurately and reliably without accessing data from the field, which would otherwise impose latency on data processing. In this way, the consumption of computing resources and processing time for protecting data may be reduced for protecting of data using techniques described herein.

Techniques described herein may also be used by a data processing system to better ascertain metadata stored about data managed by the data processing system. By more accurately assigning field labels to dataset fields, the techniques improve the accuracy of metadata about the dataset fields stored by the data processing system. By allowing the data processing system to better ascertain metadata about dataset fields, the techniques further improve the data processing system's ability to generate data lineage information for dataset fields. For example, when the same field label is assigned to two dataset fields, the data processing system may recognize that the two dataset fields are related (e.g., one dataset field may be derived from the other dataset field, or one dataset field may depend on the other dataset field).

The data processing system may generate data lineage information indicating the relationship between the dataset fields. Thus, more accurate metadata about dataset fields provided by improved field label assignments may allow the data processing system to capture data lineage more accurately and completely. The improved lineage information may improve processes that utilize the lineage information such as: (1) identifying, tracing, and resolving errors in data processing; (2) identifying and resolving data security risks (e.g., risk of granting improper access to data); and (3) determining how changes in a dataset field affect downstream data and operations. A data lineage may represent relationships among physical datasets accessible/used by a software application of a data processing system, and may be generated by analyzing source code of a computer program and analyzing information obtained during runtime of the computer program. The generation of a data lineage involves identifying physical datasets accessed/used by a computer program, transformations applied to inputs of the computer program. This emphasizes the relationship and effect that the physical datasets and the generated data lineage have with respect to the computer program and the data processing performed by the data processing system (inputs, outputs, and transformations used by the computer program).

Furthermore, the techniques improve the data processing system's ability to govern data quality in data managed by the data processing system. More accurate field label assignments to dataset fields result in more accurate application of data standards to the dataset fields (as the data standards may be mapped to the dataset fields through their assigned field labels). Thus, the techniques allow the data processing system to apply data standards more accurately across dataset fields.

The improved field label accuracy leads to improved performance of software applications that utilize the field labels. For example, more accurate field labels lead to improved security of data by triggering data protection functionality (e.g., masking of PII) in a software application. As another example, more accurate field labels may better inform the format of data stored in the dataset fields which may allow software applications to process data from the dataset fields more efficiently (e.g., by configuring processing according to the format). To illustrate, some data processing applications cannot be initiated if the input data is not in a suitable format. The improved field label accuracy may provide field labels that better indicate whether input data is not in a suitable format and thus avoids use of computing resources and time to execute a data processing application using the input data. The field labels may mitigate a failure in the execution of a software application or a malfunction in its execution. The data from the field may be reformatted or the application may be reconfigured based on the field labels to improve the efficiency of the data processing system. As another example, more accurate field labels may provide better descriptions of data in a software application development environment to make development easier and more efficient.

FIG. 1A shows an example of a data processing system 100 that manages datasets from datastores 109A, 109B, 109C, according to some embodiments of the technology described herein. Managing a dataset may involve storing the dataset, processing data in the dataset, generating and storing metadata about the dataset, updating the dataset, reading from the dataset, writing to the dataset, and/or other operations. The data processing system 100 may be configured to manage the datasets by ingesting them or without ingesting them. For example, in some embodiments, the data processing system 100 may ingest datasets into storage of the data processing system 100. As another example, in some embodiments, the data processing system 100 may manage datasets by determining information about the datasets and storing the information in dataset profiles corresponding to respective datasets.

As illustrated in FIG. 1A, in some embodiments, the data processing system 100 may be configured to manage datasets 112A, 112B, 112C from the datastores 109A, 109B, 109C (e.g., to apply processing to the datasets 112A, 112B, 112C). As shown in FIG. 1A, in some embodiments, each of the datastores 109A, 109B, 109C may be located in a different geographic region. For example, each of the datastores 109A, 109B, 109C may be one of multiple geographically distributed datastores (e.g., databases, data lakes, data warehouses, and/or other type of datastores) of an organization's enterprise system. In this example, the data processing system 100 may be configured to process datasets from the datastores to generate and store metadata about the datasets. The data processing system 100 may be configured to perform various metadata-driven processes 180 which are described in more detailed herein.

As shown in FIG. 1A, the data processing system 100 includes a pre-processing module 101 configured to process the datasets 112A, 112B, 112C to generate dataset profiles 116A, 116B, 116C which contain information about respective datasets 112A, 112B, 112C. Each of the dataset profiles 116A, 116B, 116C may be configured to store profile data for a respective one of the datasets 112A, 112B, 112C. Example processing that may be performed by the pre-processing module 101 to generate the dataset profiles 116A, 116B, 116C. A dataset profile may store information associated with a corresponding dataset such as a name of the dataset, names of fields in the dataset, data from fields of the dataset (e.g., a subset of values sampled from the fields), statistical information about data in the fields, information specifying a format of data in fields of the dataset, and/or other information. An example data profile is described herein with reference to FIG. 6C.

As illustrated in FIG. 1A, each of the dataset profiles 116A, 116B, 116C stores information about different fields in a respective one of datasets 112A, 112B, 112C. In some embodiments, information about a dataset field stored in a dataset profile may include a field name and data from the field (e.g., as described herein with reference to FIG. 6C). The pre-processing module 101 may be configured to read a field name and field data from a dataset and store them in the dataset profile. The field name and the field data may be used for processing performed by the data processing system 100 (e.g., for field labeling performed by field labeling system 110 described herein with reference to FIGS. 1B-2C).

Although example embodiments described herein used dataset profiles, some embodiments may use techniques described herein without using dataset profiles. In such embodiments, the techniques may access field names and field values from a dataset instead of accessing them from a dataset profile. For example, the field labeling system 110 may assign labels to fields of the datasets 112A, 112B, 112C by accessing field names and field values directly from the datasets 112A, 112B, 112C (e.g., by accessing the datasets in datastores 109A, 109B, 109C or in storage of the data processing system 100) as opposed to from dataset profiles. Accordingly, field data analysis and field name analysis techniques described herein may be performed without using dataset profiles, in some embodiments.

The data processing system 100 may ascertain information about data (information about data may be referred to as "metadata") stored in one or more fields of datasets 112A, 112B, 112C to perform various functions and/or for certain applications. The data processing system 100 may be configured to drive processing based on metadata about field(s) of the datasets 112A, 112B, 112C. Metadata-driven processing may be identified and/or triggered based on metadata associated with the field(s). Further, metadata-driven processing may further use metadata about the field(s) to perform various functions. Accordingly, the data processing system 100 needs an efficient way to ascertain metadata about data stored in field(s) of the datasets 112A, 112B, 112C.

FIG. 1A illustrates examples of metadata-driven processes 180 that may be used by the data processing system 100, according to some embodiments of the technology described herein. The example processes 180 include a personally identifiable information (PII) masking process 180A that, when applied to a field, masks data in the field to protect PII stored in the field. The processes 180 further include a data quality control process 180B that, when applied to a field, checks whether data stored in the field meets one or more data quality requirements. For example, a data quality requirement may require that a particular field be populated. When the data quality control process 180B is applied to a field, it may determine whether every location in the field is populated with a value. If every location is not populated, the data quality control process 180B may, for example, populate the empty locations with default values, provide a notification that the data quality requirement is not met, and/or trigger other processing. As another example, a data quality requirement may require that values in a field meet a particular format. When the data quality control process 180B is applied to a field, it may determine whether values in the field meet the particular format. To illustrate, a data quality requirement may require values in a field storing email addresses to adhere to a particular email address format. The data quality control process 180B, when applied to a field, may determine whether values adhere to the particular email address format. The processes 180 include a data application 180C that, when applied to a field, updates data stored in the field. For example, the data application 180C may update data in the field such that the data conforms to one or more data quality requirements (e.g., by changing a format of the data in the field). The metadata-driven processes described herein are for illustrating example embodiments. Some embodiments may be configured to use other metadata-drive processes in addition to or instead of those described herein.

The data processing system 100 may need to apply the metadata-drive processes 180 to various fields of the datasets 112A, 112B, 112C (e.g., to ensure that PII is protected, data quality requirement(s) are met, and/or to update datasets). However, given that the data processing system 100 is frequently processing data, the data processing system 100 is unaware that datasets have been introduced and that metadata-driven processes may be applicable to fields of the datasets. Thus, as illustrated in FIG. 1A, the data processing system 100 is unaware of the fields of the datasets 112A, 112B, 112C to which the metadata-driven processes 180 would apply. For example, the data processing system 100 is unaware of which of the fields include PII that needs to be masked by the PII masking process 180A. As another example, the data processing system 100 is unaware of which of the fields store values to which data quality requirement(s) checked by the data quality control process 180B would apply. Given that there are thousands or millions of fields across the datasets managed by the data processing system 100, the data processing system 100 needs to efficiently ascertain metadata about the dataset fields to properly apply the processes 180 to the dataset fields (e.g., to protect PII, ensure data quality requirements are met, and/or to update data stored in the dataset fields). The data processing system 100 needs to ascertain information about a field to determine whether each of the processes 180 applies to the field.

Figure 1B:
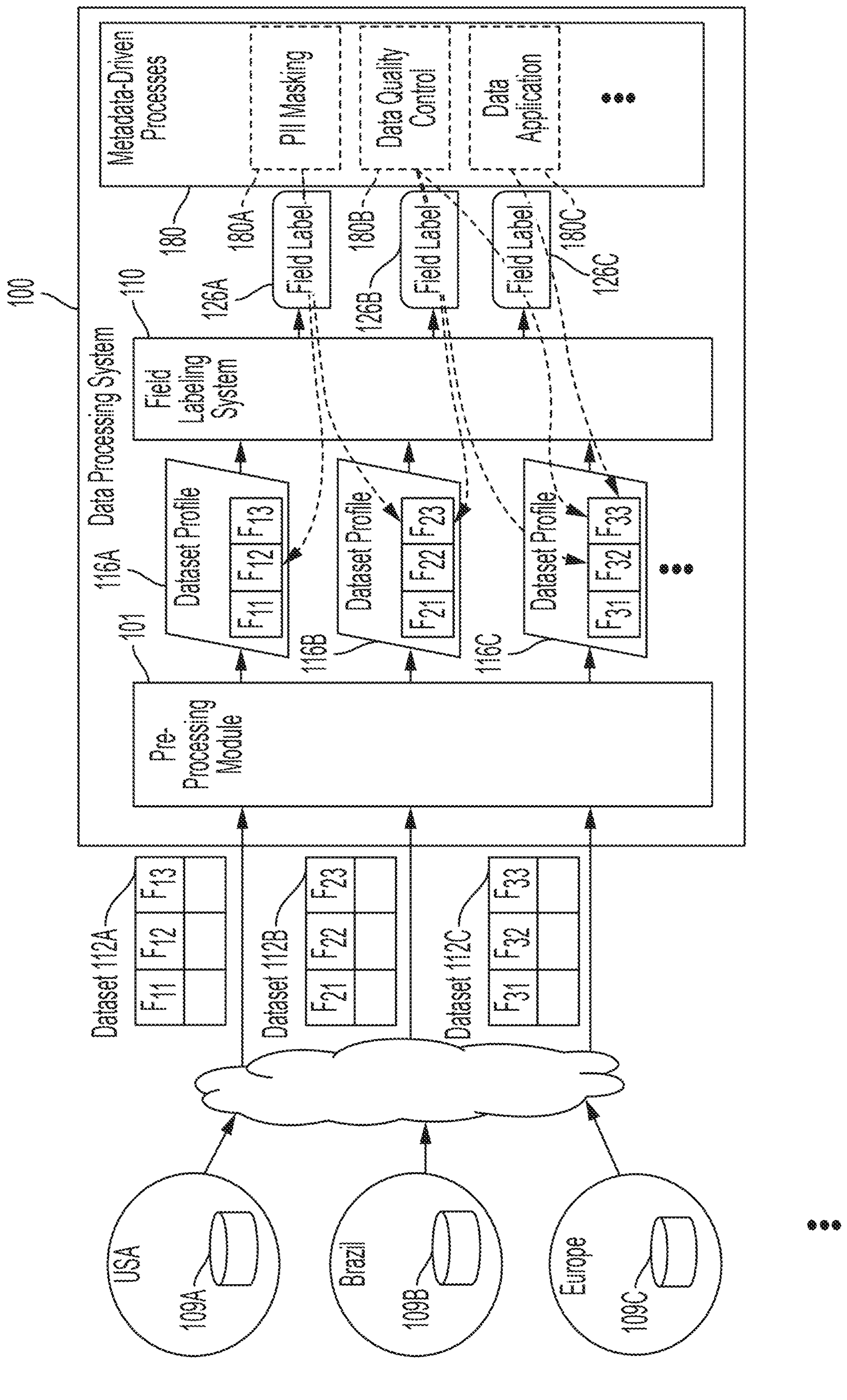
FIG. 1B illustrates the data processing system of FIG. 1A with a field labeling system for assigning field labels to fields of datasets, according to some embodiments of the technology described herein.
Figure 10:
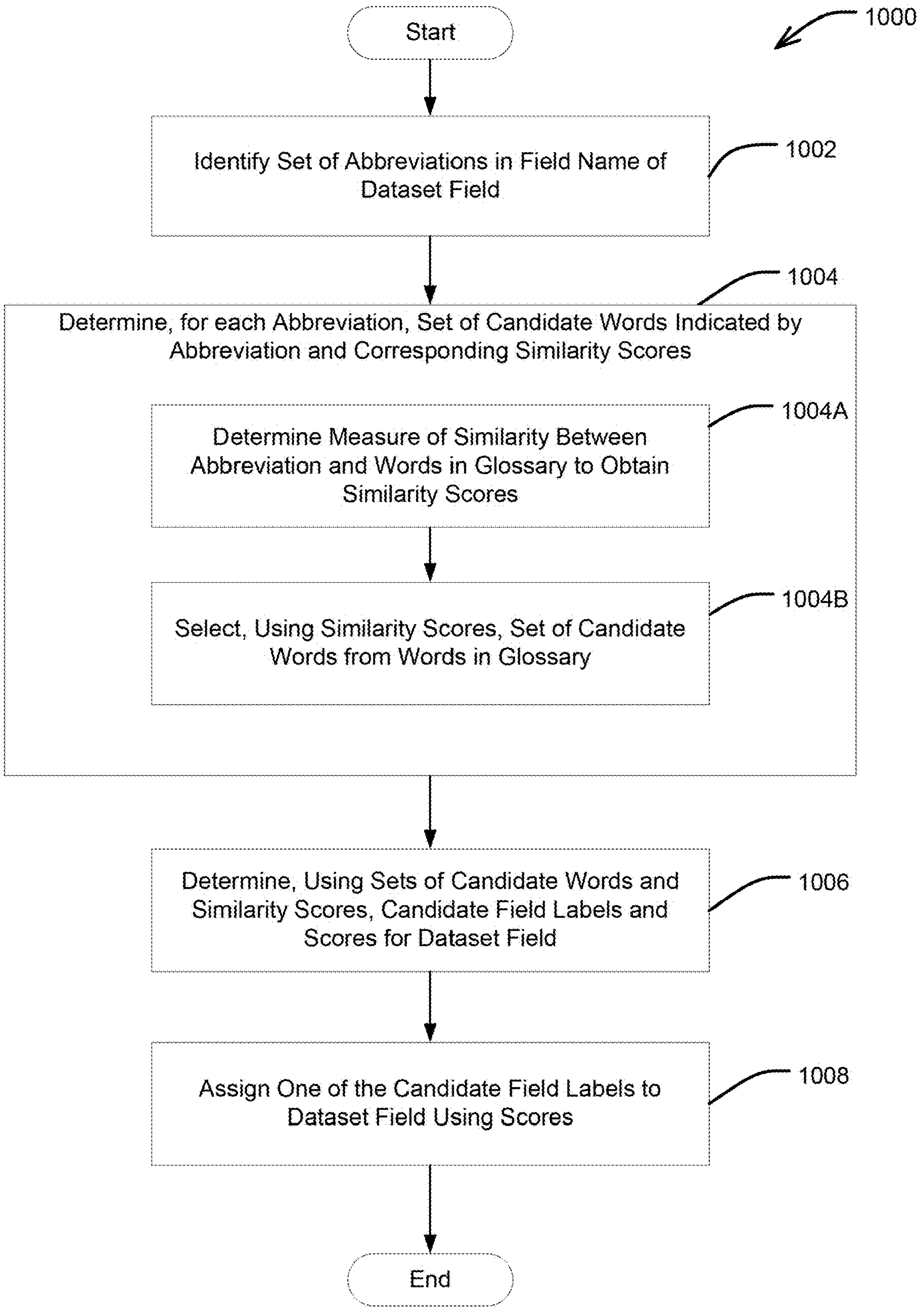
FIG. 10 shows another example process for processing a dataset to identify a respective field label for each of one or more fields in a dataset, according to some embodiments of the technology described herein.
Figure 11A:
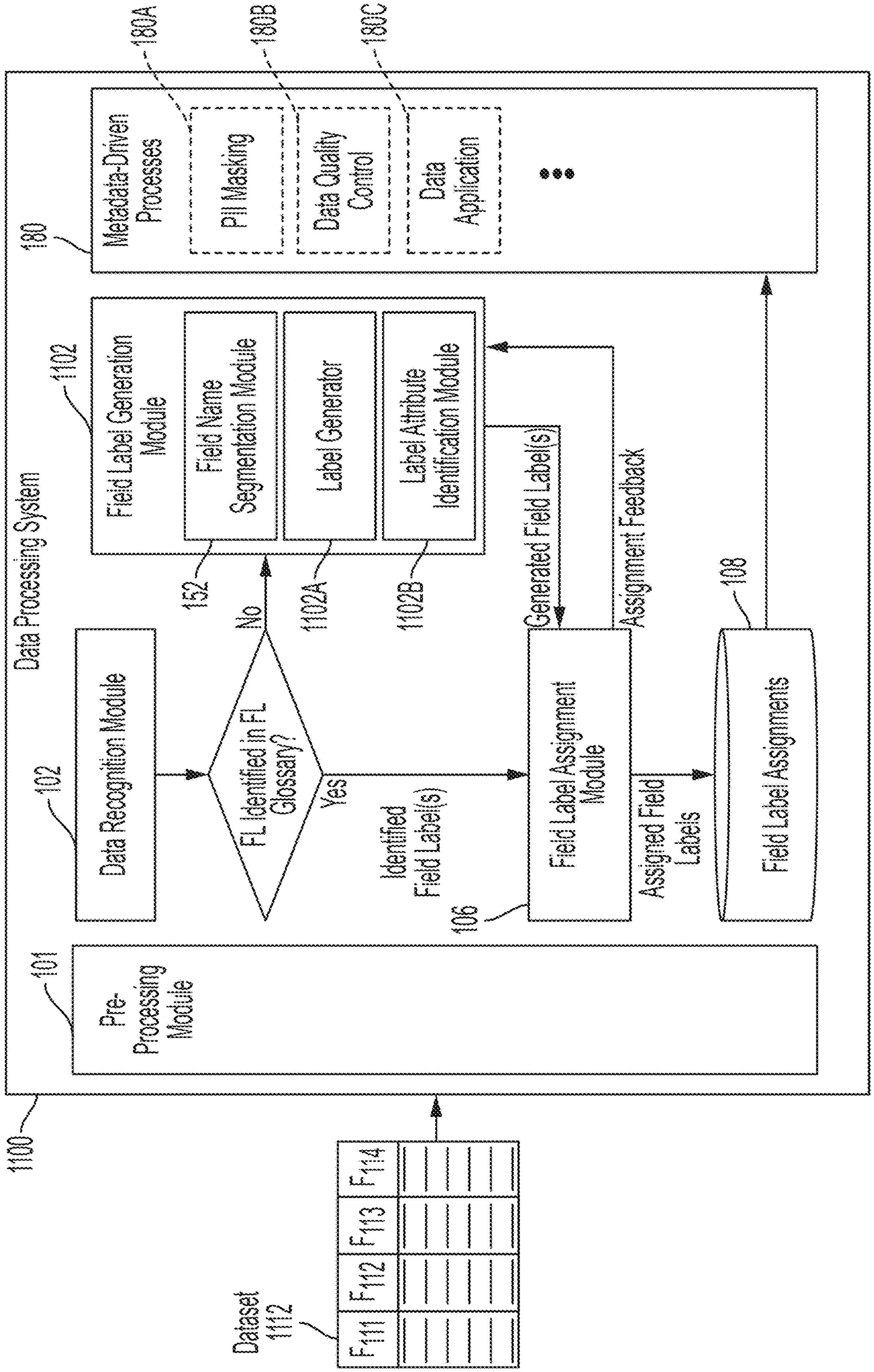
FIG. 11A is a block diagram of a data processing system configured to generate field labels for dataset fields, according to some embodiments of the technology described herein.
Figure 11B:
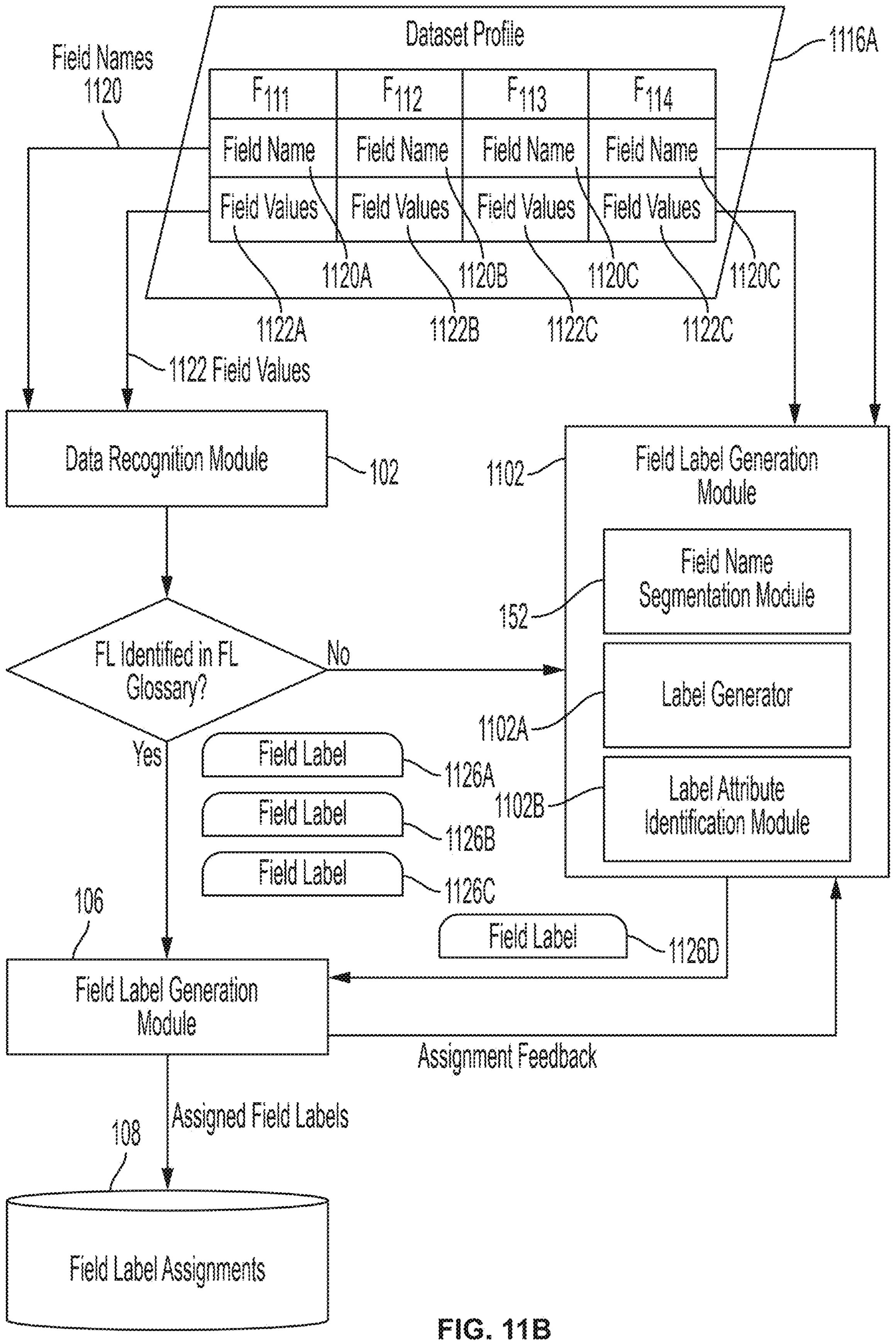
FIG. 11B illustrates an example of the data processing system of FIG. 11A assigning field labels to fields of a dataset, according to some embodiments of the technology described herein.

To allow the data processing system 100 to ascertain metadata-driven processes applicable to data from a dataset field, the dataset field may be assigned a field label (e.g., one of a pre-defined set of field labels in a field label glossary assigned by data processing system 100 or a field label generated by the data processing system 1100 described herein with reference to FIGS. 11A-11B). FIG. 1B illustrates the data processing system 100 with a field labeling system 110 configured to assign field labels 126A, 126B, 126C to respective fields of the datasets 112, according to some embodiments of the technology described herein. The different processes 180 are each associated with dataset fields through the field labels 126A, 126B, 126C. Each of the processes 180 may then be applied to the dataset fields they are associated with through the field labels 126A, 12B, 126C. Described herein are techniques of assigning field labels to dataset fields (e.g., by assigning one of an existing set of field labels and/or generating a new field label for assignment). In some embodiments, a label may be selected from a field label glossary for assignment to a field (e.g., as described herein with reference to FIGS. 2A-10). In some embodiments, a label may be generated and assigned to a field (e.g., as described herein with reference to FIGS. 11A-18).

FIG. 1B further illustrates application of the metadata-driven processes 180 to respective fields based on the field label assignments determined by the field labeling system 110. In some embodiments, the data processing system 100 may be configured to determine that a field label is assigned to a given field, and apply one or more metadata-driven processes to the field by triggering execution of the one or more metadata-driven processes on data from the field. For example, the data processing system 100 may identify a value of an attribute stored in memory indicating a field label assigned to a field and trigger execution of one or more metadata-driven processes in response to identifying the value of the attribute (e.g., by starting an execution thread, launching a new process, making an application program interface (API) call, and/or making a remote procedure call). In some embodiments, the data processing system 100 may be configured with code that, when executed, identifies fields assigned a particular field label and triggers the execution of metadata-driven processes designated for the particular field label.

As illustrated in FIG. 1B the PII masking process 180A process is applied to fields $F_{12}$, $F_{23}$ through the field label 126A, data quality control process 180B is applied to fields $F_{21}$, $F_{32}$ through the field label 126B and to field $F_{33}$ through the field label 126C, and the data application 180C is applied to field $F_{33}$ through the field label 126C. The field labels thus allow the data processing system 100 to efficiently ascertain metadata about the dataset fields and apply metadata-driven processes to the dataset fields based on the ascertained metadata. The field labels may further describe data stored in respective fields in language that is more easily understood by human users of the data processing system 100 than field names.

Figure 1C:
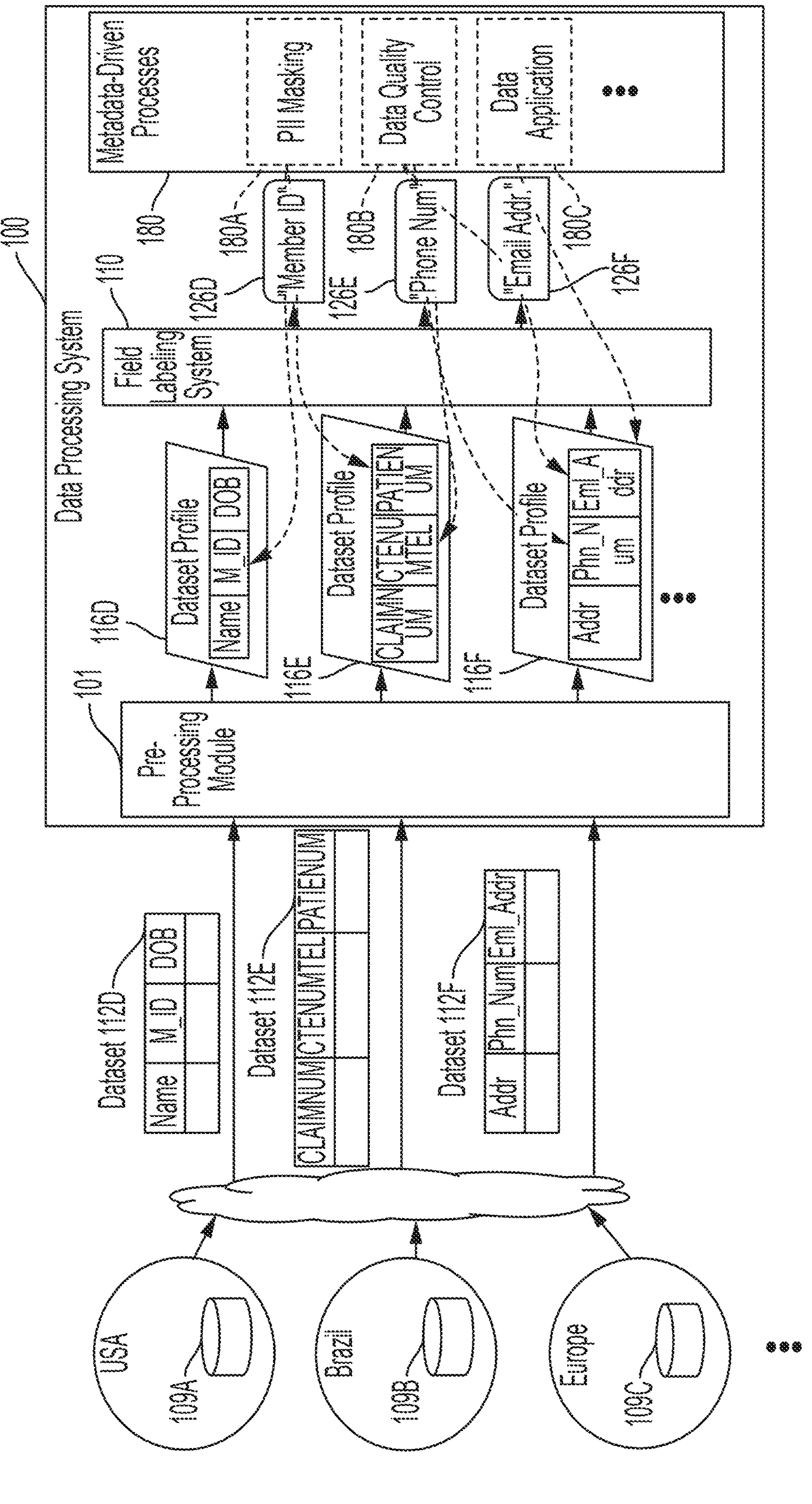
FIG. 1C illustrates an example of the field labeling system assigning field labels to specific example fields of datasets, according to some embodiments of the technology described herein.

FIG. 1C illustrates an example of the field labeling system 110 assigning field labels to fields of datasets 112D, 112E, 112F. Each of the field labels is associated with one or more of the processes 180. The field labels include "Member ID" 1126D, "Phone Num" 126E, and "Email Addr." 126F. As illustrated in FIG. 1C, the label "Member ID" 1126D is associated with the PII masking process 180A. The PII masking process 180A may be applied to fields that are assigned the "Member ID" label to mask identification numbers of customers or clients in datasets. The label "Phone Num" 126E is associated with the data quality control process 180B. The data quality control process 180B may be applied to fields storing phone numbers to determine whether the field values meet a required phone number format. The label "Email Addr." 126F is associated with the data quality control process 180B and the data application 180C. The data quality control process 180B, when applied to a field assigned the label "Email Addr." 126F, may determine whether values of the field meet an email address format. The data application 180C, when applied to a field, may modify field values (e.g., by making the values all lowercase).

As shown in FIG. 1C, the pre-processing module 101 processes each of datasets 112D, 112E, 112F to generate corresponding dataset profiles 116D, 116E, 116F. Each of the dataset profiles 116D, 116E, 116F may store information about fields of respective datasets 112D, 112E, 112F. The dataset profile 116D stores information (e.g., field names and a set of values stored in the fields) about the fields "Name", "M_ID", and "DOB" of the dataset 112D. The dataset profile 116E stores information about the fields "CLAIMNUM", "CTENUMTEL", and "PATIENUM" of dataset 112E. The dataset profile 116F stores information about the fields "Addr", "Phn_Num", "Eml_Addr" of dataset 112F.

The field labeling system 110 has assigned the field labels 1126D, 126E, 126F to fields of the datasets 112D, 112E, 112F using the dataset profiles 116D, 116E, 116F. In the example of FIG. 1C, the PII masking process 180A is applied to the field "M_ID" in dataset profile 116D corresponding to dataset 112D and the field "PATIENUM" in dataset profile 116E corresponding to dataset 112E. The PII masking process 180A may thus mask the identification numbers stored in those fields. The data quality control process 180B is applied to the field "CTENUMTEL" in dataset profile 116E corresponding to dataset 112E and the field "Phn_Num" in dataset profile 116F corresponding to dataset 112F. The data quality control process 180B may check whether phone numbers stored in these fields meets a particular format. The data quality control process 180B is also applied to the field "Eml_Addr" in dataset profile 116F corresponding to dataset 112F to determine whether email addresses stored in the field meet a particular email format. The data application 180C is applied to the "Eml_Addr" field in dataset profile 116F corresponding to dataset 112F. The data application 180C may modify formatting of email addresses stored in the field (e.g., by making them all lowercase).

Furthermore, assigning a field label to a particular dataset field maps metadata associated with the field label to the particular dataset field. For example, each field label may be associated with a data entity definition specifying a set of attributes for capturing metadata about a dataset field. In a data entity instance generated from the data entity definition, each of the attributes may take on a value such as number, string, or reference to another data entity instance. Assigning a field label to a dataset field may associate the data entity definition with the dataset field. As another example, each field label may be associated with a data standard. A data standard associated with a given field label is applied to all dataset fields that are assigned the field label. Thus, a field label allows a data processing system to apply a data standard to multiple dataset fields that need to be governed by the data standard without requiring the data standard to be mapped directly to each of the multiple dataset fields, which would be computationally expensive to do given the large number of dataset fields. Moreover, a data standard associated with a field label may automatically be associated with new or updated dataset fields that are assigned the field label. The field label thus allows mappings of the data standard and dataset field labels to dynamically update in response to addition or modification of data (e.g., that causes a new dataset field to be assigned the label).

As an illustrative example, a data standard for phone numbers may be applicable to any dataset field storing phone numbers. The data standard may, for example, have data quality requirements such as a format in which the phone numbers are stored, a length of the phone numbers, an indication of whether a value of the field needs to be populated, and/or other data quality requirements. The data standard may be associated with a field label such as one named "telephone number." Techniques described herein may be used to assign the field label to one or more fields. By assigning the field label to a given field, the data standard for phone numbers may automatically be applied to the field. Thus, the field may be required to meet the data standard (e.g., by meeting data quality requirements specified by the data standard). Additional fields may subsequently be assigned the field label (e.g., as result of labeling performed after addition of datasets and/or fields to dataset). Each field that is assigned the field label may automatically be associated with the data standard for telephone numbers without requiring analysis of data in the field outside of assignment of a field label.

Given the large number (e.g., millions) of dataset fields in data managed by a data processing system that need to be assigned a field label and the frequency of updates to the datasets (e.g., by addition of fields and/or modification of data within the dataset fields), it is impractical or impossible for the dataset fields to be manually assigned a field label from a field label glossary. Thus, the dataset fields need to be assigned a field label from the field label glossary automatically.

Field Label Glossary Based Labeling

In some embodiments, a field label glossary may comprise a set of strings or information used to identify a string (e.g., a reference to a string). Each string in the set of strings may be a field label. For example, each string may be a field label describing data that is assigned the field label. In some embodiments, each field label in the field label glossary may indicate metadata beyond a descriptive string. Examples of metadata beyond a descriptive string include data standard(s) applicable to data, a data steward, a data owner, a location where data is stored, a functional area associated with the data, a data domain, a PII classification, a security access level of the data, a geographic location the data is associated with, and/or other metadata.

Conventional techniques for automatically assigning field labels to dataset fields involve analyzing data stored in the dataset fields to identify field labels. A subset of data from a given field may be analyzed to identify candidate field label(s) for the dataset field in a field label glossary. The subset of data may be used to determine the score(s) for the candidate field label(s), where each of the score(s) indicates how well the subset of data matches a particular field label. A field label may be assigned to the dataset field based on the scores (e.g., by selecting the highest (or one of the top) scoring candidate field labels or presenting a set of the highest scoring labels to a user for selection as a label).

Although the name of a dataset field should describe the field and be useful to facilitate automated labeling, incorporating field names into the labeling process is difficult. There are various reasons that make field names difficult to accurately map to field labels in a field label glossary. One reason is that field names often include multiple abbreviations each of which may indicate multiple possible words, each of which may map to a different field label in the field label glossary. For example, the abbreviation "CTE" in the field name "CTE_NUM" may indicate the word "client", "cite", "customer", or another word. Another reason is that a field name may use language that is idiosyncratic to an organization (e.g., based on a vocabulary internal to the organization). Thus, field labels of a field label glossary may not accurately map to a particular field name. For example, the field name "CTE_NUM" may refer to a customer's social security number for one organization and a customer's telephone number for another organization. As another example, "CTE_LOC" may refer to a customer's address for one organization and refer to a customer's zip code for another organization. Yet another reason is that field names may not consistently adhere to a particular format. Different field names may use different characters (e.g., a space, tab, underscore, another character, or no character) to separate words or abbreviations in the field names. For example, one field name (e.g., "TEL_NUM") may use an underscore to separate portions of the field name while another field name (e.g., "CREDITCARDNUM") does not use any character to separate portions of the field name.

Incorporating field names into the labeling processing is also difficult because of the large number (e.g., thousands or millions) of datasets managed by the data processing system. Different datasets may use different naming conventions for field names. Thus, a labeling process that utilizes the field name needs to handle the different naming conventions in order to assign field labels from a field label glossary to the dataset fields. Further, field names in different datasets may also be in different languages (e.g., because an organization may store some or all of its data in multiple languages for different geographic regions) relative to field labels of a field label glossary. A labeling process needs to be robust enough to handle different language grammars and conventions to identify, from a field label glossary, a field label for a dataset field using its field name.

For these reasons, it is difficult to map a field name to a field label in a field label glossary. Thus, conventional techniques of assigning a field label to a dataset field do not consider field name as it would result in poor accuracy of field labels assigned to dataset fields. This in turn would lead to downstream issues such as inaccurate metadata indicated about dataset fields and improper functioning of software applications that rely on the metadata. Accordingly, conventional techniques analyze data stored in a dataset field to assign a field label to the field without considering its field name.

Accordingly, the inventors have developed field labeling techniques that perform field name analysis to assign labels, from a field label glossary to dataset fields. The field name analysis uses natural language processing (NLP) to map a given field name to one or more candidate field labels in a field label glossary (e.g., in which each field label indicates respective metadata about a dataset field that is assigned the field label). The NLP involves deriving a word sequence from a field name (e.g., by dividing the field name into component abbreviations and resolving the abbreviations) and using the word sequence to determine candidate field label(s) and corresponding score(s) for the dataset field. Optionally, the candidate field label(s) and score(s) obtained from performing the field name analysis may be merged with candidate field label(s) and score(s) obtained from analyzing data from the dataset fields. The merged candidate field label(s) and score(s) may be used to assign a field label to the dataset field. By incorporating field name analysis, techniques described herein improve over conventional techniques of mapping dataset fields to field labels in a field label glossary.

The techniques for assigning field labels, from a field label glossary, to dataset fields described herein may be implemented in any of numerous ways, as the techniques are not limited to any particular manner of implementation. Examples of details of implementation are provided herein solely for illustrative purposes. Furthermore, the techniques of assigning field labels to dataset fields disclosed herein may be used individually or in any suitable combination, as aspects of the technology described herein are not limited to the use of any particular technique or combination of techniques.

Figure 3A:
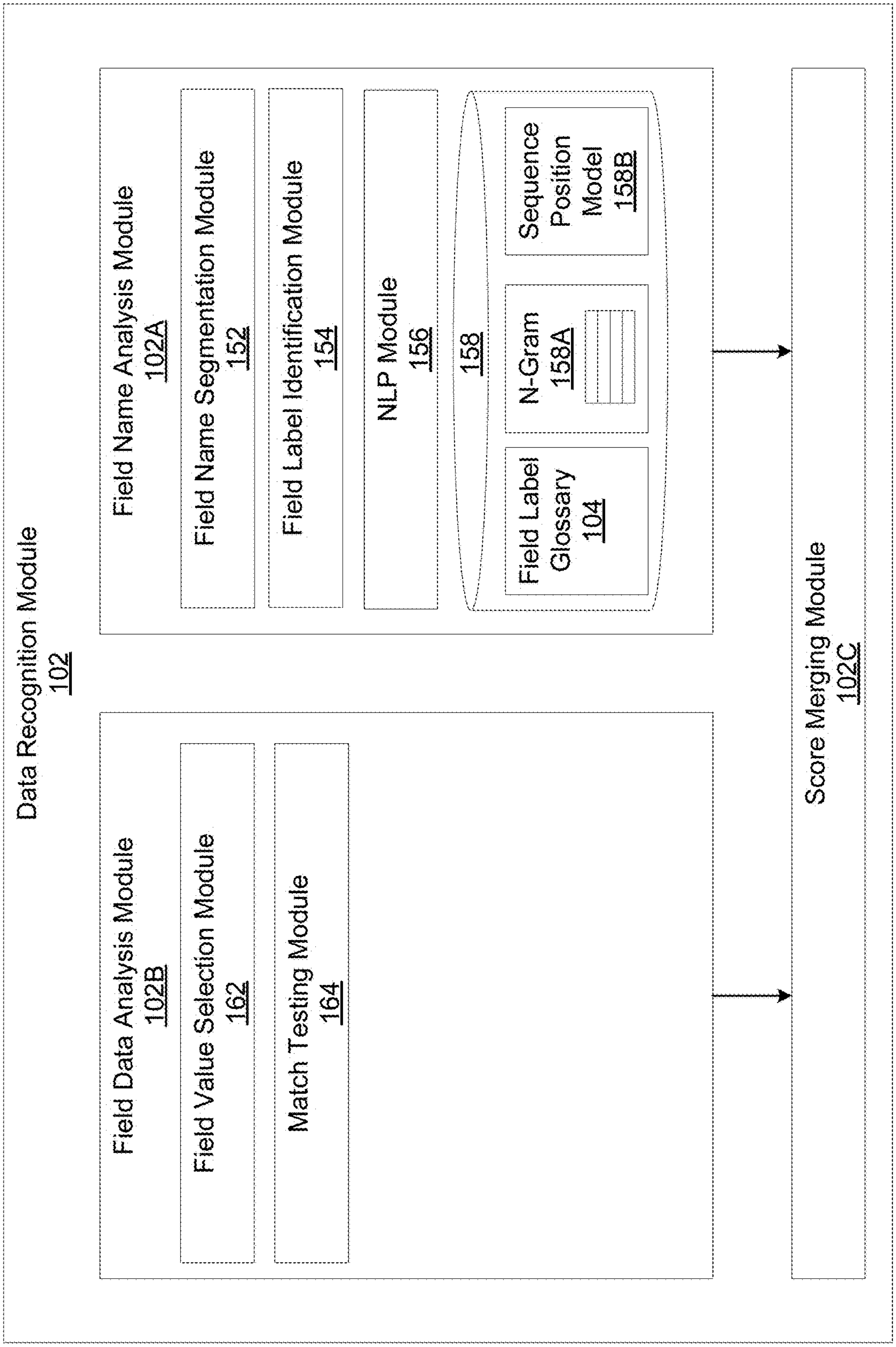
FIG. 3A shows example components of the data recognition module of the field labeling system of FIGS. 1B-2C, according to some embodiments of the technology described herein.

Some embodiments provide a system for processing a dataset comprising data stored in fields to identify, from a field label glossary (e.g., field label glossary 159 described herein with reference to FIG. 3A), a field label for each field in a set of one or more of the dataset fields of the dataset. The field labels describe data stored in the set of fields (e.g., by associating fields to metadata indicated by the field labels). The system may be configured to, for each particular field in the set of fields: (1) determine, using a name of the particular field (e.g., field name 402 in FIG. 4A) and natural language processing (NLP), a first set of candidate field labels for the particular field and field name analysis scores for the first set of candidate field labels (e.g., field name analysis candidate field label scores 700 of FIG. 7); (2) determine, using a subset of data from the particular field and tests (e.g., pattern matching tests, tests that compare the subset of data to a reference set of values, tests that compare a distribution of the subset of data to an expected distribution, tests that compare the support of the subset of data to an expected support, and/or other tests) associated with respective field labels in the field label glossary, a second set of candidate field labels and field data analysis scores for the second set of candidate field labels (e.g., field data analysis candidate field label scores 702 of FIG. 7); and (3) determine merged candidate field labels and corresponding scores (e.g., merged candidate label scores 704 of FIG. 7) using the first set of candidate field labels and the field name analysis scores, and the second set of candidate field labels and the field data analysis scores. The system may be configured to assign one of the merged candidate field labels to the particular field using the corresponding scores (e.g., by automatically selecting, from the merged candidate field labels, a candidate field label using the corresponding scores and/or obtaining user input indicating selection of a field label through a GUI).

Figure 4A:
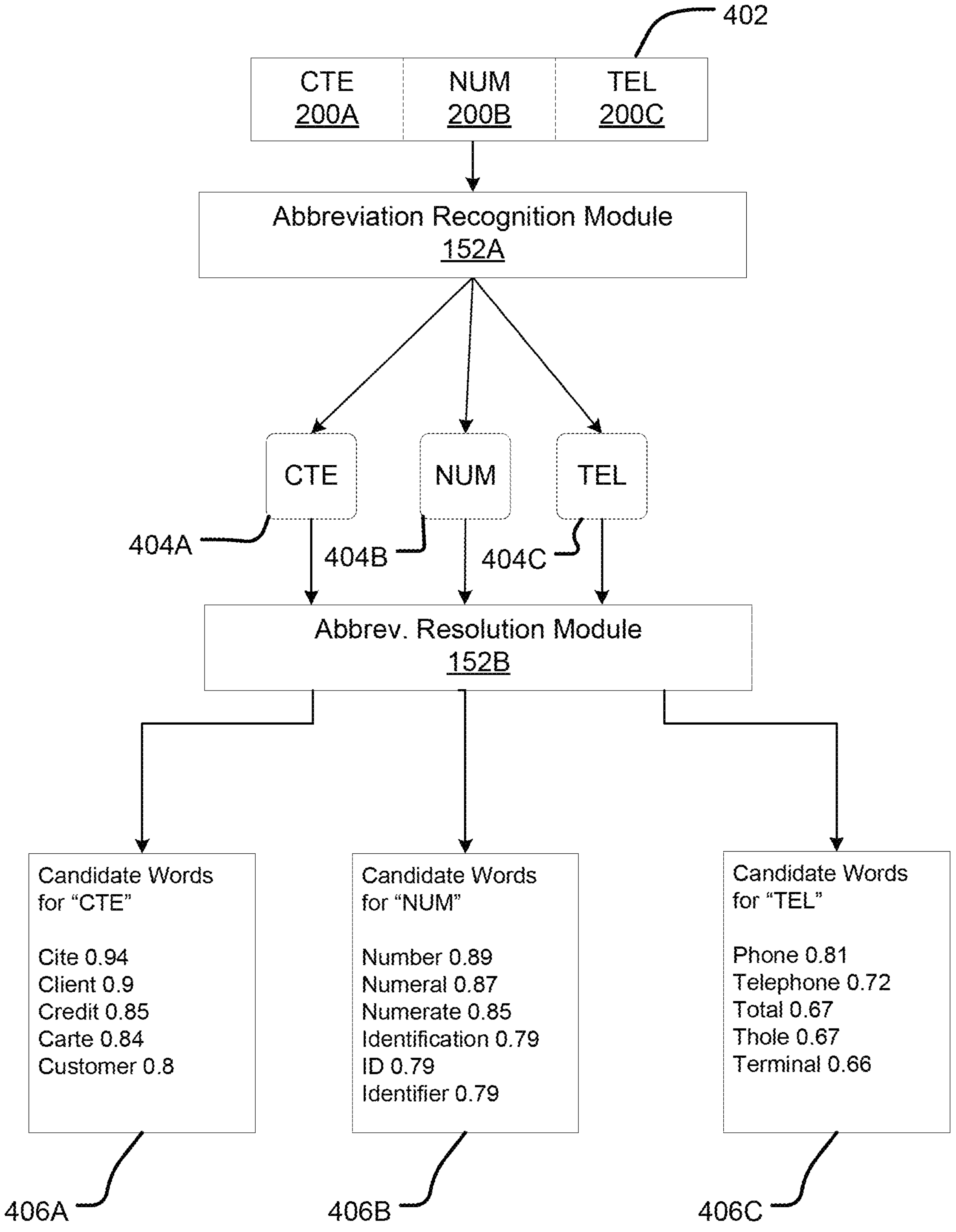
FIG. 4A shows an example of identifying abbreviations in a field name and identifying candidate word sets for each of the identified abbreviations, according to some embodiments of the technology described herein.
Figure 4B:
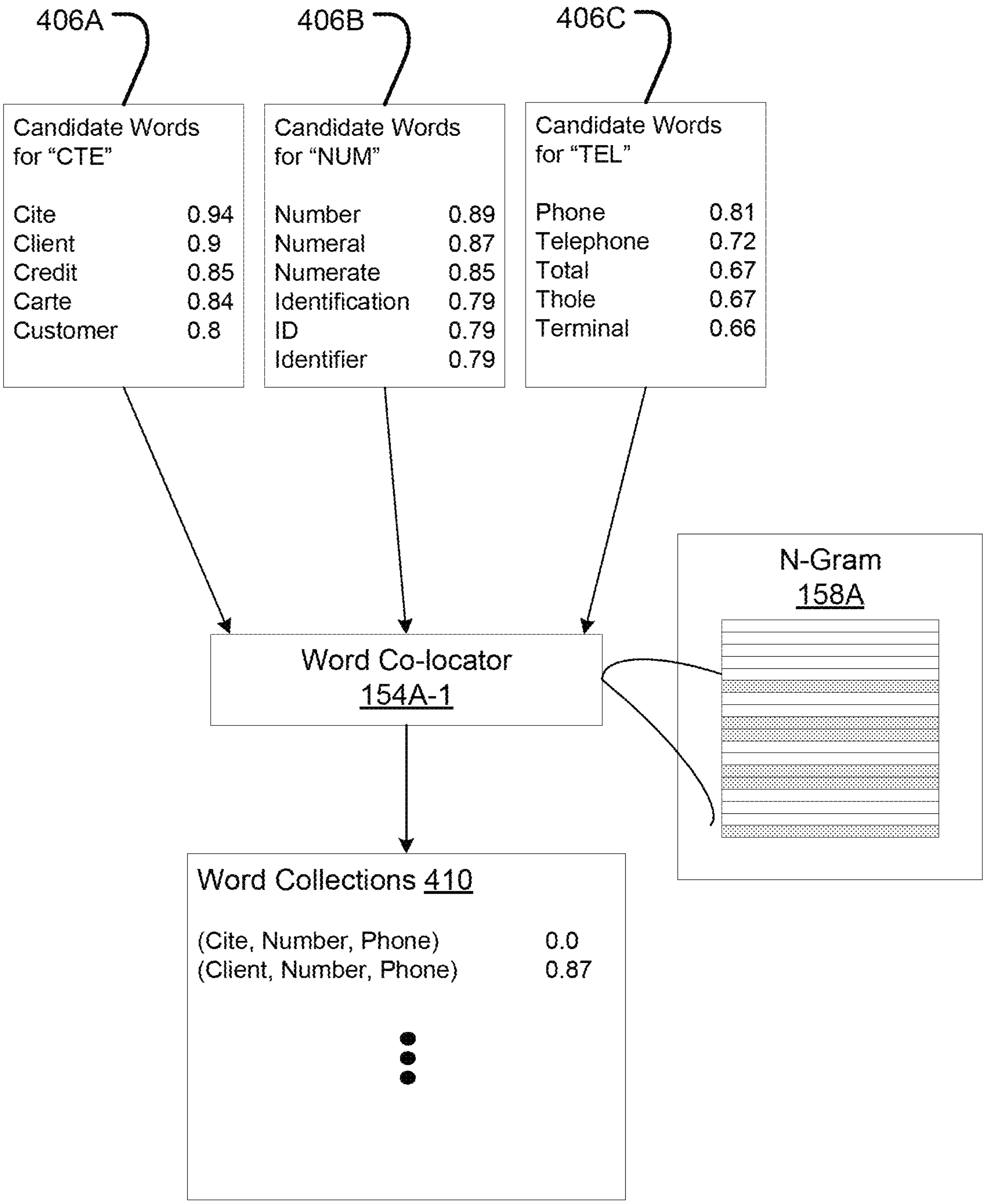
FIG. 4B shows an example of generating word collections and corresponding scores using an n-gram model for the abbreviations identified in the example shown in FIG. 4A, according to some embodiments of the technology described herein.
Figure 4C:
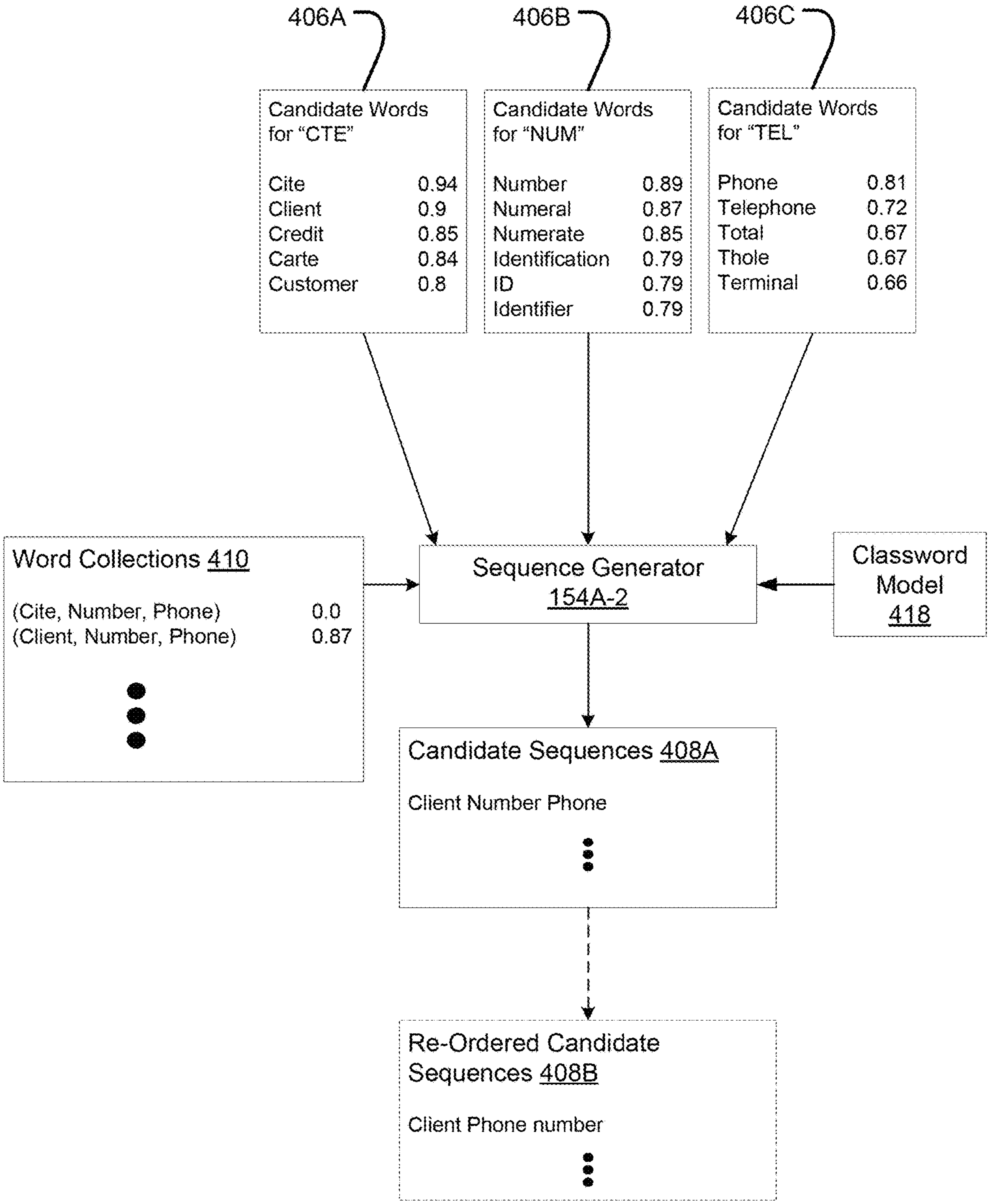
FIG. 4C shows an example of generating candidate sequences using the word collections and candidate word sets for the abbreviations obtained in the example shown in FIG. 4B, according to some embodiments of the technology described herein.
Figure 4D:
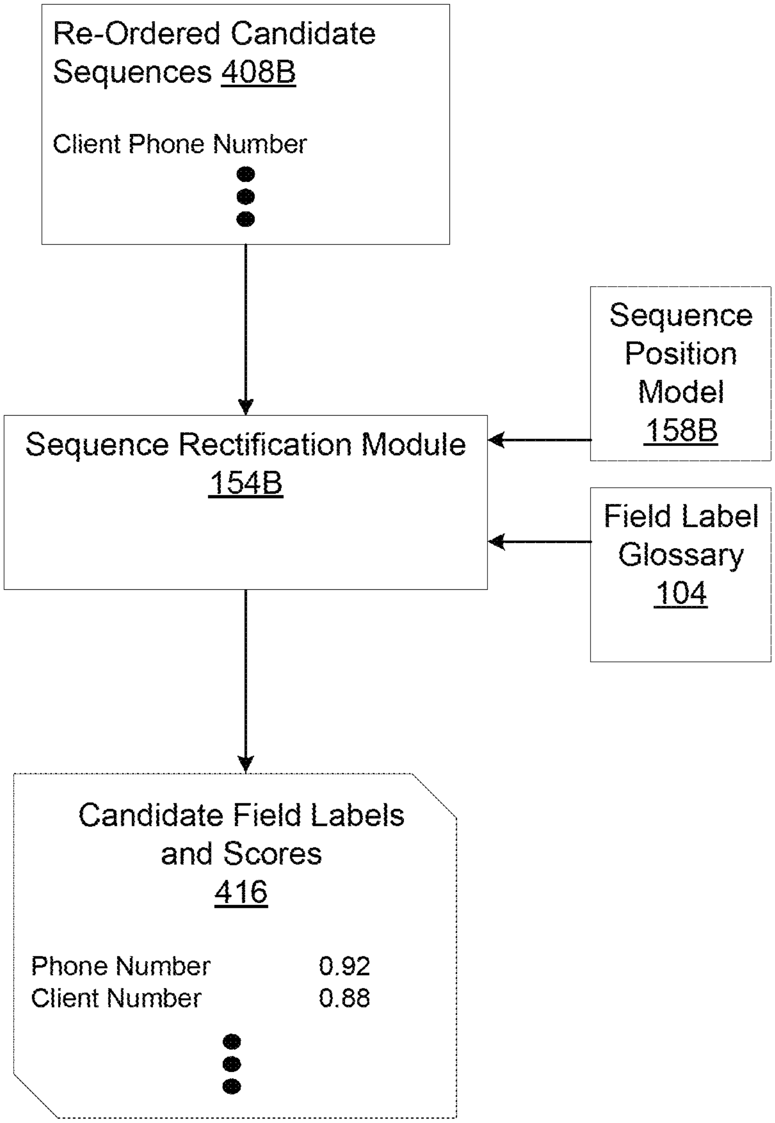
FIG. 4D shows an example of identifying candidate field labels from a field label glossary using the candidate sequences obtained in the example shown in FIG. 4C, according to some embodiments of the technology described herein.

In some embodiments, the system may be configured to determine, using the name of the particular field and the NLP, the first set of candidate field labels for the particular field and the field name analysis scores for the first set of candidate field labels by: (1) identifying a set of abbreviations in the name of the particular field (e.g., abbreviations 404A, 404B, 404C in field name 402 of FIG. 4A); (2)

determining, for each particular abbreviation in the set of abbreviations, a set of candidate words indicated by the abbreviation and a corresponding set of similarity scores to obtain sets of candidate words indicated by the abbreviations and corresponding sets of similarity scores (e.g., candidate word sets and corresponding scores 406A, 406B, 406C of FIG. 4A); and (3) determining, using the sets of candidate words indicated by the abbreviations and the corresponding sets of similarity scores, the first set of candidate field labels and the field name analysis scores (e.g., candidate field labels and scores 416 in FIG. 4D).

In some embodiments, the system may be configured to determine, using the subset of data from the particular field and the tests associated with respective field labels in the field label glossary, the second set of candidate field labels and the field data analysis scores for the second set of candidate field labels by: (1) applying the tests associated with the respective field labels (e.g., field label 1 test and field label 2 test of FIG. 6B) to the subset of data from the particular field to obtain test results (e.g., by determining a proportion of the subset of data that meets a regular expression, comparing a distribution of the subset of data to an expected distribution, comparing the support of the subset of values to a support of the expected distribution, determining a number of values in the subset of data that are in a reference set of values specified by the test, and/or determining how much of the reference data meets rule(s) specified by the test); and (2) determining the second set of candidate field labels and the dataset field analysis scores (e.g., score 1 and score 2 of FIG. 6B) using the test results obtained from applying the tests.

In some embodiments, the system may be configured to determine the merged candidate field labels and the corresponding scores using the first set of candidate field labels and the field name analysis scores, and the second set of candidate field labels and the field data analysis scores by: (1) identifying a first field label associated with a first one of the field name analysis scores and a first one of the field data analysis scores, the first field label being in the first set of candidate field labels and the second set of candidate field labels; and (2) determining a first merged score for the first field label by adjusting the first field name analysis score using the first field data analysis score to obtain the first merged score (e.g., by adjusting the first field name analysis score based on a bias value determined from a ratio between the first field name analysis score and the first field data analysis score).

In some embodiments, the system may be configured to determine the merged candidate field labels and the corresponding scores using the first set of candidate field labels and the field name analysis scores, and the second set of candidate field labels and the field data analysis scores comprises: (1) identifying a first field label from the first set of candidate field labels associated with a first one of the field name analysis scores; (2) determining that none of the subset of data passes a test associated with the first field label; and (3) determining a first merged score for the first field label by reducing the first field name analysis score.

Some embodiments provide a system for processing a dataset comprising data stored in fields to identify, from a field label glossary, a field label for each field in a set of one or more of the dataset fields of the dataset, the field labels describing data stored in the set of fields. The system may be configured to, for each particular field in the set of fields, determine, using a name of the particular field and natural language processing (NLP), candidate field labels for the particular field and field name analysis scores for the candidate field labels (e.g., candidate field labels and scores 416 of FIG. 4D). The system may be configured to determine the candidate field labels and the field name analysis scores by: (1) identifying a set of abbreviations (e.g., abbreviations 404A, 404B, 404C of FIG. 4A) in the name of the particular field (e.g., field name 402 of FIG. 4A); (2) identifying, for each particular abbreviation in the set of abbreviations, a set of candidate words indicated by the particular abbreviation thereby obtaining sets of candidate words (e.g., sets of candidate words 406A, 406B, 406C of FIG. 4A); (3) generating, using the sets of candidate words identified for the abbreviations and an n-gram model (e.g., n-gram model 158A of FIGS. 3A-3D) indicating a plurality of word collections that appear within field labels of a field label glossary, at least one word sequence describing data stored in the particular field (e.g., candidate sequences 408A of FIG. 4C); and (4) determining, using the at least one word sequence and the field label glossary, the candidate field labels for the particular field and the field name analysis scores for the candidate field labels (e.g., candidate field labels and scores 416 of FIG. 4D). The system may be configured to assign one of the candidate field labels to the particular field using the field name analysis scores determined for the candidate field labels.

In some embodiments, the system may be configured to generate, using the sets of candidate words identified for the abbreviations and the n-gram model indicating the plurality of word collections that appear within the field labels of the field label glossary, the at least one word sequence describing data stored in the particular field by: (1) combining words from the sets of candidate words to obtain a plurality of word sequences; and filtering, using the n-gram model, the plurality of word sequences to obtain the at least one word sequence (e.g., by determining, using the n-gram model, for each of the plurality of word sequences, a likelihood that words of the word sequence are collocated and filtering, using likelihoods determined for the plurality of word sequences, the plurality of word sequences to obtain the at least one word sequence).

In some embodiments, the system may be configured to determine, using the at least one word sequence and the field label glossary, the candidate field labels for the particular field and the field name analysis scores for the candidate field labels by: (1) determining that one of the words in the at least one word sequence specifies a particular category of data; (2) determining a target position of the word in the at least one word sequence (e.g., based on a target language for a field label); and (3) determining the field name analysis scores for the candidate field labels based on the target position of the word in the at least one word sequence.

In some embodiments, the system may be configured to determine, using the at least one word sequence and the field label glossary, the candidate field labels for the particular field and the field name analysis scores for the candidate field labels by: (1) accessing a sequence position model (e.g., sequence position model 158B shown in FIG. 4E) that is based on an order of words in the at least one word sequence; (2) determining, using the sequence position model, scores for the field labels of the field label glossary; and (3) selecting, using the scores for the field labels of the field label glossary, the candidate field labels from the field label glossary.

In some embodiments, the system may be configured to identify, for each particular abbreviation in the set of abbreviations, the set of candidate words indicated by the particular abbreviation by determining a similarity score between each candidate word in the set of candidate words and the particular abbreviation thereby obtaining sets of similarity scores corresponding to the sets of candidate words (e.g., sets of candidate words and corresponding scores 406A, 406B, 406C in FIG. 4A). In some embodiments, the system may be configured to determine, using the at least one word sequence and the field label glossary, the candidate field labels for the particular field and the field name analysis scores for the candidate field labels by: (1) identifying words in the at least one word sequence that are present in the sets of candidate words and corresponding similarity scores; and (2) determining, using the words in the at least one word sequence and the corresponding similarity scores, the candidate field labels for the particular field and the field name analysis scores for the candidate field labels.

Some embodiments provide a system for processing a dataset comprising data stored in fields to identify, from a field label glossary, a field label for each field in a set of one or more of the dataset fields of the dataset. The field labels describe data stored in the set of fields (e.g., by associating the fields with metadata indicated by the field labels). The system may be configured to determine, using a name of the particular field and natural language processing (NLP), candidate field labels for the particular field and field name analysis scores for the candidate field labels. The system may be configured to determine the candidate field labels and the field name analysis scores by identifying a set of abbreviations (e.g., abbreviations 404A, 404B, 404C of FIG. 4A) in the name of the particular field (e.g., field name 402 in FIG. 4A); (2) determining, for each particular abbreviation in the set of abbreviations, a set of candidate words indicated by the particular abbreviation and corresponding set of similarity scores thereby obtaining sets of candidate words and corresponding sets of similarity scores (e.g., sets of candidate words and corresponding sets of similarity scores 406A, 406B, 406C in FIG. 4A). The system may be configured to identify the set of abbreviations by (1) determining a measure of similarity between the particular abbreviation and each of a plurality of words in a glossary to obtain a plurality of similarity scores for the plurality of words, the measure of similarity between an abbreviation and a word being based on characters in the abbreviation, characters in the word, order of the characters in the abbreviation, and order of the characters in the word; and (2) selecting, using the plurality of similarity scores, the set of candidate words from the plurality of words in the glossary to obtain the set of candidate words for the particular abbreviation and the corresponding set of similarity scores. The system may be configured to determine, using the sets of candidate words and the corresponding sets of similarity scores, the candidate field labels for the particular label and the field name analysis scores for the candidate field labels (e.g., candidate field labels and scores 416 in FIG. 4D). The system may be configured to assign one of the candidate field labels to the particular field using the field name analysis scores determined for the candidate field labels.

In some embodiments, the measure of similarity comprises multiple component measures of similarity (e.g., cosine similarity, Jaro-Winkler similarity, Jaro-Winkler similarity modified to scale based on a shared suffix, a loss value based on positions of shared letters and/or a combination thereof) and determining the measure of similarity between the particular abbreviation and each of the plurality of words in the glossary to obtain the plurality of similarity scores comprises: (1) determining, for the particular abbreviation and the word, the component measures of similarity to obtain values of the component measures of similarity; and (2) determining the measure of similarity between the particular abbreviation and the word using the values of the component measures of similarity (e.g., as a maximum of the component similarities).

In some embodiments, the system may be configured to determine the measure of similarity between the particular abbreviation and a first word of the plurality of words in the glossary to obtain a first one of the plurality of similarity scores by determining one of the multiple component measures of similarity based on a degree to which a prefix and/or a suffix of the first word matches a prefix and/or a suffix of the particular abbreviation.

In some embodiments, the system may be configured to determine the measure of similarity between the particular abbreviation and a first word of the plurality of words in the glossary to obtain a first one of the plurality of similarity scores by: (1) removing vowels from the first word to obtain a vowelless word; and (2) determining one of the multiple component measures of similarity using the vowelless word.

In some embodiments, the system may be configured to determine the measure of similarity between the particular abbreviation and a first word of the plurality of words in the glossary to obtain a first one of the plurality of similarity scores by: (1) stemming the first word to obtain a word stem; and (2) determining one of the multiple component measures of similarity using the word stem.

In some embodiments, the system may be configured to select, using the plurality of similarity scores, the set of candidate words from the plurality of words in the glossary to obtain the set of candidate words for the particular abbreviation and the corresponding set of similarity scores comprises, by: (1) identifying a subset of the plurality of similarity scores that meet a threshold similarity score, the subset of similarity scores associated with a subset of the plurality of words; and (2) selecting the subset of the plurality of words as the set of candidate words for the particular abbreviation.

In some embodiments, the candidate field labels comprise words from the sets of candidate words and the system may be configured to determine, using the sets of candidate words and the corresponding sets of similarity scores, the candidate field labels for the particular field and the field name analysis scores for the candidate field labels by: (1) determining, using the sets of candidate words, at least one word sequence (e.g., candidate sequences 408A) describing data stored in the particular field; and (2) determining, using the sets of similarity scores and the at least one word sequence, the field name analysis scores for the candidate field labels (e.g., candidate field labels and scores 416).

In some embodiments, the system may be configured to determine, using the sets of similarity scores and the at least one word sequence, the field name analysis scores for the candidate field labels comprises by performing, for each of the candidate field labels: (1) identifying words from the sets of candidate words included in the candidate field label; (2) obtaining similarity scores corresponding to the identified words; and (3) determining a field name analysis score for the candidate field label using the similarity scores corresponding to the identified words.

Figure 2A:
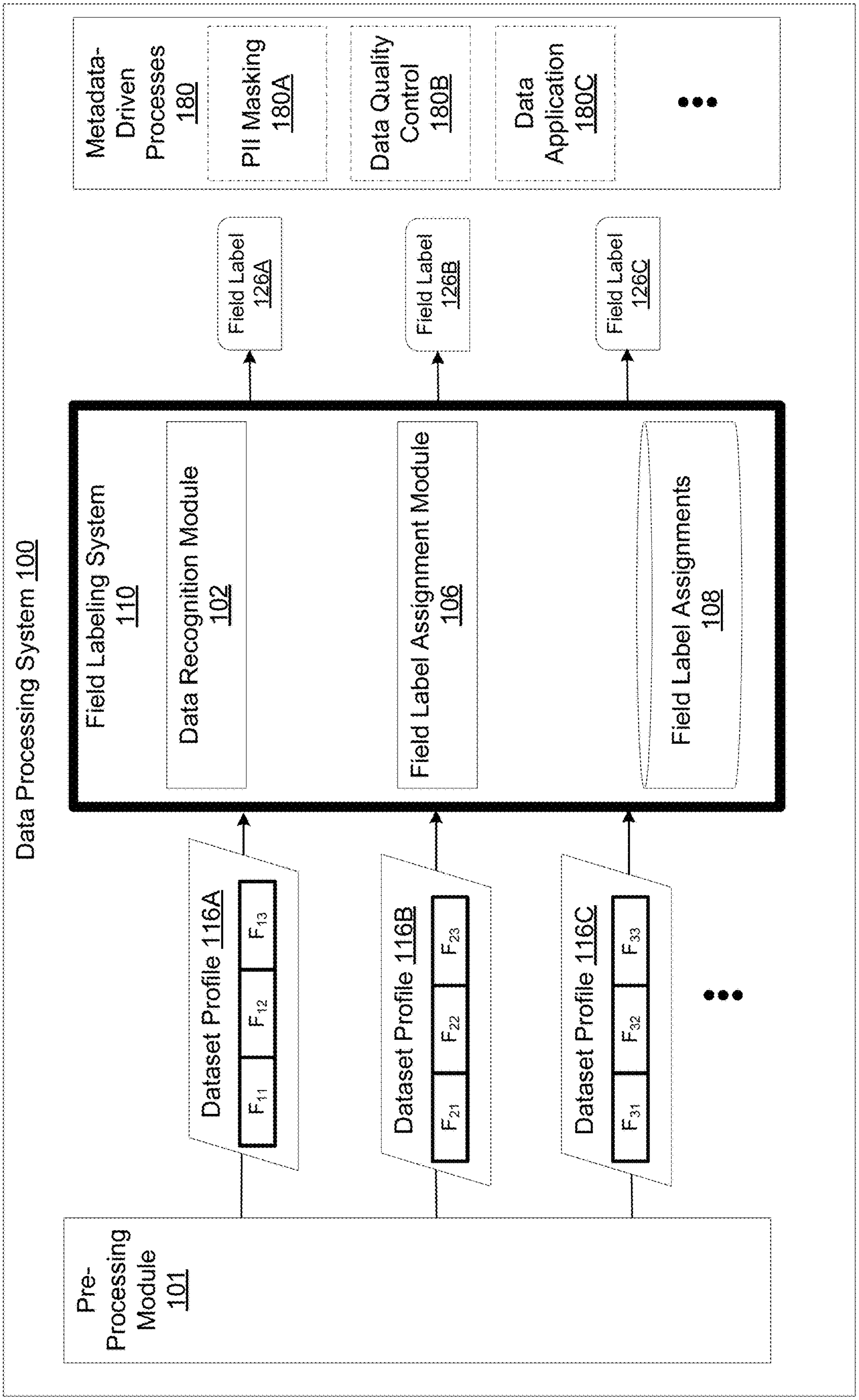
FIG. 2A is a block diagram of a data processing system configured to use the field labeling system of FIGS. 1B-1C to assign field labels from a field label glossary to one or more dataset fields, according to some embodiments of the technology described herein.

FIG. 2A is a block diagram of the data processing system 100 configured to use the field labeling system 110 to assign field labels from a field label glossary to one or more dataset fields, according to some embodiments of the technology described herein. The data processing system 100 may be configured to access data from datastores 109A, 109B, 109C described herein with reference to FIGS. 1A-IC. The data processing system 100 may be configured to process datasets to assign labels to fields of the datasets. For example, the data processing system 100 may assign a label to each of fields $F_1$, $F_{12}$, $F_{13}$ of dataset 112A using dataset profile 116A as described herein with reference to FIG. 2C.

Figure 2B:
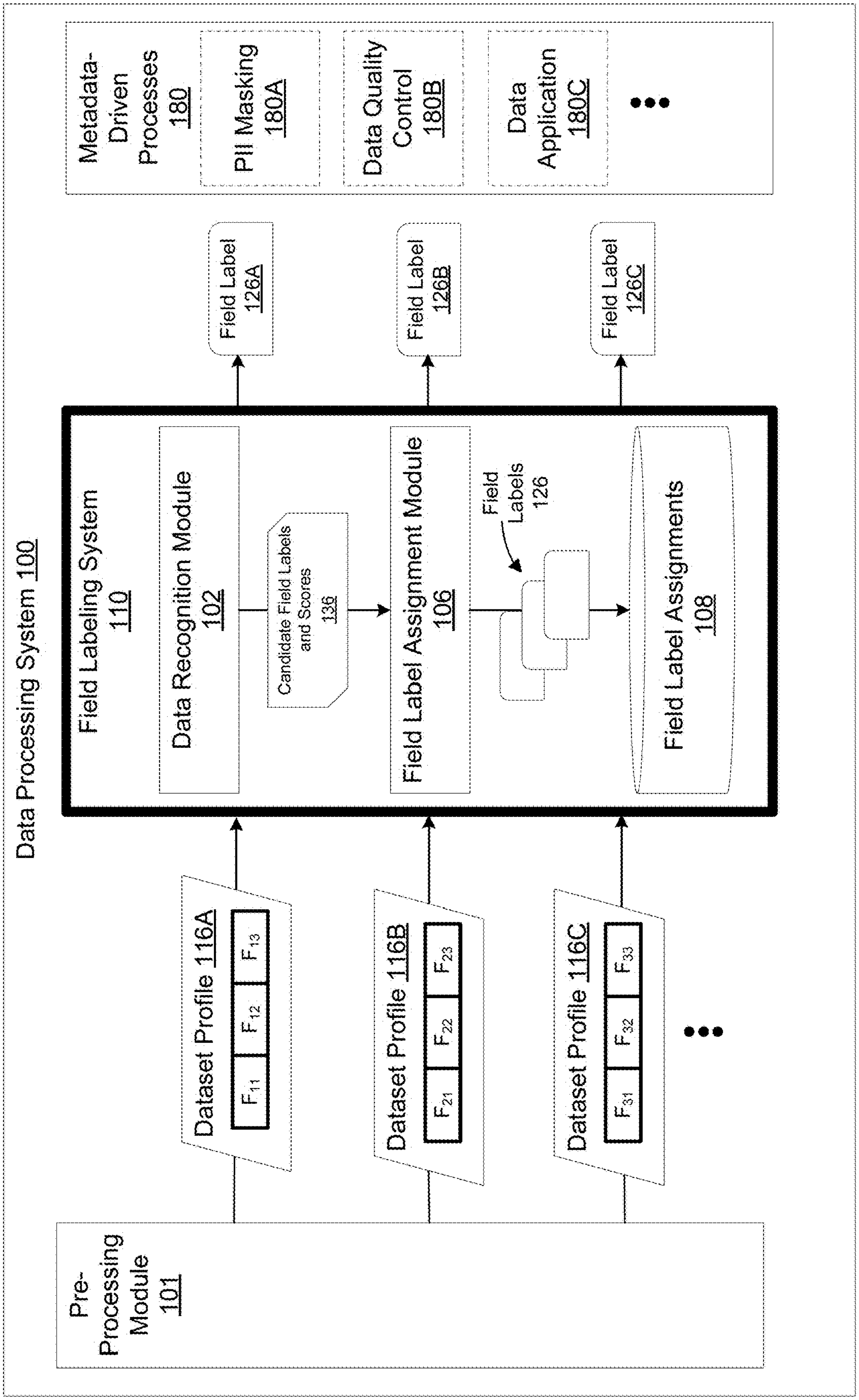
FIG. 2B illustrates an example of how software modules of the field labeling system of FIG. 2A may operate to assign labels to dataset fields, according to some embodiments of the technology described herein.

As shown in FIG. 2A, the field labeling system 110 includes a data recognition module 102, a field label assignment module 106, and a datastore 108 storing field labels. FIG. 2B illustrates an example of how the modules 102, 106 of the field labeling system of FIG. 2A may operate to assign field labels 126 to dataset fields, according to some embodiments of the technology described herein.

The data recognition module 102 may be configured to process dataset fields to identify candidate field labels and scores 136 for the dataset fields from a field label glossary 104 (shown in FIG. 3A). The field label glossary 104 may be a finite set of field labels that are assignable to a dataset field. In some embodiments, field labels in the field label glossary 104 may each indicate metadata to be stored about dataset field(s) to which the field label has been assigned. For example, each field label may be associated with a data entity definition specifying attributes (e.g., metadata attributes). When the field label is assigned to a dataset field, the data processing system 100 may instantiate a data entity instance storing values of the attributes specific to the dataset field. The attribute values may indicate metadata about the dataset field and data stored therein. In some embodiments, the field label glossary 104 may comprise a set of strings. For example, the field label glossary 104 may comprise a predetermined set of terms that are assignable as field labels to dataset fields. For example, the field label glossary 104 may comprise a set of terms determined by an organization that each describes data that may be stored in dataset(s) storing information for the organization. Example terms may include "city", "state", "country", "zip code", "account number", "social security number", "customer ID", "transaction value", and/or other terms.

In some embodiments, the data processing system 100 may be configured to generate the field label glossary 104. For example, the data processing system 100 may generate the field label glossary 104 from a set of text (e.g., provided to the data processing system 100). The field label glossary 104 may identify strings in the set of text and store the identified strings in a data structure (e.g., an array) as the field label glossary 104. In some embodiments, the field label glossary 104 may be loaded into the data processing system 100. For example, the field label glossary 104 may be loaded as a file into the memory of the data processing system 100. In some embodiments, the field label glossary 104 may be updated to add additional field labels that can be assigned to dataset fields. For example, an initial field label glossary may be stored in the data processing system 100. The initial field label glossary may be subsequently updated to obtain the field label glossary 104.

The field label glossary 104 may be stored in memory of the data processing system 100 (e.g., in datastore 158 as shown in FIG. 3A). In some embodiments, the field label glossary 104 may be stored as a data structure in memory of the data processing system 100. For example, the field label glossary 104 may be stored as a table in which each entry stores a field label, as an array in which each value is a field label, or as another suitable data structure. The field label glossary 104 may be accessed by the data recognition module 102 from memory of the data processing system 100 to identify candidate field labels.

In some embodiments, the data recognition module 102 may be configured to determine candidate field labels and scores 136 for dataset fields. The data recognition module 102 may be configured to determine one or more candidate field labels for a particular dataset field by performing two separate analyses to obtain two sets of candidate field labels and corresponding scores: (1) a field name analysis in which the data recognition module 102 determines, using a name of the particular field, a first set of candidate field labels ("field name analysis candidate field labels") and corresponding scores ("field name analysis scores"); and (2) a field data analysis in which the data recognition module 102 determines, using a subset of data stored in the particular field, a second set of candidate field labels ("field data analysis candidate field labels") and corresponding scores ("field data analysis scores"). The data recognition module 102 may be configured to merge the two sets of candidate field labels and corresponding scores to obtain merged candidate field labels and corresponding scores. The data recognition module 102 may be configured to provide the merged candidate field labels and corresponding scores 136 to the field label assignment module 106 for the assignment of one of the merged candidate field labels to the particular field (e.g., automatically based on the scores and/or based on user input).

In some embodiments, the data recognition module 102 may be configured to determine a first set of candidate field labels for a dataset field using its field name by processing the field name using natural language processing (NLP). The data recognition module 102 may be configured to use NLP to: (1) determine a semantic meaning indicated by the field name; and (2) identify candidate field label(s) corresponding to the semantic meaning in field label glossary 104. Examples of NLP that may be performed by the data recognition module 102 are described herein.

Once candidate field label(s) are determined for a dataset field by the data recognition module 102, one of the candidate field label(s) needs to be assigned as the field label to the dataset field. The field label assignment module 106 may be configured to select field labels 126 to assign to dataset fields from candidate field labels determined for the dataset fields (by the data recognition module 102). The field label assignment module 106 may be configured to receive candidate field labels and corresponding scores 136 from the data recognition module 102. For example, the field label assignment module 106 may obtain merged candidate field labels and corresponding scores determined by the data recognition module 102.

In some embodiments, the field label assignment module 106 may be configured to automatically assign one of the candidate field labels associated with a dataset field based on scores associated with the candidate field labels. For example, when the field label assignment module 106 receives a single merged candidate field label for a dataset field with a corresponding score that meets a first threshold, the field label assignment module 106 may automatically assign the candidate field label to the dataset field. In some embodiments, the first threshold score may be any suitable value in the range of 0.8 to 1. For example, the first threshold score may be 0.9. In some embodiments, the first threshold score may be a configurable parameter. For example, the first threshold may be configured by the field label assignment module 106 based on user input received through a GUI.

In some embodiments, the field label assignment module 106 may be configured to request user input to assign one of the candidate field labels associated with a dataset field based on scores associated with the candidate field labels. For example, when the field label assignment module 106 receives a merged candidate field label for a dataset field with a corresponding score that meets a second threshold lower than the first threshold, the field label assignment module 106 may request user input confirming the field label. In some embodiments, the second threshold score may be any suitable value in the range 0.6-0.9. For example, the field label assignment module 106 may request user input to assign one of the candidate field labels to the dataset field when the greatest one of the scores associated with the candidate field labels meets a second threshold score of 0.75 but is less than a first threshold score of 0.9. In some embodiments, the second threshold score may be a configurable parameter. For example, the second threshold score may be configured by the field label assignment module 106 based on user input received through a GUI.

In some embodiments, the field label assignment module 106 may be configured to request user input when multiple candidate field labels have associated scores that meet a third threshold score. In some embodiments, the third threshold score may be any suitable value in the range 0.6-1.0. For example, the third threshold score may be 0.75. In this example, when multiple candidate field labels have scores of at least 0.75, the field label assignment module 106 may request user input selecting one of the multiple candidate field labels to assign to the particular field. In some embodiments, the third threshold score may be a configurable parameter. For example, the third threshold score may be configured by the field label assignment module 106 based on user input received through a GUI.

In some embodiments, the field label assignment module 106 may be configured to determine that there is no matching candidate field label when none of the associated scores meet a fourth threshold score. In some embodiments, the fourth threshold score may be a value in the range 0.1-0.2, 0.2-0.3, 0.3-0.4, 0.4-0.5, 0.5-0.6, 0.6-0.7, or 0.7-0.8. For example, the fourth threshold score may be 0.75. In this example, when none of the candidate field labels have a score of at least 0.75, the field label assignment module 106 may determine that none of the candidate field labels are to be assigned to the particular field.

As shown in FIG. 2A, the field label assignment module 106 stores the assigned field labels 126 in the datastore 108. In the example of FIG. 2A, dataset profile 116A (corresponding to dataset 112A) includes information about includes dataset fields (e.g., columns) $F_{11}$, $F_{12}$, $F_{13}$. The field label assignment module 106 may be configured to assign a field label to each of the dataset fields $F_{11}$, $F_{12}$, $F_{13}$. The assigned field labels 126 include a field label 126A assigned to dataset field $F_{11}$, a label 126B assigned to dataset field $F_{12}$, and a label 126C assigned to dataset field $F_{13}$. In some embodiments, the field label assignment module 106 may be configured to store each of the assigned field labels 126 in association with its respective field.

In some embodiments, the datastore 108 may be configured to store metadata about data stored in the datastores 109A, 109B, 109C. In some embodiments, the metadata may be stored in data entity instances which each store metadata about a particular dataset field. In some embodiments, the data entity instances for a dataset field may be defined based on the field label assigned to the dataset field. For example, the data entity instance for the dataset field may be instantiated from a data entity definition associated with the field label assigned to the dataset field. The data entity definition may define metadata to be stored about the dataset field in the instantiated data entity instance. In the example of FIG. 2A, the data entity instances may include a data entity instance associated with dataset field $F_1$, a data entity instance associated with dataset field $F_{12}$, and a data entity instance associated with dataset field $F_{13}$. A data entity instance may store metadata about a dataset field as values of one or more metadata attributes. In some embodiments, the field label assignment module 106 may be configured to store a field label assigned to a dataset field as a metadata attribute value in a data entity instance associated with the dataset field. In the example of FIG. 2A, the field label assignment module 106 may store the label 126A as a metadata attribute value in the data entity instance associated with dataset field $F_{11}$, the label 126B as a metadata attribute value in the data entity instance associated with dataset field $F_{12}$, and the label 126C as a metadata attribute value in the data entity instance associated with dataset field $F_{13}$.

In some embodiments, assigned field labels may be used by the data processing system 100 for various processes. For example, metadata attribute values in data entity instances associated with the dataset fields $F_1$, $F_{12}$, $F_{13}$ may be used by the data processing system to identify relationships between the dataset fields $F_1$, $F_{12}$, $F_{13}$, to generate lineage information about the dataset fields $F_{11}$, $F_{12}$, $F_{13}$, determine whether to anonymize PII in the dataset fields $F_{11}$, $F_{12}$, $F_{13}$, to identify a format of data stored in the dataset fields $F_1$, $F_{12}$, $F_{13}$, to govern access to the dataset fields $F_1$, $F_{12}$, $F_{13}$, to determine a data standard(s) to apply to the dataset fields $F_{11}$, $F_{12}$, $F_{13}$, and/or for other purposes). As another example, the data processing system 100 may use the metadata attribute values to identify which of dataset fields $F_1$, $F_{12}$, $F_{13}$ in dataset 112A is the key or index field of the dataset 112A. As another example, the data processing system 100 may use the metadata attribute values to automatically identify different dataset fields from different datasets that store the same type of information. The system may identify the different dataset fields by determining that they are all assigned a common field label from field label glossary 104. The system may further generate a visual map associating the field label to the different fields and their corresponding source datasets (e.g., to illustrate that a software application is accessing the same type of information from multiple datasets). To illustrate, the system may generate a visual map showing that two different data entity instances (e.g., "member identifier" and "member identification code") that each represents a respective set of dataset field(s) both indicate the same field label assignment (e.g., "member identifier") for their respective sets of dataset field(s). This shows that the dataset field(s) associated with the two data entity instances store the same information (e.g., a member identifier).

In some embodiments, the datastore 108 may comprise any suitable storage hardware configured to store field label assignments. For example, the datastore 108 may comprise one or more hard drives (e.g., solid state drive(s) (SSD(s)), disk(s), and/or other hard drive(s)). In some embodiments, the datastore 108 may comprise local storage. In some embodiments, the datastore 108 may comprise distributed storage. The distributed storage may be connected through a network. For example, the datastore 1058 may include a distributed database. In some embodiments, the datastore 108 may comprise virtual storage. In some embodiments, the datastore 108 may comprise a database managed by a database management system. For example, the database may be a relational database managed by a relational database management system (RDBMS).

Figure 2C:
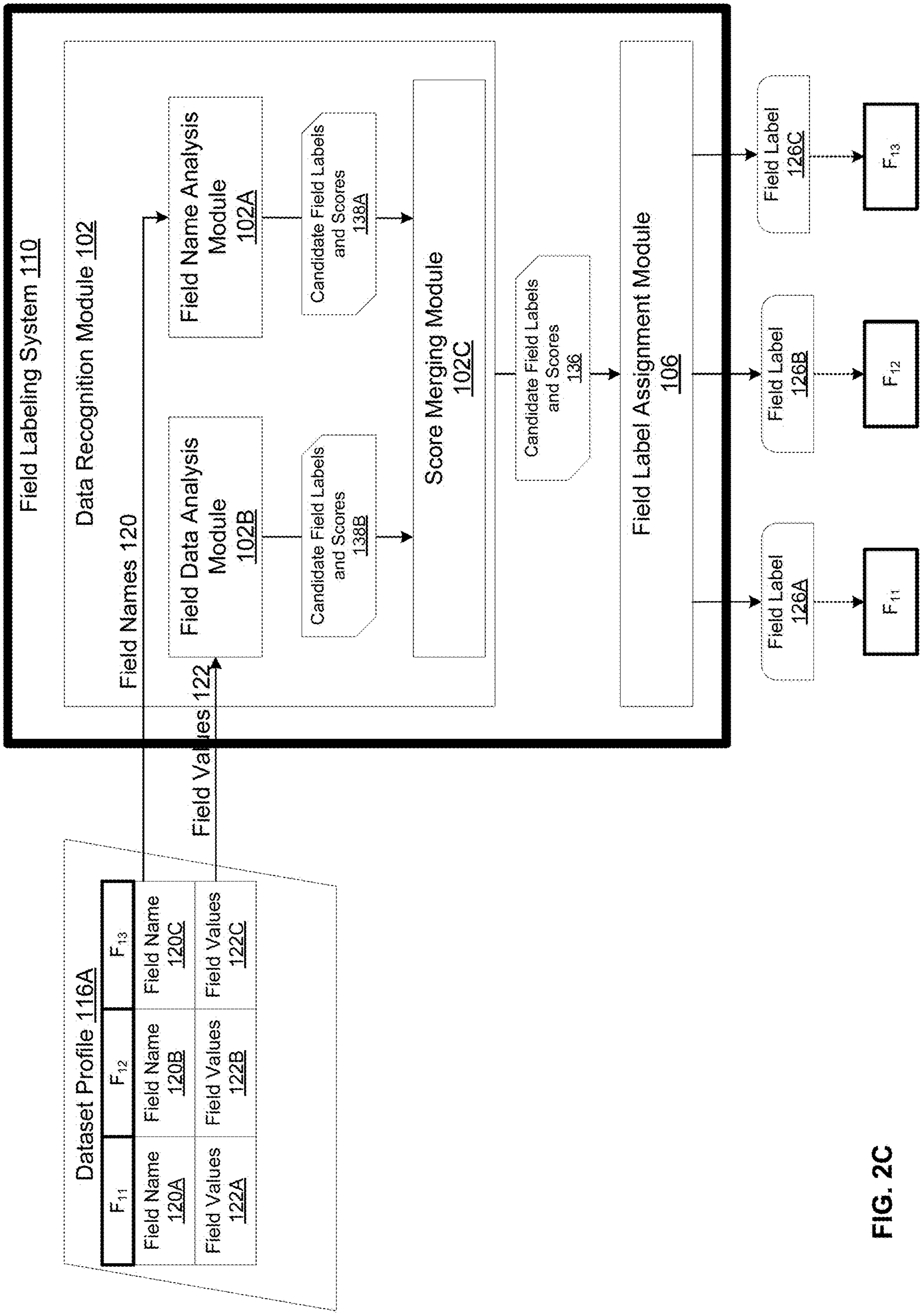
FIG. 2C shows multiple analyses, including a field name analysis and a field data analysis, performed by the field labeling system to identify labels for dataset fields, according to some embodiments of the technology described herein.

FIG. 2C shows multiple analyses, including a field name analysis and a field data analysis, performed by the data processing system 100 to identify candidate field labels for a dataset field, according to some embodiments of the technology described herein. As shown in FIG. 2C, the data recognition module 102 accesses field names 120 of fields $F_{11}$, $F_{12}$, $F_{13}$ in dataset profile 116A (corresponding to dataset 112A) and field values 122 from each of the dataset fields $F_{11}$, $F_{12}$, $F_{13}$. The field names include the field name 120A of field $F_1$, the field name 120B of field $F_{12}$, and the field name 120C of field $F_{13}$. The field values 122 include field values 122A of field $F_{11}$, field values 122B of field $F_{12}$, and field values 122C of field $F_{13}$. The data recognition module 102 uses the field names 120 and field values 122 to determine candidate field labels and associated scores 136. These candidate field labels and scores 136 are provided to the field label assignment module 106, which uses the field labels and scores 124 to assign field labels 126A, 126B, 126C to respective fields $F_{11}$, $F_{12}$, $F_{13}$.

As shown in FIG. 2C, the data recognition module 102 includes a field name analysis module 102A, a field data analysis module 102B, and a score merging module 102C. The data recognition module 102 performs two paths of analysis: a field name analysis using field name analysis module 102A and a field data analysis using the field data analysis module 102B.

The field name analysis module 102A may be configured to process the field names 120 to determine, for each dataset field, a set of one or more candidate field labels and corresponding field name analysis score(s). In some embodiments, the field name analysis module 102A may be configured to determine a set of candidate field label(s) for a given field name using NLP. The field name analysis module 102A may be configured to determine one or more candidate word sequences using the field name. The field name analysis module 102A may be configured to determine the candidate word sequence(s) using the field name by: (1) segmenting the field name into portions (e.g., abbreviations); (2) identifying candidate sets of words represented by the portions; and (3) generating, using the candidate sets of words, the candidate word sequence(s). In some embodiments, the candidate word sequence(s) may indicate a recognized type of data in the dataset field. The candidate word sequence(s) may each provide a description of data stored in the dataset field.

Candidate word sequence(s) identified for a dataset field are then used to identify candidate field label(s) from the field label glossary 104 for the dataset field. The field name analysis module 102A may be configured to use a candidate word sequence generated for a dataset field to identify one or more candidate field labels for the dataset field in the field label glossary 104 by determining a degree to which each field label in the field label glossary 104 matches the word sequence. The field name analysis module 102A may be configured to select field label(s) that match the word sequence as the candidate field label(s). For example, the field name analysis module 102A may score each field label in the field label glossary 104 based on how closely it matches the word sequence and select field label(s) that meet a threshold score as the candidate field label(s).

The data recognition module 102 further performs the field data analysis using field values 122. In some embodiments, the field data analysis may be performed independently of the field name analysis module. The field data analysis module 102B may be configured to process values from a given field to identify candidate field label(s) for the dataset field in the field label glossary 104. In some embodiments, the field data analysis module 102B may be configured to determine candidate field label(s) for a dataset field using values accessed from the dataset field by: (1) accessing tests associated with field labels of the field label glossary 104; (2) applying the tests associated with the field labels to the values accessed from the dataset field to obtain scores corresponding to the field labels; and (3) determine the candidate field label(s) based on the scores (e.g., by identifying field label(s) that meet a threshold score as the candidate field label(s) for the dataset field). In some embodiments, a test may quantify how well the values meet an expected pattern of data described by a field label corresponding to the test. Example tests associated with field labels are described herein with reference to FIGS. 6A-6B.

After obtaining the results of the field name analysis and the field data analysis, the data recognition module 102 merges the results of the two analysis paths. The score merging module 102C may be configured to merge a field name analysis score corresponding to a candidate field label with a field data analysis score corresponding to the candidate field. In some embodiments, the score merging module 102C may be configured to merge the field name analysis score with the field data analysis score by adjusting the field name analysis score using the field data analysis score. For example, the score merging module 102C may: (1) penalize a candidate field label obtained from the field name analysis that the field data analysis indicates is poor; and (2) reward a candidate field label obtained from the field name analysis that the field data analysis indicates is good. In some embodiments, the score merging module 102C may apply a loss function (e.g., cross entropy) to penalize a poor candidate field label and reward a good candidate field label. For example, the score merging module 102C may determine a bias value based on a comparison (e.g., a ratio) between the field name analysis score and the field data analysis score and adjust the field name analysis score using the bias to obtain a merged score (e.g., by adding or subtracting the calculated bias value to the field name analysis score). Example techniques of merging a field name analysis score and a field data analysis score are described herein.

In some embodiments, the score merging module 102C may be configured to obtain, from the field name analysis module 102A for a dataset field, a candidate field label that was not identified as a candidate field label by the field data analysis module 102B (e.g., because values obtained from the dataset field failed to score sufficiently when a test associated with the candidate field label was applied to the values). The score merging module 102C may be configured to determine a merged score for such a candidate field label. In some embodiments, the score merging module 102C may be configured to determine the merged score by reducing the field name analysis score. For example, the score merging module 102C may reduce the field name analysis score by a pre-determined penalty percentage (e.g., 1%, 5%, 10%, 15%, 20%, 25%, or a percentage between any of the aforementioned percentages). This may reflect the determination that the dataset field values failed to match a pattern expected for the candidate field label identified by the field name analysis module.

Once the merged candidate field labels and corresponding scores 136 are determined, the field label assignment module 106 uses the merged candidate field labels and corresponding scores 136 to assign field labels 126A, 126B, 126C to the dataset fields $F_1$, $F_{12}$, $F_{13}$. As shown in FIG. 2B, the field label assignment module 106 receives merged candidate field labels and corresponding scores 136 for dataset fields $F_1$, $F_{12}$, $F_{13}$ from the data recognition module 102. The field label assignment module 106 assigns field label 126A to dataset field $F_{11}$, field label 126B to dataset field $F_{12}$, and field label 126C to dataset field $F_{13}$. In some embodiments, the field label assignment module 106 may be configured to assign a field label to a dataset field based on a merged score of the field label. For example, when the field label assignment module 106 determines that the merged score meets a first threshold score, the field label assignment module 106 may automatically assign the field label to the dataset field. When the field label assignment module 106 determines that the merged score does not meet the first threshold score but meets a second lower threshold score, the field label assignment module 106 may request user input to confirm the field label. When the field label assignment module 106 receives multiple potential field labels for a dataset field, the field label assignment module 106 may request user input selecting one of the field labels as the one assigned to the dataset field.

As shown in FIG. 2C, the first path performed by the field name analysis module 102A using field names 120, and a second path is performed by the field data analysis module 102B using field values 122.

In the example of FIG. 2C, the field name analysis module 102A accesses the field names 120 from dataset profile 116A. The field name analysis module 102A determines candidate field labels and corresponding field name analysis scores 138A. The field name analysis module 102A provides the candidate field labels and field name analysis scores 138A to the score merging module 102C. The field data analysis module 102B access the field values 122 from dataset profile 116A. The field data analysis module 102B determines candidate field labels and field data analysis scores 138B (e.g., by applying tests to determine the field data analysis score(s)).

The results from the two paths are merged by the score merging module 102C. As shown in FIG. 2C, the score merging module 102C generates a merged set of candidate field labels and corresponding scores 136 (which may be used by the field label assignment module 106 to assign labels to fields $F_1$, $F_{12}$, $F_{13}$). In some cases, the merged candidate field labels and corresponding scores may include candidate field label(s) identified by both the field name analysis module 102A and the field data analysis module 102B, candidate field label(s) identified by only the field name analysis module 102A, and/or candidate field label(s) identified by only the field data analysis module 102B. When a particular candidate field label is identified by both modules 102A, 102B, the score merging module 102C may be configured to merge a field name analysis score of the candidate field label with its field data analysis score. When a particular candidate field label is identified by the field name analysis module 102A but not by the field data analysis module 102B, the score merging module 102C may adjust the field name analysis score (e.g., by penalizing it) to obtain a merged score for the candidate field label. When a particular candidate field label is identified by the field data analysis module 102B but not by the field name analysis module 102A, the score merging module 102C may adjust the field data analysis score (e.g., by penalizing it) to obtain a merged score for the candidate field label.

In some embodiments, each of the analysis paths illustrated in FIG. 2C may be performed in parallel. For example, the field name analysis module 102A may determine candidate field label and score 138A using field names 120 in parallel with the field data analysis module 102B determining candidate field labels and scores 138B using field values 122. In some embodiments, analysis paths may be performed sequentially. For example, the field name analysis module 102A may determine candidate field labels and scores 138A followed by field data analysis module 102B determining candidate field labels and scores 138B.

FIG. 3A shows components of the data recognition module 102 of the field labeling system 110 of the data processing system 100, according to some embodiments of the technology described herein. As shown in FIG. 2D, the data recognition module 102 includes field name analysis module 102A, field data analysis module 102B, and score merging module 102C.

As shown in FIG. 3A, field name analysis module 102A includes field name segmentation module 152, field label identification module 154, NLP module 156, and a datastore 158 storing the field label glossary 104, an n-gram model 158A and a sequence position model 158B. The field name analysis module 102A may be configured to use the NLP module 156 to generate the n-gram model 158A (e.g., as described herein with reference to FIG. 3D) and the sequence position model 158B. The field name analysis module 102A may be configured to use the field name segmentation module 152 to divide a field name into portions (e.g., abbreviations) and identify candidate sets of words that may be indicated by the portions. The field name analysis module 102A may be configured to use the field label identification module 154 to identify candidate field labels in field label glossary 104 using the candidate sets of words identified by the field name segmentation module 152.

In some embodiments, the field name segmentation module 152 may be configured to segment a field name into multiple portions. For example, the field name segmentation module 152 may segment a field name into abbreviations present in the field name. In some embodiments, the field name segmentation module 152 may be configured to identify, for each field name portion, a candidate set of words that may be indicated by the field name portion. For example, for each abbreviation in the field name, the field name segmentation module 152 may identify a candidate set of words that may be indicated by the abbreviation. The field name segmentation module 152 may be configured to determine a similarity score between each word in a candidate set of words and the corresponding field name portion (e.g., abbreviation). The similarity scores may be used to identify and score candidate field labels by the field label identification module 154.

In some embodiments, the field label identification module 154 may be configured to determine candidate field labels and corresponding scores using candidate sets of words identified by the field name segmentation module 152. The field label identification module 154 may be configured to determine a candidate set of labels for a dataset field and corresponding scores by: (1) using the candidate sets of words to generate one or more word sequences; and (2) identifying candidate field labels in the field label glossary 104 using the word sequence(s). The field label identification module 154 may be configured to use a word sequence to configure sequence position model 158B and determine scores for field labels in the field label glossary 104 using sequence position model 158B.

In some embodiments, the field label identification module 154 may be configured to identify candidate labels using the n-gram model 158A. In some embodiments, the NLP module 156 may be configured to generate an n-gram model 158A which may be used by the field label identification module 154 to identify candidate field labels. The NLP module 156 may be configured to generate the n-gram model 158A using the field label glossary 104. The n-gram model 158A may thus provide a language model representing the field labels. In some embodiments, the NLP module 156 may be configured to generate the n-gram model 158A by: (1) identifying all word sequences that appear in the field label glossary 104; (2) storing an indication of the identified sequences in a data structure (e.g., a table); and (3) storing the data structure in memory of the data processing system 100 as the n-gram model 158A. For example, the NLP module 156 may store each identified sequence in a row of a table in which one column stores the last word in the sequence and the other column stores one or more words that precede the last word. The last word in the sequence may be referred to as a "target" that completes the sequence. Example generation of the n-gram model 158A is described herein with reference to FIG. 3D.

The field label identification module 154 may be configured to score field labels using the sequence position model 158B. In some embodiments, the NLP module 156 may be configured to generate the sequence position model 158B. The NLP module 156 may be configured to generate the sequence position model 158B using a word sequence (e.g., generated from sets of candidate words determined by the field name segmentation module 152). The NLP module 156 may be configured to set parameters of the sequence position model 158B based on the word sequence. For example, the NLP module 156 may map points in the sequence position model 158B to respective words in the word sequence. In some embodiments, the sequence position model 158B may be used to generate an output score for a field label that is based on: (1) whether words in the field label appear in the word sequence; and (2) the degree to which the order of words in the field label match the order of words in the word sequence. An example sequence position model 158B is described herein with reference to FIG. 4E.

In some embodiments, the field name segmentation module 152 may be configured to identify candidate sets of words that may be indicated by field name portions in a glossary of words. In some embodiments, the NLP module 156 may be configured to generate the glossary of words. In some embodiments, the NLP module 156 may be configured to generate the word collection by: (1) loading words from a dictionary; (2) filtering the words to obtain a filtered set of words; and (3) including the filtered set of words in the word collection. For example, the NLP module 156 may filter single character words out of the words loaded from the dictionary. In some embodiments, the NLP module 156 may be configured to identify synonyms and antonyms of the filtered set of words and include the identified synonyms and antonyms in the glossary. The NLP module 156 may configure the glossary to indicate synonyms and antonyms of each word. For example, the NLP module 156 may identify synonyms and antonyms of words using the WordNet lexical database. The NLP module 156 may be configured to store the glossary in the datastore 158.

As shown in FIG. 3A, the field data analysis module 102B includes a field value selection module 162 and a match testing module 164. The field data analysis module 102B may be configured to use the field value selection module 162 to select subsets of values from dataset fields. The field data analysis module 102B may be configured to use the match testing module 164 to apply tests associated with field labels to the subsets of values selected from the dataset fields.

In some embodiments, the field value selection module 162 may be configured to select values from a set of field values (e.g., stored in a dataset profile or from a dataset). The field value selection module 162 may be configured to select field values using one or more criteria. For example, the field value selection module 162 may select a number (e.g., 10-20, 20-30, 30-40, 40-50, 50-100, 100-150, 150-200, 200-300, 300-400, 400-500, 500-1000, or another number of values) of the most frequently occurring field values. As another example, the field value selection module 162 may randomly select a number of field values. As another example, the field value selection module 162 may select a number of most recently added field values in the field.

In some embodiments, the match testing module 164 may be configured to determine a score for each of one or more of the field labels in the field label glossary 104 using the selected field values. In some embodiments, match testing module 164 may be configured to determine the score for a given field label using various techniques. The match testing module 164 may be configured to determine the score(s) for the field label(s) by applying test(s) associated with the field label(s) to the selected field values. For example, the match testing module 164 may execute a first test associated with a first field label on the selected values to obtain a first field data analysis score for the first field label and may execute a second test associated with a second field label on the selected values to obtain a second field data analysis score for the second field label.

In some embodiments, the match testing module 164 may be configured to apply tests associated with field labels (e.g., of field label glossary 104) to selected field values. The match testing module 164 may be configured to apply a test associated with a given field label to the selected field values to determine a score associated with the field label. The match testing module 164 may be configured to determine a score for multiple field labels (e.g., of field label glossary 104). In some embodiments, a test, when executed by the match testing module 164, may indicate a number of selected field values that match an expected pattern for a field label. The match testing module 164 may use the number to determine a score for the field label (e.g., by determining a ratio of matching values to total selected values, or a ratio of matching values to values that do not match the pattern). The field data analysis module 102B may be configured to identify a candidate set of labels based on scores determined for the multiple field labels. For example, the field data analysis module 102B may identify field labels with scores that meet a threshold score as the candidate set of labels. As another example, the field data analysis module 102B may identify a set of the highest scoring field labels as the candidate set of labels.

Figure 3B:
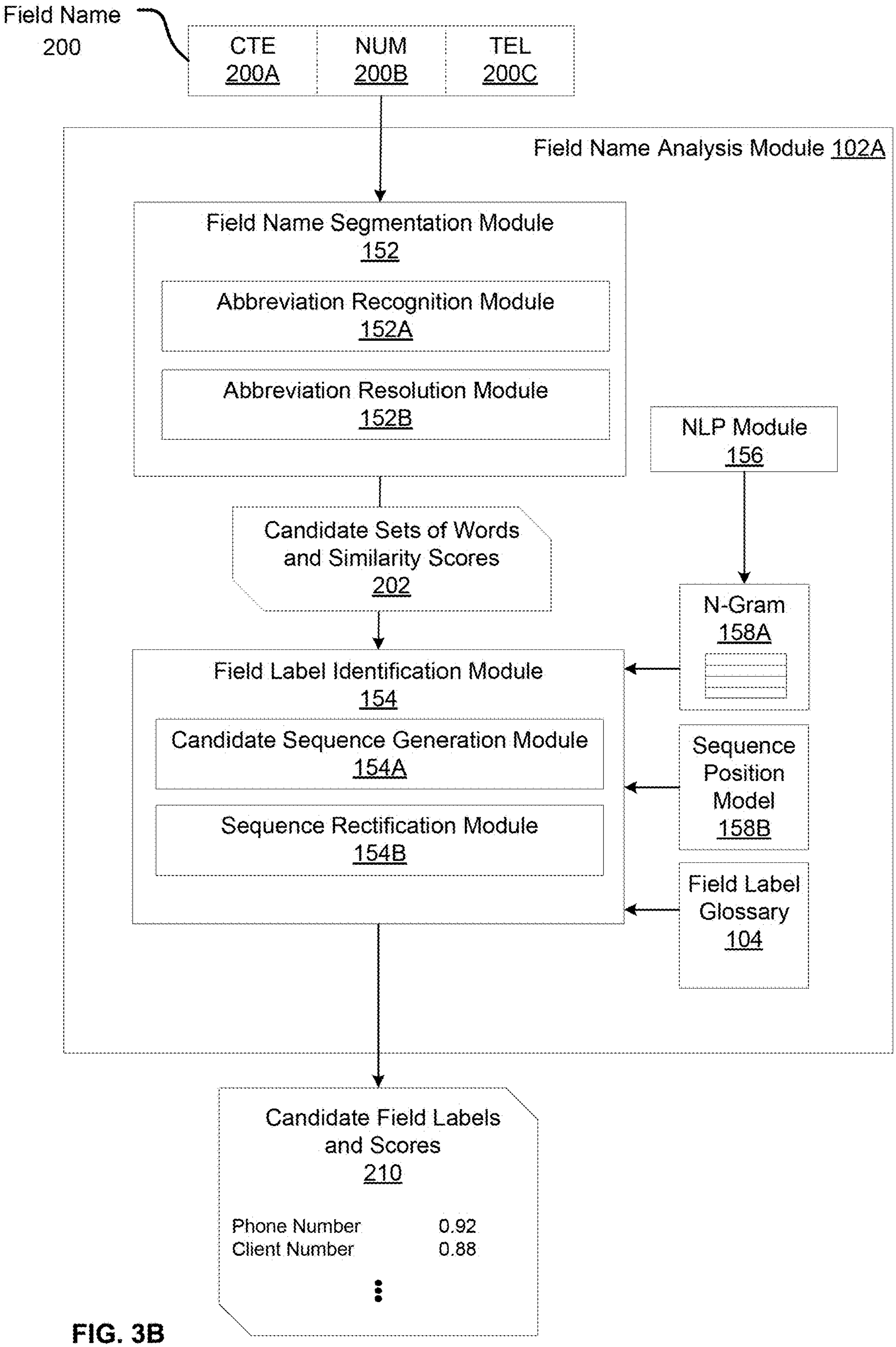
FIG. 3B illustrates an example of how component software modules of the field name analysis module (which itself is part of the data recognition module of FIG. 3A) may operate to determine candidate field labels and scores, according to some embodiments of the technology described herein.

FIG. 3B illustrates an example of how component modules of the field name analysis module 102A (that is part of the data recognition module of FIG. 3A) may operate to determine candidate field labels and scores, according to some embodiments of the technology described herein. As shown in FIG. 3A, the field name segmentation module 152 accesses a field name 200 which includes abbreviations 200A, 200B, 200C. The field name segmentation module 152 generates candidate sets of words 202 that may be indicated by the abbreviations 200A, 200B, 200C and provides them to the field label identification module 154. The field label identification module 154 uses the candidate sets of words 202 to determine candidate field labels and corresponding scores 210.

As shown in FIG. 3B, the field name segmentation module 152 includes an abbreviation recognition module 152A and an abbreviation resolution module 152B. The field name segmentation module 152 may be configured to use the abbreviation recognition module 152A to divide the field name 200 into abbreviations 200A, 200B, 200C. The field name segmentation module 152 may be configured to use the abbreviation resolution module 152B to identify candidate sets of words that may be indicated by the abbreviations 200A, 200B, 200C.

In some embodiments, the abbreviation recognition module 152A may be configured to divide the field name 200 into its abbreviations 200A, 200B, 200C. In some embodiments, the abbreviation recognition module 152A may be configured to segment the field name 200 by determining a set of locations at which to segment the field name 200. The abbreviation recognition module 152A may be configured to determine the set of locations by: (1) identifying different segmentations of the field name; (2) determining a score for each segmentation; and (3) selecting one of the segmentations based on scores determined for the segmentations (e.g., by selecting the highest scoring set of segmentations). The abbreviation recognition module 152A may be configured to score each segmentation by: (1) determining a score for each field name portion obtained from the segmentation; and (2) determining the score for the segmentation using scores determined for the field name portions. As an illustrative example, the field name segmentation module 152 may segment the field name “numtelcel” at a first set of candidate locations into “num”, “tel”, and “cel”. The abbreviation recognition module 152A may determine a score for each of “num”, “tel”, “cel” based on whether it is a valid abbreviation for a word (e.g., by determining whether the abbreviation exists in a set of abbreviations and corresponding words).

In some embodiments, the abbreviation recognition module 152A may be configured to determine a score for a segmentation of a field name using a glossary of words. The glossary of words may include words, lemmatizations of words, stemmed words, and/or words with vowels removed. A lemmatization of a word may refer to a root or lemma of the word. For example, a lemmatization of the word “running” would be “run”. The abbreviation recognition module 152A may determine a score for a segmentation of the field name using the glossary of words by: (1) identifying, for each field name portion of the segmentation, one or more words in the glossary that match the field name portion; and (2) determining a measure of similarity between each field name portion and its matched word(s) to obtain a set of similarity score(s) for the field name portion. The abbreviation recognition module 152A may be configured to determine the score for the segmentation using the sets of similarity score(s) obtained for the field name portions of the segmentation. For example, the abbreviation recognition module 152A may identify the maximum similarity score determined for each field name portion in the segmentation. When there are multiple field name portions, the abbreviation recognition module 152A may determine an average of the similarity scores determined for the field name portions as the score for the segmentation.

As an illustrative example, the abbreviation recognition module 152A may determine a segmentation of the field name “dispcd” into field name portions “disp” and “cd”. For the field name portion “disp”, the abbreviation recognition module 152A may determine that “disp” matches the word “disposition”, the lemmatization of disposition “dispose”, the stemmed word “dispos”, and the vowelless word “dspstn” from a glossary of words. The abbreviation recognition module 152A may determine a measure of similarity between “disp” and each of the words “disposition”, “dispose”, “dispos”, and “dspstn” to obtain a first set of similarity scores [0.9, 0.92, 0.94]. For the field name portion “cd”, the abbreviation recognition module 152A may determine that “cd” matches the words “code” and the vowelless word “cd” in the glossary. The abbreviation recognition module 152A may determine a measure of similarity between “cd” and each of words “code” and “cd” to obtain a second set of similarity scores [0.88, 0.9]. The abbreviation recognition module 152A may determine a score for the segmentation of [“disp”, “cd”] by: (1) identifying the maximum similarity score in the first set of similarity scores determined for the field name portion “disp” (i.e., 0.94) and the maximum similarity score in the second set of similarity scores determined for the field name portion “cd” (i.e., 0.9); and (2) averaging the maximum similarity scores (i.e., 0.94 and 0.9) to obtain the score of 0.92 for the segmentation.

After identification of the abbreviations 200A, 200B, 200C in the field name 200, the abbreviation resolution module 152B determines candidate word sets for the abbreviations 200A, 200B, 200C. In some embodiments, the abbreviation resolution module 152B may be configured to determine, for each field name portion, a candidate set of words that may be indicated by the field name portion. For example, the abbreviation resolution module 152B may determine, for each of a set of abbreviations into which a field name is segmented, a candidate set of words that may be indicated by the abbreviation. In some embodiments, the abbreviation resolution module 152B may be configured to identify a candidate set of words that may be represented by a field name portion (e.g., an abbreviation) from a word collection (e.g., a glossary generated by the NLP module 156). In some embodiments, the field name segmentation module 152 may be configured to identify a candidate set of words for a field name portion by: (1) determining a measure of similarity between the field name portion and each of the words in the word collection; and (2) identifying a subset of the words to be the candidate set of words. The field name segmentation module 152 may be configured to identify the subset of words that meet a threshold similarity score to be the candidate set of words for the field name portion. Example measures of similarity that may be used are described herein. Accordingly, the abbreviation resolution module 152B may be configured to generate, for each field name portion, a set of candidate words and corresponding similarity scores. The candidate sets of words 202 for the field name portions and the similarity scores may be used by the field label identification module 154 to identify and score candidate field labels for the dataset field.

As shown in FIG. 3A, the field label identification module 154 includes a candidate sequence generation module 154A and a sequence rectification module 154B. The field label identification module 154 may be configured to use the candidate sequence generation module 154A to generate word sequence(s) for the field name 200. The field identification module 154 may be configured to use the sequence rectification module 154B to identify candidate field label(s) using the word sequence(s) and scoring the candidate field label(s).

In some embodiments, the candidate sequence generation module 154A may be configured to generate one or more word sequences that indicate a semantic meaning for the dataset field based on its field name 200. The candidate sequence generation module 154A may be configured to use the candidate sets of words and similarity scores to generate the word sequence(s). The candidate sequence generation module 154A may be configured to generate the word sequence(s) using the n-gram model 158A. For example, the candidate sequence generation module 154A may use the n-gram model 158A to generate word sequences by combining words taken from each of the candidate sets of words and filtering the word sequences using the n-gram model 158A to obtain the word sequence(s) that are used for determining candidate field label(s). The candidate sequence generation module 154A may filter the word sequences by removing word sequences composed of words that do not co-occur in any sequence indicated by the n-gram model 158A.

In some embodiments, the sequence rectification module 154B may be configured to use word sequence(s) generated by the candidate sequence generation module 154A to: (1) identify candidate field label(s); and (2) determine score(s) for the candidate field label(s). The candidate sequence generation module 154A may be configured to identify field label(s) in the field label glossary 104 using the word sequence(s). The candidate sequence generation module 154A may be configured to score the identified label(s) (e.g., using sequence position model 158B). The candidate sequence generation module 154A may be configured to determine the candidate field labels and scores 210 for the field name 200.

Figure 3C:
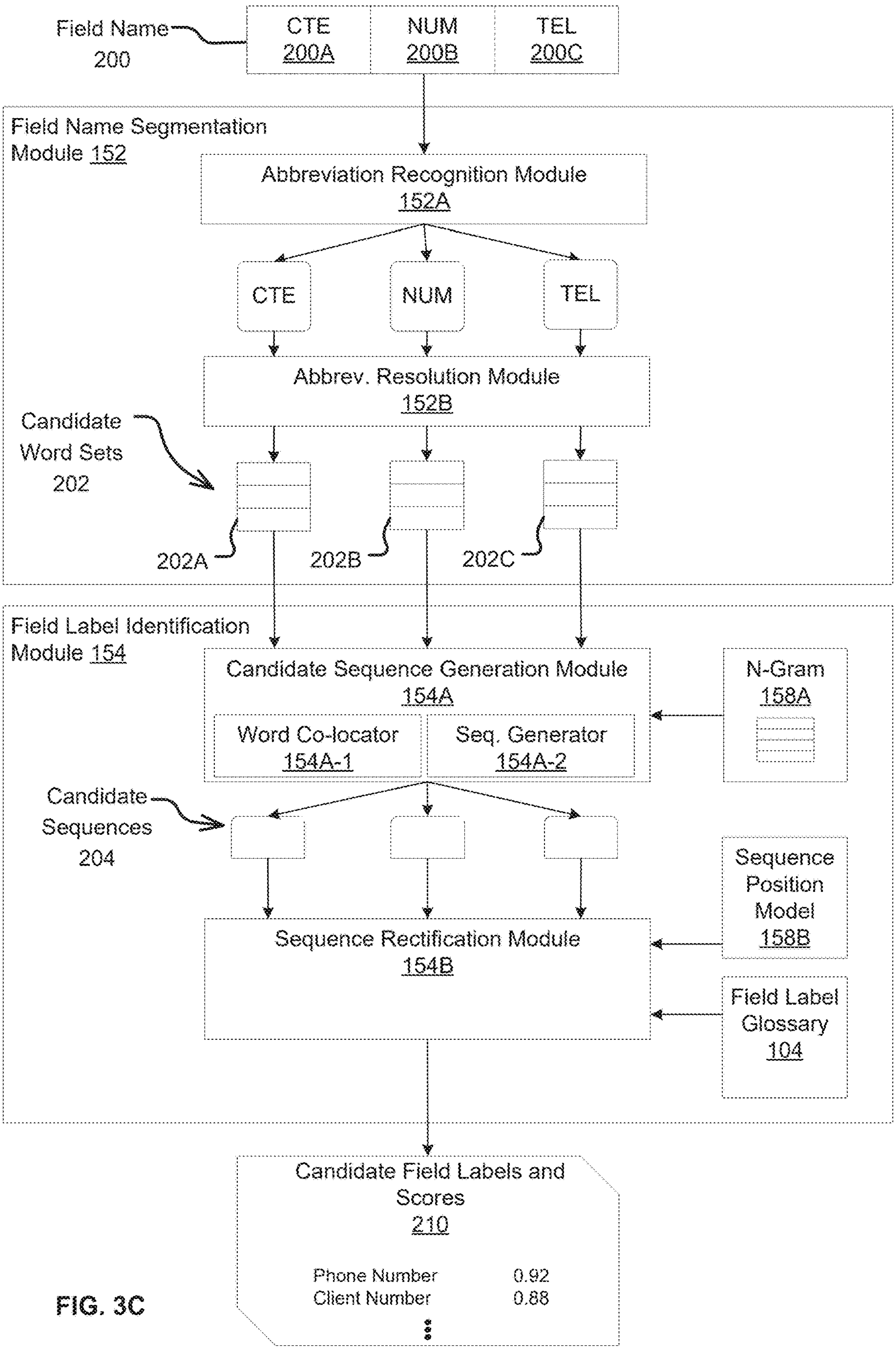
FIG. 3C shows an example of how a field name may be processed using the component modules of the field name analysis module shown in FIG. 3B to obtain the candidate field labels and scores for the dataset field, according to some embodiments of the technology described herein.

FIG. 3C shows an example of how field name 200 may be processed using the component modules of the field name analysis module 102A shown in FIG. 3A to obtain candidate field labels and scores 210 for the dataset field, according to some embodiments of the technology described herein. The processing illustrated in FIG. 3C is performed by the field name segmentation module 152 and the field label identification module 154.

As shown in FIG. 3C, the abbreviation recognition module 152A identifies the abbreviations 200A, 200B, 200C in the field name 200. In some embodiments, the abbreviation recognition module 152A may be configured to identify the abbreviations 200A, 200B, 200C by: (1) segmenting the field name 200 at two locations in the field name 200 to obtain three segments; and (2) identifying the abbreviations 200A, 200B, 200C in the three segments. For example, the abbreviation recognition module 152A may score various segmentations of the field name 200 and select the highest scoring segmentation to obtain the abbreviations 200A, 200B, 200C.

Next, the abbreviation resolution module 152B generates, for each of the abbreviations 200A, 200B, 200C, a candidate set of words that may be indicated by the abbreviation. The abbreviation resolution module 152B generates a candidate word set 202A for the abbreviation 200A, a candidate word set 202B for the abbreviation 200B, and a candidate word set 202C for the abbreviation 200C. In some embodiments, the abbreviation resolution module 152B may be configured to identify the candidate word set for each of the abbreviations 200A, 200B, 200C by: (1) determining a measure of similarity between the abbreviation and each of a glossary of words (e.g., generated by the NLP module 156); and (2) identify the candidate set of words based on similarity scores obtained for the glossary of words. For example, the abbreviation resolution module 152B may identify words from the glossary that meet a threshold similarity score as the candidate set of words. In some embodiments, the similarity scores may be values between 0 and 1. The threshold similarity score may be a value between 0.5 and 0.6, 0.6 and 0.7, 0.7 and 0.8, 0.8 and 0.9, or 0.9 and 1. For example, the threshold similarity score may be 0.8.

Next, the candidate sequence generation module 154A uses the candidate word sets 202A, 202B, 202C to generate candidate sequences 204 for the field name 200. As shown in FIG. 3C, the candidate sequence generation module 154A includes a word co-locator 154A-1. The word co-locator 154A-1 may be configured to identify which collections of words generated from the candidate word sets 202A, 202B, 202C co-occur in sequences indicated by the n-gram model 158A. The word co-locator 154A-1 may be configured to: (1) generate word collections by combining words taken from each of the candidate word sets 202A, 202B, 202C; and (2) determine which of the word collections appear in the n-gram model 158A.

In some embodiments, the word co-locator 154A-1 may be configured to determine a score for each word collection. For example, the score associated with a word collection may indicate a probability of the words in the word collection co-occurring. The word co-locator 154A-1 may be configured to determine a score for each word collection using similarity scores associated with words in the word collection. For example, the word co-locator 154A-1 may be configured to determine a score for a word collection by determining a mean similarity score of words in the word collection if they co-occur in any sequence indicated by the n-gram model 158A. If words in a word collection do not co-occur in any sequence indicated by the n-gram model 158A, then the word co-locator may determine a score of 0 for the word collection.

In some embodiments, sequence generator 154A-2 of the candidate sequence generation module 154A may be configured to generate the candidate word sequences 204. The sequence generator 154A-2 may be configured to generate candidate sequences using one or more of the word collections generated by the word co-locator 154A-1. In some embodiments, the sequence generator 154A-2 may be configured to generate candidate sequences using word collection(s) that meet a threshold score (e.g., probability value). The threshold score may be a value between 0 and 1. For example, the threshold score value may be 0.5. Thus, the sequence generator 154A-2 may generate candidate sequences using only collections of words generated from the candidate word sets 202A, 202B, 202C that co-occur in a sequence indicated by the n-gram model 158A.

In some embodiments, the sequence generator 154A-2 may be configured to modify an order of words in a generated word sequence. For example, the sequence generator 154A-2 may modify the order of words in a word sequence based on language convention. In some embodiments, the sequence generator 154A-2 may be configured to modify an order of words in a word sequence by: (1) identifying a classword in the word sequence; and (2) changing a position of the classword in the sequence. A classword may be a word that identifies a category (e.g., name, amount, code, number, and/or other category) of data. The sequence generator 154A-2 may determine a position of an identified classword (e.g., based on language convention). For example, for an English word sequence, the sequence generator 154A-2 may move a classword identified in the word sequence to the end of the word sequence. To illustrate, in the word sequence "number client phone", the sequence generator 154A-2 may identify the word "number" as a classword and move it to the end of the word sequence to obtain the updated sequence "client phone number".

As shown in FIG. 3C, the sequence rectification module 154B uses the candidate sequences 204 generated by the candidate sequence generation module 154A to determine the candidate field labels and scores 210. The sequence rectification module 154B identifies the candidate field labels in the field label glossary 104. The sequence rectification module 154B uses the sequence position model 158B to determine scores for the candidate field labels.

In some embodiments, the sequence rectification module 154B may be configured to identify, in the field label glossary 104, one or more field labels for each of the candidate sequences 204. For each candidate sequence, the sequence rectification module 154B may select one or more field labels from the field label glossary 104. In some embodiments, the sequence rectification module 154B may be configured to select a field label for a candidate sequence if the field label shares at least one word with the candidate sequence. In some embodiments, the sequence rectification module 154B may be configured to select a field label for a candidate sequence if all the words of the field label are included in the candidate sequence. As an illustrative example, one of the candidate sequences 204 may be "client phone number". The sequence rectification module 154B may identify the field labels "phone number" and "client number" from the field label glossary 104 for the candidate sequence "client phone number".

In some embodiments, the sequence rectification module 154B may be configured to determine a score for each identified field label. The sequence rectification module 154B may be configured to use the sequence position model 158B to determine a score for each identified field label. In some embodiments, the sequence rectification module 154B may be configured to use the sequence position model 158B to determine a score for a field label that is rectified based on the degree to which the order of words in the field label matches the order of words in one of the candidate sequences 204 from which the field label was identified. For example, for the field labels "phone number" and "client number" determined from the candidate sequence "client phone number", the sequence position model 158B may indicate a higher score for "phone number" than "client number" because it more closely matches the order of words in "client phone number".

In some embodiments, the sequence rectification module 154B may be configured to use similarity scores associated with words in each of the candidate sequences 204 to determine scores for field label(s) identified for the candidate sequence. For example, the similarity score for each word in the candidate sequence may indicate a relative position in the sequence position model 158B associated with the word. An example sequence position model 158B and use thereof to determine a candidate field label score is described herein with reference to FIG. 4E.

As shown in FIG. 3C, the sequence rectification module 154B determines the candidate field labels and scores 210 using the candidate sequences 204. The candidate field labels include "Phone Number" with the corresponding 0.92, and "Client Number" with the corresponding 0.88. In some embodiments, a score corresponding to a candidate field label may indicate a strength of the match between the candidate field label and the field name 200. For example, the score may be a value between 0 and 1, where a greater value indicates a stronger match between the candidate field label and the dataset field.

Figure 3D:
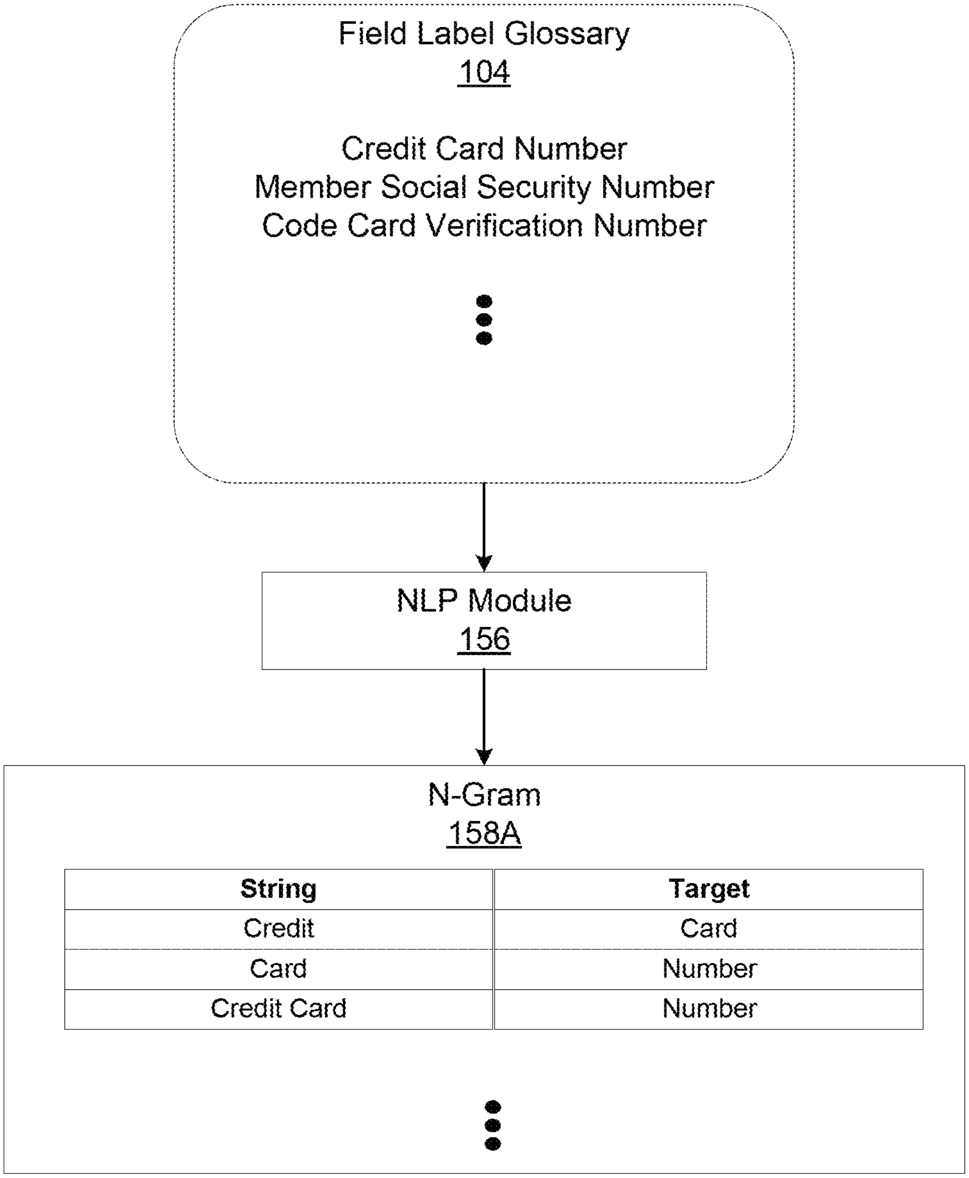
FIG. 3D shows an example of how an n-gram model (used in performing field name analysis of FIGS. 3B-3C) is generated using a field label glossary, according to some embodiments of the technology described herein.

FIG. 3D shows an example of how the n-gram model 158A (used in performing field name analysis) is generated using a field label glossary, according to some embodiments of the technology described herein. As shown in FIG. 3D, the NLP module 156 of the field name analysis module 102A of data processing system 100 generates the n-gram model 158A using the field label glossary 104. In some embodiments, the NLP module 156 may be configured to generate the n-gram model 158A using the field label glossary 104 by: (1) identifying sequences of words that appear in field labels of the field label glossary 104; and (2) storing an indication of the identified sequences in the n-gram model 158A.

In the example of FIG. 3D, the NLP module 156 processes the field label "Credit Card Number" in the field label glossary 104. The NLP module 156 identifies the following sequences that appear within this field label: "Credit Card", "Card Number", and "Credit Card Number". The NLP module 156 stores an indication of each of these sequences in the n-gram model 158A. As shown in FIG. 3D, the n-gram model 158A includes a "String" column and a "Target" column. The "Target" column may store words that complete each sequence and the "String" column may store strings of one or more words that precede each sequence. The word that completes a sequence may be referred to as a "target". For the sequences identified from the field label "Credit Card Number", the NLP module 156 stores, in the n-gram model 158A, a string "Credit" with a target "Card", a string "Card" with a target "Number", and a string "Credit Card" with a target "Number". The NLP module 156 may proceed accordingly for all the field labels in the field label glossary 104 to obtain the n-gram model 158A.

FIGS. 4A-4E illustrate the field name analysis performed for a field name 402 of "CTENUMTEL". In some embodiments, the analysis illustrated in FIGS. 4A-4E may be performed by the field name analysis module 102A of the data recognition module 102 of the field labeling system 110 described herein with reference to FIGS. 1B-2C.

FIG. 4A shows the segmentation of the field name 402 into abbreviations and identification of candidate word sets for each of the abbreviations, according to some embodiments of the technology described herein. It is difficult to identify a division of abbreviations or a meaning from the field name "CTENUMTEL". Abbreviation recognition module 152A (described herein with reference to FIGS. 3B-3C) of the field name analysis module 102 segments the field name 402 into abbreviations "CTE" 404A, "NUM" 404B, "TEL" 404C. For example, the abbreviation recognition module 152A may identify the abbreviations 404A, 404B, 404C in the field name 402 and segment the field name 402 to obtain the abbreviations 404A, 404B, 404C. For example, the abbreviation recognition module 152A may determine a score for various segmentations of the field name 402 and identify the segmentation with abbreviations 404A, 404B, 404C to be the highest scoring.

As shown in FIG. 4A, the abbreviation resolution module 152B generates a set of candidate words for each of the abbreviations 404A, 404B, 404C. The set of candidate words for a given abbreviation may be words that the abbreviation resolution module 152B determines could be indicated by the abbreviation. In some embodiments, the abbreviation resolution module 152B may be configured to identify a set of candidate words for an abbreviation in a glossary (e.g., generated by the NLP module 156 as described herein with reference to FIG. 2D). The abbreviation resolution module 152B may be configured to determine a measure of similarity between the abbreviation and each of the words in the glossary to obtain similarity scores for the words. The abbreviation resolution module 152B may be configured to identify a subset of the words in the glossary as the candidate words for the abbreviation. For example, the abbreviation module 152B may identify a subset of words with similarity scores greater than a threshold similarity score (e.g., a value between 0.5-0.6, 0.6-0.7, 0.7-0.8, 0.8-0.9, or 0.9-0.1). To illustrate, the abbreviation resolution module 152B may identify the subset of words in the glossary with similarity scores of at least 0.6 to be the candidate words for an abbreviation. As another example, the abbreviation module 152B may identify a number (e.g., 1, 2, 3, 4, 5, 6, 7, 8, 9, 10, 11, 12, 13, 14, 15, 16, 17, 18, 19, 20, or other number) of words in the glossary having the highest similarity scores as the candidate words for the abbreviation.

In the example of FIG. 4A, the abbreviation resolution module 152B has identified the following sets of candidate words for the abbreviations 404A, 404B, 404C:

(i) For "CTE" 404A, the set of candidate words 406A includes "Cite", "Client", "Credit", "Carte", and "Customer".

(ii) For "NUM" 406B, the set of candidate words 406B includes "Number", "Numeral", "Numerate", "Identification", "ID", and "Identifier".

(iii) For "TEL" 406C, the set of candidate words 406C includes "Phone", "Telephone", "Total", "Thole", and "Terminal".

After obtaining the candidate word sets and corresponding scores 406A, 406B, 406C for the abbreviations 404A, 404B, 404C, the candidate word sets and corresponding scores 406A, 406B, 406C are used to generate word collections 410. FIG. 4B shows an example of generating word collections 410 and corresponding scores using n-gram model 158A, according to some embodiments of the technology described herein. In some embodiments, the word co-locator 154A-1 may be configured to determine the word collections 410 and corresponding scores using the n-gram model 158A by: (1) combining words from the candidate word sets 406A, 406B, 406C to obtain the word collections 410; and (2) determining a score for each of the word collections 410. In some embodiments, the word co-locator 154A-1 may determine a score of 0 for a word collection if the words in the word collection do not co-occur in any of the sequences indicated by the n-gram model 158A. As shown in FIG. 4B, in some embodiments, the co-locator 154A-1 may be configured to determine a score of 0 for a word collection if words in the collection do not co-occur in any sequence indicated by the n-gram model 158A. For example, the word collection (Cite, Number, Phone) has a score of 0 because the words do not co-occur in any sequence indicated by the n-gram model 158A. For word collections with words that do co-occur in a sequence of the n-gram model 158A, the word co-locator 154A-1 may be configured to determine a score using similarity scores of words in the collection. For example, the word co-locator 154A-1 may determine the score of a word collection to be a mean similarity score of the words in the word collection. In the example of FIG. 4B, the word collection (Client, Number, Phone) has a score of 0.87.

FIG. 4C shows an example of generating candidate sequences using the word collections 410 and candidate word sets and corresponding scores 406A, 406B, 406C for the abbreviations 404A, 404B, 404C obtained in the example shown in FIG. 4B, according to some embodiments of the technology described herein. As shown in FIG. 4C, in some embodiments, the sequence generator 154A-2 may be configured to generate candidate sequences 408A for word collections that co-occur in a sequence indicated by the n-gram model 158A (i.e., that have an associated score greater than 0). In some embodiments, the sequence generator 154A-2 may be configured to generate candidate sequences 408A for word collections that have a score that meets a threshold score (e.g., a value in one of ranges 0.6, 0.6-0.7, 0.7-0.8, 0.8-0.9, or 0.9-0.1). For example, the sequence generator 154A-2 may generate candidate sequences 408A for word collections with a score of at least 0.5. In the example of FIG. 4C, the sequence generator 154A-2 generates a sequence using the word collection (Client, Number, Phone) but did not generate any sequence using the word collection (Cite, Number, Phone) (i.e., because these words did not co-occur in any sequence indicated by the n-gram model 158A).

In some embodiments, the sequence generator 154A-2 may be configured to re-order words in a generated sequence. The sequence generator 154A-2 may be configured to re-order a candidate sequence by identifying a classword within the candidate sequence. A classword may indicate a category of data. For example, the word "number" in "client number phone" may indicate that the data is numerical. As another example, the word "name" in "customer name" may indicate that the data is a name. The sequence generator 154A-2 may be configured to change the position of a classword in the sequence.

As shown in FIG. 4C, in some embodiments, the sequence generator 154A-2 may be configured to re-order a classword using a classword model 418. The classword model 418 may indicate target positions of classwords. In some embodiments, the classword model 418 may indicate target positions of classwords according to language. For example, the classword model 418 may indicate that a classword's target position for the English language is the end of the sequence. As another example, the classword model 418 may indicate that a classword's target position for the Spanish language is at the beginning of a sequence. The sequence generator 154A-2 may be configured to re-order a candidate sequence using the classword model 418 by: (1) identifying a classword in the candidate sequence; (2) identifying a target position of the classword indicated by the classword model 418; and (3) re-ordering the candidate sequence to move the classword to the target position indicated by the classword model 418.

In the example of FIG. 4C, the sequence generator 154A-2 identifies the classword "Number" in the sequence "Client Number Phone" and re-orders the sequence to obtain "Client Phone Number". The sequence generator 154A-2 may be generating a sequence in English and thus determine, using the classword model 418, that the target position of the classword "Number" is at the end of the sequence. The sequence generator 154A-2 may thus re-order "Client Number Phone" to move the classword "Number" to the end of the sequence. The re-ordered candidate sequences 408B may be used to identify candidate field labels from field label glossary 104. As indicated by the dotted lines around the re-ordered candidate sequences 408B, in some cases, the sequence generator 154A-2 may not re-order any candidate sequences (e.g., because the classwords are in their target positions). In such cases, the candidate sequences may not re-order any of the candidate sequences 408A.

FIG. 4D shows an example of identifying candidate field labels from the field label glossary 104 using the candidate sequences, according to some embodiments of the technology described herein. As shown in FIG. 4D, the sequence rectification module 154B uses the re-ordered candidate sequences 408B to determine candidate field labels and scores 416. In some embodiments, the sequence rectification module 154B may be configured to determine the score of a field label identified from a candidate sequence based on: (1) whether words in the candidate sequence appear in the field label; and (2) the degree to which the order of words in the field label match the order of words in the candidate sequence. In some embodiments, the sequence rectification module 154B may be configured to use a word sequence from re-ordered candidate sequences 408B in conjunction with the sequence position model 158B to determine scores for field labels in the field label glossary 104.

Figure 4E:
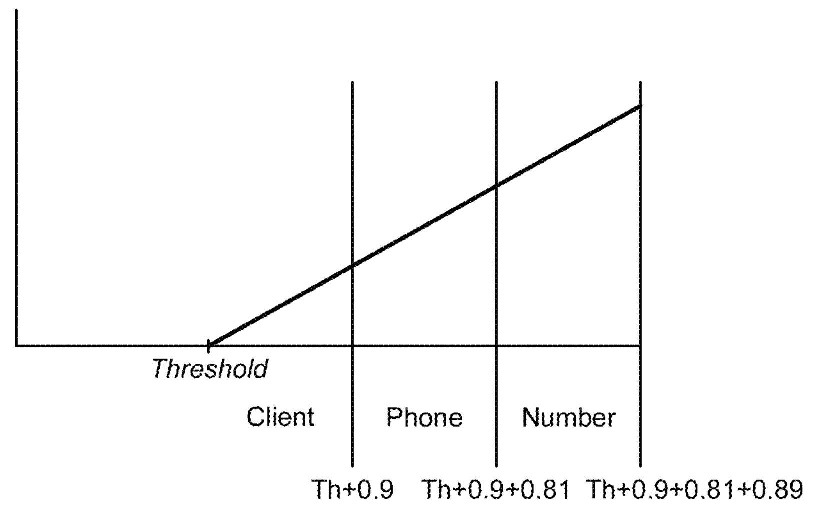
FIG. 4E shows an example sequence position model that may be used for identification of candidate field labels from a field label glossary using the candidate sequences, including in the example shown in FIGS. 4A-4D, according to some embodiments of the technology described herein.

FIG. 4E shows an example of the sequence position model 158B that may be used for identification of candidate field labels from field label glossary 104 using the candidate sequences 408B, according to some embodiments of the technology described herein. As shown in FIG. 4E, the sequence position model 158B is represented by the function ƒ(x) which is equal to ax for x greater than a threshold value Th. In the example of FIG. 4E, the candidate sequence “Client Phone Number” is used to define parameters of the sequence position model 158B. The word “Client”, which comes first in the candidate sequence, is associated with a first domain of x values between Th and Th+0.9. The word “Phone”, which comes second in the candidate sequence, is associated with a second domain of x values between Th+0.9 and Th+0.9+0.81. The word “Number”, which comes third in the candidate sequence, is associated with a third domain of x values between Th+0.9+0.81 and Th+0.9+0.81+0.89. The size of each domain is equal to the similarity score of the word associated with the domain. To score each field label, the system may determine a score by determining an integral of the function ƒ(x) in region(s) associated with word(s) of the candidate sequence that are present in the field label. As an illustrative example, the sequence rectification module 154B may determine scores for the field labels “Phone Number” and “Client Number” using the sequence position model 158B of FIG. 4E. The sequence rectification module 154B may determine the score for the field label “Phone Number” as the integral of the function ƒ(x) in the second domain (associated with the word “Phone”) and in the third domain (associated with the word “Number”). The sequence rectification module 154B may determine the score for the field label “Client Number” as the integral of the function ƒ(x) in the first domain (associated with the word “Client”) and the third domain (associated with the word “Number”).

Accordingly, the sequence rectification module 154B may be configured to determine a score for each field label using the sequence position model 158B that is based on words shared between a candidate sequence and the field label, and on how closely the order of words in the candidate sequence match the order of words in the field label. In the above example of “Phone Number” and “Client Number”, the field label “Phone Number” more closely matches the order of terms in “Client Phone Number” than does the field label “Client Number”. Accordingly, as illustrated in FIG. 4D, “Phone Number” has a greater candidate field label score than “Client Number”.

Figure 5:
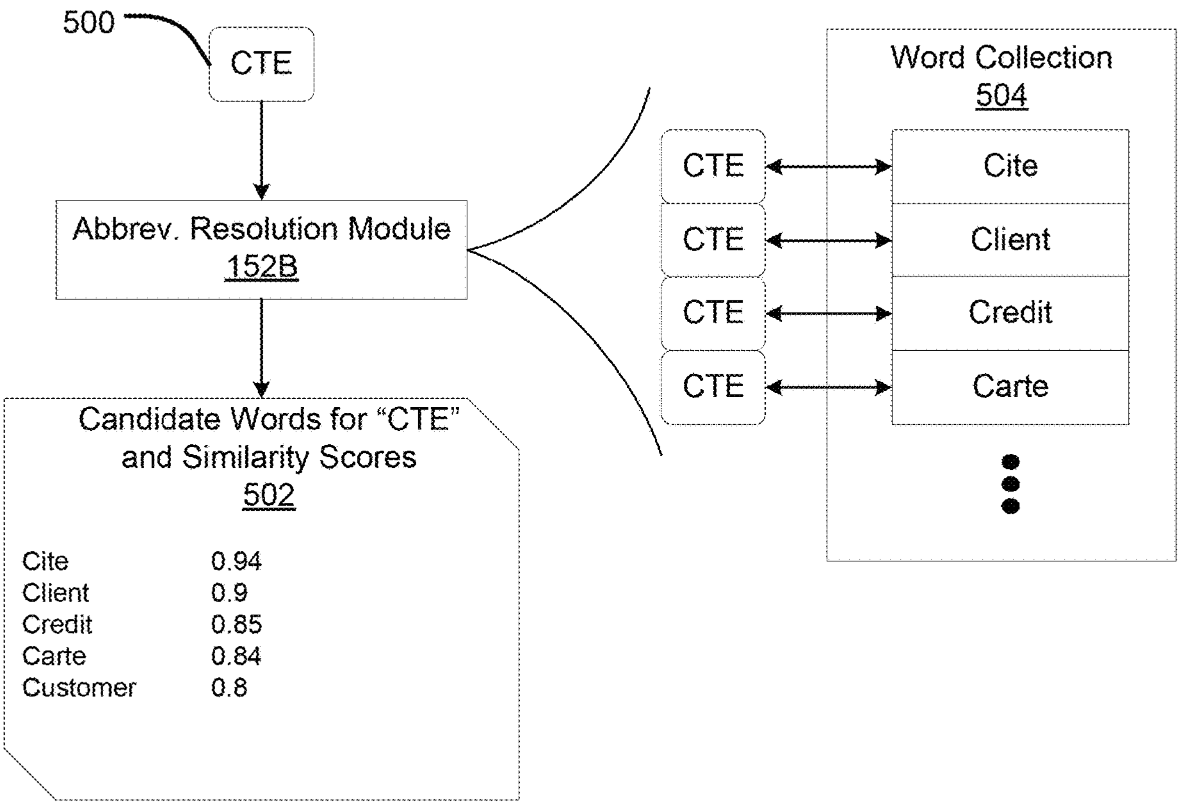
FIG. 5 shows an example of identifying candidate words for an abbreviation in a word collection, according to some embodiments of the technology described herein.

FIG. 5 shows an example of identifying candidate words for an abbreviation from a word collection 504, according to some embodiments of the technology described herein. As shown in FIG. 5, in some embodiments, the abbreviation resolution module 152B may be configured to determine a measure of similarity of an abbreviation 500 with words in a word collection 504. In the example of FIG. 5, the abbreviation resolution module 152B determines a measure of similarity between the abbreviation “CTE” and words in the word collection 504 (e.g., a glossary). In this example, the candidate words 502 identified by the abbreviation resolution module 152B are “Cite”, “Client”, “Credit”, and “Carte”. The abbreviation resolution module 152B determines a similarity score for each of the candidate words. The similarity scores are as follows: 0.94 for “Cite”, 0.9 for “Client”, 0.85 for “Credit”, 0.84 for “Carte”, and 0.8 for “Customer”. These similarity scores may be used in identifying candidate field labels (e.g., as described herein with reference to FIGs.

Figure 6A:
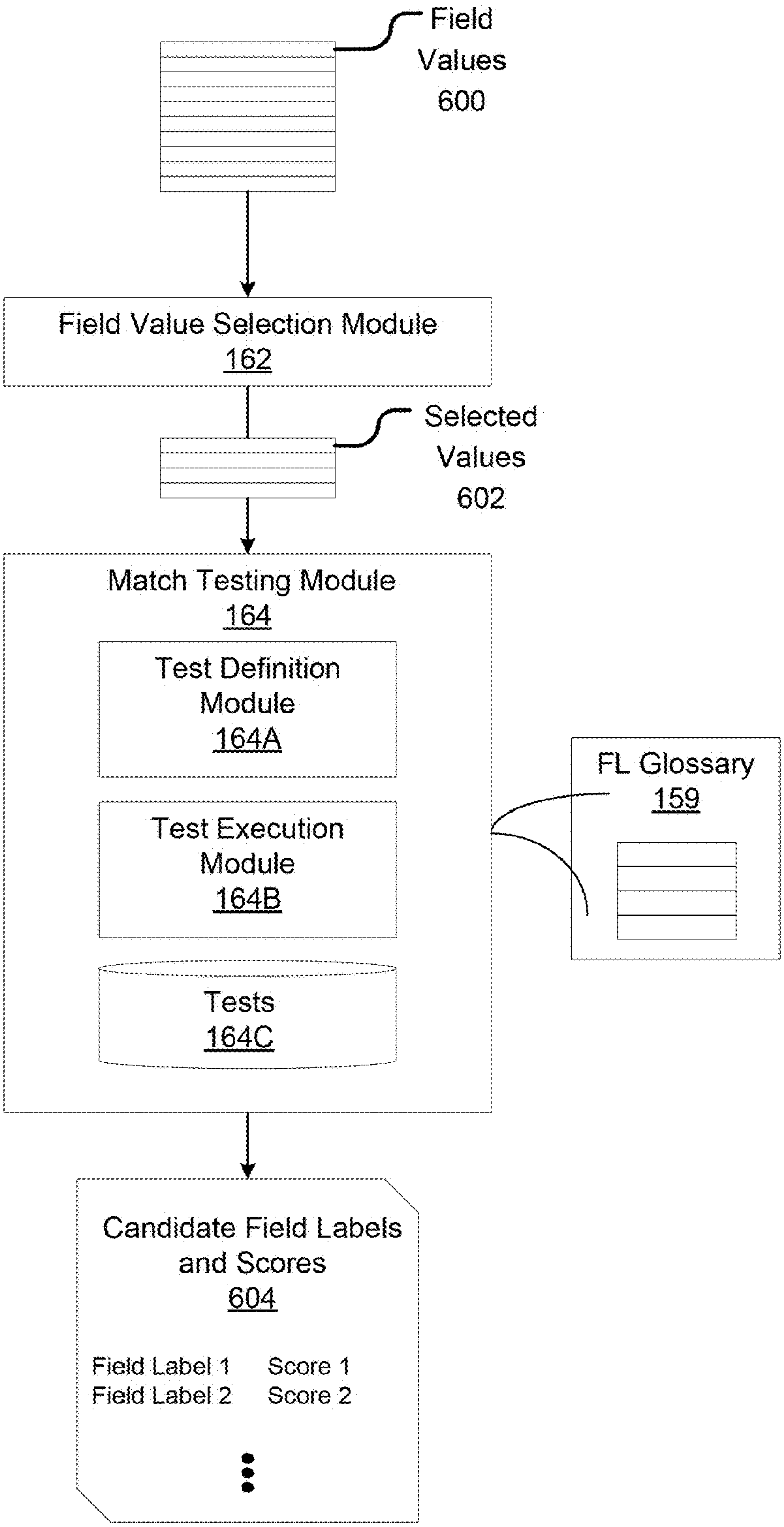
FIG. 6A illustrates an example of how component modules of a field data analysis module (that is part of the data processing system of FIGS. 2A-2E) may operate to determine candidate field labels and scores, according to some embodiments of the technology described herein.

FIG. 6A shows an example of how component modules of field data analysis module 102B (that is part of the data processing system 100 described herein with reference to FIGS. 2A-3D) operate to determine candidate field labels and scores, according to some embodiments of the technology described herein. The field data analysis module 102B selects values 602 from values 600 stored in a dataset field and uses the selected values 602 to determine a set of candidate field labels and scores 604.

As shown in FIG. 6A, the field value selection module 162 accesses values 600 from a dataset field for which candidate field labels are to be identified. The field value selection module 162 may be configured to access the values 600 from a dataset or a dataset profile corresponding to the dataset. The field value selection module 162 selects a subset of the values 600 to obtain selected values 602. In some embodiments, the field value selection module 162 may be configured to select a subset of the dataset field values 600 by identifying the most common values of the dataset field values 600. For example, the field value selection module 162 may select the 50-100, 100-150, 150-200, 200-300, 300-400, 400-500 most frequently occurring values from the dataset field values 600. In some embodiments, the field value selection module 162 may be configured to randomly select values from the dataset field values 600 to obtain the selected field values 602. In some embodiments, the field value selection module 162 may be configured to select a number of the most recently updated ones of the dataset field values 600 to obtain the selected field values.

As shown in FIG. 6A, the match testing module 164 uses the selected values 602 to determine the candidate field labels and scores 604. In some embodiments, the match testing module 164 may be configured to determine the candidate field labels and scores 604 by: (1) applying tests associated with field labels in the field label glossary 104 to the selected values 602; and (2) using results of the tests to determine the candidate field labels and scores 604. The match testing module 164 includes a test definition module 164A, a test execution module 164B, and a datastore 164C.

In some embodiments, the test definition module 164A may be configured to define tests for field labels in field label glossary 104. In some embodiments, a test may be defined as follows and the test definition module 164A may be used to create the test based on user input. The user input may indicate one or more measures of how well a set of field values match a field label associated with a test and information to use in computing each of the measure(s). In some embodiments, the test definition module 164A may be configured to store defined tests (e.g., in datastore 164C). In some embodiments, the test definition module 164A may be configured to translate a defined test into an executable software application (e.g., that can be executed by the test execution module 164B to apply the test to the selected values 602).

In some embodiments, test definition module 164A, the test definition module 164A may be configured to define a test for a field label by specifying a regular expression indicating an expected pattern for values stored in a dataset field assigned the field label. For example, the test definition module 164A may define a regular expression based on user input indicating the user expression (e.g., received through a test definition GUI). As another example, the test definition module 164A may automatically define the regular expression. The test definition module 164A may automatically define the regular expression by analyzing a set of target data values to generate a regular expression that matches all the target data values.

In some embodiments, the test definition module 164A may be configured to define a test for a field label by specifying a set of reference values that can be stored in a dataset field assigned the field label. For example, the test definition module 164A may specify a set of integer values from 1-12 (i.e., each representing a month of the year) as the set of reference values for the field label "month". As another example, the test definition module 164A may specify a set of names of states in the United States of America and/or abbreviations thereof as the set of reference values for a field label "State". In some embodiments, the test definition module 164A may be configured to specify a set of reference values as a set of values indicated by user input indicating the set of reference values.

In some embodiments, the test definition module 164A may be configured to define a test for a field label by specifying a set of values on which a distribution associated with the field label is defined. For example, the test definition module 164A may specify a set of integer values from 1-31 for a field label referring to the date of the month in a date. A distribution associated with the field label may be defined on the set of integer values from 1-31.

In some embodiments, the test definition module 164A may be configured to define a test for a field label by specifying one or more rules that must be met by a field value in order for the field value to be valid. The rule(s) may be specified as logical statements. In order for a field value to be considered correctly described by the field label, the field value may be required to meet the rule(s). For example, for a field label of "birth year" the test definition module 164A may specify a rule requiring that a field value is greater than 1910 and less than 2023. As another example, for a field label "age" the test definition module 164A may specify a rule requiring that a field value is greater than 0 and less than 200.

In some embodiments, the test definition module 164A may be configured to define a test for a field label by: (1) identifying an information type (e.g., date, month, year, social security number, credit card number, phone number, city, state, and/or other information type); (2) and defining the test based on the identified information type. For example, the test definition module 164A may define the test to include a regular expression associated with the information type. As another example, the test definition module 164A may define the test by specifying a set of valid values and/or a distribution of values associated with the information type for the test.

In some embodiments, the test execution module 164B may be configured to execute tests associated with field labels in the field label glossary 104 on the selected values 602 to obtain a corresponding score for each of the field labels. For example, the test execution module 164B may apply a test associated with a field name to the selected values 602 by: (1) accessing information (e.g., from datastore 164C) associated with the test (e.g., a regular expression, a set of reference values, a distribution of values, support of a distribution of values, and/or one or more rules); and (2) applying the test to the selected values 602 using the information to obtain a score corresponding to the field name. The test execution module 164B may apply the test to the selected values 602 using the information by determining to execute one or more component tests and determining the score using result(s) of the component test(s).

In some embodiments, test execution module 164B may be configured to apply a test associated with a field label to the selected values 602 by: (1) accessing a regular expression (e.g., a regular expression indicating a pattern of mm/dd/yyyy for a "date" field label) specified by the test; and (2) determining a score for the field label using the regular expression (e.g., by determining a number of the selected values 602 that match the regular expression). In some embodiments, the test execution module 164B may be configured to determine the score using the regular expression by: (1) determining a percentage of the selected values 602 that match the regular expression; and (2) determining the score for the field label using the percentage of the selected values 602 that match the regular expression. For example, the text execution module 164B may determine a percentage of the selected values 602 that match a regular expression indicating an expected pattern for a social security number and determine a score for the field label "social security number" using the determined percentage.

In some embodiments, the test execution module 164B may be configured to apply a test associated with a field label to the selected values 602 by: (1) accessing a set of reference values (e.g., the integer values 1-12 for a "month" field label) specified by the test; and (2) determining a score for the field label using the set of reference values and the selected values 602 (e.g., by determining a number of the selected values 602 that are included in the set of reference values). In some embodiments, the match testing module 164 may be configured to determine the score by: (1) determining whether each of the selected field values 602 is in the set of reference values associated with the field label; and (2) determining the score based on a number of the selected field values are included in the set of reference values. In some embodiments, the set of reference values associated with the field label may be an enumerated set of values that would be valid for a dataset field to which the field label is assigned. For example, the dataset field may store an indication of a state in the United States of America (USA) and the set of reference values may be a list of the 50 states in the USA. The test execution module 164B may determine a percentage of the selected values 602 that are in the list of 50 states and determine a score for the field label using the determined percentage.

In some embodiments, the test execution module 164B may be configured to apply a test associated with a field label to the selected values 602 by: (1) accessing a distribution of values specified by the test (e.g., a distribution defined on the values 1-31 that is associated with a field label "day of the month"; (2) comparing the distribution specified by the test to a distribution defined on the selected values 602. The test execution module 164B may be configured to determine the score associated with the field label based on a result of the comparison. For example, the test execution module 164B may compare the distribution specified by the test to the distribution defined on the selected values 602 using a chi-squared test, and determine the score associated with the field label using the result of the chi-squared test.

In some embodiments, the test execution module 164B may be configured to apply a test associated with a field label to the selected values 602 by: (1) accessing a set of values specified by the test; and (2) comparing a support of the set of values to a support of the selected values 602. The test execution module 164B may be configured to determine the score associated with the field label based on the comparison. For example, the test execution module 164B may determine a ratio of the support of the selected values 602 to the support of the distribution specified by the test and determine the score for the field label using the ratio. To illustrate, the support for a distribution specified by a test associated with the field label "gender" may be male, female, other, and unknown while the support for the selected values 602 may be male and other. The test execution module 164B may determine a support ratio of 0.5 for the field label and determine the score for the field label using the support ratio.

In some embodiments, the test execution module 164B may be configured to apply a test associated with a field label to the selected values 602 by: (1) accessing one or more rules specified by the test; and (2) determining a percentage of the selected values 602 that meet the rule(s) (e.g., by determining a percentage of the selected values 602 for which logical statement(s) indicating the rule(s) are true). The test execution module 164B may be configured to determine the score for the field label based on the percentage of the selected values 602 that meet the rule(s). For example, a rule specified by test associated with the field label "age" may require values to be greater than greater than 0 and less than 200. The test execution module 164B may determine a percentage of the selected values 602 that are within the range required by the rule and determine the score for the field label "age" based on the percentage of the selected values 602 that are within the range.

In some embodiments, the test execution module 164B may be configured to combine results of multiple test components (e.g., match to an expression, match to a reference set of values, match to a distribution of values) to obtain a score for a field label. For example, the test execution module 164B may be configured to determine a component score from each test component and determine the score for the field label by combining the component scores (e.g., by determining a weighted average of the component scores). A test associated with a field label may involve any one or more test components described herein and/or other test component(s). For example, the test may involve regular expression matching, comparison of the selected values 602 to a reference set of values and/or a distribution.

In some embodiments, the datastore 164C may store tests generated by the test definition module 164A. For example, data defining a pattern patching test (e.g., a regular expression) may be stored in the datastore 164C. The test information may be accessed when identifying candidate field labels and scores 604. For example, the test execution module 164B may access the tests stored in the datastore 164C to apply them to the selected values 602.

Figure 6B:
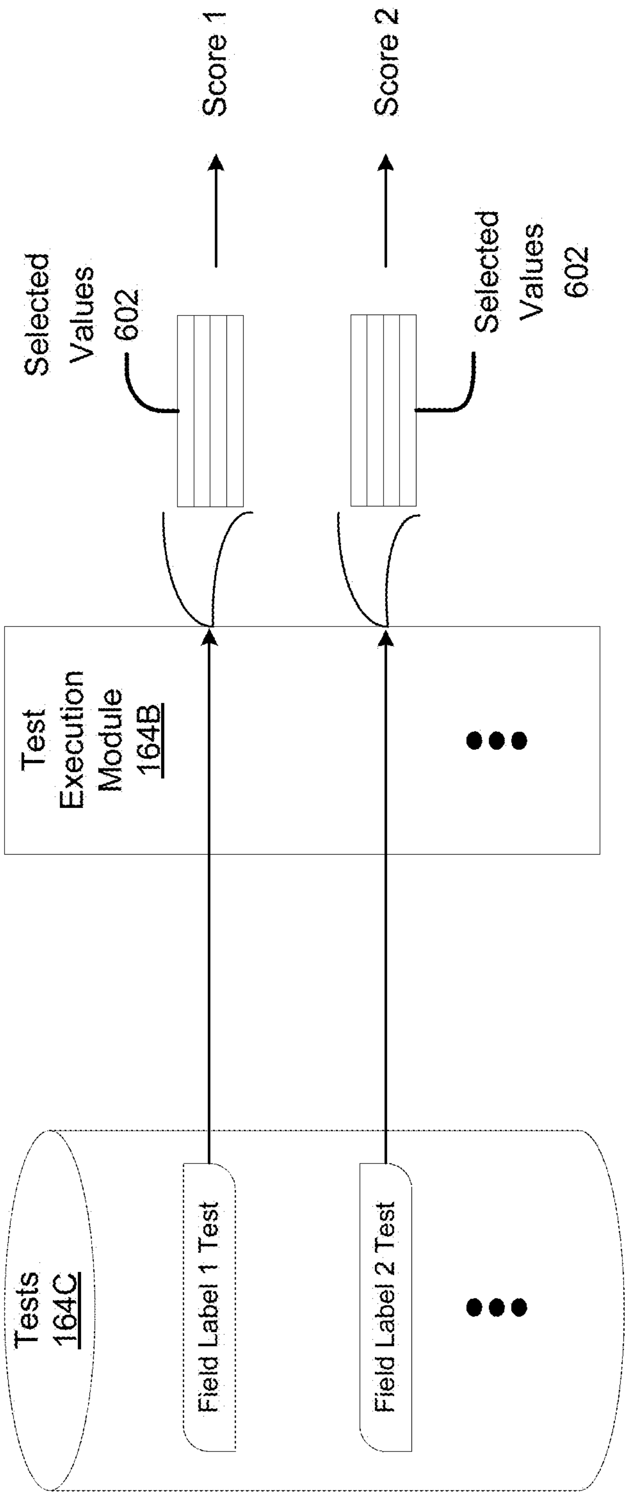
FIG. 6B illustrates an example of executing field label tests on field values to determine scores for field labels based on selected field values, according to some embodiments of the technology described herein.

FIG. 6B illustrates an example of executing tests on field values to determine scores for field labels, according to some embodiments of the technology described herein. As shown in FIG. 6B, the test execution module 164B accesses a field label 1 test from the datastore 164C and applies it to the selected values 602 to obtain a first score for field label 1. Likewise, the test execution module 164B accesses a field label 2 test from the datastore 164C and applies the test to the selected values 602 to obtain a second score for field label 2. In some embodiments, the test execution module 164B may be configured to identify a subset of field labels of the field label glossary 104 as the candidate field labels and scores 604. For example, the test execution module 164B may identify field label(s) with score(s) that meet a threshold score as the candidate field labels 604.

Figure 6C:
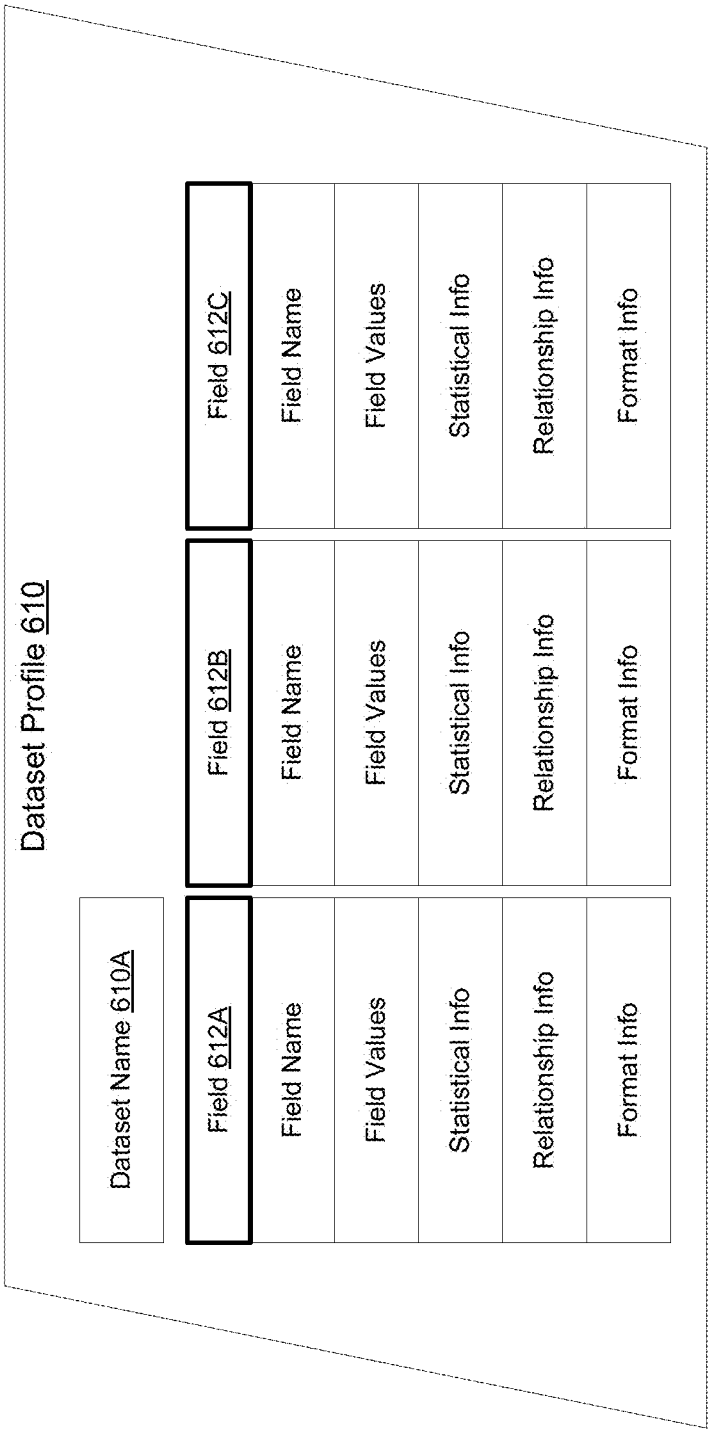
FIG. 6C illustrates an example of a dataset profile corresponding to a dataset, according to some embodiments of the technology described herein.

FIG. 6C illustrates an example of a dataset profile 610 corresponding to a dataset (e.g., dataset 112A described herein with reference to FIGS. 1A-2C), according to some embodiments of the technology described herein. For example, the dataset profile 610 may have been generated by the pre-processing module 101 of data processing system 100 for a dataset. As shown in FIG. 6C, the dataset profile 610 stores information (e.g., profile data) related to the dataset. The information includes a dataset name 610A (e.g., read from the dataset). The dataset profile 610 further stores information about fields 612A, 612B, 612C of the dataset. For each of the fields 612A, 612B, 612C, the dataset profile 610 stores a field name, field values, statistical information about the field, relationship information about the field, and format information about the field.

In some embodiments, the field values may be a sampled subset of values obtained from the field in the dataset. For example, the field values may be a randomly sampled subset of values from the field. As another example, the field values may be a subset of the most frequently occurring values in the field. As another example, the field values may be a subset of values that were most recently written to the field.

In some embodiments, the statistical information about a field may include statistics about data stored in the field. For example, statistics about data stored in a field may include a minimum value, a maximum value, a range of values, a medium value, a variance, a total number of values stored in the field, a number of empty (e.g., null) values, a minimum length of values in the field, a maximum length of values in the field, a most common value in the field, a least common value in the field, and/or other statistical information.

In some embodiments, the relationship information about the field may include an indication of relationships of the field with one or more other fields. For example, the relationship information may indicate a statistical correlation of the field with another field. As another example, the relationship information may indicate a dependency of the field on another field.

In some embodiments, the format information for a field may indicate that values in the field need to adhere to a particular format and/or indicate the particular format. For example, the format information may indicate a standard format for telephone numbers, addresses, social security numbers, birth dates, or other type of value to be stored in the field. As another example, the format information may indicate a number of decimal places for numbers stored in the field. As another example, the format information may indicate a minimum or maximum number of digits or characters for values stored in the field.

Examples of information stored in a dataset profile described herein are for illustrative purposes. In some embodiments, the dataset profile 610 may include other information related to the dataset and/or a field therein. Some embodiments may be configured to store, in a dataset profile, other information instead of or in addition to examples of information described herein.

Figure 7:
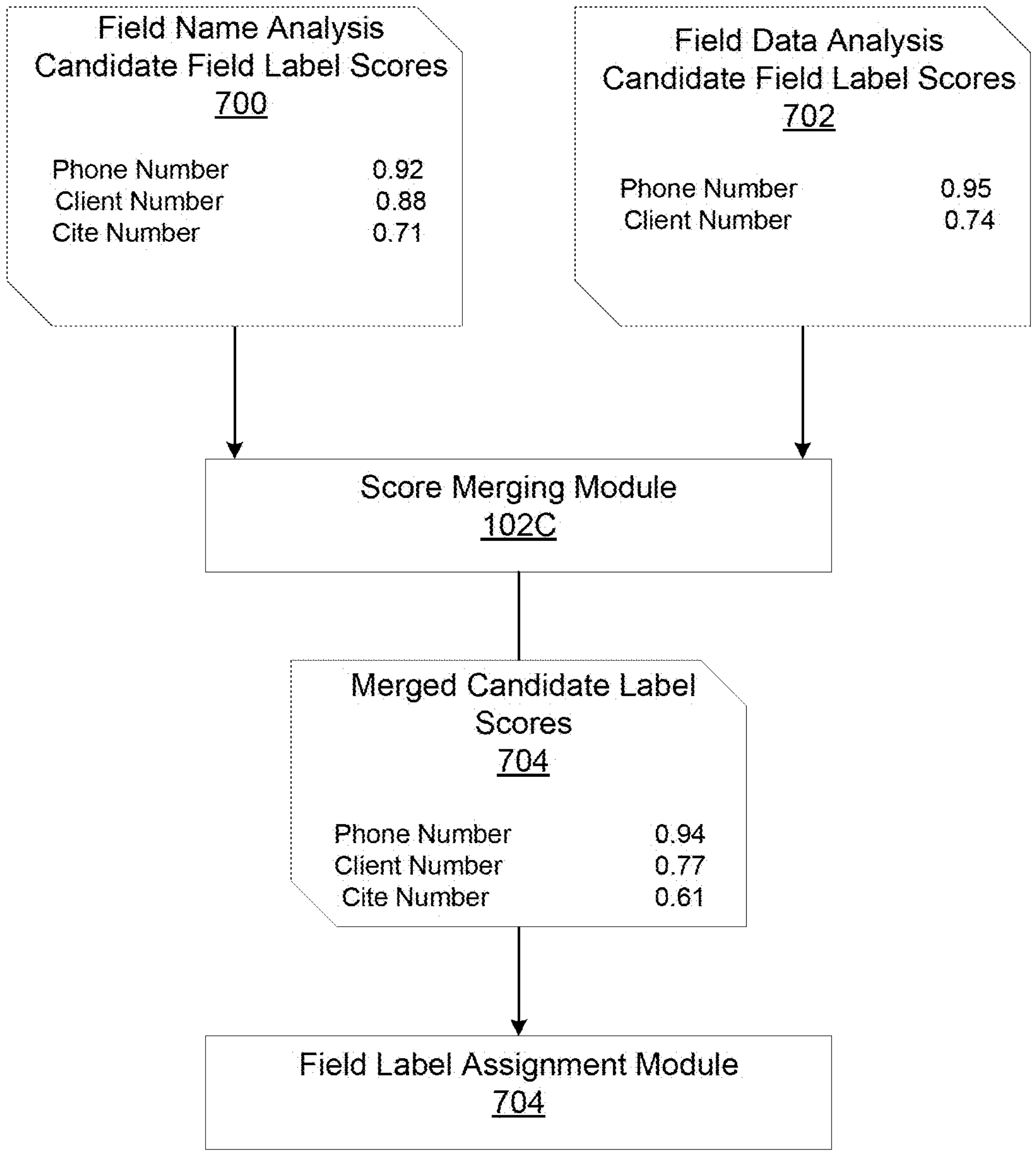
FIG. 7 shows an example of determining merged candidate field label scores using a first set of candidate field labels and scores obtained from performing a field name analysis and a second set of candidate field labels and scores obtained from performing a field data analysis, according to some embodiments of the technology described herein.

FIG. 7 shows an example of determining merged candidate field label scores using a first set of candidate field labels and scores obtained from performing a field name analysis and a second set of candidate field labels and scores obtained from performing a field data analysis, according to some embodiments of the technology described herein.

As shown in FIG. 7, the score merging module 102C receives: (1) field name analysis candidate field label scores 700; and (2) field data analysis candidate field label scores 702. The merging module 102C generates merged candidate field label scores 704 using the field name analysis candidate field label scores 700 and the field data analysis candidate field label scores 702.

In some embodiments, the score merging module 102C may be configured to identify candidate field labels that exist in both field name analysis candidate field label scores 700 and field data analysis candidate field label scores 702. In the example of FIG. 7, the candidate field labels "Phone Number", and "Client Number" are included in both sets of candidate field label scores 700, 702. The score merging module 102C may be configured to merge the field name analysis score and the field data analysis score for such candidate field labels.

In some embodiments, the score merging module 102C may be configured to merge the field name analysis score and the field data analysis score of a candidate field label by adjusting the field name analysis score using the field data analysis score. For example, the score merging module 102C may determine a ratio between the field name analysis score and the field data analysis score and adjust the field name analysis score based on the ratio. For example, the score merging module 102C may determine a proportion of log, of the ratio as a bias value that can be used to adjust the field name analysis score (e.g., by adding the bias value to the field name analysis score). When the field data analysis score is greater than the field name analysis score, the score merging module 102C may determine the bias value as $$m * \ln\left(\frac{\text{field data analysis score}}{\text{field name analysis score}}\right),$$

where m is a configurable value. For example, the value of m may be a value between 0 and 1 (e.g., 0.25). When the field name analysis score is greater than the field data analysis score, the score merging module 102C may determine the vias value an $$m * \ln\left(\frac{\text{field name analysis score}}{\text{field data analysis score}}\right).$$

For example, the value of m may be a value between 0 and 1 (e.g., 0.25). In the example of FIG. 7, the candidate field label "Phone Number" has a merged score of 0.94 and the candidate field label "Client Number" has a merged score of 0.77.

In some embodiments, the score merging module 102C may be configured to penalize a field name analysis score of field label that was identified as a candidate field label by the field name analysis but not by the field data analysis. For example, the score merging module 102C may reduce the field name analysis score by a particular amount. To illustrate, the score merging module 102C may reduce the field name analysis score by 1-10%, 10-20%, 20-30% or another suitable percentage. In the example of FIG. 7, the merged score for the candidate field label "Cite Number" is 0.61, which is a reduction of the field name analysis score for the candidate field label of 0.7.

Figure 8:
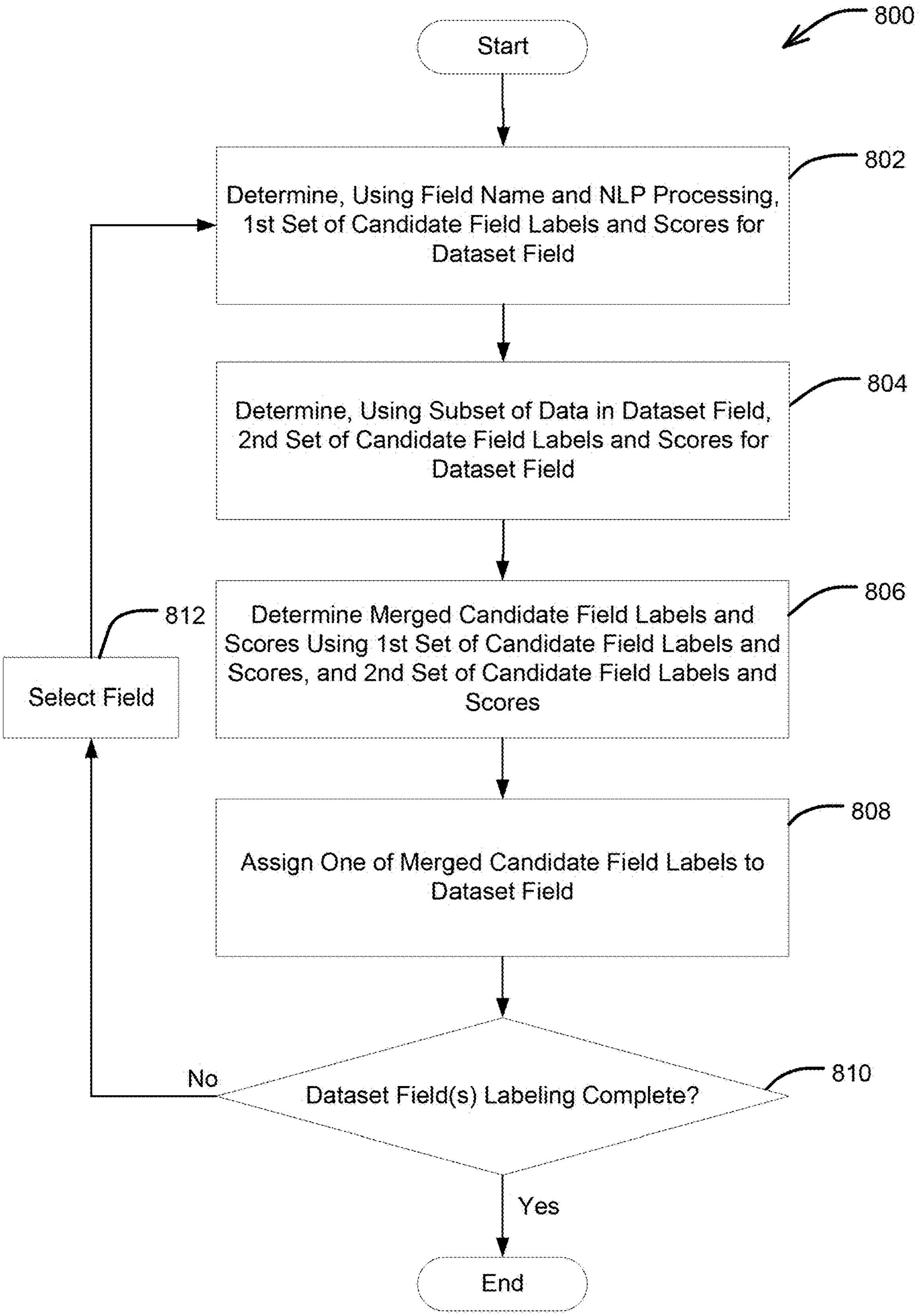
FIG. 8 shows an example process for processing a dataset to identify a respective field label for each of one or more fields in a dataset, according to some embodiments of the technology described herein.

FIG. 8 shows an example process 800 for processing a dataset to identify a respective field label, from a field label glossary (e.g., field label glossary 104), for each of one or more fields in the dataset, according to some embodiments of the technology described herein. In some embodiments, process 800 may be performed by data processing system 100 described herein with reference to FIGS. 2A-3D. For example, the process 800 may be performed to identify field labels for each of dataset fields $F_{11}$, $F_{12}$, $F_{13}$ of dataset 112A from field label glossary 104 described herein with reference to FIG. 2A.

Prior to performing process 800, the system accesses a field name of one of the dataset fields to be assigned a field label. In some embodiments, the system may be configured to read the field name from a dataset profile corresponding to the dataset. For example, the system may read the field name from a dataset profile generated for the dataset by the pre-processing module 101 described herein with reference to FIGS. 1A-IC. In some embodiments, the system may be configured to read the field name from the dataset. For example, the system may query a datastore for the field name of the dataset field to be assigned a field label for the name of the dataset field to be assigned the field label. In some embodiments, field name(s) of the dataset field(s) to be assigned a field label may be pre-loaded into a datastore of the system. The system may read a field name of the dataset from the datastore of the system. The system may be configured to access a subset of data from the dataset field. For example, the system may access a set of the most frequently occurring field values from the dataset field. For example, the system may be configured to access the subset of data from a dataset profile corresponding to the dataset. As another example, the system may be configured to access the subset of data by reading it from the dataset.

Process 800 begins at block 802, where the system determines, using the field name of the dataset field and NLP, a first set of candidate field labels for the dataset field and corresponding scores. The system may be configured to perform a field name analysis to identify the first set of candidate field labels and the corresponding scores. The scores corresponding to the first set of candidate field labels may thus be field name analysis scores. For example, the system may perform the field name analysis using the field name analysis module 102A as described herein with reference to FIGS. 3A-3D. An example process that the system may perform to determine the first set of candidate field labels and the field analysis scores is described herein with reference to FIG. 9.

Next, process 800 proceeds to block 804, where the system determines, using a subset of data from the dataset field (e.g., a subset of field values) and tests associated with field labels of the field label glossary, a second set of candidate field labels and corresponding scores. The system may be configured to perform a field data analysis to identify the second set of candidate field labels and corresponding scores. The scores corresponding to the second set of candidate field labels may thus be field data analysis scores. For example, the system may perform the field data analysis using the field data analysis module 102B as described herein with reference to FIGS. 6A-6B.

In some embodiments, the system may be configured to determine, using the subset of data from the particular field and the tests associated with respective field labels in the field label glossary, the second set of candidate field labels and corresponding scores by applying the tests associated with the respective field labels to the subset of data to obtain test results. For example, the subset of data may be a set of the most commonly occurring field values. The system may be configured to determine the second set of candidate field labels and the corresponding scores using the test results. The system may be configured to access tests associated with respective field labels in the field label glossary. Examples of how the system may access and apply tests to the subset of data (e.g., a set of selected field values) are described herein with reference to FIGS. 6A-6B.

After determining the first and second sets of candidate field labels and their corresponding sets of scores (e.g., field name analysis scores and field data analysis scores), process 800 proceeds to block 806, where the system determines merged candidate field labels and scores using the first and second candidate field labels and scores.

In some cases, the first and second sets of candidate field labels may have one or more candidate field labels in common. For each of such candidate field labels, the system may be configured to merge the two scores associated with the candidate field label. In other words, the system may be configured to merge a field name analysis score associated with the candidate field label with a field data analysis score associated with the candidate field label. In some embodiments, the system may be configured to merge the two scores by adjusting the field name analysis score using the field data analysis score. For example, the system may: (1) determine a ratio between the field name analysis score and the field data analysis score; and (2) adjust the field name analysis score using the ratio. In some embodiments, the system may determine the ratio as the field data analysis score divided by the field name analysis score when the field data analysis score is greater, and the ratio as the field name analysis score divided by the field data analysis score when the field name analysis score is greater.

In some embodiments, the system may determine a bias value using the ratio between the field name analysis score and the field data analysis score. The system may adjust the field name analysis score using the bias value. For example, the system may determine the bias value as a log of the ratio between the field name analysis score and the field data analysis score. The system may adjust the field name analysis score using the bias value. For example, the system may add a proportion of the bias value to the field name analysis score. The proportion of the bias value may be a value in the range 0-0.1, 0.1-0.2, 0.3-0.4, or 0.4-0.5. For example, the proportion of the bias value added to the field name analysis score may be 0.25. The system may use the ratio to determine a bias (e.g., a logarithm of the ratio) and increase the field name analysis score by the bias. The bias may thus be a reward term added to the field name analysis score when it has a matching candidate field label identified from the field data analysis. Equations (i)-(ii) are an example merging of a field name analysis score (Sn) and a field data analysis score (Sa).

$$\text{Bias} = \begin{Bmatrix} \ln\left(\frac{s_d}{s_n}\right); s_d > s_n \\ \ln\left(\frac{s_n}{s_d}\right); s_n > s_d \end{Bmatrix} \tag{i}$$

$$\text{Merged Score} = s_n + \text{Bias} \tag{ii}$$

In some cases, the first set of candidate field labels may include a candidate field label that is not included in the second set of candidate field labels. In such cases, the system may be configured to determine a merged score for the candidate field label by reducing the field name analysis score associated with the candidate field label (e.g., as a penalty for not matching a candidate label of the second set of candidate field labels). For example, the system may reduce the field name analysis score by a pre-determined percentage. The pre-determined percentage may be a percentage between 0-5%, 5-10%, 10-15%, 15-20%, 20-25%, 25-30%, 30-35%, 35-40%, or other suitable percentage. For example, the pre-determined percentage may be a 10% reduction of the field name analysis score.

In some cases, the second set of candidate field labels may include a candidate field label that is not included in the first set of candidate field labels. In such cases, the system may be configured to determine a merged score for the candidate field label by reducing the field data analysis score associated with the candidate field label (e.g., as a penalty for not matching a candidate label of the first set of candidate field labels). For example, the system may reduce the field data analysis score by a pre-determined percentage. The pre-determined percentage may be a percentage between 0-5%, 5-10%, 10-15%, 15-20%, 20-25%, 25-30%, 30-35%, 35-40%, or other suitable percentage. For example, the pre-determined percentage may be a 10% reduction of the field data analysis score.

After determining the merged candidate field labels and scores at block 806, process 800 proceeds to block 808, where the system assigned one of the merged candidate field labels to the dataset field using the merged scores.

In some embodiments, the system may be configured to automatically select one of the candidate field labels using the merged scores. For example, the system may select the candidate label from the merged candidate field label with the highest score. In some embodiments, the system may be configured to obtain user input selecting one of the merged candidate field labels as the assigned field label. For example, the system may present one or more of the merged candidate field labels in a graphical user interface (GUI) and receive user input indicating a selection of one of the merged candidate field labels. In some embodiments, the system may present an indication of the merged score of each of the merged candidate field labels. For example, the system may rank the candidate labels in the GUI based on their merged scores.

In some embodiments, the system may be configured to assign one of the merged candidate field labels to the dataset field using the merged score by determining whether any of the merged candidate field labels meet a first threshold merged score. The first threshold merged score may be a value in the range 0.8-0.85, 0.85-0.9, 0.9-0.95, or 0.95-1.0. For example, the first threshold merged score may be 0.95. When one of the merged candidate field labels meets the first threshold merged score, the system may be configured to automatically assign the candidate field label to the dataset field. When multiple of the merged candidate field labels meets the first threshold merged score, the system may obtain user input indicating a selection of one of the candidate field labels as the assigned field label (e.g., through a GUI). When none of the merged candidate field labels meets the first threshold score, the system may request user input selecting one of the merged candidate field labels as the assigned field label.

In some embodiments, the system may be configured to request user input for a given candidate field label when it has a merged score that meets a second threshold merged score that is lower than the first threshold merged score but fails to meet the first threshold score. For example, the system may determine that this indicates that the candidate label is a near match and requests user input confirming the match.

In some embodiments, the system may be configured to store the assigned field label in association with the dataset field in a datastore (e.g., datastore 108) of the system. For example, the system may map a data entity definition associated with the assigned field label to the dataset field (e.g., for storage of metadata about the dataset field). As another example, the system may store a metadata attribute value indicating the assigned field label of the dataset field.

After assigning one of the merged candidate field labels to the dataset field, process 800 proceeds to block 810, where the system determines whether labeling is complete for the dataset field(s) to be labeled. For example, the system may determine whether there are additional dataset field(s) to be labeled. If the system determines that there are additional dataset field(s) to be labeled, then the system may determine that labeling is not complete. In this case, the system may proceed to block 812, where the system selects another dataset field. The system may be configured to access a field name of the dataset field and a subset of data from the dataset field (e.g., a subset of field values). The system then proceeds to block 802 and repeats the steps at blocks 802-808 for another dataset field. If the system determines that there are no additional dataset(s) to assign a field label, then the system may determine that labeling is complete. Thus, process 800 may end.

Figure 9:
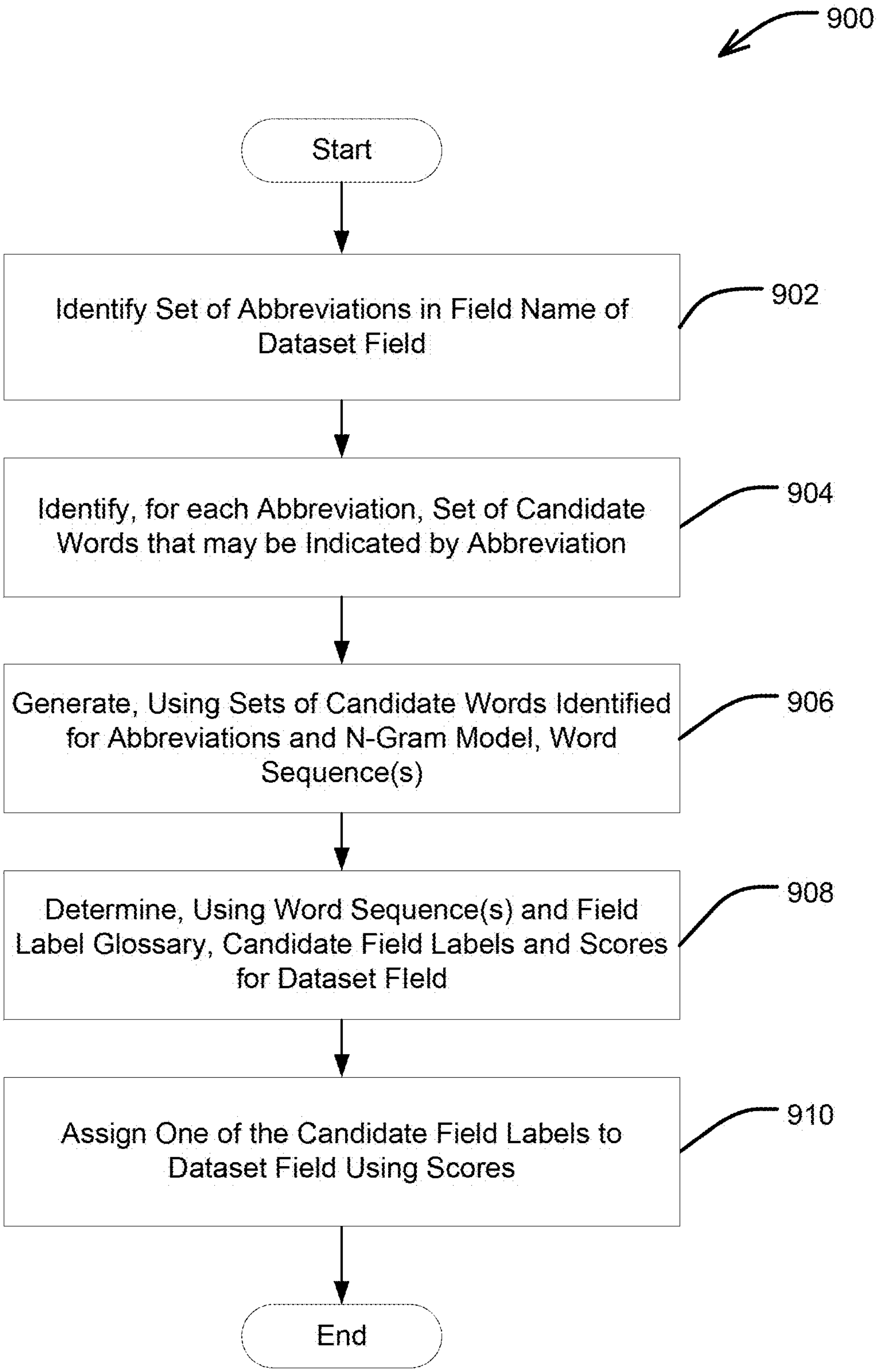
FIG. 9 shows an example process for determining, using a name of a dataset field, candidate field labels for the dataset field and field name analysis scores for the candidate field labels, according to some embodiments of the technology described herein.

FIG. 9 shows an example process 900 for determining, using a name of a dataset field, candidate field labels from a field label glossary (e.g., field label glossary 104) for the dataset field and field name analysis scores for the candidate field labels, according to some embodiments of the technology described herein. In some embodiments, process 900 may be performed by data processing system 100 described herein with reference to FIGS. 1B-2C. For example, the data processing system 100 may perform process 900 using field name analysis module 102A (e.g., as described herein with reference to FIGS. 3A-3D and FIGS. 4A-4E). In some embodiments, process 900 may be performed at block 804 of process 800 described herein with reference to FIG. 8 to obtain a first set of candidate field labels and corresponding field name analysis scores. In some embodiments, process 900 may be performed independently of process 800 to assign a field label to the dataset field. For example, process 900 may be performed to identify a field label for a dataset field by performing field name analysis without performing field data analysis.

Prior to performing process 900, the system accesses a field name of the dataset field to be assigned a field label. In some embodiments, the system may be configured to read the field name from a dataset profile corresponding to the dataset (e.g., a dataset profile generated by the pre-processing module 101 described herein with reference to FIGS. 1A-1C). In some embodiments, the system may be configured to read the field name from the dataset. For example, the system may query a datastore for the field name of the dataset field to be assigned a field label for the name of the dataset field to be assigned the field label. In some embodiments, field name(s) of the dataset field(s) to be assigned a field label may be pre-loaded into a datastore of the system. The system may read a field name of the dataset from the datastore of the system.

Process 900 begins at block 902, where the system identifies a set of abbreviations in the field name of the dataset field. For example, the system may be configured to identify the set of abbreviations using the abbreviation recognition module 152A as described herein with reference to FIGS. 3A-3B and FIG. 4A. In some embodiments, the system may be configured to identify the set of abbreviations by: (1) identifying one or more ways to segment the field name to obtain candidate field name segmentation(s); (2) selecting one of the candidate field name segmentations; and (3) identifying the set of abbreviations in the selected field name segmentation. For example, the system may determine scores for the candidate field name segmentation(s) and select the highest scoring segmentation. For example, the system may identify the abbreviations "CTE", "NUM", "TEL" in the field name "CTENUMTEL".

Next, process 900 proceeds to block 904, where the system identifies, for each abbreviation, a set of candidate words that may be indicated by the abbreviation. In some embodiments, the system may be configured to identify a set of candidate words for an abbreviation by determining a measure of similarity between the abbreviation and a pre-determined set of words (e.g., a glossary of words generated by the NLP module 156) to obtain similarity scores for the set of words. Example measures of similarity are described herein. For example, the example measure of similarity may be a cosine similarity, Jaro-Winkler similarity, Euclidean distance, and/or a combination of one or more similarity measures. In some embodiments, the system may be configured to select a subset of the pre-determined set of words as the candidate set of words. For example, the system may determine the candidate set of words for the abbreviation as those with a similarity score that meets a threshold similarity score. The similarity score may, for example, be a value between 0 and 1 and the threshold similarity score may be a value in one of the following ranges: 0.5-0.6, 0.6-0.7, 0.7-0.8, 0.8-0.9, 0.9-1. For example, the threshold similarity score may be 0.8.

Next, process 900 proceeds to block 906, where the system generates, using the sets of candidate words identified for the identified abbreviations and an n-gram model (e.g., n-gram model 158A), one or more word sequences. For example, the system may generate the word sequence(s) using the candidate sequence generation module 154A as described herein with reference to FIGS. 3B-3C and FIGS. 4B-4C. In some embodiments, the system may be configured to combine words from the sets of candidate word sequences to obtain multiple word sequences and filter the word sequences using the n-gram model. For example, the system may generate word sequences using collections of words that co-occur in at least one sequence indicated by the n-gram model. Accordingly, the system may not generate word sequences with collections of words that do not occur in a sequence indicated by the n-gram model or filter out such word sequences from a set of generated word sequences. As another example, the system may use the n-gram model to determine a score (e.g., a probability value) indicating a likelihood that collections of words taken from the sets of candidate words co-occur in a sequence indicated by the n-gram model and generate word sequences with word collections that meet a threshold score.

In some embodiments, the system may be configured to identify a word in a word sequence as a classword. The classword may indicate a category of data (e.g., number, name, or other category of data). The system may determine a target position of the classword in the word sequence. For example, the system may determine a target position of the classword using a classword model (e.g., classword model 418) as described herein with reference to FIG. 4C. In some embodiments, the target position of the classword may be based on a language of the field label to be assigned to the dataset field. For example, a target position of the classword for the English language may be at the end of the word sequence. The system may subsequently use the word sequence to identify candidate field labels according to the target position of the classword. For example, the system may re-arrange the order of the word sequence such that the classword is in its target position.

Next, process 900 proceeds to block 908, where the system uses the word sequence(s) and field label glossary to identify the candidate field labels and scores. In some embodiments, the system may be configured to access a sequence position model (e.g., sequence position model 158B) that is based on the order of words in each word sequence. The system may be configured to use the sequence position model to determine scores for field labels in the field label glossary (e.g., as described herein with reference to FIG. 3C and FIGS. 4D-4E). A score for a given field label in the field label glossary may be based on a degree to which the words of the field label match the words of the word sequence and the degree to which the order of the words in the field label matches the order of the words in the word sequence. For example, for a word sequence "client phone number", the field label "phone number" may have a higher score than the field label "client number" because the order of words in "phone number" aligns more closely with the order of the words in "client phone number".

Next, process 900 proceeds to block 910, where the system assigns one of the candidate field labels to the dataset field using the scores. In some embodiments, the system may be configured to assign a field label in conjunction with candidate field labels and scores obtained from performing field data analysis as described at blocks 806-808 of process 800 described herein with reference to FIG. 8.

In some embodiments, the system may be configured to assign a field label using the candidate field labels obtained at block 908 without using candidate field labels and scores obtained from performing field data analysis. In some embodiments, the system may be configured to automatically select one of the candidate field labels using the scores. For example, the system may select the candidate label from the candidate field labels with the highest score. In some embodiments, the system may be configured to obtain user input selecting one of the candidate field labels as the assigned field label. For example, the system may present one or more of the candidate field labels in a graphical user interface (GUI) and receive user input indicating a selection of one of the candidate field labels. In some embodiments, the system may present an indication of the score of each of the candidate field labels. For example, the system may rank the candidate labels in the GUI based on their scores.

In some embodiments, the system may be configured to assign one of the candidate field labels to the dataset field using the score by determining whether any of the candidate field labels meet a first threshold score. The first threshold score may be a value in the range 0.8-0.85, 0.85-0.9, 0.9-0.95, or 0.95-1.0. For example, the first threshold score may be 0.95. When one of the candidate field labels meets the first threshold score, the system may be configured to automatically assign the candidate field label to the dataset field. When multiple of the candidate field labels meet the first threshold score, the system may obtain user input indicating a selection of one of the candidate field labels as the assigned field label (e.g., through a GUI). When none of the candidate field labels meets the first threshold score, the system may request user input selecting one of the candidate field labels as the assigned field label.

In some embodiments, the system may be configured to request user input for a given candidate field label when it has a score that meets a second threshold score that is lower than the first threshold score but fails to meet the first threshold score. For example, the system may determine that this indicates that the candidate label is a near match and requests user input confirming the match.

In some embodiments, the system may be configured to store the assigned field label in association with the dataset field in a datastore (e.g., datastore 108) of the system. For example, the system may map a data entity definition associated with the assigned field label to the dataset field (e.g., for storage of metadata about the dataset field). As another example, the system may store a metadata attribute value indicating the assigned field label of the dataset field.

FIG. 10 shows another example process 1000 for determining, using a name of a dataset field, candidate field labels from a field label glossary (e.g., field label glossary 104) for the dataset field and field name analysis scores for the candidate field labels, according to some embodiments of the technology described herein. In some embodiments, process 1000 may be performed by data processing system 100 described herein with reference to FIGS. 1B-3D. For example, the data processing system 100 may perform process 1000 using field name analysis module 102A (e.g., as described herein with reference to FIGS. 3A-3C and FIGS. 4A-4E). In some embodiments, process 1000 may be performed at block 804 of process 800 described herein with reference to FIG. 8 to obtain a first set of candidate field labels and corresponding field name analysis scores. In some embodiments, process 1000 may be performed independently of process 800 to assign a field label to the dataset field. For example, process 1000 may be performed to identify a field label for a dataset field by performing field name analysis without performing field data analysis.

Prior to performing process 1000, the system accesses a field name of the dataset field to be assigned a field label. The system may be configured to read the field name from the dataset. For example, the system may query a datastore for the field name of the dataset field to be assigned a field label for the name of the dataset field to be assigned the field label. In some embodiments, field name(s) of the dataset field(s) to be assigned a field label may be pre-loaded into a datastore of the system. The system may read a field name of the dataset from the datastore of the system.

Process 1000 begins at block 1002, where the system identifies a set of abbreviations in the field name of the dataset field. The system may identify the set of abbreviations as described at block 902 of process 900 described herein with reference to FIG. 9.

Next, process 1000 proceeds to block 1004, where the system determines, for each abbreviation, a set of candidate words indicated by the abbreviation and corresponding similarity scores. The block 1004 includes two sub-blocks 1004A, 1004B.

At sub-block 1004A, the system determines a measure of similarity between the abbreviation and words in a glossary (e.g., generated by the NLP module 156) to obtain similarity scores for the words. In some embodiments, the measure of similarity between the abbreviation and a given word is based on characters in the abbreviation, characters in the word, order of the characters in the abbreviation, and order of the characters in the word. In some embodiments, the measure of similarity is based on a prefix (e.g., the first 1 to 4 letters) of the abbreviation and a prefix of the word. In some embodiments, the measure of similarity is based on a suffix (e.g., the last 1 to 4 letters) of the abbreviation and a suffix of the word. In some embodiments, the measure of similarity may be based on multiple component measures of similarity between the abbreviation and the word. For example, the measure of similarity may be based on a cosine similarity, Jaro-Winkler similarity between the abbreviation and the word, and/or Jaro-Winkler similarity modified to be based on suffix instead of prefix. An example measure of similarity that may be used at sub-block 1004A is described herein.

Next, at sub-block 1004B, the system selects, using the similarity scores, a set of candidate words from the glossary. In some embodiments, the system may be configured to select a subset of the pre-determined set of words as the candidate set of words. For example, the system may determine the candidate set of words for the abbreviation as those with a similarity score that meets a threshold similarity score. The similarity score may, for example, be a value between 0 and 1 and the threshold similarity score may be a value in one of the following ranges: 0.5-0.6, 0.6-0.7, 0.7-0.8, 0.8-0.9, 0.9-1. For example, the threshold similarity score may be 0.8.

After determining sets of candidate words and corresponding sets of similarity scores at block 1004, process 1000 proceeds to block 1006. At block 1006 the system determines, using the sets of candidate words and corresponding sets of similarity scores, candidate field labels and scores for the dataset field. The system may be configured to determine the candidate field labels and scores for the dataset field as described at blocks 906-908 of process 900 described herein with reference to FIG. 9.

Next, process 1000 proceeds to block 1008, where the system assigns one of the candidate field labels to the dataset field using the scores. The system may be configured to assign one of the candidate field labels to the dataset field using the scores as described at block 910 of process 900 described herein with reference to FIG. 9.

Field Label Generation

Described herein are techniques for generating a new field label that can be assigned to one or more dataset fields. In some embodiments, the techniques involve generating a field label for a particular dataset field by: (1) generating, using a name of the particular dataset field, a word sequence describing data stored in the particular dataset field; and (2) generating the field label for the particular dataset field using the word sequence.

In some cases, none of the field labels in a field label glossary may match a particular dataset field (e.g., because none of the field labels in the field label glossary accurately describe data stored in the particular dataset field). Thus, none of the field labels from the field label glossary can be assigned to the particular dataset field. For example, a data processing system may determine candidate field labels from the field label glossary using techniques described herein with reference to FIGS. 1A-10 and determine that none of the candidate field labels have a sufficiently high score to be assigned to the field. In some cases, there may be no field label glossary from which to assign field labels to fields of a dataset.

Accordingly, the inventors have developed techniques for generating a new field label for assignment to one or more dataset fields. In some embodiments, the techniques may be used to generate a field label for a dataset field when none of the field labels in a field label glossary can be assigned to the dataset field. For example, the system may determine that none of the field labels in the field label glossary have a sufficiently high associated score to be assigned to a particular dataset field. The system may determine to generate a new field label for assignment to the dataset field. The new field label may be assigned to one or more other dataset fields. For example, the new field label may be added to the field label glossary for identification as a candidate field label for other dataset field(s).

The techniques generate a new field label for a dataset field using the name of the dataset field ("field name"). The techniques generate a word sequence describing data stored in the field and generate the field label using the word sequence (e.g., by including some or all of the word sequence in the field label). In some embodiments, the techniques may be employed in cases when no field labels from a field label glossary are assigned to a given dataset field (e.g., because none of them indicate metadata about the field with sufficient accuracy). For example, the system may attempt to identify a candidate field label for a field from a field label glossary (e.g., by performing process 800 described with reference to FIG. 8, process 900 described with reference to FIG. 9, and/or process 1000 described with reference to FIG. 10). When the system fails to identify any label from the field label glossary to assign to the field (e.g., because none of the labels have a sufficiently high score), the system may generate a new field label.

FIG. 11A is a block diagram of a data processing system 1100 configured to generate field labels for dataset fields, according to some embodiments of the technology described herein. As shown in FIG. 11A, the data processing system 1100 may be configured to access data from datastores 109A, 109B, 109C. For example, in the example of FIG. 11A, the data processing system 1100 is accessing dataset 1112 from datastore 109B. The data processing system 1100 may be configured to process dataset 1112 to assign labels to fields $F_{111}$, $F_{112}$, $F_{113}$, $F_{114}$ of dataset 1112.

As shown in FIG. 11A, the data processing system 1100 includes a data recognition module 102 (described herein with reference to FIGS. 2A-3D), a field label assignment module 106 (described herein with reference to FIGS. 2A-2C), a field label generation module 1102, and a datastore 108 storing field label assignments (described herein with reference to FIGS. 2A-2C).

The data recognition module 102 may be configured to process dataset fields to identify candidate field labels for dataset fields from a field label glossary (e.g., field label glossary 104 described herein with reference to FIGS. 3A-3D). In some cases, the data recognition module 102 may be unable to identify a label in the field label glossary for a given dataset field. In some embodiments, the data processing system 1100 may be configured to determine whether there are any labels in a field label glossary to assign to a dataset field by determining, using the data recognition module 102, whether any of the labels in the field label glossary match the dataset field (e.g., based on the field name and/or field values). For example, the data processing system 1100 may determine whether there are any labels in the field label glossary to assign to the dataset field by determining whether any label in the field label glossary has a sufficiently high corresponding score. Example techniques for determining scores for field labels using the data recognition module 102 are described herein. The data processing system 1100 may be configured to determine whether any of the labels in the field label glossary has a corresponding score that meets or exceed a threshold score (e.g., a score in the range between 0 and 0.7). When the data processing system 1100 determines that none of the labels in the field label glossary have a corresponding score that meets or exceeds the threshold score, the data processing system 1100 may determine that there are no labels in the field label glossary to assign to the dataset field.

In some embodiments, the data processing system 1100 may be configured to use the field label generation module 1102 to generate one or more field labels for a dataset field (e.g., when no field labels are identified for the field from the field label glossary by data recognition module 102). The field label generation module 1102 may be configured to provide generated field label(s) to the field label assignment module 106 for assignment of one of the generated field label(s) to the dataset field (e.g., by selecting from multiple generated candidate field labels).

In some embodiments, the field label generation module 1102 may be configured to generate candidate field label(s) for a given dataset field. The field label generation module 1102 may be configured to generate the candidate field label(s) using the field name of the dataset field. The field label generation module 1102 may be configured to generate the candidate field label(s) using the field name of the dataset field by: (1) segmenting the field name into multiple segments (e.g., abbreviations); (2) identifying a candidate set of words indicated by each of the segments and corresponding words to obtain multiple candidate word sets and corresponding sets of scores; and (3) generating the candidate field label(s) using the candidate word sets and corresponding sets of scores. For example, for the field name "CTENUMTEL", the field label generation module 1102 may: (1) segment the field name into the segments "CTE", "NUM", and "TEL"; (2) identify a candidate set of words indicated by each of the segments "CTE", "NUM", and "TEL" and a corresponding set of scores to obtain multiple candidate word sets and corresponding sets of scores; and (3) generate the candidate field label(s) for the dataset field using the multiple candidate word sets.

In some embodiments, the field label generation module 1102 may be configured to generate candidate field label(s) for a dataset field using NLP. The data recognition module 102 may be configured to use a set of text to generate a language model, and generate the candidate field label(s) using the language model. For example, the field label generation module 1102 may access a corpus of text with vocabulary related to a particular industry and generate a language model using the corpus of text. To illustrate, the field label generation module 1102 may access a corpus of text produced by the Federal Reserve to generate a language model for use in generating field labels for a banking institution. As another example, the field label generation module 1102 may access a corpus of text from a medical encyclopedia to generate a language model for use in generating field labels for a medical institution. In some embodiments, the language model may encode word sequences identified in the set of text and relative positions of words in the word sequences. The field label generation module 1102 may be configured to use the language model to generate a word sequence that describes data of a dataset field, and generate a candidate field label from the identified word sequence.

In some embodiments, the field label generation module 1102 may be configured to use a colocation scoring model to generate candidate field label(s) for a dataset field. The field label generation module 1102 may be configured to use the colocation scoring model to determine score(s) for word collections generated using candidate word sets associated with respective segments of a field name. The field label generation module 1102 may be configured to identify a word collection with which to generate a candidate field label based on the scores determined using a colocation scoring model. In some embodiments, the field label generation module 1102 may be configured to determine a score for each generated candidate field label using the colocation scoring model.

As illustrated in FIG. 11A, in some embodiments, the field label generation module 1102 may be configured to receive feedback from the field label assignment module 106 based on field labels assigned to dataset fields. The field label generation module 1102 may be configured to use the feedback to update parameters used to generate an output of a colocation scoring model. For example, the assignment feedback may indicate the selection of a particular candidate field label for assignment to a dataset field. The field label generation module 1102 may update similarity scores determined for candidate words associated with respective abbreviations based on the selection of the particular candidate field label (e.g., by adjusting the similarity scores such that a score corresponding to the assigned candidate field label would increase).

In some embodiments, the field label generation module 1102 may be configured to use values obtained from the dataset field to generate candidate field label(s) for the field. For example, the field label generation module 102 may be configured to identify a portion of a candidate field label using field values. In some embodiments, the field label generation module 1102 may be configured to identify attribute values of a candidate field label using field values. For example, the field label generation module 1102 may apply various attribute tests to the field values to determine metadata about the field. The field label generation module 1102 may store the metadata as attribute values (e.g., in a data entity definition and/or instances thereof associated with the candidate field label).

FIG. 11B illustrates an example of the data processing system 1100 of FIG. 11A assigning field labels to fields $F_{111}$, $F_{112}$, $F_{113}$, $F_{114}$, according to some embodiments of the technology described herein.

As shown in the example of FIG. 11B, the data processing system 1100 assigns field labels using a dataset profile 1116A storing information related to the dataset 1112. For example, the dataset profile 1116A may have been generated by the pre-processing module 101 described herein with reference to FIG. 1A. An example dataset profile and information related to a dataset that may be stored therein is described herein with reference to FIG. 6C. In the example of FIG. 11B, the dataset profile 1116A stores a field name 1120A and field values 1122A of field $F_{111}$, a field name 1120B and field values 1122B of field $F_{112}$, a field name 1120A and field values 1122A of field $F_{113}$, and a field name 1120A and field values 1122A of field $F_{114}$. In some embodiments, the dataset profile 1116A may store additional information that is not illustrated in FIG. 11B.

As shown in the example of FIG. 11B, data recognition module 102 may use field names 1120 of the fields $F_{111}$, $F_{112}$, $F_{113}$, $F_{114}$ and field values 1122 from the fields $F_{111}$, $F_{112}$, $F_{113}$, $F_{114}$ to identify candidate field label(s) for each of the fields $F_{111}$, $F_{112}$, $F_{113}$, $F_{114}$ in the field label glossary 104. In some embodiments, the data recognition module 102 may be configured to identify candidate field labels for dataset field labels $F_{111}$, $F_{112}$, $F_{113}$ as described herein with reference to FIGS. 2A-10. In some embodiments, the field label assignment module 106 may be configured to assign field labels to dataset fields $F_{111}$, $F_{112}$, $F_{113}$ as described herein with reference to FIGS. 2A-10.

In the example of FIG. 11B, the data recognition module 102 has identified candidate field labels 1126A, 1126B, 1126C from the field label glossary 104 for fields $F_{111}$, $F_{112}$, $F_{113}$. The data recognition module 102 thus transmits the labels 1126A, 1126B, 1126C to the field label assignment module 106 for assignment to the fields $F_{111}$, $F_{112}$, $F_{113}$ (e.g., based on user input). However, the data recognition module 102 does not identify any candidate field labels from the field label glossary 104 for field $F_{114}$ (e.g., because none of the field labels in the field label glossary 104 have a sufficiently high score to be a candidate for the field $F_{114}$). Accordingly, field label generation module 1102 generates one or more candidate field labels for the field $F_{114}$.

Although in the example of FIG. 11A-11B, the data processing system 1100 has a field label glossary, in some embodiments, the data processing system 1100 may not have any field label glossary. The data processing system 1100 may be configured to generate field labels and assign them to fields of the dataset 1112 (e.g., all the fields or a subset of the fields). In some embodiments, the data processing system 1100 may be configured to assemble generated field labels (e.g., into a field label glossary). A field label generated for a particular dataset field may subsequently assigned to other dataset fields (e.g., by matching the generated field label based on field names and/or field values as described herein with reference to FIGS. 2A-10).

As shown in the example of FIG. 11B, in some embodiments, the field label generation module 1102 may be configured to access the name 1120C of the field $F_{114}$ and the values 1122C from the field $F_{114}$ (e.g., from the dataset profile 1116A as shown in FIG. 11B). The field label generation module 1102 may be configured to use the field name and values to generate the candidate field label(s). Field label generation module 1102 includes the field name segmentation module 152 (described herein with reference to FIGS. 3A-3C, 4A, 5, and 9-10), label generator 1102A, and label attribute identification module 1102B.

In some embodiments, the label generator 1102A may be configured to obtain candidate word sets (associated with segments (e.g., abbreviations) of a field name) from the field name segmentation module 152 and use the candidate word sets to generate candidate field label(s) for a dataset field. The label attribute identification module 1102B may be configured to determine attributes of the candidate field label(s) generated by the label generator 1102A. As shown in FIG. 11B, the field label generation module 1102 provides the candidate field label(s) generated for dataset field $F_{114}$ to the field label assignment module 106.

In some embodiments, the field label assignment module 106 may be configured to assign one of the candidate field label(s) generated for dataset field $F_{114}$ to the dataset field $F_{114}$. For example, the field label assignment module 106 may associate a data entity definition with one of the candidate field label(s). In some embodiments, the field label assignment module 106 may be configured to assign one of the candidate field label(s) to the dataset field $F_{114}$ based on user input. For example, the field label assignment module 106 may present the candidate field label(s) to the user in a graphical user interface, receive input through the GUI indicating a selection of one of the candidate field label(s), and assign the selected candidate field label to the dataset field $F_{114}$. In some embodiments, the field label assignment module 106 may be configured to automatically select a field label from the candidate field label(s). For example, the candidate field label(s) may have associated score(s) determined by the field label generation module 1102 and the field label assignment module 106 may assign one of the candidate field label(s) to the dataset field $F_{114}$ using the associated score(s) (e.g., by selecting the candidate field label associated with the highest score). In the example of FIG. 11B, the field label generation module 1102 transmits the generated label 1126D to the field label assignment module 106 for assignment to the field $F_{114}$ (e.g., based on user input accepting the assignment). The field label assigned to dataset field $F_{114}$ may be stored in the datastore 108.

Figure 12A:
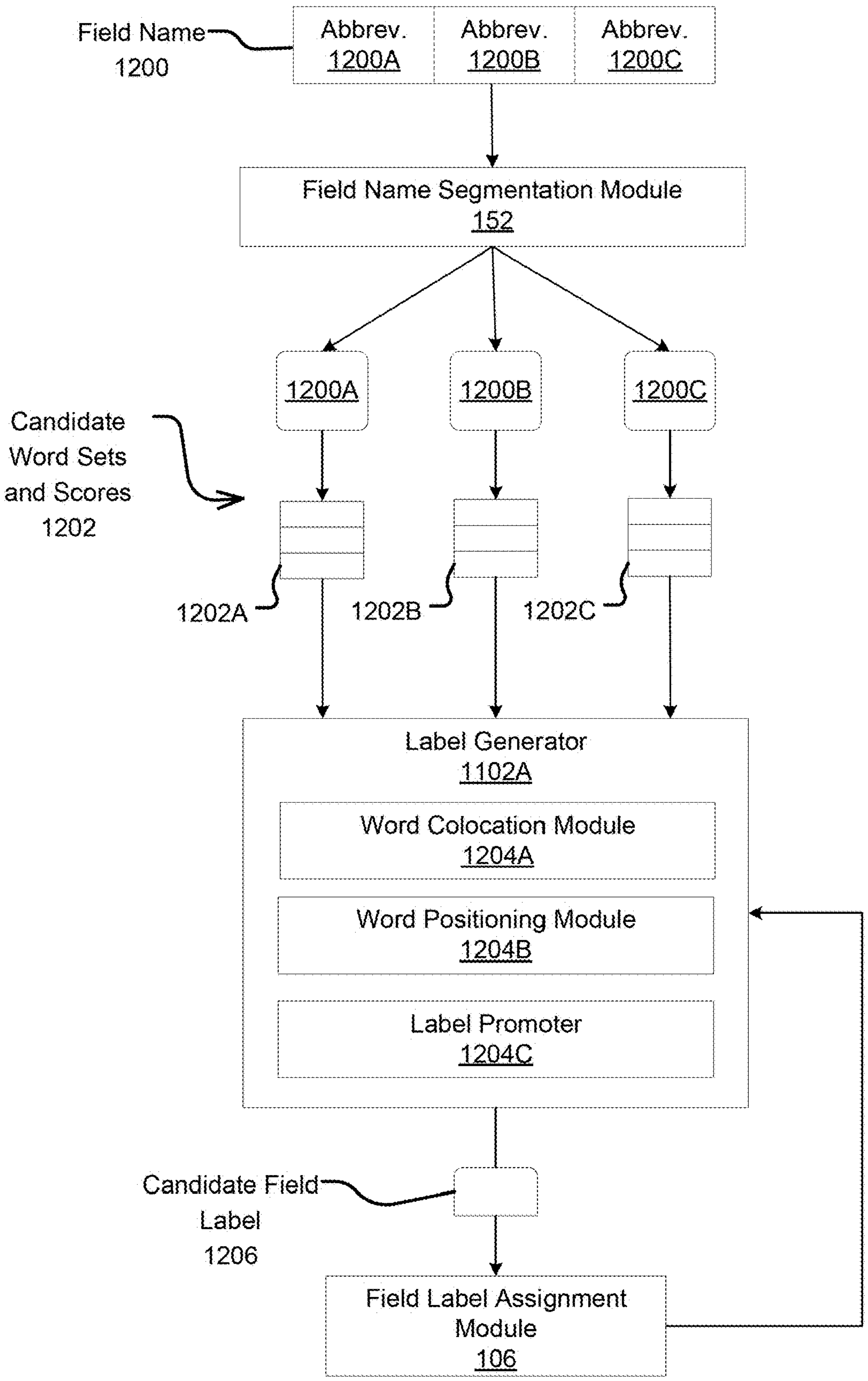
FIG. 12A illustrates an example of how a label generator of the field label generation module of the data processing system in FIGS. 11A-11B generates a candidate field label, according to some embodiments of the technology described herein.

FIG. 12A illustrates an example of how the field label generation module 1102 in FIGS. 11A-11B generates a new candidate field label 1206 for a dataset field, according to some embodiments of the technology described herein. The field label generation module 1102 obtains a field name 1200 of the dataset field and uses the field name 1200 to generate the candidate field label 1206.

As shown in FIG. 12A, the field name segmentation module 152 may be configured to obtain field name 1200. As indicated by the dashed lines in the field name 1200, the field name 1200 includes multiple abbreviations 1200A, 1200B, 1200C. The field name segmentation module 152 may be configured to segment the field name 1200 to obtain the abbreviations 1200A, 1200B, 1200C and respective candidate word sets and corresponding scores 1202. The candidate word sets and corresponding scores 1202 include candidate word set and scores 1202A associated with abbreviation 1200A, candidate word set and scores 1202B associated with abbreviation 1200B, and candidate word set and scores 1202C associated with candidate word set 1202C. Each candidate word set includes a set of one or more candidate words that may be indicated by the respective abbreviation. The field name segmentation module 152 may be configured to determine scores for words in each candidate word set. The score associated with a word in a candidate word set may indicate a measure of similarity between the word and its respective abbreviation. Example techniques that may be used by the field name segmentation module 152 to segment the field name 1200 into abbreviations 1200A, 1200B, 1200C and identify the candidate word sets with corresponding scores 1202 are described herein with reference to FIGS. 3A-3D, and 4A. Example measures of similarity are described herein as well.

As shown in FIG. 12A, the label generator 1102A may be configured to use the candidate word sets and corresponding sets of scores 1202 to generate the candidate field label 1206. The label generator 1102A includes a word colocation module 1204A, a word positioning module 1204B, and a label promoter 1204C. In some embodiments, the word colocation module 1204A may be configured to identify, using the candidate word sets and corresponding sets of scores 1202, a word collection from which to generate the field label 1206. The word positioning module 1204B may be configured to position the words in the identified collection into a particular word sequence. The label promoter 1204C may be configured to generate the field label 1206 using the word sequence.

Figure 12B:
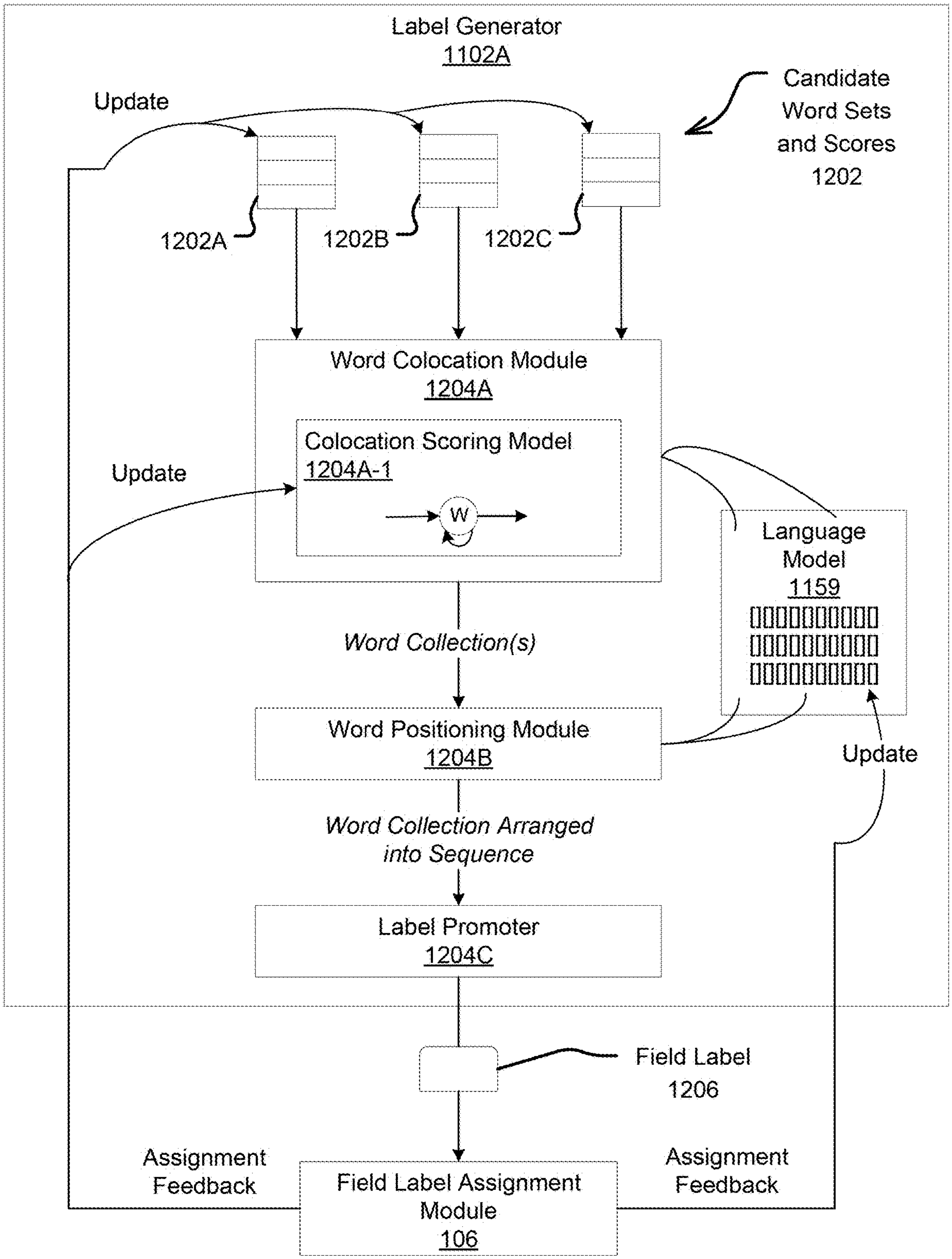
FIG. 12B illustrates how components of the label generator of the field label generation module operate to generate a candidate field label, according to some embodiments of the technology described herein.

FIG. 12B illustrates how the modules 1102A, 1130B, 1102C of the label generator 1102A of FIG. 12A operates to generate the candidate field label 1206, according to some embodiments of the technology described herein. As described herein, the word colocation module 1204A may be configured to use a language model 1159 to identify a word collection C using the candidate word sets and scores 1202. The word positioning module 1204B may be configured to use the language model 1159 to order words in the word collection into a particular sequence C'. The label promoter 1204C may be configured to identify a portion of the word sequence as the candidate field label 1206.

In some embodiments, the language model 1159 may encode word collections of collocated words in a set of text. FIG. 13 depicts a portion of the language model 1159, according to some embodiments of the technology described herein. As shown in FIG. 13, in some embodiments, the language model 1159 may store, for each of a set of target words, sequences in a set of text that include the target word. The sequences may be sequences of words that are less than or equal to a threshold number of words in length (e.g., 2 words, 3 words, 4 words, 5 words, or another number of words). For example, target word 1 is included in sequences 11, 12, 13, target word 2 is included in sequences 21, 22, 23, and target word 3 is included in sequences 31, 32. The language model 1159 further indicates words collocated with each target word in the set of text. The words collocated with a target word may be those words that appear proximate the target word in the set of text. Words proximate the target word in the set of text may be those words that are within a threshold number of words before and/or after the target word in the set of text. For example, the threshold number of words may be 1, 2, 3, 4, 5, 6, 7, 8, 9, 10, or another number of words.

In the example of FIG. 13, as illustrated in FIG. 13, words 11, 12, 13 are collocated with target word 1, words 21, 22 are collocated with target word 2, and words 31, 32 are collocated with target word 3. The language model 1159 indicates the position of each collocated word relative to its target word. For example, the relative position may be a signed integer indicating a number of words prior to or after the target word where the word is located. The language model 1159 indicates a loss for each collocated word. The loss may be determined based on the relative position of the collocated word relative to the target word. For example, a collocated word that is located further from a target word may have a greater associated loss than a collocated word that is closer to the target word.

In some embodiments, the word colocation module 1204A may be configured to identify the word collection C by: (1) generating multiple candidate word collections using the candidate word sets and corresponding scores 1302; and (2) selecting the word collection C from the candidate word collections. In some embodiments, the word colocation module 1204A may be configured to generate the candidate word collections by combining words from the candidate word sets. For example, the word colocation module 1204A may generate each word collection by obtaining a word from candidate word set 1302A, a word from candidate word set 1302B, and a word from candidate word set 1302C.

In some embodiments, the word colocation module 1204A may be configured to select the word collection C from among the candidate word collections by: (1) determining a score for each of the candidate word collections using scores associated with the words in the collection; and (2) selecting the word collection C based on scores corresponding to the candidate word collections. For example, the word colocation module 1204A may be configured to identify the word collection having the greatest associated score as the word collection C from which to generate the field label 1206.

As shown in FIG. 12A, the label generator 1102A provides the field label 1206 to the field label assignment module 106. The field label assignment module 106 may be configured to select field labels to assign to dataset fields from candidate field labels determined for the dataset fields the label generator 1102A. The field label assignment module 106 may be configured to receive candidate field labels and corresponding scores from the label generator 1102A.

In some embodiments, the field label assignment module 106 may be configured to automatically assign one of the candidate field labels associated with a dataset field based on scores associated with the candidate field labels. For example, when the field label assignment module 106 receives a single candidate field label for a dataset field with a corresponding score that meets a first threshold, the field label assignment module 106 may automatically assign the candidate field label to the dataset field. In some embodiments, the first threshold score may be any suitable value in the range of 0.8 to 1. For example, the first threshold score may be 0.9. In some embodiments, the first threshold score may be a configurable parameter. For example, the first threshold may be configured by the field label assignment module 106 based on user input received through a GUI.

In some embodiments, the field label assignment module 106 may be configured to request user input to assign one of the candidate field labels associated with a dataset field based on scores associated with the candidate field labels. For example, when the field label assignment module 106 receives a merged candidate field label for a dataset field with a corresponding score that meets a second threshold lower than the first threshold, the field label assignment module 106 may request user input confirming the field label. In some embodiments, the second threshold score may be any suitable value in the range 0.6-0.9. For example, the field label assignment module 106 may request user input to assign one of the candidate field labels to the dataset field when the greatest one of the scores associated with the candidate field labels meets a second threshold score of 0.75 but is less than a first threshold score of 0.9. In some embodiments, the second threshold score may be a configurable parameter. For example, the second threshold score may be configured by the field label assignment module 106 based on user input received through a GUI.

In some embodiments, the field label assignment module 106 may be configured to request user input when multiple candidate field labels have associated scores that meet a third threshold score. In some embodiments, the third threshold score may be any suitable value in the range 0.6-1.0. For example, the third threshold score may be 0.75. In this example, when multiple candidate field labels have scores of at least 0.75, the field label assignment module 106 may request user input selecting one of the multiple candidate field labels to assign to the particular field. In some embodiments, the third threshold score may be a configurable parameter. For example, the third threshold score may be configured by the field label assignment module 106 based on user input received through a GUI.

As illustrated in FIG. 12A, the field label assignment module 106 may be configured to provide feedback to the label generator 1102A. The label generator 1102A may be configured to use the feedback to update a machine learning model (e.g., a neural network) used by the label generator 1102A to generate field labels. For example, the label generator 1102A may use feedback from the field label assignment module 106 by updating parameters (e.g., weights) used to determine an output of the machine learning model.

In some embodiments, the field label assignment module 106 may be configured to determine feedback to send to the label generator 1102A using field assignments made by the field label assignment module 106. In some embodiments, the field label assignment module 106 may be configured to receive user input indicating selecting a field label from among one or more field labels generated by the label generator 1102A to assign to a dataset field. The field label assignment module 106 may be configured to transmit an indication of the selected field label to the label generator 1102A. The label generator 1102A may be configured to use the indication of the selected field label to update scores associated with candidate words, a colocation scoring model 1204A-1, and/or the language model 1159. Example techniques for performing updates to the label generator 1102A are described herein. In some embodiments, the field label assignment module 106 may be configured to automatically assign one of one or more field labels generated by the label generator 1102A to a dataset field (e.g., using the score(s) associated with the field label(s)). The field label assignment module 106 may be configured to transmit an indication of the field label assigned to the label generator 1102A for learning (e.g., by updating parameters of the language model 1159, the colocation scoring model 1204A-1, and/or scores associated with candidate words).

In some embodiments, the label generator 1102A may be configured to learn using feedback provided by the field label assignment module 106. The label generator 1102A may be configured to update parameters used to score word collections by the label generator 1102A (e.g., to select a word collection from which to generate a field label). In some embodiments, the label generator 1102A may be configured to use feedback provided by the field label assignment module 106 by updating similarity scores associated with words in the candidate word sets and scores 1202. For example, the similarity scores may be used to determine an output of the word colocation scoring model 1204A-1 and the label generator 1102A may update the similarity scores such that the updated similarity scores are used subsequently by the model 1204A-1. As another example, the label generator 1102A may update weights of the word colocation scoring model 1204A-1 used to generate an output score for a word collection. As another example, the label generator 1102A may update a language model used for generating a field label based on the feedback.

In some embodiments, the label generator 1102A may be configured to update parameters using the feedback received from the field label assignment module 106 using any suitable method. For example, in some embodiments, the label generator 1102A may use stochastic gradient descent to update the parameters. The label generator 1102A may be configured to update the parameters by: (1) determining a field label assigned to a field; and (2) updating the parameters based on the assigned field label. For example, the assigned field label may be a modified version of the candidate field label 1206 (e.g., specified by a user). The label generator 1102A may update parameters based on the modified version of the candidate field label 1206. As another example, the assigned field label may be a field label selected from multiple candidate field labels. The label generator 1102A may update parameters based on a selection of one of the candidate field labels. Example updates that may be made by the label generator 1102A are described herein with reference to FIG. 12B.

As illustrated in FIG. 12B, the word colocation module 1204A may be configured to determine a score for a given word collection using the language model 1159. The word colocation module 1204A may be configured to determine the score using a colocation scoring model 1204A-1. The word colocation module 1204A may be configured to determine the score as an output of the colocation scoring model 1204A-1. In some embodiments, the word colocation module 1204A may be configured to determine the output of the colocation scoring model 1204A-1 for the word collection using the language model 1159. For example, the word colocation module 1204A may use the language model 1159 to determine an output of the colocation scoring model 1204A-1 for the word collection by: (1) determining whether words in the word collection co-occur in any word sequence indicated by the language model 1159; and (2) determine an output of the colocation scoring model 1204A-1 based on whether the words co-occur in any word sequence indicated by the language model 1159. The word colocation module 1204A may be configured to determine an output of the colocation scoring model 1204A-1 for a given candidate word collection when at least some of its words co-occur in any sequence(s) using loss values indicated by the language model 1159 for the words. The word colocation module 1204A may be configured to determine an output of the colocation scoring model 1204A-1 for a word collection in which at least some of the words co-occur in a word sequence indicated by the language model 1159 using similarity scores associated with the co-occurring words (e.g., determined by the field name segmentation module 152). A similarity score associated with a word may indicate a similarity between the word and a respective abbreviation of the field name 1200 (i.e., one of the abbreviations 1200A, 1200B, 1200C).

As illustrated in FIG. 12B, the colocation scoring model 1204A-1 is a recursive model. Accordingly, the word colocation module 1204A-1 may be configured to determine an output for a word collection by sequentially processing each word as an input to the colocation scoring model 1204A-1. The output for each word may be determined based on an output of the colocation scoring model 1204A-1 for a previously processed word (i.e., when the word is not the first word of the collection that is processed).

Equation (iii) below is an example equation that may be used to determine an output of the word colocation scoring model 1204A-1 for a given word collection.

$$H_N = \left(\frac{1}{N}\right)\sum_{i=1}^{N} W_i(S_i + H_{i-1} - L_{i+1}) * C) \qquad \text{Equation (iii)}$$

In Equation (iii) above, N is the number of words in the collection, $S_i$ is a similarity score associated with the ith word in the collection. The similarity score associated with a given word may be a similarity score between the word and its respective abbreviation determined by the field name segmentation module 152. $L_{i+1}$ is the loss indicated by the language model 1159 for the subsequent word. C is a value indicating whether the words in the collection co-occur in any word sequence indicated by the language model 1159. C may be equal to 1 if the words in the collection co-occur in any word sequence and 0 if the words in the collection do not co-occur in any word sequence. $W_i$ may be a weight parameter. An example determination of an output of the colocation scoring model 1204A-1 using Equation (iii) is described herein with reference to FIGS. 14D and 16B.

In some embodiments, the word colocation module 1204A may be configured to identify a loss value for a word subsequent to a given word in the collection by: (1) identifying the given word among the target words indicated by the language model 1159; and (2) identifying the loss value for the subsequent word among the loss values associated with the target word. For example, for target word 1 in a word collection, the word colocation module 1204A may identify a loss associated with word 11 subsequent to target word 1 in the word collection. In some embodiments, the word colocation module 1204A may be configured to search among synonyms of target words when a given word is not among the target words indicated by the language model 1159. The word colocation module 1204A may identify a loss for a subsequent word in the collection in losses associated with a target word of which the given word is a synonym. For example, the word colocation module 1204A may determine that synonym 11 in a word collection is associated with target word 1 and determine a loss for word 11 subsequent to synonym 11 in the word collection as loss 11 indicated by the language model 1159.

In some embodiments, the word colocation module 1204A may be configured to use Equation (iii) above to determine the output of the colocation scoring model 1204A-1 for each word collection generated using the candidate word sets as the score associated with the word collection. The scores may be used to select one of the word sequence(s) generated from the word collection(s) to use in generating a field label (e.g., by selecting the word sequence with the greatest associated score).

Although in the example of FIG. 12B the word colocation module 1204A is configured to use the colocation scoring model 1204A-1 to determine scores for word collections, in some embodiments, the word colocation module 1204A may be configured to use another suitable model in addition to or instead of the colocation scoring model 1204A-1 to determine the scores for the word collections. For example, the word colocation module 1204A may be configured to use a convolutional neural network (CNN), feed forward neural network, or other suitable machine learning model. In some embodiments, the word colocation module 1204A may be configured to determine scores for word collections without using a machine learning model. For example, the word colocation module 1204A may use similarity scores associated with words in a word collection to determine a score for the word collection (e.g., by determining a mean or median of the similarity scores as the score for the collection).

In some embodiments, the word positioning module 1204B may be configured to arrange words in word collection(s) using the language model 1159. The word positioning module 1204B may be configured to identify a set of collocated words indicated by the language model 1159 that includes a given word collection and determine positions of the words in the collection based on the relative positions of the words indicated by the language model 1159. For example, for the word collection C, the word positioning module 1204B may: (1) determine that the words in the word collection C are words 21, 22, 23 included in the set of collocated words associated with target word 2 indicated by the language model 1159; (2) determine relative positions of the words indicated by the language model 1159; and (3) arrange the words in the word collection C to obtain the word sequence C'.

In some cases, the word positioning module 1204B may not identify any word in the word collection C among target words indicated by the language model 1159. In such cases, the word positioning module 1204B may be configured to search for words of the collection among synonyms of the target words indicated by the language model 1159. When a word is identified as a synonym of a particular target word, the word positioning module 1204B may be configured to use the relative position information mapped to the particular target word to arrange the words of the word collection C (e.g., by arranging the words in the word collection C relative to the synonym according to the positions of the words relative to the particular target word).

In some embodiments, the word positioning module 1204B may be configured to select one of multiple word sequences (obtained from arranging respective word collections) to provide to the label promoter 1204C for generation of the field label 1206. The word positioning module 1204B may be configured to select the word sequence having the highest associated score (i.e., the score associated with the word collection from which the word sequence was generated). In some embodiments, one of the word sequences may be selected using a contextual scoring model that takes into account contextual information about neighboring fields and the name of the dataset to adjust scores associated with the word sequences. Context-adjusted scores output by the contextual scoring model may be used to select a word sequence to provide to the label promoter 1204C. An example of such a contextual scoring model and use thereof is described herein with reference to FIGS. 16A-16B.

In some embodiments, the label promoter 1204C may be configured to generate the field label 1206 from the word sequence C'. For example, the label promoter 1204C may output the word sequence C' as the field label 1206. In some embodiments, the label promoter 1204C may be configured to identify a portion of the word sequence C' as the field label 1206. The label promoter 1204C may be configured to categorize each word in the sequence C' and determine the field label 1206 based on the word categorizations. For example, the label promoter 1204C may: (1) categorize each word in the sequence C' as a classword, prime word, modifier, or entity; and (2) determine the field label to be the prime word and the and the classword. To illustrate, in the word sequence "client cell telephone number", "client" may be categorized as an entity, "cell" as a modifier, "telephone" as a prime word, and "number" as a classword. The label promoter 1204C may output "telephone number" as the field label 1206 generated from the sequence C'. In some embodiments, the categorization of words in the sequence C' may be based on language conventions. The label promoter 1204C may be configured to use different categorizations based on which language the label promoter 1204C is generating a label for.

FIG. 12B further illustrates how the label generator 1102A dynamically learns based on assignment feedback from the field label assignment module 106. As shown in FIG. 12B, in some embodiments, the similarity scores corresponding to the candidate word sets may be updated based on an assigned field label. For example, similarity scores associated with words included in an assigned field label may be increased, and/or similarity scores associated with words that were not included in the assigned field label may be decreased. In some embodiments, the label generator 1102A may be configured with a learning rate according to which the label generator 1102A increases and/or decreases similarity scores associated with candidate words. For example, the label generator 1102A may increase and/or decrease a similarity score by a proportion of the similarity score.

As shown in FIG. 12B, the language model 1159 may be updated based on assignment feedback. In some embodiments, the label generator 1102A may be configured to update the language model 1159 by updating collocated word collections indicated by the language model 1159. For example, if a field label assigned to a given field includes words that are not in any collocated collection of words indicated by the language model 1159, the label generator 1102A may update the language model 1159 to indicate a new collection of collocated words that include the words of the field label. As another example, the label generator 1102A may update loss values associated with words based on a field label assigned to a field. The label generator 1102A may increase a loss associated with a word when it is further away from a target word in a field label than originally indicated by the language model 1159. As another example, the label generator 1102A may update a relative position of one or more words indicated by the language model 1159 based on a field label assigned to a field.

Figure 14A:
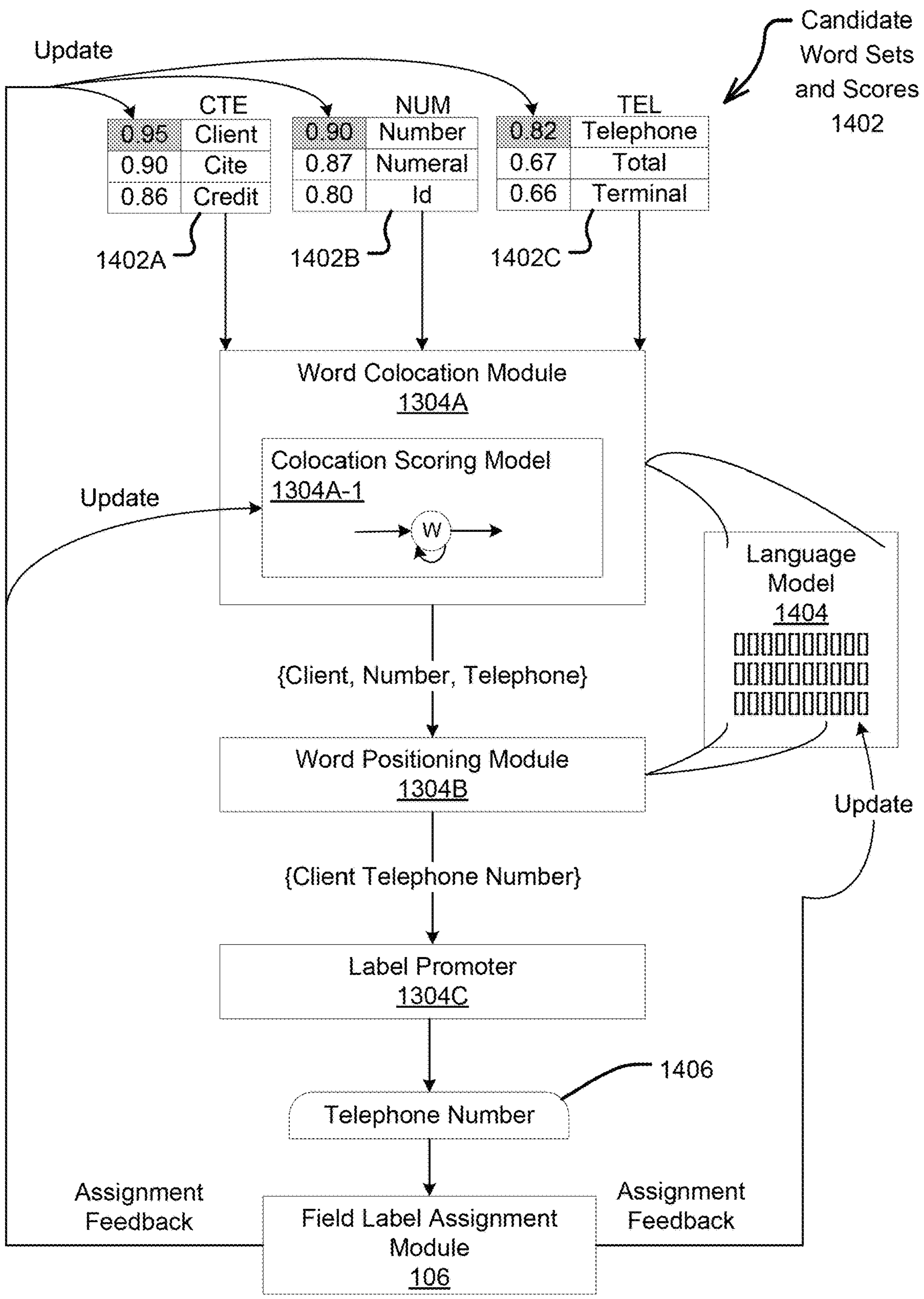
FIG. 14A illustrates the generation of an example field label by the label generator of FIGS. 12A-12B, according to some embodiments of the technology described herein.

As shown in FIG. 12B, the colocation scoring model 1204A-1 may be updated using feedback from the label assignment module 106. In some embodiments, the label generator 1102A may be configured to update the colocation scoring model 1204A-1 by updating its parameters based on the assignment module 106. For example, the label generator 1102A may update weight values used by the model to determine output (e.g., values of the weight parameter $W_i$ in Equation (iii) above). In some embodiments, the label generator 1102A may be configured to update weight values using gradient descent. The label generator 1102A may be configured to: (1) determine a difference between a FIG. 14A illustrates generation of an example field label for a dataset field by the modules of the label generator of FIGS. 12A-12B, according to some embodiments of the technology described herein. The dataset field has a field name of "CTENUMTEL". As shown in FIG. 14A, the word colocation module 1204A obtains candidate word sets and scores 1402 (e.g., determined by field name segmentation module 152). The candidate word sets include a candidate word set 1402A associated with the abbreviation "CTE", candidate word set 1402B associated with abbreviation "NUM", candidate word set 1402C associated with the abbreviation "TEL". Each of the words in the candidate word sets has an associated similarity score indicating a similarity between the word and its associated abbreviation. For example, the similarity score may be a cosine similarity between the word and the abbreviation minus a loss value. Equation (v) is an example of the loss value that may be determined between the word and the abbreviation. Other example measures of similarity that may be used are described herein.

As shown in FIG. 14A, the word colocation module 1204A identifies the word collection "Client Number Telephone" from which to generate a field label. The word colocation module 1204A uses the language model 1404 to identify the word collection. FIG. 14B is an example representation of a portion of the language model 1404, according to some embodiments of the technology described herein. The language model 1404 indicates target words "client", "number", and "telephone". For each target word, the language model 1404 indicates a set of synonyms, sequences from a set of text that include the target word, words collocated with the target word in the sequences, relative positions of the collocated words, and losses associated with the collocated words.

Figure 14C:
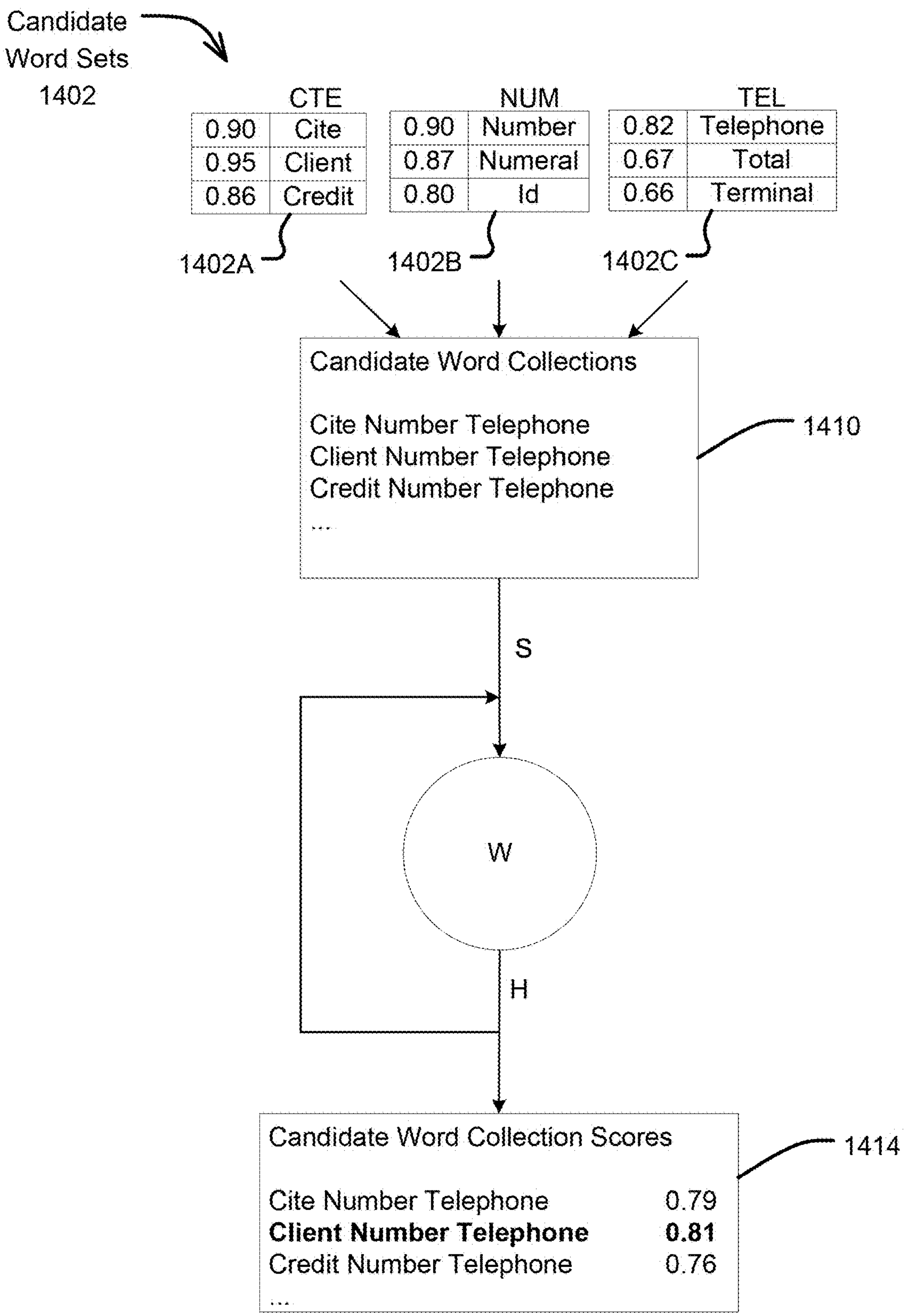
FIG. 14C shows an example of using a colocation scoring model to determine scores for candidate word collections, according to some embodiments of the technology described herein.

FIG. 14C illustrates the word colocation module 1204A determining scores 1414 for candidate word collections 1410 using the colocation scoring model 1204A-1, according to some embodiments of the technology described herein. As shown in FIG. 14C, the word colocation module 1204A generates the candidate word collections 1410 by combining words from each of candidate word sets 1402A, 1402B, 1402C. The candidate word collections include "cite number telephone", "client number telephone", "credit number telephone". The word colocation module 1204A determines a score for each of the candidate word collections using the colocation scoring model 1204A-1 and the language model 1404. In the example of FIG. 14C, the word colocation module 1204A determines a score of 0.79 for the word collection "cite number telephone", a score of 0.81 for the word collection "client number telephone", and a score of 0.76 for the word collection "credit number telephone". In some embodiments, the word colocation module 1204A may be configured to calculate the score for each word collection using Equation (iii) described herein.

Figure 14D:
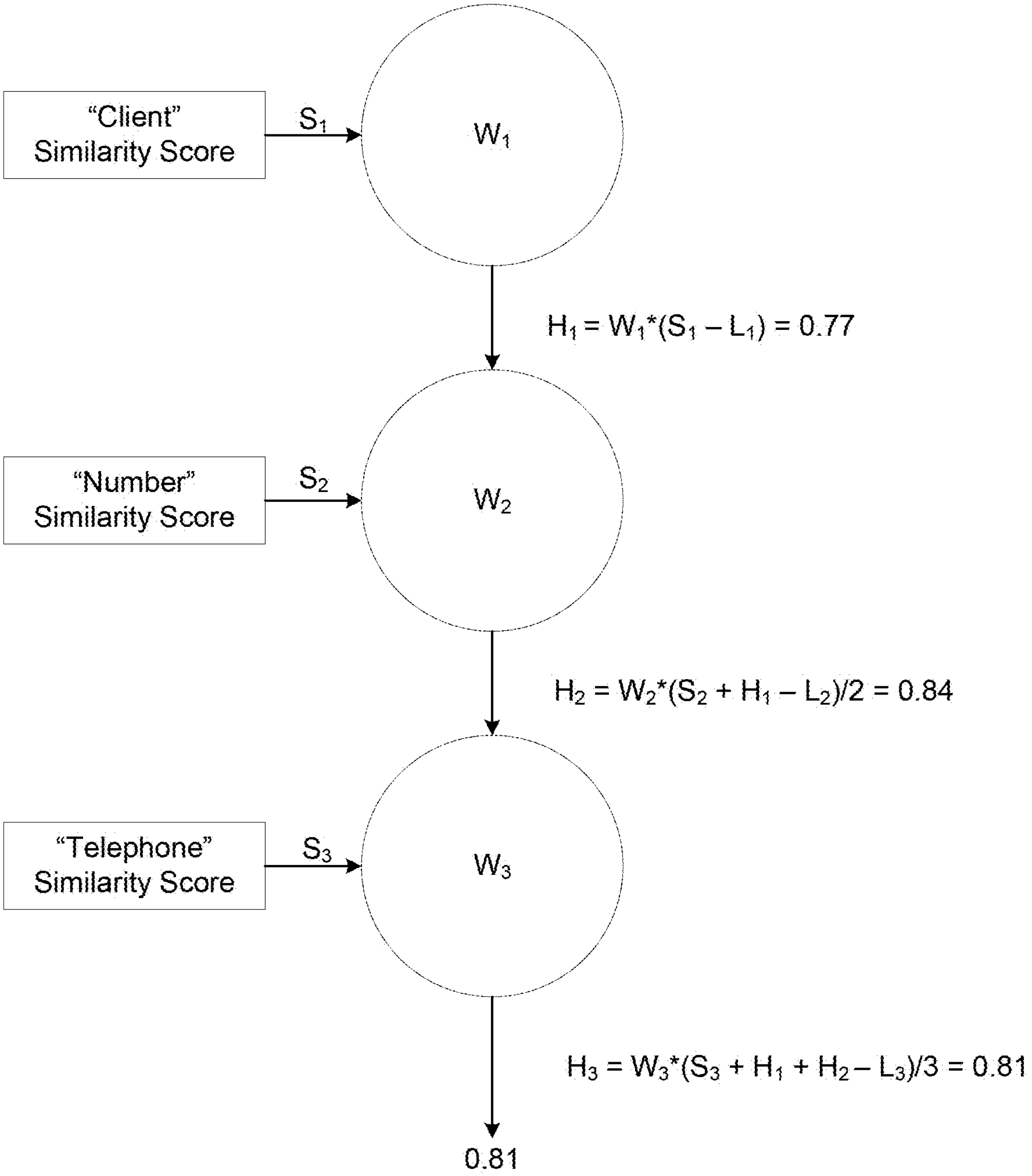
FIG. 14D shows an example of using the colocation scoring model to determine a score for a particular word collection “client number telephone”, according to some embodiments of the technology described herein.

FIG. 14D shows an example of using the colocation scoring model 1204A-1 to determine a score for the word collection "client number telephone", according to some embodiments of the technology described herein. The word colocation module 1204A determines an output of the colocation scoring model 1204A-1 for the word "client". The output is determined by: (1) determining a difference between the similarity score $S_1$ (0.95) and loss value $L_1$ of (0.18) associated with the subsequent word "number" in the collection; and (2) multiplying the difference by a weight parameter $W_1$, which is equal to 1 in this example. The word collection identification module 1404 identifies the loss by identifying the "client" target word in the language model 1404 and identifying the loss value of 0.18 indicated by the language model 1404 for the word "number" collocated with "client". As "client" is the first word in the collection, there is no previous output to incorporate into Equation (iii). Thus, the output $H_1$ is 0.77.

Next, the output for "client number" is determined. The output for "client number" is the product of (1) the weight $W_2$, which is equal to 1; and (2) the sum of the output $H_1$ for "client", the similarity score $W_2$ associated with "number", and the negative loss associated with "telephone". The loss indicated by the language model 1404 for the word "telephone" collocated with the target word "number" is 0. The output $H_2$ for "client number" is thus the sum of $S_2$ and $H_1$ divided by 2.

Next, the output for "client number telephone" is determined. There is no word in the collection after "telephone", thus the loss term $L_3$ is 0. The output is thus the product of (1) the weight $W_3$, which is equal to 1; and (2) the sum of the similarity score $S_3$ associated with "telephone" with the outputs $H_1$ and $H_2$ divided by the total number of words in the collection (i.e., 3). Accordingly, the score for the word collection "client number telephone" is 0.81. The word collections and their corresponding scores are provided to the word positioning module 1204B to be arranged into word sequences.

Figure 14E:
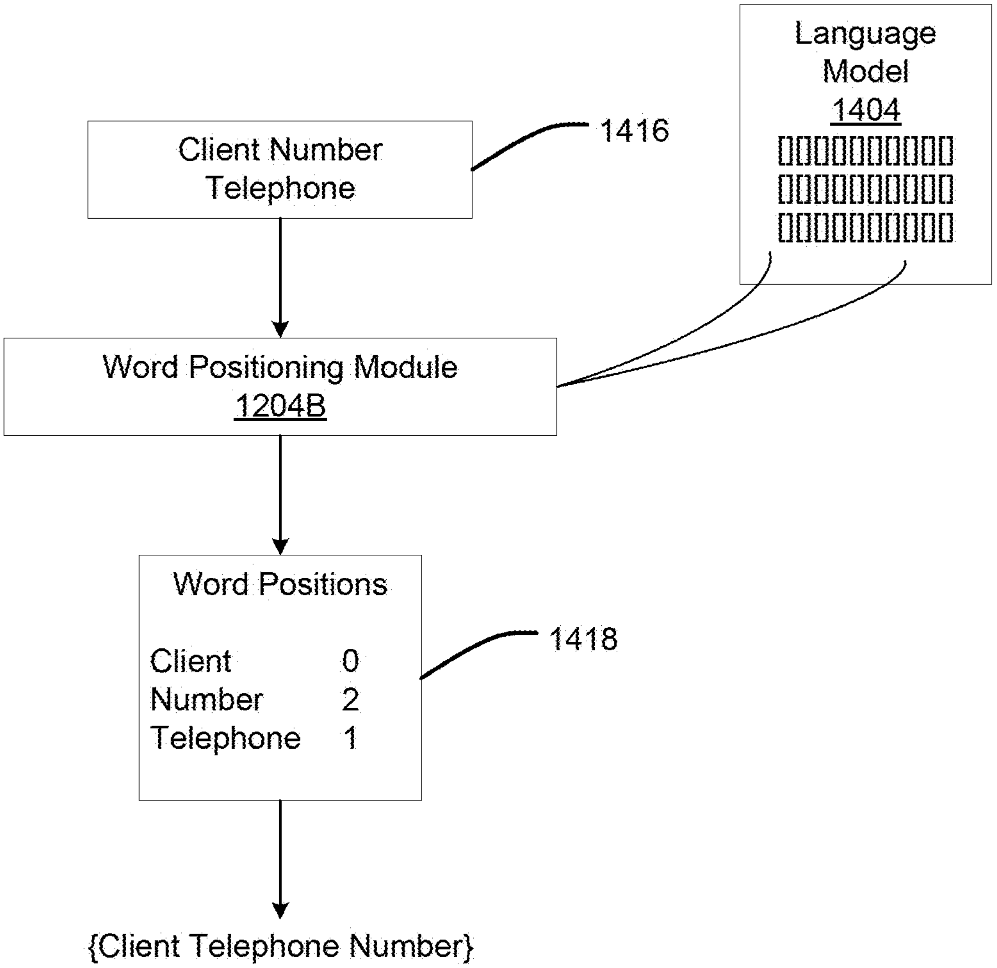
FIG. 14E shows an example of positioning words in a word collection to obtain a word sequence from which to generate a field label, according to some embodiments of the technology described herein.

FIG. 14E shows an example of the word positioning module 1204B arranging words in the sword collection "client number telephone" 1416 to obtain a word sequence from which to generate a field label, according to some embodiments of the technology described herein. In the example of FIG. 14E, the word positioning module 1204B identifies a sequence indicated by the language model 1404 in which the words of the word collection are collocated. As shown in FIG. 14B, the words are collocated in the sequence "client telephone number" associated with the target word "client" by the language model 1404. The language model 1404 indicates the mean position of the word "number" relative to the target word "client" across sequences from a set of text in which they co-occur, and the mean position the word "telephone" relative to the target word "client" across sequences from a set of text in which they co-occur. The word positioning module 1204B determines positions 1418 for each word in the word collection "client number telephone" based on the relative positions. The word positioning module 1204B determines that "client" is the first word (i.e., position 0) because both "number" and "telephone" are indicated by the relative positions of the language model 1404 to be after "client". The word "telephone" has an associated relative position of −1 and the word "number" has an associated relative position of −1.5. This indicates that "telephone" comes after the word "client" but before the word "number". Accordingly, the word positioning module 1204B determines that the word "telephone" is second (i.e., position 1) and that the word "number" is after "telephone" (i.e., position 2). The word positioning module 1204B thus generates the word sequence "client telephone number". This word sequence may describe data stored in the dataset field.

In some embodiments, the word positioning module 1204B may be configured to generate word sequences from multiple word collections provided by the word colocation module 1204A and select one of the word sequences to provide to the label promoter 1204C. The word positioning module 1204B may select a word sequence based on the scores provided by the word colocation module 1204A. As shown in FIG. 14C, the candidate word sequence with the highest associated score is "client telephone number".

In the example of FIGS. 14A-14E, the label promoter 1204C generates the field label 1406 "telephone number" using the word sequence "client telephone number". For example, the label promoter 1204C may identify the word "telephone" as a prime word and the word "number" as a classword. The label promoter 1204C may generate the field label 1406 as a combination of the prime word and the classword from the word sequence "client telephone number". Thus, the label promoter 1204C generates the field label 1406 to be "telephone number".

Figure 15A:
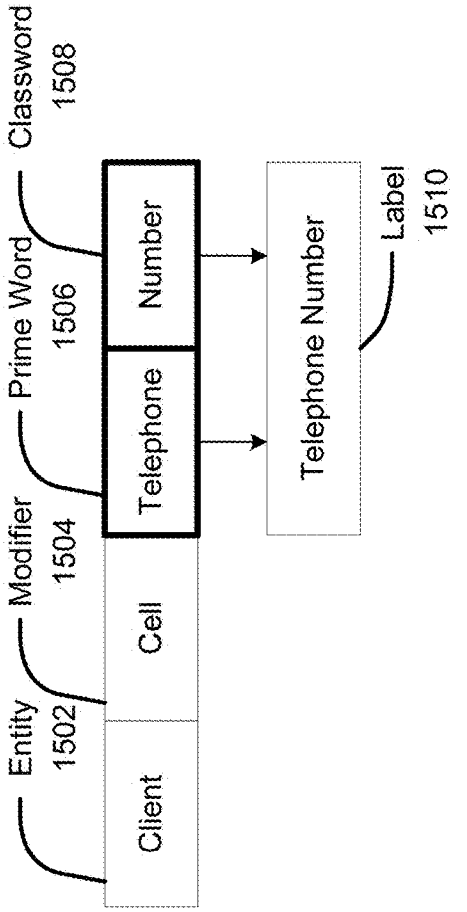
FIG. 15A shows an example of generating a field label from a word sequence “client cell telephone number”, according to some embodiments of the technology described herein.

FIG. 15A shows an example of generating a field label by the label promoter 1204C from a word sequence "client cell telephone number", according to some embodiments of the technology described herein. As illustrated in FIG. 15A, the label promoter 1204C categorizes each of the words in the word sequence "client cell telephone number". The label promoter 1204C categorizes "client" as an entity 1502, the word "cell" as a modifier 1504, the word "telephone" as a prime word 1506, and the word "number" as a classword 1508. In some embodiments, the label promoter 1204C may be configured to generate the field label as a combination of the prime word 1506 and the classword 1508. In the example of FIG. 15A, the label promoter 1204C generates the label 1510 to be "telephone number".

The word category identification and field label generation illustrated by FIG. 15A is an example technique that may be used for word sequences in English. In some embodiments, the label promoter 1204C may be configured to use a different categorization of words and/or generate a field label as a different combination of word categories. For example, the label promoter 1204C may generate the field label as the combination of the entity 1502 and the classword 1508. In some embodiments, the label promoter 1204C may be configured to use different word category identification and field label generation techniques for different languages.

Figure 15B:
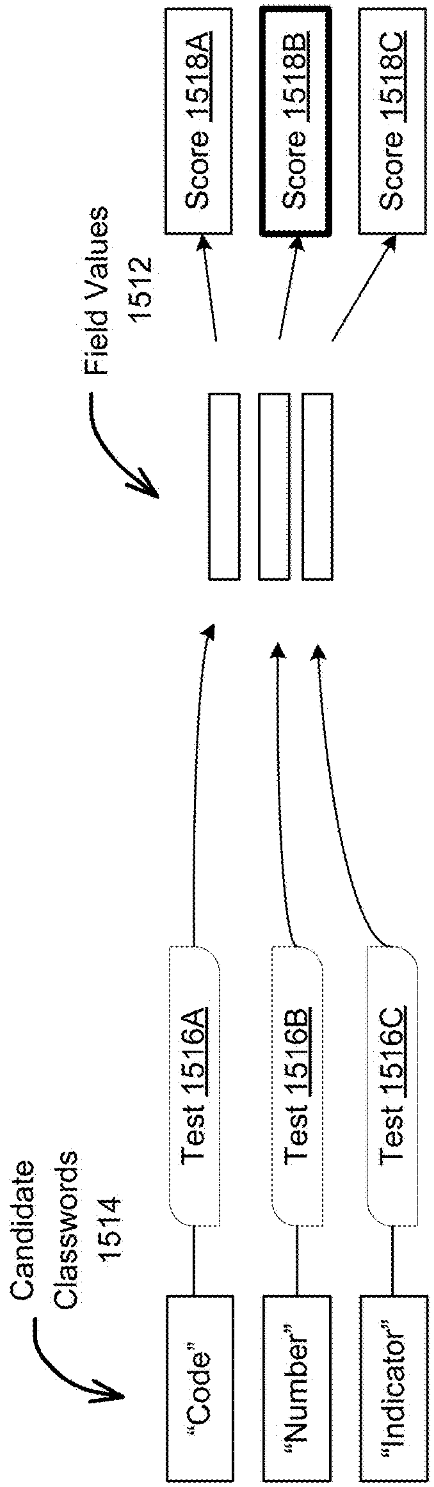
FIG. 15B shows an example of determining a classword for a field label using field values, according to some embodiments of the technology described herein.

FIG. 15B shows an example of determining a classword for a field label by the label promoter 1204C using field values, according to some embodiments of the technology described herein. As shown in FIG. 15B, the label promoter 1204C uses field values 1512 to determine a classword. The label promoter 1204C may be configured to generate a field label using the determined classword. For example, the label promoter 1204C may make the determined classword the last word in the field label.

In some embodiments, the label promoter 1204C may be configured to determine the classword using the field values 1512 by applying tests 1516A, 1516B, 1516C to the field values 1512. The tests 1516A, 1516B, 1516C are associated with respective candidate classwords 1514. The label promoter 1204C may be configured to apply a test to the field values 1512 by: (1) accessing information associated with the test (e.g., a regular expression, a set of reference values, a distribution of values, support of a distribution of values, and/or one or more rules); and (2) applying the test to the field values 1512 using the information to obtain a score for the test. The label promoter 1204C may be configured to select a classword associated with the test that yielded the highest score as a classword for the field label. In some embodiments, the label promoter 1204C may be configured to select one of the candidate classwords 1514 as the classword for the field label if at least one of the scores 1518A, 1518B, 1518C meets a threshold score. For example, the label promoter 1204C may determine to use the classword associated with the test to generate a field label when the score meets or exceeds a threshold value (e.g., a value between 0.7-1.0).

In some embodiments, the label promoter 1204C may be configured to apply a test to the field values 1512 by: (1) accessing a regular expression (e.g., a regular expression indicating a pattern of mm/dd/yyyy for a "date" field label) specified by the test; and (2) determining a score using the regular expression (e.g., by determining a number of the field values 1512 that match the regular expression). In some embodiments, the label promoter 1204C may be configured to determine the score using the regular expression by: (1) determining a percentage of the field values 1512 that match the regular expression; and (2) determining the score using the percentage of the field values 1512 that match the regular expression. For example, the label promoter 1204C may determine a percentage of the field values 1512 that match a regular expression indicating an expected pattern for a social security number and determine a score using the determined percentage.

In some embodiments, the label promoter 1204C may be configured to apply a test to the field values 1512 by: (1) accessing a set of reference values (e.g., the integer values 1-12 for a "month" field label) specified by the test; and (2) determining a score using the set of reference values and the field values 1512 (e.g., by determining a number of the field values 1512 that are included in the set of reference values). In some embodiments, the label promoter 1204C may be configured to determine the score by: (1) determining whether each of the field values 1512 is in the set of reference values; and (2) determining the score based on a number of the selected field values are included in the set of reference values. In some embodiments, the set of reference values may be an enumerated set of values. For example, the dataset field may store an indication of a state in the United States of America (USA) and the set of reference values may be a list of the 50 codes for states in the USA. The label promoter 1204C may determine a percentage of the field values 1512 that are in the list of 50 codes and determine a score for the field label using the determined percentage. If the label promoter 1204C determines that the score meets or exceeds a threshold, the label promoter 1204C may determine to use a classword "code" associated with the test to generate a field label (e.g., by making the classword the last word in the field label).

In some embodiments, the label promoter 1204C may be configured to apply a test to the field values 1512 by: (1) accessing a distribution of values specified by the test (e.g., a distribution defined on the values 1-31 that is associated with a field label "day of the month"; (2) comparing the distribution specified by the test to a distribution defined on the field values 1512. The label promoter 1204C may be configured to determine the score based on a result of the comparison. For example, the label promoter 1204C may compare the distribution specified by the test to the distribution defined on the field values 1512 using a chi-squared test, and determine the score associated with the field label using the result of the chi-squared test.

In some embodiments, the label promoter 1204C may be configured to apply a test to the field values 1512 by: (1) accessing a set of values specified by the test; and (2) comparing a support of the set of values to a support of the field values 1512. The label promoter 1204C may be configured to determine the score based on the comparison. For example, the label promoter 1204C may determine a ratio of the support of the field values 1512 to the support of the distribution specified by the test and determine the score using the ratio. To illustrate, the support for a distribution specified by a test for "gender" may be male, female, other, and unknown while the support for the field values 1512 may be male and other. The label promoter 1204C may determine a support ratio of 0.5 and determine the score for the field label using the support ratio.

In some embodiments, the label promoter 1204C may be configured to apply a test to the field values 1512 by: (1) accessing one or more rules specified by the test; and (2) determining a percentage of the field values 1512 that meet the rule(s) (e.g., by determining a percentage of the field values 1512 for which logical statement(s) indicating the rule(s) are true). The label promoter 1204C may be configured to determine the score for the test based on the percentage of the field values 1512 that meet the rule(s). For example, a rule specified by test for "age" may require values to be greater than greater than 0 and less than 200. The label promoter 1204C may determine a percentage of the field values 1512 that are within the range required by the rule and determine the score for the test based on the percentage of the field values 1512 that are within the range.

Figure 16A:
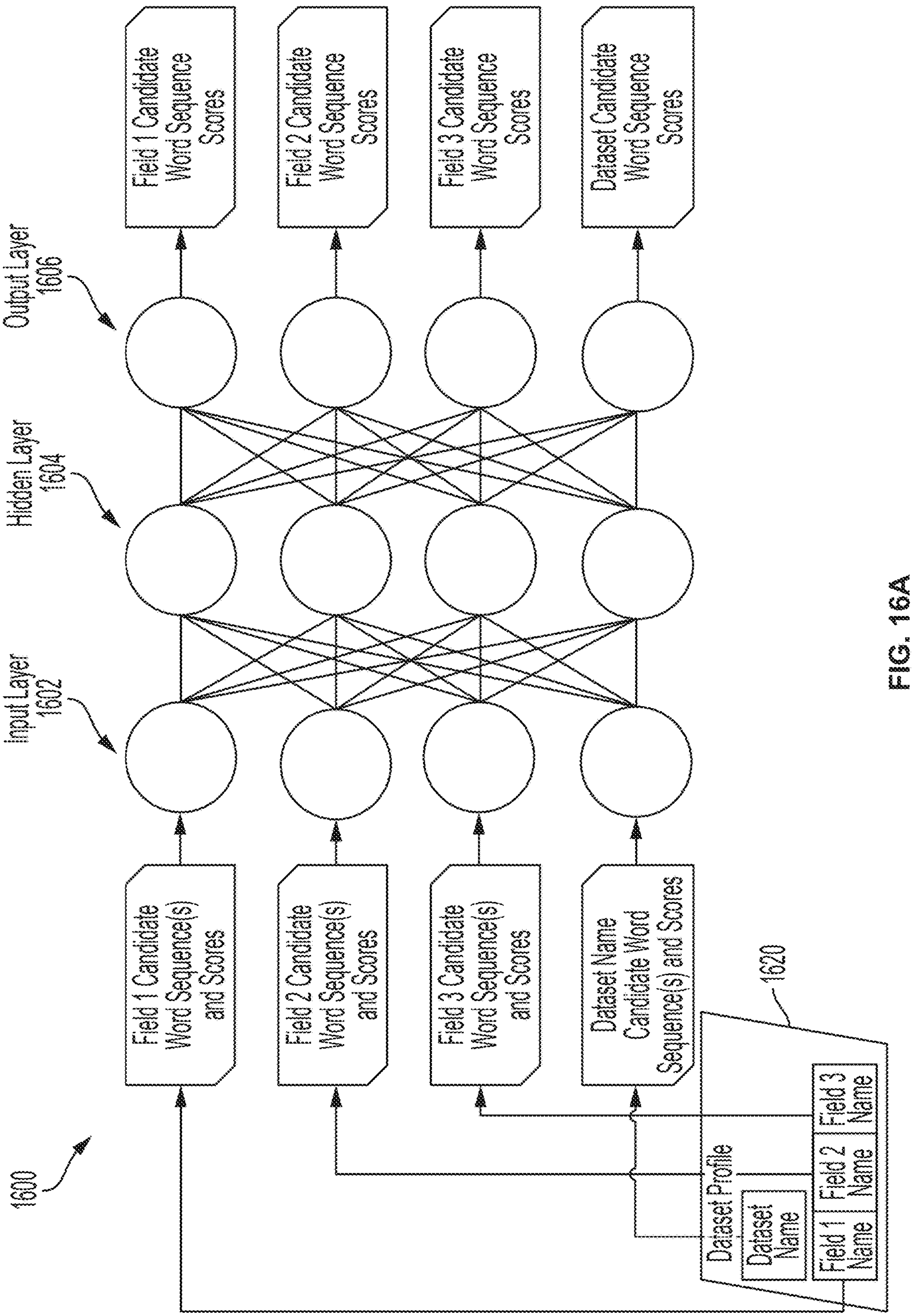
FIG. 16A shows an example colocation scoring model that may be used to score candidate word collections generated for a field in a dataset using the context of names of neighboring fields and the dataset, according to some embodiments of the technology described herein.

FIG. 16A shows an example of a contextual scoring model 1600 that may be used to score candidate word sequences generated by the word positioning module 1204B described herein with reference to FIGS. 12A-12B, according to some embodiments of the technology described herein. The contextual scoring model 1600 may be used to determine context-adjusted scores for candidate word sequences generated from the word collections by the word positioning module 1204B. The contextual scoring model 1600 uses the context of names of neighboring fields and the name of the dataset. In particular, the contextual scoring model 1600 of FIG. 16A may determine a score for a candidate word sequence of a field in a dataset using context about candidate word sequence(s) associated with the neighboring field(s) in the dataset and candidate word sequence(s) associated with the name of the dataset. As illustrated in the example of FIG. 16A, in some embodiments, the dataset name and field names may be obtained from a dataset profile 1620 storing information about the dataset.

As shown in FIG. 16A, the colocation scoring module 1600 includes an input layer 1602 which processes candidate word sequences associated with respective fields of a dataset, and the name of the dataset. The input layer 1602 includes a node corresponding to each dataset field and a node corresponding to the dataset name. Each of the nodes may receive one or more candidate word sequences and corresponding scores (e.g., output by the word positioning module 1204B) determined for a field name or database name. Thus, the input layer 1602 includes a first node that receives the candidate word sequence(s) and scores determined for the name of field 1, a second node that receives the candidate word sequence(s) and scores determined for the name of field 2, a third node that receives the candidate word sequence(s) and scores determined for the name of field 3, and a fourth node that receives the candidate word sequence(s) and scores determined for the name of the dataset.

As shown in FIG. 16A, the contextual scoring model 1600 includes a hidden layer 1604. The hidden layer 1604 may be configured to score combinations of candidate word sequences received by the input layer 1602 according to the language model 1159. The hidden layer 1604 includes a node corresponding to each node of the input layer 1602. Each node of the hidden layer 1604 may output, for each candidate word sequence output by a corresponding node of the input layer 1602, values for combinations of the candidate word sequences with candidate word sequences output by other nodes of the input layer 1602. The values may indicate whether the combination of candidate word sequences is collocated by the language model 1159. In some embodiments, each of the values may be a value indicating a likelihood that the combination of word sequences is collocated. For example, the value may be a binary value where 1 indicates that the combination of word sequences is collocated and 0 indicates that the combination of word sequences is not collocated. As another example, the value may be a value between 0 to 1 indicating a likelihood that the combination of word sequences is collocated.

As shown in FIG. 16A, the contextual scoring model 1600 includes an output layer 1606. The output layer 1606 includes multiple nodes that each output scores for candidate word sequences associated with one of the fields or the dataset. In this example, the output layer 1606 includes a node that outputs scores for candidate word sequences of field 1, a node that outputs scores for candidate word sequences of field 2, a node that outputs scores for candidate word sequences of field 3, and a node that outputs scores for candidate word sequences of the dataset. In some embodiments, each node of the output layer 1606 may be configured to use output of the hidden layer 1604 to determine the output candidate word sequence scores. If the values output by the hidden layer 1604 indicate that a candidate word sequence is collocated with candidate word sequences of other fields, then the node may output a score of the candidate word sequence received by the input layer 1602. If the values output by the hidden layer 1604 indicate that the candidate word sequence is not collocated with candidate word sequences of other fields, then the node may reduce the score output for the candidate word sequence by the input layer 1602. For example, the node may output a score of 0 for the candidate word sequence. As another example, the node may reduce the score of the candidate word sequence by a factor (e.g., by a percentage between 0-5%, 5-10%, 10-20%, 20-30%, 30-40%, 40-50%, 50-60%, 60-70%, 70-80%, 80-90%, or 90-100%).

A word sequence for the fields of the dataset may be selected (e.g., to provide to the label promoter 1204C of the label generator 1102A) based on scores output by the output layer 1606. Accordingly, the contextual scoring model 1600 may be a dataset context-based filter for candidate word sequences identified for fields of the dataset.

Figure 16B:
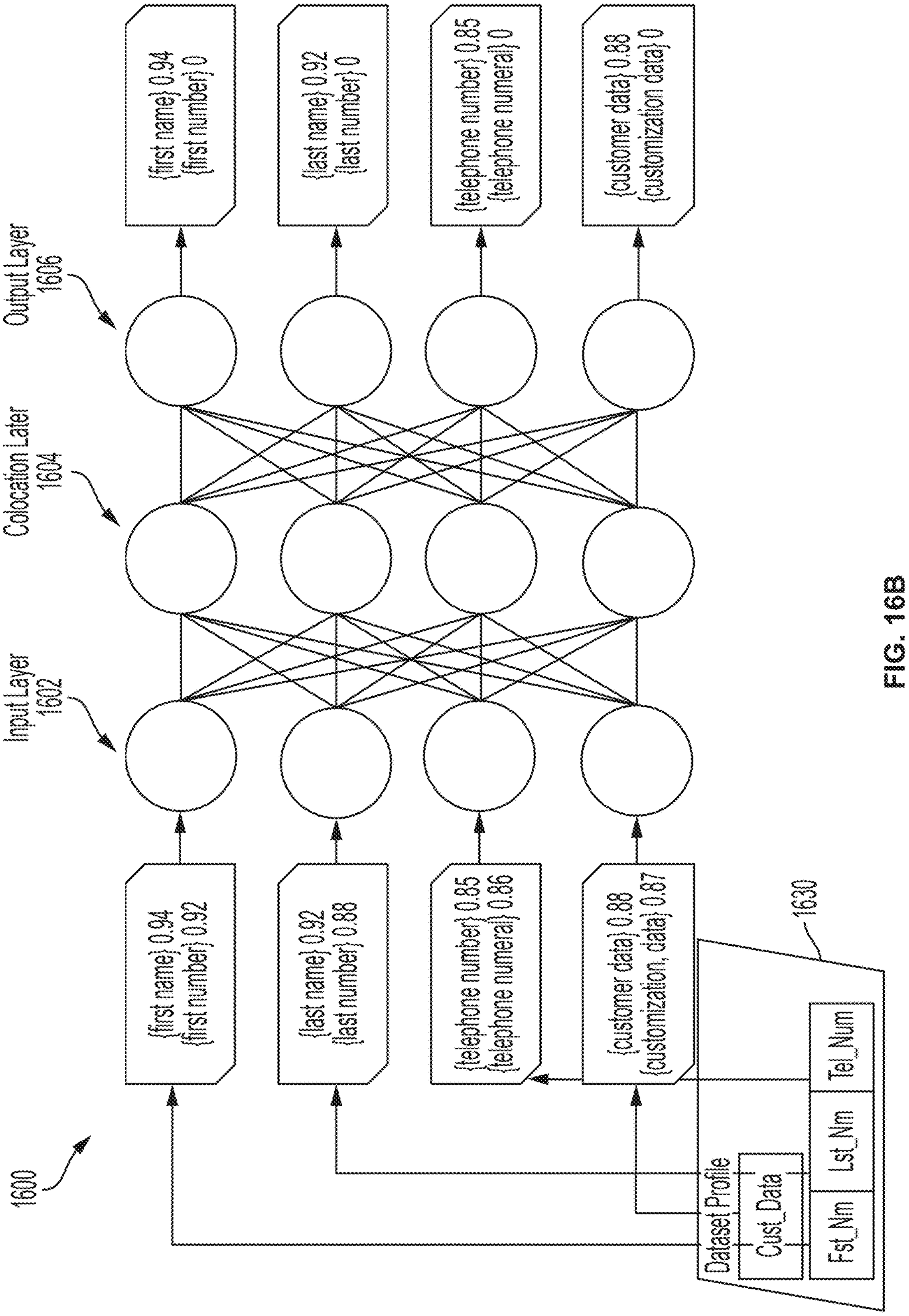
FIG. 16B shows an example of using the colocation scoring model of FIG. 16B to determine scores for word collections identified for a set of neighboring fields in a dataset, according to some embodiments of the technology described herein.

FIG. 16B shows an example of using the contextual scoring model 1600 to determine scores for word sequences identified for the fields "Fst_Nm", "Lst_Nm", and "Tel_Num" in the dataset "Cust_Data", according to some embodiments of the technology described herein. The candidate word sequences for the field "Fst_Nm" are {first name} and {first number}, the candidate word sequences for the field "Lst_Nm" are {last name} and {last number}, the candidate word sequences for the field "Tel_Num" are {telephone number} and {telephone numeral}, and the candidate word sequences for the dataset "Cust_Data" are {customer data} and {customization data}. As shown in FIG. 16B, each of the candidate word sequences determined for a field have an associated score determined by the label generator 1102A (e.g., output by the word positioning module 1204B of the label generator 1102A).

The hidden layer 1604 may be configured to determine values indicating whether different combinations of word sequences are collocated according to the language model 1159. In the example of FIG. 16B, the hidden layer 1604 may determine that the word sequences {first number}, {last number}, {telephone numeral}, and {customization data} are not collocated with any other candidate word sequences. For example, the hidden layer 1604 may output values of 0 corresponding to word sequence combinations including those word sequences. The output layer 1606 uses the output of the hidden layer 1604 to output scores for the different candidate word sequences. In the example of FIG. 16B, the output layer 1606 outputs a score of 0.94 for the candidate word sequence {first name}, a score of 0.92 for the candidate word sequence {last name}, a score of 0.85 for the candidate word sequence {telephone number}, and a score of 0.88 for the candidate word sequence {customization data}. The output layer 1606 outputs scores of 0 for the word sequences {first number}, {last number}, {telephone numeral}, and {customization data} because they are not collocated with other candidate word sequences as indicated by the output of the hidden layer 1604.

A word sequence may be selected for each of the fields of the "Cust_Data" dataset using the scores output by the output layer 1606. For example, the word sequence having the highest score may be selected (e.g., to provide to the label promoter 1204C for generation of a field label). Thus, the selected word sequence for the field "Fst_Nm" may be {first name}, the selected word sequence for the field "Lst_Nm" may be {last name}, the selected word sequence for the field "Tel_Num" may be {telephone number}, and the selected word sequence for the dataset "Cust_Data" may be {customer data}.

Figure 17:
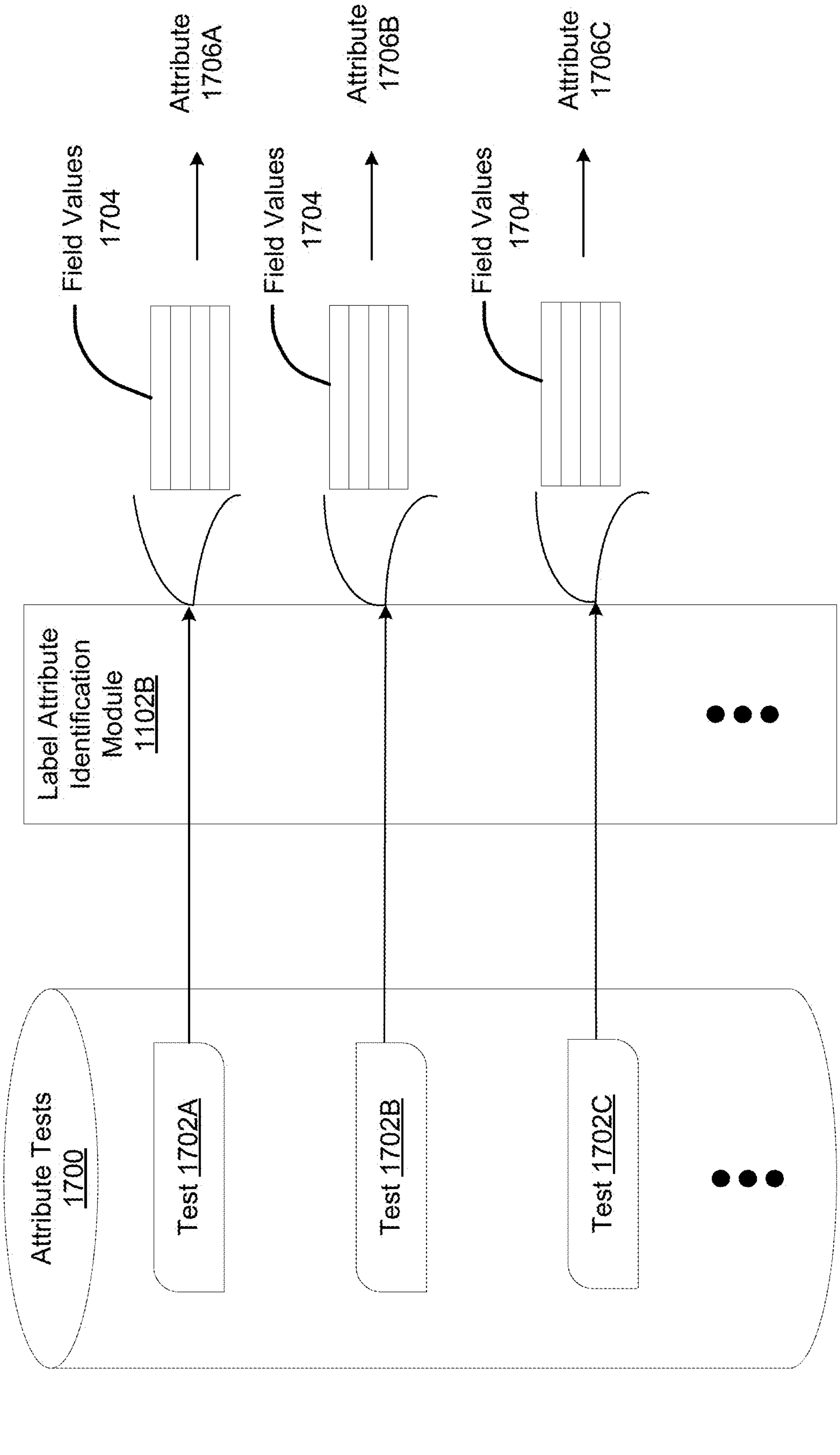
FIG. 17 shows an example operation of label attribute identification module of the field label generation module of FIGS. 11A-11B, according to some embodiments of the technology described herein.

FIG. 17 shows an example operation of label attribute identification module 1102B of the field label generation module 1102 of FIGS. 11A-11B, according to some embodiments of the technology described herein. As illustrated in FIG. 17, the label attribute identification module 1102B may be configured to determine attributes of a dataset field using field values 1704 from the dataset field. The label attribute identification module 1102B may be configured to apply various tests that produce results indicating the attributes. In the example of FIG. 17, the label attribute identification module 1102B applies tests 1702A, 1702B, 1702C to the field values 1704. The label attribute identification module 1102B applies test 1702A to the field values 1704 to obtain attribute 1706A, applies test 1702B to the field values 1704 to obtain attribute 1706B and applies test 1702C to the field values to obtain attribute 1706C.

Examples of attributes that may be determined from application of the tests 1702A, 1702B, 1702C to the field values 1704 include a requirement attribute indicating whether a value is required for the field, a uniqueness attribute indicating whether each value of the field is unique relative to other values of the field, a code attribute indicating a code set (e.g., U.S. state codes) from which values of the field are selected, and/or other attributes. In some embodiments, the attribute values may be metadata about a dataset field.

In some embodiments, the label attribute identification module 1102B may be configured to use the attributes 1706A, 1706B, 1706C to populate a data entity definition and/or instance thereof associated with a field label. For example, the label attribute identification module 1102B may use the attributes 1706A, 1706B, 1706C to determine attributes of a data entity definition and/or values of the attributes in instances of the data entity definition. Assigning the field label to a dataset field may automatically associate the data entity definition and/or instance thereof with the dataset field.

Figure 18A:
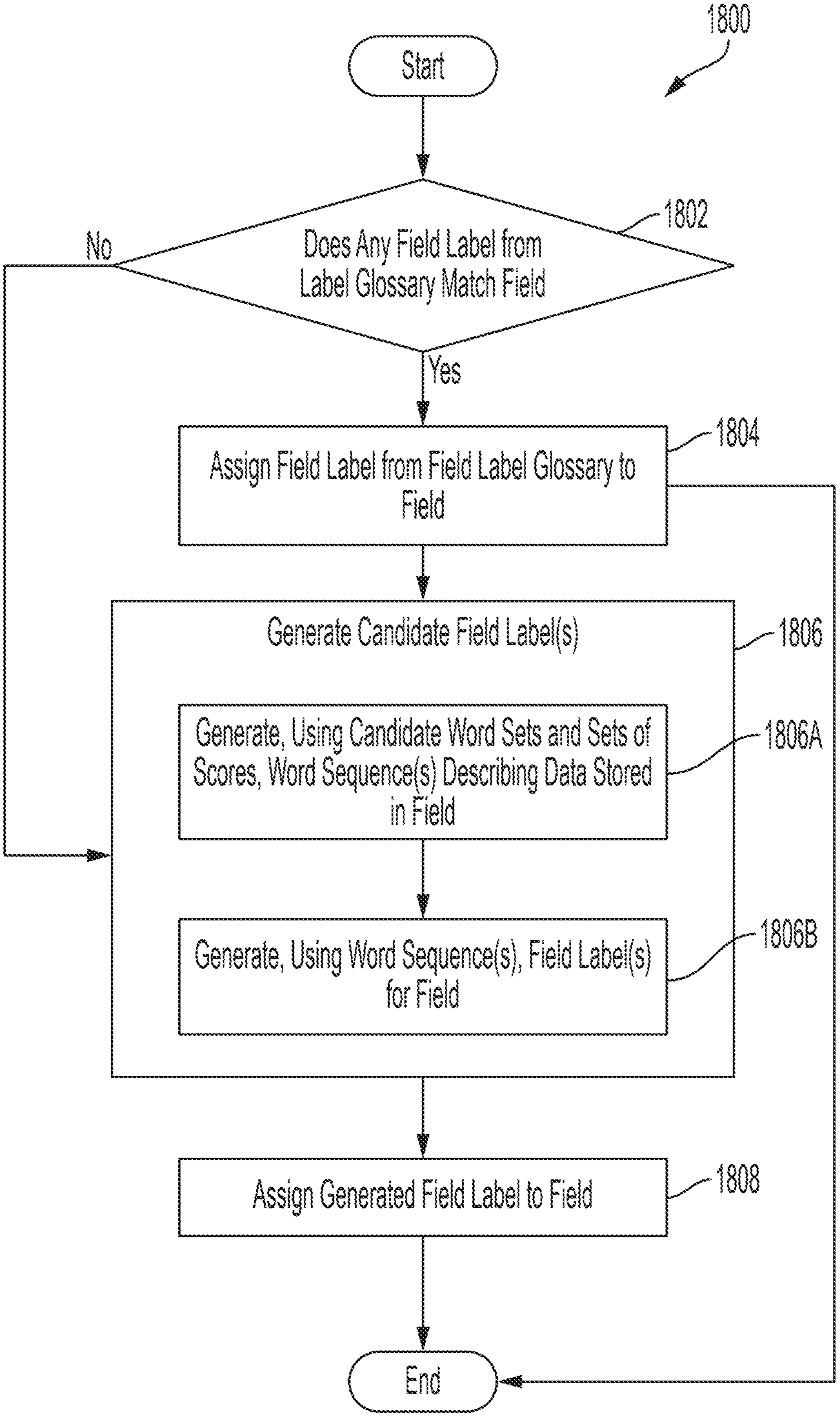
FIG. 18A shows an example process for assigning a field label to a field of a dataset, according to some embodiments of the technology described herein.

FIG. 18A shows a process 1800 for assigning a field label to field of a dataset, according to some embodiments of the technology described herein. Process 1800 may be performed by any suitable computing device. In some embodiments, process 1800 may be performed by data processing system 1100 described herein with reference to FIGS. 11A-11B.

Process 1800 begins at block 1802 where the system performing process 1800 determines whether any field label from a field label glossary (e.g., field label glossary 104) match the field. An example process for determining whether any field label from the field label glossary matches the field is described herein with reference to FIG. 18B. Determining whether any field label from the field label glossary matches the field involves obtaining candidate word sets and corresponding scores (e.g., by performing blocks 1002-1006 of process 1000 described herein with reference to FIG. 10), and determining whether any field label from the field label glossary matches the field using the candidate word sets and corresponding scores. If it is determined that a field label from the field label glossary matches the field then process 1800 proceeds to block 1804, where the system assigns one of the field labels from the field label glossary to the field. The process of assigning a label to the field would then end.

If at block 1802 the system determines that none of the field labels in the field label glossary match the field, then process 1800 proceeds to block 1806, where the system generates one or more new candidate field labels for the field. As shown in FIG. 18A, the block 1806 includes two sub-blocks 1806A, 1806B.

At block 1806A, the system generates, using candidate word sets and corresponding sets of scores (e.g., candidate word sets and scores 1402 described herein with reference to FIG. 14A) one or more word sequences describing data stored in the field. As described herein with reference to FIG. 12B, the system may combine words from the candidate word sets to obtain candidate word collections, select one or more of the candidate word collections, and generate word sequence(s) using the selected candidate word collection(s). The system may be configured to select the candidate word collection(s) from which to generate the word sequence(s) by: (1) determining a score for each candidate word collection using the scores (e.g., similarity scores) associated with each word in the candidate word collection; and (2) selecting the candidate word collection(s) from which to generate the word sequence(s) using the scores. An example process for generating a word sequence describing data stored in a field is described herein with reference to FIG. 18C.

Next, at block 1806B, the system generates, using the word sequence(s), field label(s) that are not in the field label glossary. In some embodiments, the system may be configured to make an entire word sequence a new field label. In some embodiments, the system may be configured to select a portion of a word sequence as a field label. For example, the system may select a prime word and a classword of the word sequence as the field label (e.g., as described herein with reference to FIG. 15A). In some embodiments, the system may be configured to select a portion of a word sequence based on a language of the field label. For example, the system may select one portion of a word sequence for an English field label and a different portion of the word sequence for a Spanish field label. The system may be configured with logic that selects a portion of the word sequence according to the target language of the field label.

In some embodiments, the system may be configured to generate a portion of a field label using field values from the field. The system may be configured to: (1) apply tests associated with candidate words for the portion of the new field label to the field values to obtain test scores; and (2)

select one of the candidate words for the portion of the new field label using the test scores. For example, as described herein with reference to FIG. 15B, the system may apply tests associated with candidate classwords to the field values to obtain test scores and select a classword associated with the highest test score to be part of the field label. For example, the system may make the classword the last word in the field label.

After generating the new candidate field label(s) at block 1806, process 1800 proceeds to block 1808, where the system assigns a generated field label to the field. In some embodiments, the system may be configured to assign the field label to the field based on user input. The system may be configured to: (1) present the generated candidate field label(s) to a user in a GUI; (2) receive input indicating a selection of one of the generated candidate field label(s); and (3) assign the selected generated candidate field label to the field. In some embodiments, the system may be configured to automatically assign one of the generated field label(s) to the field. For example, the system may select a generated field label based on scores associated with word collections from which the field label(s) were generated. The system may assign the generated field label with the highest associated score to the field.

In some embodiments, process 1800 may be performed for multiple fields in a dataset. In some embodiments, process 1800 may be repeated on fields of a dataset to update labeling. Labeling results may be different in different iterations due to learning of the model based on assignment feedback and or changes in field values.

Figure 18B:
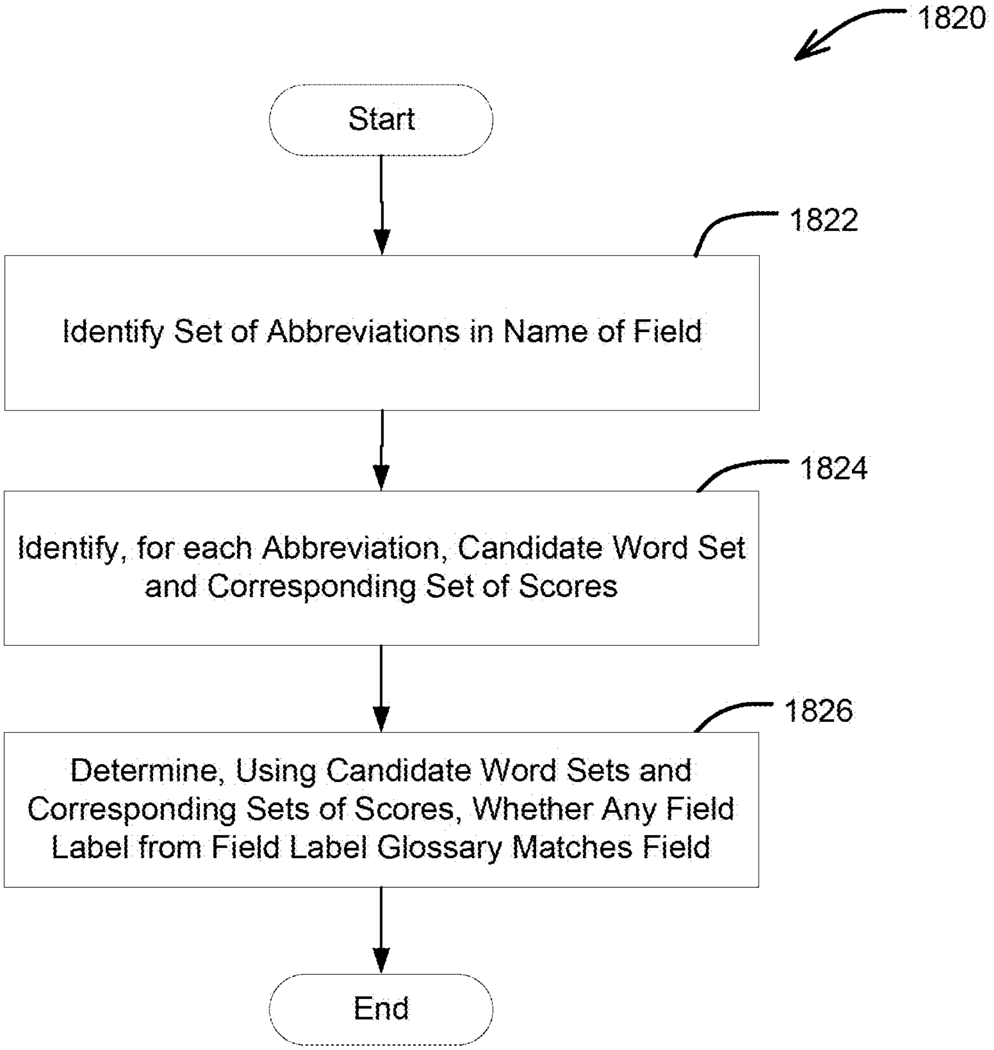
FIG. 18B shows an example process for determining whether any field label from a field label glossary matches a field, according to some embodiments of the technology described herein.

FIG. 18B shows an example process 1820 for determining whether any field label from a field label glossary (e.g., field label glossary 104 described herein with reference to FIG. 2A) matches the field. In some embodiments, process 1820 may be performed at block 1802 of process 1800 described herein with reference to FIG. 18A. Process 1820 may be performed by any suitable computing device. In some embodiments, process 1820 may be performed by the data processing system 1100 described herein with reference to FIGS. 11A-11B.

Process 1820 begins at block 1822, where the system performing process 1820 identifies a set of abbreviations in a name of a field. An example process for identifying a set of abbreviations in the name of the field is described herein with reference to block 902 of FIG. 9.

Next, process 1820 proceeds to block 1824, where the system identifies, for each abbreviation, a candidate word set and corresponding set of scores. An example process for determining, for each abbreviation, the candidate word set and the corresponding set of scores is described herein with reference to block 1004 of FIG. 10.

Next, process 1820 proceeds to block 1826, where the system determines, using the candidate word sets and the set of scores to determine whether any field label from a field label glossary matches the field. In some embodiments, the system may be configured to determine whether any field label from the field label glossary matches the field by: (1) determining scores for the field labels in the field label glossary; and (2) determining whether any of the field labels match the field using the scores. An example process for determining scores for the field labels is described herein with reference to FIG. 8. For example, the system may determine scores for the field labels by analyzing the name of the field and data stored in the field to obtain the scores.

In some embodiments, the system may be configured to determine whether any of the field labels from the field label glossary match the field using the corresponding scores by: (1) determining whether any of the scores meet or exceed a threshold score; and (2) determining that none of the field labels match the field when none of the field labels have corresponding scores that meet or exceed the threshold score. In some embodiments, the threshold score may be a value in the range 0.5-0.6, 0.6-0.7, 0.7-0.8, 0.8-0.9, or 0.9-1.0). For example, the threshold score may be 0.7. In some embodiments, the threshold score may be a configurable parameter that is adjustable based on user input. The system may be configured to adjust the threshold score based on the user input. For example, the system may receive, through a GUI, a user input indicating a threshold score. When the system determines that none of the field labels from the field label glossary match the field, the system may proceed to generate a new field label to assign to the field (e.g., as described at blocks 1806-1808 described herein with reference to FIG. 18A). When the system determines that at least one field label from the field label glossary meets or exceeds the threshold score, the system may proceed to assign a field label from the field label glossary to the field (e.g., as described at block 1804 described herein with reference to FIG. 18A).

Figure 18C:
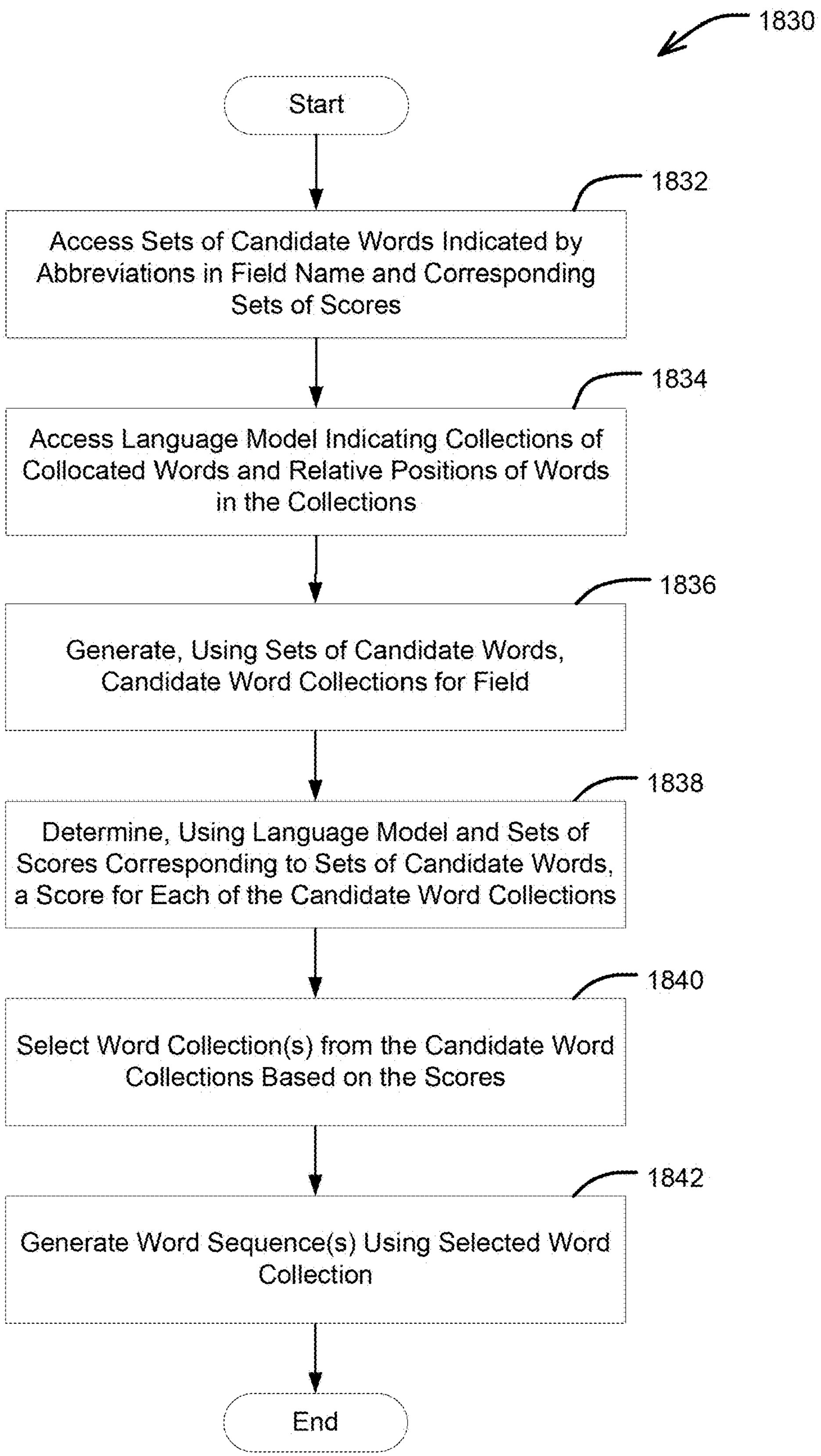
FIG. 18C shows an example process for generating one or more word sequences describing data stored in a field, according to some embodiments of the technology described herein.

FIG. 18C describes an example process 1830 for generating one or more word sequences describing data stored in a field, according to some embodiments of the technology described herein. In some embodiments, process 1830 may be performed at block 1806A of process 1800 described herein with reference to FIG. 18A. Process 1830 may be performed by any suitable computing device. In some embodiments, process 1830 may be performed by data processing system 1100 described herein with reference to FIGS. 11A-11B.

Process 1830 begins at block 1832, where the system accesses sets of candidate words indicated by abbreviations in the name of the field and corresponding sets of scores. An example technique for identifying a set of abbreviations in the name of the field is described herein with reference to block 902 of FIG. 9. An example technique for determining, for each abbreviation, the candidate word set and the corresponding set of scores is described herein with reference to block 1004 of FIG. 10. The candidate word sets and corresponding sets of scores may be obtained using these techniques.

Next, process 1830 proceeds to block 1834, where the system accesses a language model (e.g., language model 1159 described herein with reference to FIG. 13) indicating collections of collocated words and relative positions of words in the collections. In some embodiments, the system may be configured to access the language model by accessing parameters of the language model from memory of the system. For example, the system may read values from the language model. In some embodiments, the system may be configured to access the language model by querying another system storing the language model for information from the model. For example, the system may query the system for values from the language model.

Next, process 1830 proceeds to block 1836, where the system generates, using the sets of candidate words, candidate word collections for the field. In some embodiments, the system may be configured to generate the candidate word collections by combining words from the sets of candidate words to obtain the candidate word collections. The system may be configured to: (1) select a word from each of the sets of candidate words; and (2) combine the words selected from the sets of candidate words to obtain a candidate word collection. In some embodiments, the system may be configured to generate all combinations words from the candidate word sets as the candidate word collections for the field. An example of generating candidate word collections is illustrated in FIG. 14C.

Next, process 1830 proceeds to block 1838, where the system determines, using the language model and sets of scores corresponding to the sets of candidate words, a score for each of the candidate word collections. In some embodiments, the system may be configured to use a colocation scoring model (e.g., colocation scoring model 1204A-1 and/or contextual scoring model 1600 described herein with reference to FIGS. 16A-16B) to determine scores for the candidate word collections. The colocation scoring model may utilize information from the language model to determine scores for candidate word collections. Example techniques of how the system may use the colocation scoring model and the language model to determine a score for a candidate word collection are described herein with reference to FIGS. 12A-14D and 16A-16B.

Next, process 1830 proceeds to block 1840, where the system selects one or more word collections from the candidate word collections based on the scores. In some embodiments, the system may be configured to select a word collection with the highest associated score to use in generation of a word sequence. In some embodiments, the system may be configured to select one or more word collections that meet or exceed a threshold word collection score to use in generating the word sequence(s). The threshold word collection score may be a value in the range 0.5-0.6, 0.6-0.7, 0.7-0.8, 0.8-0.9, or 0.9-1.0. For example, the system may select word collection(s) from the candidate word collections that have an associated score of at least 0.7, In some embodiments, the system may be configured to select a particular number (e.g., 1, 2, 3, 4, 5, 6, or another number) of the highest scoring candidate word collections to use in generating the word sequence(s).

Next, process 1830 proceeds to block 1842, where the system generates a respective word sequence using each of the selected word collection(s). In some embodiments, the system may be configured to generate a word sequence using a given selected word collection by arranging words in the word collection into a particular order. The system may be configured to determine the particular order using a language model (e.g., language model 1159). The system may be configured to determine the particular order of the words by: (1) identifying collections of collocated words indicated by the language model in which words of the word collection occur; (2) determining relative positions of the words in the identified collections of collocated words indicated by the language model; and (3) arranging the words in the word collection according to the relative positions. The relative positions of the words indicated by the language model may be determined by the order of the words in a set of text from which the language model was generated. Example position information that may be indicated by the language model is described herein with reference to FIGS. 13 and 14B. Example techniques for arranging words in the word collection are described herein with reference to the word positioning module 1204B in FIGS. 12B, 14A, and 14E. As an illustrative example, the system may arrange the words in the word collection {client, number, telephone} into the word sequence {client telephone number}.

Example Measure of Similarity

Described herein is an example measure of similarity that may be used in some embodiments. In some embodiments, the measure of similarity may be used to determine a similarity score between two strings. For example, the measure of similarity may be used to determine a similarity score between an abbreviation and candidate words that may be indicated by the abbreviation. In some embodiments, the measure of similarity may be used by the data processing system 100 (e.g., by field name segmentation module 152 of data recognition module 102) to determine a set of candidate words that may be indicated by a field name portion (e.g., an abbreviation) and a corresponding set of similarity scores.

In some embodiments, the measure of similarity may be based on the characters of the two strings being compared and the order of the characters in the two strings. The measure of similarity may comprise multiple component measures of similarity. The measure of similarity may be determined as a combination of the component measurements of similarity. For example, the measure of similarity may be a weighted sum of the component measures of similarity. Example component measures of similarity include cosine similarity, Otsuka-Ochiai coefficient, Jaro-Winkler similarity, and Jaro-Winkler similarity modified to scale based on common suffix instead of a common suffix. In some embodiments, a measure of similarity may be determined between two strings using numerical representations of the strings. For example, each string may be represented as a numerical vector. A numerical vector representation of a string may represent characters in a string and their order.

For two strings a and b (e.g., where a is a field name portion (e.g., an abbreviation) and b is a candidate word represented by the field name portion), let $a_1$ be the string a with its vowels removed and let $b_1$ be the string b with its vowels removed. Let $a_2$ be the stemmed version of string a and let $b_2$ be the stemmed version of string b. cosine(a, b) denotes the cosine similarity between the strings a and b. Each of equations (iv)-(vii) below is a component measure of similarity that is used in determining the measure of similarity.

(iv)

$$S_{raw}(a, b) = \frac{S(a, b) + S(a_1, b_1) + S(a_2, b_2)}{3},$$

where S(x, y)=cosine(x, y)−Loss(x, y)

(v) Loss(x, y) is a measure of the degree to which letters in the strings x and y have the same order.

$$\text{Loss}(x, y) = \left(\frac{2}{N}\right)\sum_{i=1}^{N} |Wx - Wy|^2$$

where Wx is the index of common letters in the string x and Wy is the index of common letters in the string y.

(vi) J(a, b) is the Jaro-Winkler similarity between a and b. This indicates a degree to which prefixes match between the two strings.

(vii) $J_s$(a, b) is the Jaro-Winkler similarity modified to adjust similarity of the two strings based on the length of a common suffix of the two strings a and b, instead of a common prefix. This indicates the degree to which suffixes match between the two strings.

The modified Jaro-Winkler similarity $J_s$(a, b) may be defined by equation (viii) below.

(viii) $J_s(a,b)=S_j(a,b)+\alpha L(1-S_j)$ where $S_j$(a, b) is the Jaro similarity between the strings a and b, a is a scaling factor (e.g., a value between 0.0 and 0.25), and L is the length of a matching suffix between strings a and b up to a maximum of 4 characters.

The measure of similarity between two strings a and b is given by equation (ix) below. The measure of similarity is a function of multiple different component similarities. The measure of similarity $S_{raw}$ is determined using a cosine similarity between the two strings, a cosine similarity between vowelless versions of the two strings, a cosine similarity between stemmed versions of the two strings, and differences in order of characters between the two strings, the vowelless versions of the two strings, and the stemmed versions of the two strings. The similarity given by equation (ix) is further based on a degree to which prefixes of the two strings match because it incorporates the Jaro-Winkler similarity measure J(a, b) and on a degree to which suffixes of the two strings match because it incorporates the modified Jaro-Winkler similarity measure $J_s$(a, b).

$$\text{Similarity}(a, b) = \text{Max}(S_{raw}(a, b), J(a, b), J_s(a, b)) \quad \text{(ix)}$$

Example Computer System

Figure 19:
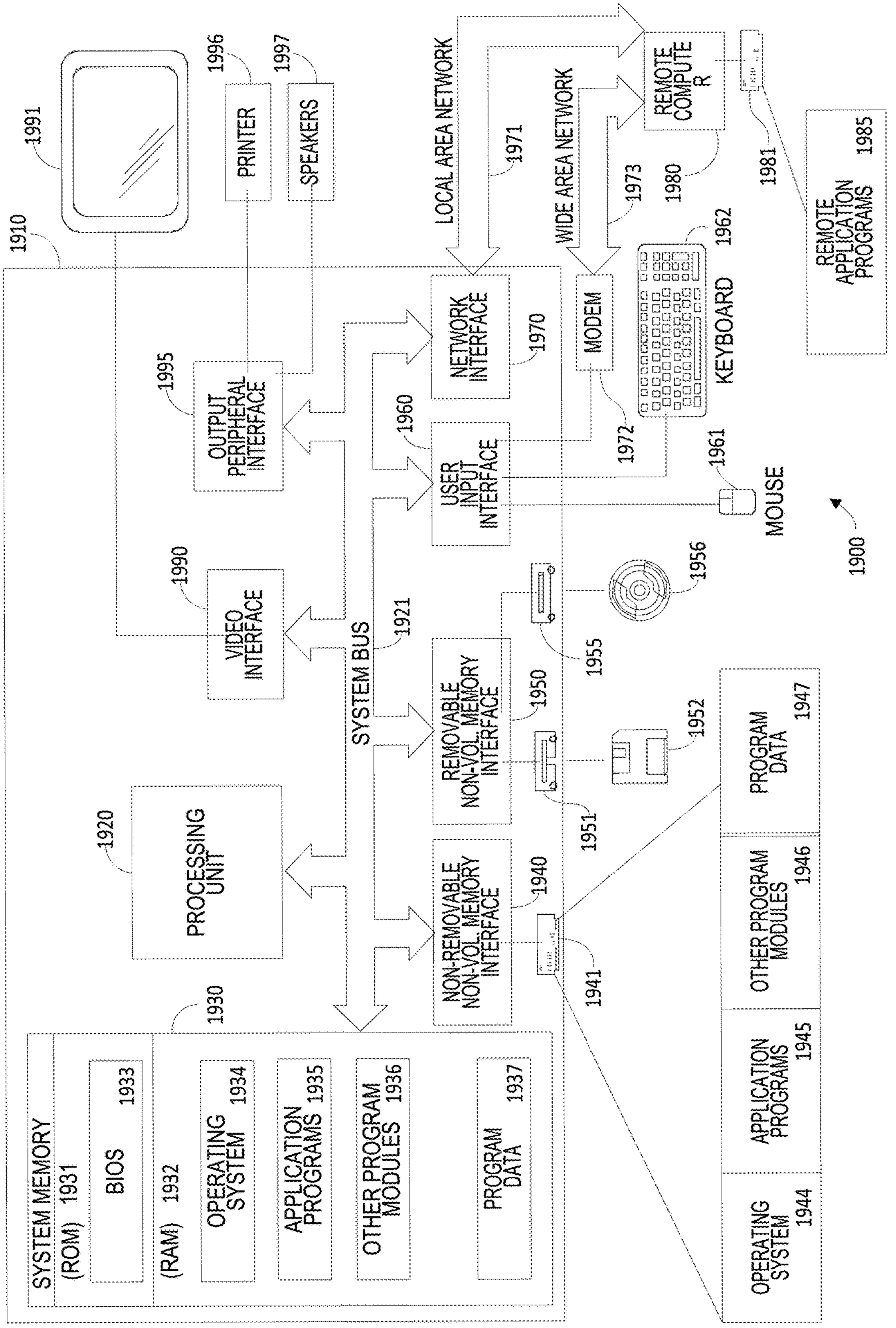
FIG. 19 is a block diagram of an illustrative computing system that may be used in implementing some embodiments of the technology described herein.

FIG. 19 illustrates an example of a suitable computing system environment 1900 on which the technology described herein may be implemented. The computing system environment 1900 is only one example of a suitable computing environment and is not intended to suggest any limitation as to the scope of use or functionality of the technology described herein. Neither should the computing environment 1900 be interpreted as having any dependency or requirement relating to any one or combination of components illustrated in the exemplary operating environment 1900.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 19, an exemplary system for implementing the technology described herein includes a general purpose computing device in the form of a computer 1900. Components of computer 1910 may include, but are not limited to, a processing unit 1920, a system memory 1930, and a system bus 1921 that couples various system components including the system memory to the processing unit 1920. The system bus 1921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (ELISA) bus, Video Electronics Standards Association (VESA) local bus, and Peripheral Component Interconnect (PCI) bus also known as Mezzanine bus.

Computer 1910 typically includes a variety of computer readable media. Computer readable media can be any available media that can be accessed by computer 1910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computer 1910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1930 includes computer storage media in the form of volatile and/or nonvolatile memory such as read only memory (ROM) 1931 and random access memory (RAM) 1932. A basic input/output system 1933 (BIOS), containing the basic routines that help to transfer information between elements within computer 1910, such as during start-up, is typically stored in ROM 1931. RAM 1932 typically contains data and/or program modules that are immediately accessible to and/or presently being operated on by processing unit 1920. By way of example, and not limitation, FIG. 19 illustrates operating system 1934, application programs 1935, other program modules 1936, and program data 1937.

The computer 1910 may also include other removable/non-removable, volatile/nonvolatile computer storage media. By way of example only, FIG. 19 illustrates a hard disk drive 1941 that reads from or writes to non-removable, nonvolatile magnetic media, a flash drive 1951 that reads from or writes to a removable, nonvolatile memory 1952 such as flash memory, and an optical disk drive 1955 that reads from or writes to a removable, nonvolatile optical disk 1956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1941 is typically connected to the system bus 1921 through a non-removable memory interface such as interface 1940, and magnetic disk drive 1951 and optical disk drive 1955 are typically connected to the system bus 1921 by a removable memory interface, such as interface 1950.

The drives and their associated computer storage media described above and illustrated in FIG. 19, provide storage of computer readable instructions, data structures, program modules and other data for the computer 1910. In FIG. 19, for example, hard disk drive 1941 is illustrated as storing operating system 1944, application programs 1945, other program modules 1946, and program data 1947. Note that these components can either be the same as or different from operating system 1934, application programs 1935, other program modules 1936, and program data 1937. Operating system 1944, application programs 1945, other program modules 1946, and program data 1947 are given different numbers here to illustrate that, at a minimum, they are different copies. An actor may enter commands and information into the computer 1910 through input devices such as a keyboard 1962 and pointing device 1961, commonly referred to as a mouse, trackball or touch pad. Other input devices (not shown) may include a microphone, joystick, game pad, satellite dish, scanner, or the like. These and other input devices are often connected to the processing unit 1920 through a user input interface 1960 that is coupled to the system bus, but may be connected by other interface and bus structures, such as a parallel port, game port or a universal serial bus (USB). A monitor 1991 or other type of display device is also connected to the system bus 1921 via an interface, such as a video interface 1990. In addition to the monitor, computers may also include other peripheral output devices such as speakers 1997 and printer 1996, which may be connected through an output peripheral interface 1995.

The computer 1910 may operate in a networked environment using logical connections to one or more remote computers, such as a remote computer 1980. The remote computer 1980 may be a personal computer, a server, a router, a network PC, a peer device or other common network node, and typically includes many or all of the elements described above relative to the computer 1910, although only a memory storage device 1981 has been illustrated in FIG. 19. The logical connections depicted in FIG. 19 include a local area network (LAN) 1971 and a wide area network (WAN) 1983, but may also include other networks. Such networking environments are commonplace in offices, enterprise-wide computer networks, intranets and the Internet.

When used in a LAN networking environment, the computer 1910 is connected to the LAN 1971 through a network interface or adapter 1970. When used in a WAN networking environment, the computer 1910 typically includes a modem 1982 or other means for establishing communications over the WAN 1983, such as the Internet. The modem 1982, which may be internal or external, may be connected to the system bus 1921 via the actor input interface 1960, or other appropriate mechanism. In a networked environment, program modules depicted relative to the computer 1910, or portions thereof, may be stored in the remote memory storage device. By way of example, and not limitation, FIG. 19 illustrates remote application programs 1985 as residing on memory device 1981. It will be appreciated that the network connections shown are exemplary and other means of establishing a communications link between the computers may be used.

Having thus described several aspects of at least one embodiment of the technology described herein, it is to be appreciated that various alterations, modifications, and improvements will readily occur to those skilled in the art.

Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the dataset fields with locations in a computer-readable medium that conveys relationship between the dataset fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 3 and 7. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user". It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

SUMMARY OF SOME EMBODIMENTS

In some embodiments, the techniques described herein relate to a method for processing a dataset including data stored in fields to determine field labels for a set of the dataset's fields, the method including: using at least one computer hardware processor to perform: for each particular field in one or more fields in the set of the dataset's fields: determining whether any field label in a field label glossary matches the particular field; when it is determined that a field label in the field label glossary matches the particular field, assigning the field label to the particular field; and when it is determined that no field label in the field label glossary matches the particular field: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

In some embodiments, the techniques described herein relate to a method, wherein generating the word sequence describing data stored in the particular field includes: determining, using the plurality of sets of candidate words and the plurality of sets of scores, a plurality of candidate word collections and corresponding plurality of word collection scores; generating a plurality of candidate word sequences using the plurality of candidate word collections; and selecting the word sequence from the plurality of candidate word sequences using the plurality of word collection scores.

In some embodiments, the techniques described herein relate to a method, wherein determining the plurality of candidate word collections and the corresponding plurality of word collection scores includes: combining words from each of the plurality of sets of candidate words to obtain the plurality of candidate word collections; and determining the plurality of word collection scores corresponding to the plurality of candidate word collections using a colocation scoring model.

In some embodiments, the techniques described herein relate to a method, wherein determining the plurality of word collection scores corresponding to the plurality of candidate word collections using the colocation scoring model includes, for each particular candidate word collection of one or more of the plurality of candidate word collections: determining a first output of the colocation scoring model for a first word in the particular candidate word collection; determining, using the first output of the colocation scoring model for the first word, a second output of the colocation scoring model for a second word in the particular candidate word collection; and determining the score for the particular candidate word collection using the first output of the colocation scoring model and the second output of the colocation scoring model.

In some embodiments, the techniques described herein relate to a method, wherein selecting the word sequence from the plurality of candidate word sequences includes determining context-adjusted scores for the plurality of candidate word sequences using a colocation scoring model, the colocation scoring model including: a first layer including: a first plurality of nodes each associated with a respective field of the set of the dataset's fields; and a node associated with a name of the dataset; and a second layer including a second plurality of nodes each configured to output word sequence scores corresponding to candidate word sequences determined for a respective field of the set of the dataset's fields.

In some embodiments, the techniques described herein relate to a method, wherein determining the context-adjusted scores for the plurality of candidate word sequences using the colocation scoring model includes: determining outputs of the first plurality of nodes of the first layer; and determining outputs of the second plurality of nodes of the second layer, the outputs of the second plurality of nodes including outputs of a particular node associated with the particular field, the outputs of the particular node indicating the context-adjusted scores for the plurality of candidate word sequences.

In some embodiments, the techniques described herein relate to a method, wherein determining the plurality of word collection scores corresponding to the plurality of candidate word collections includes: accessing a language model indicating sets of collocated words that appear in a set of text and, for each of the sets of collocated words, a relative position of each word in the set of collocated words; and determining, using the language model and the plurality of sets of scores corresponding to the plurality of sets of candidate words, the plurality of word collection scores corresponding to the plurality of candidate word collections.

In some embodiments, the techniques described herein relate to a method, wherein generating the plurality of candidate word sequences using the plurality of candidate word collections includes, for each candidate word collection: arranging words in the candidate word collection to obtain a corresponding word sequence.

In some embodiments, the techniques described herein relate to a method, wherein generating, using the word sequence describing data stored in the particular field, the new field label includes: selecting a subset of words from the word sequence; and generating the new field label such that the new field label includes the subset of words without including words in the word sequence that are not included in the subset of words.

In some embodiments, the techniques described herein relate to a method, wherein generating the new field label includes: identifying a classword; and including the classword in the new field label.

In some embodiments, the techniques described herein relate to a method, wherein identifying the classword includes identifying the classword in the word sequence describing data stored in the particular field.

In some embodiments, the techniques described herein relate to a method, wherein identifying the classword includes: accessing stored in the particular field of the dataset, the data including a set of alphanumeric values; and identifying the classword using the set of alphanumeric values.

In some embodiments, the techniques described herein relate to a method, wherein identifying the classword using the set of values from the particular field includes: applying a plurality of tests to the set of values, each of the plurality of tests associated with a respective classword; and selecting, using results of applying the plurality of tests to the set of values, the classword from among classwords associated with the plurality of tests.

In some embodiments, the techniques described herein relate to a method, wherein assigning the new field label to the particular field includes: presenting a plurality of candidate field labels to a user in a graphical user interface (GUI), the plurality of candidate field labels including the new field label; and obtaining user input through the GUI indicating a selection of the new field label.

In some embodiments, the techniques described herein relate to a method, further including: updating the plurality of sets scores corresponding to the plurality of sets of candidate words based on the user input indicating the selection of the new field label.

In some embodiments, the techniques described herein relate to a method, wherein updating the plurality of sets scores corresponding to the plurality of sets of candidate words based on the user input indicating the selection of the new field label includes: increasing scores associated with words in the plurality of sets of candidate words that are included in the word sequence from which the new field label for the particular field was generated.

In some embodiments, the techniques described herein relate to a method, wherein generating the new field label includes: determining values of a plurality of attributes for the new field label; and generating a data entity definition for the new field label using the values of the plurality of attributes.

In some embodiments, the techniques described herein relate to a method, wherein determining the values of the plurality of attributes for the new field label includes: obtaining values from the particular field; and applying a plurality of tests, associated with the plurality of attributes, to the values from the particular field to obtain the values of the plurality of attributes for the new field label.

In some embodiments, the techniques described herein relate to a method, further including: associating a metadata-driven process with a first field of the set of the dataset's fields at least in part by associating the metadata-driven process with a first field label assigned to the first field.

In some embodiments, the techniques described herein relate to a method, further including applying the metadata-driven process to data stored from the first field.

In some embodiments, the techniques described herein relate to a method, wherein the metadata-driven process, when applied to the data stored from the first field, masks personally identifiable information (PII) stored in the first field.

In some embodiments, the techniques described herein relate to a method, wherein the metadata-driven process, when applied to the data from the first field, determines whether the data meets one or more data quality requirements.

In some embodiments, the techniques described herein relate to a method, wherein the metadata-driven process, when applied to the data from the first field, updates the data from the first field.

In some embodiments, the techniques described herein relate to a method, further including: determining, using the first field label, that the first metadata-driven process is associated with the first field label assigned to the first field; and in response to the determining that the first metadata-driven process is associated with the first field label assigned to the first field, triggering application of the first metadata-driven process to data from the first field.

In some embodiments, the techniques described herein relate to a method, wherein the first field label indicates that data from the first field contains data to be protected, such as personally identifiable information, without having to access the data stored in the first field, and wherein the first metadata-driven process is a process for protecting the data from the first field, such as anonymizing the data from the first field, restricting access to the data from the first field, and/or de-identifying the data from the first field.

In some embodiments, the techniques described herein relate to a method, wherein the process for anonymizing the data from the first field includes masking of personally identifiable information (PII).

In some embodiments, the techniques described herein relate to a method, wherein the first field label indicates, without having to access the data from the first field, that data from the first field is of a data format that makes the data not suitable as input for a data processing application, and wherein the first metadata-driven process is a process for: reformatting the data from the first field in accordance with a data format that is suitable as input for the data processing application; and providing the reformatted data as input to the data processing application for execution of the data processing application.

In some embodiments, the techniques described herein relate to a method, wherein the data format of the data from the first field is not suitable as input for the data processing application in that the data processing application would not run, or would run with a malfunction, on the data of that not suitable data format.

In some embodiments, the techniques described herein relate to a method, wherein the first field label indicates, without having to access the data from the first field, that data from the first field depends on data from a second field of the set of the dataset's fields, so that the first and second fields are related by a relationship, and wherein the first metadata-driven process is a process for generating lineage information about the relationship of the first and second fields and providing the generated lineage information to a computer for display as lineage diagram.

In some embodiments, the techniques described herein relate to a method, wherein the relationship between the first and second fields is that data from the second field is computed using data from the first field and/or vice versa.

In some embodiments, the techniques described herein relate to a method, wherein the first field label indicates, without having to access the data stored in the first field, that data from the first field is of a data format that is incompatible as input for a particular version of a data processing application, and wherein the first metadata-driven process is a process for reconfiguring the particular version of the data processing application to obtain a reconfigured data processing application and providing the data from the first field as input to the reconfigured data processing application for execution of the reconfigured data processing application.

In some embodiments, the techniques described herein relate to a method, wherein the data format of the data from the first field causes the data processing application to fail to run or to malfunction.

In some embodiments, the techniques described herein relate to a system for processing a dataset including data stored in fields to determine field labels for a set of the dataset's fields, the system including: at least one computer hardware processor; and at least one non-transitory computer-readable storage medium storing instructions that, when executed by the at least one computer hardware processor, cause the at least one processor to perform: for each particular field in one or more fields in the set of the dataset's fields: determining whether any field label in a field label glossary matches the particular field; when it is determined that a field label in the field label glossary matches the particular field, assigning the field label to the particular field; and when it is determined that no field label in the field label glossary matches the particular field: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

In some embodiments, the techniques described herein relate to a non-transitory computer-readable storage medium storing instructions that, when executed by at least one computer hardware processor, cause the at least one computer hardware processor to perform a method for processing a dataset including data stored in fields to determine field labels for a set of the dataset's fields, the method including: for each particular field in one or more fields in the set of the dataset's fields: determining whether any field label in a field label glossary matches the particular field; when it is determined that a field label in the field label glossary matches the particular field, assigning the field label to the particular field; and when it is determined that no field label in the field label glossary matches the particular field: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

In some embodiments, the techniques described herein relate to a method for processing a dataset including data stored in fields to determine field labels for a set of the dataset's fields, the method including: using at least one computer hardware processor to perform: for each particular field in one or more fields in the set of the dataset's fields: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

In some embodiments, the techniques described herein relate to a method, wherein generating the word sequence describing data stored in the particular field includes: determining, using the plurality of sets of candidate words and the plurality of sets of scores, a plurality of candidate word collections and corresponding plurality of word collection scores; generating a plurality of candidate word sequences using the plurality of candidate word collections; and selecting the word sequence from the plurality of candidate word sequences using the plurality of word collection scores.

In some embodiments, the techniques described herein relate to a method, wherein determining the plurality of candidate word collections and the corresponding plurality of word collection scores includes: combining words from each of the plurality of sets of candidate words to obtain the plurality of candidate word collections; and determining the plurality of word collection scores corresponding to the plurality of candidate word collections using a colocation scoring model.

In some embodiments, the techniques described herein relate to a method, wherein determining the plurality of word collection scores corresponding to the plurality of candidate word collections using the colocation scoring model includes, for each particular candidate word collection of one or more of the plurality of candidate word collections: determining a first output of the colocation scoring model for a first word in the particular candidate word collection; determining, using the first output of the colocation scoring model for the first word, a second output of the colocation scoring model for a second word in the particular candidate word collection; and determining the score for the particular candidate word collection using the first output of the colocation scoring model and the second output of the colocation scoring model.

In some embodiments, the techniques described herein relate to a method, wherein selecting the word sequence from the plurality of candidate word sequences includes determining context-adjusted scores for the plurality of candidate word sequences using a colocation scoring model, the colocation scoring model including: a first layer including: a first plurality of nodes each associated with a respective field of the set of the dataset's fields; and a node associated with a name of the dataset; and a second layer including a second plurality of nodes each configured to output word sequence scores corresponding to candidate word sequences determined for a respective field of the set of the dataset's fields.

In some embodiments, the techniques described herein relate to a method, wherein determining the context-adjusted scores for the plurality of candidate word sequences using the colocation scoring model includes: determining outputs of the first plurality of nodes of the first layer; and determining outputs of the second plurality of nodes of the second layer, the outputs of the second plurality of nodes including outputs of a particular node associated with the particular field, the outputs of the particular node indicating the context-adjusted scores for the plurality of candidate word sequences.

In some embodiments, the techniques described herein relate to a method, wherein determining the plurality of word collection scores corresponding to the plurality of candidate word collections includes: accessing a language model indicating sets of collocated words that appear in a set of text and, for each of the sets of collocated words, a relative position of each word in the set of collocated words; and determining, using the language model and the plurality of sets of scores corresponding to the plurality of sets of candidate words, the plurality of word collection scores corresponding to the plurality of candidate word collections.

In some embodiments, the techniques described herein relate to a method, wherein generating the plurality of candidate word sequences using the plurality of candidate word collections includes, for each candidate word collection: arranging words in the candidate word collection to obtain a corresponding word sequence.

In some embodiments, the techniques described herein relate to a method, wherein generating, using the word sequence describing data stored in the particular field, the new field label includes: selecting a subset of words from the word sequence; and generating the new field label such that the new field label includes the subset of words without including words in the word sequence that are not included in the subset of words.

In some embodiments, the techniques described herein relate to a method, wherein generating the new field label includes: identifying a classword; and including the classword in the new field label.

In some embodiments, the techniques described herein relate to a method, wherein identifying the classword includes identifying the classword in the word sequence describing data stored in the particular field.

In some embodiments, the techniques described herein relate to a method, wherein identifying the classword includes: accessing stored in the particular field of the dataset, the data including a set of alphanumeric values; and identifying the classword using the set of alphanumeric values.

In some embodiments, the techniques described herein relate to a method, wherein identifying the classword using the set of values from the particular field includes: applying a plurality of tests to the set of values, each of the plurality of tests associated with a respective classword; and selecting, using results of applying the plurality of tests to the set of values, the classword from among classwords associated with the plurality of tests.

In some embodiments, the techniques described herein relate to a method, wherein assigning the new field label to the particular field includes: presenting a plurality of candidate field labels to a user in a graphical user interface (GUI), the plurality of candidate field labels including the new field label; and obtaining user input through the GUI indicating a selection of the new field label.

In some embodiments, the techniques described herein relate to a method, further including: updating the plurality of sets scores corresponding to the plurality of sets of candidate words based on the user input indicating the selection of the new field label.

In some embodiments, the techniques described herein relate to a method, wherein updating the plurality of sets scores corresponding to the plurality of sets of candidate words based on the user input indicating the selection of the new field label includes: increasing scores associated with words in the plurality of sets of candidate words that are included in the word sequence from which the new field label for the particular field was generated.

In some embodiments, the techniques described herein relate to a method, wherein generating the new field label includes: determining values of a plurality of attributes for the new field label; and generating a data entity definition for the new field label using the values of the plurality of attributes.

In some embodiments, the techniques described herein relate to a method, wherein determining the values of the plurality of attributes for the new field label includes: obtaining values from the particular field; and applying a plurality of tests, associated with the plurality of attributes, to the values from the particular field to obtain the values of the plurality of attributes for the new field label.

In some embodiments, the techniques described herein relate to a method, further including: associating a metadata-driven process with a first field of the set of the dataset's fields at least in part by associating the metadata-driven process with a first field label assigned to the first field.

In some embodiments, the techniques described herein relate to a method, further including applying the metadata-driven process to data from the first field.

In some embodiments, the techniques described herein relate to a method, wherein the metadata-driven process, when applied to the data from the first field, masks personally identifiable information (PII) stored in the first field.

In some embodiments, the techniques described herein relate to a method, wherein the metadata-driven process, when applied to the data stored from the first field, determines whether the data from the first field meets one or more data quality requirements.

In some embodiments, the techniques described herein relate to a method, wherein the metadata-driven process, when applied to the data from the first field, updates the data from the first field.

In some embodiments, the techniques described herein relate to a system for processing a dataset including data stored in fields to determine field labels for a set of the dataset's fields, the system including: at least one computer hardware processor; and at least one non-transitory computer-readable storage medium storing instructions that, when executed by the at least one computer hardware processor, cause the at least one processor to perform: for each particular field in one or more fields in the set of the dataset's fields: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

In some embodiments, the techniques described herein relate to a non-transitory computer-readable storage medium storing instructions that, when executed by at least one computer hardware processor, cause the at least one computer hardware processor to perform a method for processing a dataset including data stored in fields to determine field labels for a set of the dataset's fields, the method including: for each particular field in one or more fields in the set of the dataset's fields: identifying, for a set of abbreviations in a name of the particular field, a plurality of sets of candidate words indicated by the set of abbreviations and a corresponding plurality of sets of scores; generating, using the plurality of sets of candidate words and the plurality of sets of scores, a word sequence describing data stored in the particular field; generating, using the word sequence describing data stored in the particular field, a new field label for the particular field; and assigning the new field label to the particular field.

In some embodiments, the techniques described herein relate to a method for processing a dataset including data stored in fields to identify, from a field label glossary, a field label for each field in a set of one or more of the dataset fields of the dataset, the field labels describing data stored in the set of fields, the method including: using at least one computer hardware processor to perform: for each particular field in the set of fields, determining, using a name of the particular field and natural language processing (NLP), a first set of candidate field labels for the particular field and field name analysis scores for the first set of candidate field labels; determining, using a subset of data from the particular field and tests associated with respective field labels in the field label glossary, a second set of candidate field labels and field data analysis scores for the second set of candidate field labels; determining merged candidate field labels and corresponding scores using the first set of candidate field labels and the field name analysis scores, and the second set of candidate field labels and the field data analysis scores; and assigning one of the merged candidate field labels to the particular field using the corresponding scores.

In some embodiments, the techniques described herein relate to a method, wherein determining, using the name of the particular field and the NLP, the first set of candidate field labels for the particular field and the field name analysis scores for the first set of candidate field labels includes: identifying a set of abbreviations in the name of the particular field; determining, for each particular abbreviation in the set of abbreviations, a set of candidate words indicated by the abbreviation and a corresponding set of similarity scores to obtain sets of candidate words indicated by the abbreviations and corresponding sets of similarity scores; and determining, using the sets of candidate words indicated by the abbreviations and the corresponding sets of similarity scores, the first set of candidate field labels and the field name analysis scores.

In some embodiments, the techniques described herein relate to a method, wherein determining, using the subset of data from the particular field and the tests associated with respective field labels in the field label glossary, the second set of candidate field labels and the field data analysis scores for the second set of candidate field labels includes: applying the tests associated with the respective field labels to the subset of data from the particular field to obtain test results; and determining the second set of candidate field labels and the dataset field analysis scores using the test results obtained from applying the tests.

In some embodiments, the techniques described herein relate to a method, wherein applying the tests associated with the respective field labels to the subset of data from the particular field includes, for each test: accessing a regular expression associated with the test; determining a proportion of the subset of data that meets the regular expression associated with the test; and determining a test result using the proportion of the subset of data that meets the regular expression associated with the test.

In some embodiments, the techniques described herein relate to a method, wherein determining the merged candidate field labels and the corresponding scores using the first set of candidate field labels and the field name analysis scores, and the second set of candidate field labels and the field data analysis scores includes: identifying a first field label associated with a first one of the field name analysis scores and a first one of the field data analysis scores, the first field label being in the first set of candidate field labels and the second set of candidate field labels; and determining a first merged score for the first field label by adjusting the first field name analysis score using the first field data analysis score to obtain the first merged score.

In some embodiments, the techniques described herein relate to a method, wherein adjusting the first field name analysis score using the first field data analysis score includes: determining a ratio between the first field name analysis score and the first field data analysis score; and adjusting the first field name analysis score using the ratio.

In some embodiments, the techniques described herein relate to a method, wherein adjusting the first field name analysis score using the ratio includes: determining a bias value as a log of the ratio; and adjusting the first field name analysis score using the bias value.

In some embodiments, the techniques described herein relate to a method, wherein determining the merged candidate field labels and the corresponding scores using the first set of candidate field labels and the field name analysis scores, and the second set of candidate field labels and the field data analysis scores includes: identifying a first field label from the first set of candidate field labels associated with a first one of the field name analysis scores; determining that none of the subset of data passes a test associated with the first field label; and determining a first merged score for the first field label by reducing the first field name analysis score.

In some embodiments, the techniques described herein relate to a method, wherein assigning one of the merged candidate field labels to the particular field using the corresponding scores determined for the candidate field labels includes: automatically selecting, from the merged candidate field labels, a candidate field label using the corresponding scores; and assigning the selected candidate field label to the particular field.

In some embodiments, the techniques described herein relate to a method, wherein assigning one of the merged candidate field labels to the particular field using the corresponding scores includes: presenting at least some of the merged candidate field labels in a graphical user interface (GUI); and receiving, through the GUI, user input indicating selection of a candidate field label to assign to the particular field.

In some embodiments, the techniques described herein relate to a method, further including: determining, using a first field label assigned to a first field in the set of fields, that a first metadata-driven process is associated with the first field label assigned to the first field; and in response to the determining that the first metadata-driven process is associated with the first field label assigned to the first field, triggering application of the first metadata-driven process to data from the first field.

In some embodiments, the techniques described herein relate to a method, wherein the first field label indicates that data stored in the first field contains data to be protected, such as personally identifiable information, without having to access the data stored in the first field, and wherein the first metadata-driven process is a process for protecting the data from the first field, such as anonymizing the data from the first field, restricting access to the data from the first field, and/or de-identifying the data from the first field.

In some embodiments, the techniques described herein relate to a method, wherein the process for anonymizing the data from the first field includes masking of personally identifiable information (PII).

In some embodiments, the techniques described herein relate to a method, wherein the first field label indicates, without having to access the data from the first field, that data from the first field is of a data format that makes the data not suitable as input for a data processing application, and wherein the first metadata-driven process is a process for: reformatting the data from the first field in accordance with a data format that is suitable as input for the data processing application; and providing the reformatted data as input to the data processing application for execution of the data processing application.

In some embodiments, the techniques described herein relate to a method, wherein the data format of the data from the first field is not suitable as input for the data processing application in that the data processing application would not run, or would run with a malfunction, on the data of that not suitable data format.

In some embodiments, the techniques described herein relate to a method, wherein the first field label indicates, without having to access the data from the first field, that data from the first field depends on data from a second field of the set of the dataset's fields, so that the first and second fields are related by a relationship, and wherein the first metadata-driven process is a process for generating lineage information about the relationship of the first and second fields and providing the generated lineage information to a computer for display as lineage diagram.

In some embodiments, the techniques described herein relate to a method, wherein the relationship between the first and second fields is that data from the second field is computed using data from the first field and/or vice versa.

In some embodiments, the techniques described herein relate to a method, wherein the first field label indicates, without having to access the data stored in the first field, that data from the first field is of a data format that is incompatible as input for a particular version of a data processing application, and wherein the first metadata-driven process is a process for reconfiguring the particular version of the data processing application to obtain a reconfigured data processing application and providing the data from the first field as input to the reconfigured data processing application for execution of the reconfigured data processing application.

In some embodiments, the techniques described herein relate to a method, wherein the data format of the data from the first field causes the data processing application to fail to run or to malfunction.

In some embodiments, the techniques described herein relate to a system for processing a dataset including data stored in fields to identify, from a field label glossary, a field label for each field in a set of one or more of the dataset fields of the dataset, the field labels describing data stored in the set of fields, the system including: at least one computer hardware processor; and at least one non-transitory computer-readable storage medium storing instructions that, when executed by the at least one computer hardware processor, cause the at least one processor to perform: for each particular field in the set of fields, determining, using a name of the particular field and natural language processing (NLP), a first set of candidate field labels for the particular field and field name analysis scores for the first set of candidate field labels; determining, using a subset of data from the particular field and tests associated with respective field labels in the field label glossary, a second set of candidate field labels and field data analysis scores for the second set of candidate field labels; determining merged candidate field labels and corresponding scores using the first set of candidate field labels and the field name analysis scores, and the second set of candidate field labels and the field data analysis scores; and assigning one of the merged candidate field labels to the particular field using the corresponding scores.

In some embodiments, the techniques described herein relate to a non-transitory computer-readable storage medium storing instructions that, when executed by at least one computer hardware processor, cause the at least one computer hardware processor to perform a method for processing a dataset including data stored in fields to identify, from a field label glossary, a field label for each field in a set of one or more of the dataset fields of the dataset, the field labels describing data stored in the set of fields, the method including: for each particular field in the set of fields, determining, using a name of the particular field and natural language processing (NLP), a first set of candidate field labels for the particular field and field name analysis scores for the first set of candidate field labels; determining, using a subset of data from the particular field and tests associated with respective field labels in the field label glossary, a second set of candidate field labels and field data analysis scores for the second set of candidate field labels; determining merged candidate field labels and corresponding scores using the first set of candidate field labels and the field name analysis scores, and the second set of candidate field labels and the field data analysis scores; and assigning one of the merged candidate field labels to the particular field using the corresponding scores.

In some embodiments, the techniques described herein relate to a method for processing a dataset including data stored in fields to identify, from a field label glossary, a field label for each field in a set of one or more of the dataset fields of the dataset, the field labels describing data stored in the set of fields, the method including: using at least one computer hardware processor to perform: for each particular field in the set of fields, determining, using a name of the particular field and natural language processing (NLP), candidate field labels for the particular field and field name analysis scores for the candidate field labels, the determining including: identifying a set of abbreviations in the name of the particular field; identifying, for each particular abbreviation in the set of abbreviations, a set of candidate words indicated by the particular abbreviation thereby obtaining sets of candidate words; generating, using the sets of candidate words identified for the abbreviations and an n-gram model indicating a plurality of word collections that appear within field labels of the field label glossary, at least one word sequence describing data stored in the particular field; and determining, using the at least one word sequence and the field label glossary, the candidate field labels for the particular field and the field name analysis scores for the candidate field labels; and assigning one of the candidate field labels to the particular field using the field name analysis scores determined for the candidate field labels.

In some embodiments, the techniques described herein relate to a method, wherein generating, using the sets of candidate words identified for the abbreviations and the n-gram model indicating the plurality of word collections that appear within the field labels of the field label glossary, the at least one word sequence describing data stored in the particular field includes: combining words from the sets of candidate words to obtain a plurality of word sequences; and filtering, using the n-gram model, the plurality of word sequences to obtain the at least one word sequence.

In some embodiments, the techniques described herein relate to a method, wherein filtering, using the n-gram model, the plurality of word sequences to obtain the at least one word sequence includes: determining, using the n-gram model, for each of the plurality of word sequences, a likelihood that words of the word sequence are collocated; and filtering, using likelihoods determined for the plurality of word sequences, the plurality of word sequences to obtain the at least one word sequence.

In some embodiments, the techniques described herein relate to a method, wherein determining, using the at least one word sequence and the field label glossary, the candidate field labels for the particular field and the field name analysis scores for the candidate field labels includes: determining that one of the words in the at least one word sequence specifies a particular category of data; determining a target position of the word in the at least one word sequence; and determining the field name analysis scores for the candidate field labels based on the target position of the word in the at least one word sequence.

In some embodiments, the techniques described herein relate to a method, wherein determining the target position of the word in the at least one word sequence includes determining a target position of the word based on a target language for a field label to be assigned to the particular field.

In some embodiments, the techniques described herein relate to a method, wherein determining, using the at least one word sequence and the field label glossary, the candidate field labels for the particular field and the field name analysis scores for the candidate field labels includes: accessing a sequence position model that is based on an order of words in the at least one word sequence; determining, using the sequence position model, scores for the field labels of the field label glossary; and selecting, using the scores for the field labels of the field label glossary, the candidate field labels from the field label glossary.

In some embodiments, the techniques described herein relate to a method, wherein identifying, for each particular abbreviation in the set of abbreviations, the set of candidate words indicated by the particular abbreviation includes: determining a similarity score between each candidate word in the set of candidate words and the particular abbreviation thereby obtaining sets of similarity scores corresponding to the sets of candidate words.

In some embodiments, the techniques described herein relate to a method, wherein determining, using the at least one word sequence and the field label glossary, the candidate field labels for the particular field and the field name analysis scores for the candidate field labels includes: identifying words in the at least one word sequence that are present in the sets of candidate words and corresponding similarity scores; and determining, using the words in the at least one word sequence and the corresponding similarity scores, the candidate field labels for the particular field and the field name analysis scores for the candidate field labels.

In some embodiments, the techniques described herein relate to a method, further including generating the n-gram model using the field label glossary.

In some embodiments, the techniques described herein relate to a method, wherein assigning one of the candidate field labels to the particular field using the field name analysis scores determined for the candidate field labels includes automatically assigning the candidate field label to the particular field when a score corresponding to the candidate field label meets a threshold score.

In some embodiments, the techniques described herein relate to a system for processing a dataset including data stored in fields to identify, from a field label glossary, a field label for each field in a set of one or more of the dataset fields of the dataset, the field labels describing data stored in the set of fields, the system including: at least one computer hardware processor; and at least one non-transitory computer-readable storage medium storing instructions that, when executed by the at least one computer hardware processor, cause the at least one processor to perform: for each particular field in the set of fields, determining, using a name of the particular field and natural language processing (NLP), candidate field labels for the particular field and field name analysis scores for the candidate field labels, the determining including: identifying a set of abbreviations in the name of the particular field; identifying, for each particular abbreviation in the set of abbreviations, a set of candidate words indicated by the particular abbreviation thereby obtaining sets of candidate words; generating, using the sets of candidate words identified for the abbreviations and an n-gram model indicating a plurality of word collections that appear within field labels of the field label glossary, at least one word sequence describing data stored in the particular field; and determining, using the at least one word sequence and the field label glossary, the candidate field labels for the particular field and the field name analysis scores for the candidate field labels; and assigning one of the candidate field labels to the particular field using the field name analysis scores determined for the candidate field labels.

In some embodiments, the techniques described herein relate to a non-transitory computer-readable storage medium storing instructions that, when executed by at least one computer hardware processor, cause the at least one computer hardware processor to perform a method for processing a dataset including data stored in fields to identify, from a field label glossary, a field label for each field in a set of one or more of the dataset fields of the dataset, the field labels describing data stored in the set of fields, the method including: for each particular field in the set of fields, determining, using a name of the particular field and natural language processing (NLP), candidate field labels for the particular field and field name analysis scores for the candidate field labels, the determining including: identifying a set of abbreviations in the name of the particular field; identifying, for each particular abbreviation in the set of abbreviations, a set of candidate words indicated by the particular abbreviation thereby obtaining sets of candidate words; generating, using the sets of candidate words identified for the abbreviations and an n-gram model indicating a plurality of word collections that appear within field labels of the field label glossary, at least one word sequence describing data stored in the particular field; and determining, using the at least one word sequence and the field label glossary, the candidate field labels for the particular field and the field name analysis scores for the candidate field labels; and assigning one of the candidate field labels to the particular field using the field name analysis scores determined for the candidate field labels.

In some embodiments, the techniques described herein relate to a method for processing a dataset including data stored in fields to identify, from a field label glossary, a field label for each field in a set of one or more of the dataset fields of the dataset, the field labels describing data stored in the set of fields, the method including: using at least one computer hardware processor to perform: for each particular field in the set of fields, determining, using a name of the particular field and natural language processing (NLP), candidate field labels for the particular field and field name analysis scores for the candidate field labels, the determining including: identifying a set of abbreviations in the name of the particular field; determining, for each particular abbreviation in the set of abbreviations, a set of candidate words indicated by the particular abbreviation and corresponding set of similarity scores thereby obtaining sets of candidate words and corresponding sets of similarity scores, the identifying including: determining a measure of similarity between the particular abbreviation and each of a plurality of words in a glossary to obtain a plurality of similarity scores for the plurality of words, the measure of similarity between an abbreviation and a word being based on characters in the abbreviation, characters in the word, order of the characters in the abbreviation, and order of the characters in the word; and selecting, using the plurality of similarity scores, the set of candidate words from the plurality of words in the glossary to obtain the set of candidate words for the particular abbreviation and the corresponding set of similarity scores; determining, using the sets of candidate words and the corresponding sets of similarity scores, the candidate field labels for the particular label and the field name analysis scores for the candidate field labels; and assigning one of the candidate field labels to the particular field using the field name analysis scores determined for the candidate field labels.

In some embodiments, the techniques described herein relate to a method, wherein the measure of similarity includes multiple component measures of similarity and determining the measure of similarity between the particular abbreviation and each of the plurality of words in the glossary to obtain the plurality of similarity scores includes: determining, for the particular abbreviation and the word, the component measures of similarity to obtain values of the component measures of similarity; and determining the measure of similarity between the particular abbreviation and the word using the values of the component measures of similarity.

In some embodiments, the techniques described herein relate to a method, wherein determining the measure of similarity between the particular abbreviation and the word using the values of the component measures of similarity includes: determining the component measures of similarity; and determining the measure of measure similarity as a maximum of the component measures of similarity.

In some embodiments, the techniques described herein relate to a method, wherein the multiple component measures of similarity are selected from a group consisting of cosine similarity, Jaro-Winkler similarity, and Jaro-Winkler similarity modified to scale based on suffix.

In some embodiments, the techniques described herein relate to a method, wherein determining the measure of similarity between the particular abbreviation and a first word of the plurality of words in the glossary to obtain a first one of the plurality of similarity scores includes: determining one of the multiple component measures of similarity based on a degree to which a suffix of the first word matches a suffix of the particular abbreviation.

In some embodiments, the techniques described herein relate to a method, wherein determining the measure of similarity between the particular abbreviation and a first word of the plurality of words in the glossary to obtain a first one of the plurality of similarity scores includes: removing vowels from the first word to obtain a vowelless word; and determining one of the multiple component measures of similarity using the vowelless word.

In some embodiments, the techniques described herein relate to a method, wherein determining the measure of similarity between the particular abbreviation and a first word of the plurality of words in the glossary to obtain a first one of the plurality of similarity scores includes: stemming the first word to obtain a word stem; and determining one of the multiple component measures of similarity using the word stem.

In some embodiments, the techniques described herein relate to a method, wherein selecting, using the plurality of similarity scores, the set of candidate words from the plurality of words in the glossary to obtain the set of candidate words for the particular abbreviation and the corresponding set of similarity scores includes, for each of the plurality of similarity scores: identifying a subset of the plurality of similarity scores that meet a threshold similarity score, the subset of similarity scores associated with a subset of the plurality of words; and selecting the subset of the plurality of words as the set of candidate words for the particular abbreviation.

In some embodiments, the techniques described herein relate to a method, wherein: the candidate field labels include words from the sets of candidate words; and determining, using the sets of candidate words and the corresponding sets of similarity scores, the candidate field labels for the particular field and the field name analysis scores for the candidate field labels includes: determining, using the sets of candidate words, at least one word sequence describing data stored in the particular field; and determining, using the sets of similarity scores and the at least one word sequence, the field name analysis scores for the candidate field labels.

In some embodiments, the techniques described herein relate to a method, wherein determining, using the sets of similarity scores and the at least one word sequence, the field name analysis scores for the candidate field labels includes, for each of the candidate field labels: identifying words from the sets of candidate words included in the candidate field label; and obtaining similarity scores corresponding to the identified words; and determining a field name analysis score for the candidate field label using the similarity scores corresponding to the identified words.

In some embodiments, the techniques described herein relate to a system including for processing a dataset including data stored in fields to identify, from a field label glossary, a field label for each field in a set of one or more of the dataset fields of the dataset, the field labels describing data stored in the set of fields, the system including: at least one computer hardware processor; and at least one non-transitory computer-readable storage medium storing instructions that, when executed by the at least one computer hardware processor, cause the at least one processor to perform: for each particular field in the set of fields, determining, using a name of the particular field and natural language processing (NLP), candidate field labels for the particular field and field name analysis scores for the candidate field labels, the determining including: identifying a set of abbreviations in the name of the particular field; determining, for each particular abbreviation in the set of abbreviations, a set of candidate words indicated by the particular abbreviation and corresponding set of similarity scores thereby obtaining sets of candidate words and corresponding sets of similarity scores, the identifying including: determining a measure of similarity between the particular abbreviation and each of a plurality of words in a glossary to obtain a plurality of similarity scores for the plurality of words, the measure of similarity between an abbreviation and a word being based on characters in the abbreviation, characters in the word, order of the characters in the abbreviation, and order of the characters in the word; and selecting, using the plurality of similarity scores, the set of candidate words from the plurality of words in the glossary to obtain the set of candidate words for the particular abbreviation and the corresponding set of similarity scores; determining, using the sets of candidate words and the corresponding sets of similarity scores, the candidate field labels for the particular label and the field name analysis scores for the candidate field labels; and assigning one of the candidate field labels to the particular field using the field name analysis scores determined for the candidate field labels.

In some embodiments, the techniques described herein relate to a non-transitory computer-readable storage medium storing instructions that, when executed by at least one computer hardware processor, cause the at least one computer hardware processor to perform a method for processing a dataset including data stored in fields to identify, from a field label glossary, a field label for each field in a set of one or more of the dataset fields of the dataset, the field labels describing data stored in the set of fields, the method including: for each particular field in the set of fields, determining, using a name of the particular field and natural language processing (NLP), candidate field labels for the particular field and field name analysis scores for the candidate field labels, the determining including: identifying a set of abbreviations in the name of the particular field; determining, for each particular abbreviation in the set of abbreviations, a set of candidate words indicated by the particular abbreviation and corresponding set of similarity scores thereby obtaining sets of candidate words and corresponding sets of similarity scores, the identifying including: determining a measure of similarity between the particular abbreviation and each of a plurality of words in a glossary to obtain a plurality of similarity scores for the plurality of words, the measure of similarity between an abbreviation and a word being based on characters in the abbreviation, characters in the word, order of the characters in the abbreviation, and order of the characters in the word; and selecting, using the plurality of similarity scores, the set of candidate words from the plurality of words in the glossary to obtain the set of candidate words for the particular abbreviation and the corresponding set of similarity scores; determining, using the sets of candidate words and the corresponding sets of similarity scores, the candidate field labels for the particular label and the field name analysis scores for the candidate field labels; and assigning one of the candidate field labels to the particular field using the field name analysis scores determined for the candidate field labels.

What is claimed is:

1. A method for processing a dataset comprising data stored in fields to identify, from a field label glossary, a field label for each field in a set of one or more of the dataset fields of the dataset, the field labels describing data stored in the set of fields, the method comprising:

using at least one computer hardware processor to perform:

for each particular field in the set of fields, determining, using a name of the particular field and natural language processing (NLP), a first set of candidate field labels for the particular field and field name analysis scores for the first set of candidate field labels;

determining, using a subset of data from the particular field and tests associated with respective field labels in the field label glossary, a second set of candidate field labels and field data analysis scores for the second set of candidate field labels;

determining merged candidate field labels and corresponding scores using the first set of candidate field labels and the field name analysis scores, and the second set of candidate field labels and the field data analysis scores; and assigning one of the merged candidate field labels to the particular field using the corresponding scores.

2. The method of claim 1, wherein determining, using the name of the particular field and the NLP, the first set of candidate field labels for the particular field and the field name analysis scores for the first set of candidate field labels comprises:

identifying a set of abbreviations in the name of the particular field;

determining, for each particular abbreviation in the set of abbreviations, a set of candidate words indicated by the abbreviation and a corresponding set of similarity scores to obtain sets of candidate words indicated by the abbreviations and corresponding sets of similarity scores; and determining, using the sets of candidate words indicated by the abbreviations and the corresponding sets of similarity scores, the first set of candidate field labels and the field name analysis scores for the first set of candidate field labels.

3. The method of claim 1, wherein determining, using the subset of data from the particular field and the tests associated with respective field labels in the field label glossary, the second set of candidate field labels and the field data analysis scores for the second set of candidate field labels comprises:

applying the tests associated with the respective field labels to the subset of data from the particular field to obtain test results; and determining the second set of candidate field labels and the dataset field analysis scores using the test results obtained from applying the tests.

4. The method of claim 3, wherein applying the tests associated with the respective field labels to the subset of data from the particular field comprises, for each test:

accessing a regular expression associated with the test;

determining a proportion of the subset of data that meets the regular expression associated with the test; and determining a test result using the proportion of the subset of data that meets the regular expression associated with the test.

5. The method of claim 1, wherein determining the merged candidate field labels and the corresponding scores using the first set of candidate field labels and the field name analysis scores, and the second set of candidate field labels and the field data analysis scores comprises:

identifying, for a first field label that is in the first set of candidate field labels and in the second set of candidate field labels, a first field name analysis score of the field name analysis scores that is associated with the first field label and a first data analysis score of the field data analysis scores that is associated with the first field label; and determining a first merged score for the first field label by adjusting the first field name analysis score using the first field data analysis score to obtain the first merged score.

6. The method of claim 5, wherein adjusting the first field name analysis score using the first field data analysis score comprises:

determining a ratio between the first field name analysis score and the first field data analysis score; and adjusting the first field name analysis score using the ratio.

7. The method of claim 6, wherein adjusting the first field name analysis score using the ratio comprises:

determining a bias value as a log of the ratio; and adjusting the first field name analysis score using the bias value.

8. The method of claim 1, wherein determining the merged candidate field labels and the corresponding scores using the first set of candidate field labels and the field name analysis scores, and the second set of candidate field labels and the field data analysis scores comprises:

identifying, as one of the merged candidate field labels, a first field label from the first set of candidate field labels;

identifying, for the first field label, a first field name analysis score of the field name analysis scores that is associated with the first field label;

determining that none of the subset of data from the particular field passes a test associated with the first field label; and determining a first merged score corresponding to the first field label by reducing the first field name analysis score.

9. The method of claim 1, wherein assigning one of the merged candidate field labels to the particular field using the corresponding scores determined for the candidate field labels comprises:

automatically selecting, from the merged candidate field labels, a candidate field label using the corresponding scores; and assigning the selected candidate field label to the particular field.

10. The method of claim 1, wherein assigning one of the merged candidate field labels to the particular field using the corresponding scores comprises:

presenting at least some of the merged candidate field labels in a graphical user interface (GUI); and receiving, through the GUI, user input indicating selection of a candidate field label to assign to the particular field.

11. The method of claim 1, further comprising:

determining, using a first field label assigned to a first field in the set of fields, that a first metadata-driven process is associated with the first field label assigned to the first field; and in response to the determining that the first metadata-driven process is associated with the first field label assigned to the first field, triggering application of the first metadata-driven process to data from the first field.

12. The method of claim 11, wherein the first field label indicates that data stored in the first field includes personally identifiable information without having to access the data stored in the first field, and wherein the first metadata-driven process comprises a process for protecting the data in the first field, by performing one or more of:

anonymizing the data from the first field, restricting access to the data from the first field, and de-identifying the data from the first field.

13. The method of claim 12, wherein the process for anonymizing the data from the first field includes masking of personally identifiable information (PII).

14. The method of claim 11, wherein the first field label indicates, without having to access the data from the first field, that data from the first field is of a data format that makes the data not suitable as input for a data processing application, and wherein the first metadata-driven process is a process for:

reformatting the data from the first field in accordance with a data format that is suitable as input for the data processing application; and providing the reformatted data as input to the data processing application for execution of the data processing application.

15. The method of claim 14, wherein the data format of the data from the first field is not suitable as input for the data processing application in that the data processing application would not run, or would run with a malfunction, on the data of that not suitable data format.

16. The method of claim 11, wherein the first field label indicates, without having to access the data from the first field, that data from the first field depends on data from a second field of the dataset fields, so that the first and second fields are related by a relationship, and wherein the first metadata-driven process is a process for generating lineage information about the relationship of the first and second fields and providing the generated lineage information to a computer for display as lineage diagram.

17. The method of claim 11, wherein the first field label indicates, without having to access the data stored in the first field, that data from the first field is of a data format that is incompatible as input for a particular version of a data processing application, and wherein the first metadata-driven process is a process for reconfiguring the particular version of the data processing application to obtain a reconfigured data processing application and providing the data from the first field as input to the reconfigured data processing application for execution of the reconfigured data processing application.

18. The method of claim 17, wherein the data format of the data from the first field causes the data processing application to fail to run or to malfunction.

19. A system for processing a dataset comprising data stored in fields to identify, from a field label glossary, a field label for each field in a set of one or more of the dataset fields of the dataset, the field labels describing data stored in the set of fields, the system comprising:

at least one computer hardware processor; and at least one non-transitory computer-readable storage medium storing instructions that, when executed by the at least one computer hardware processor, cause the at least one computer hardware processor to perform:

for each particular field in the set of fields, determining, using a name of the particular field and natural language processing (NLP), a first set of candidate field labels for the particular field and field name analysis scores for the first set of candidate field labels;

determining, using a subset of data from the particular field and tests associated with respective field labels in the field label glossary, a second set of candidate field labels and field data analysis scores for the second set of candidate field labels;

determining merged candidate field labels and corresponding scores using the first set of candidate field labels and the field name analysis scores, and the second set of candidate field labels and the field data analysis scores; and assigning one of the merged candidate field labels to the particular field using the corresponding scores.

20. A non-transitory computer-readable storage medium storing instructions that, when executed by at least one computer hardware processor, cause the at least one computer hardware processor to perform a method for processing a dataset comprising data stored in fields to identify, from a field label glossary, a field label for each field in a set of one or more of the dataset fields of the dataset, the field labels describing data stored in the set of fields, the method comprising:

for each particular field in the set of fields, determining, using a name of the particular field and natural language processing (NLP), a first set of candidate field labels for the particular field and field name analysis scores for the first set of candidate field labels;

determining, using a subset of data from the particular field and tests associated with respective field labels in the field label glossary, a second set of candidate field labels and field data analysis scores for the second set of candidate field labels;

determining merged candidate field labels and corresponding scores using the first set of candidate field labels and the field name analysis scores, and the second set of candidate field labels and the field data analysis scores; and assigning one of the merged candidate field labels to the particular field using the corresponding scores.

* * * * *